United States Patent
Miyazawa et al.

(10) Patent No.: US 10,295,806 B2
(45) Date of Patent: May 21, 2019

(54) ZOOM LENS AND IMAGE PICKUP APPARATUS INCLUDING THE SAME

(71) Applicant: CANON KABUSHIKI KAISHA, Tokyo (JP)

(72) Inventors: Nobuyuki Miyazawa, Utsunomiya (JP); Tomoyuki Nakamura, Utsunomiya (JP); Naotoshi Ogawa, Utsunomiya (JP); Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 15/297,617

(22) Filed: Oct. 19, 2016

(65) Prior Publication Data

US 2017/0108678 A1  Apr. 20, 2017

(30) Foreign Application Priority Data

Oct. 20, 2015 (JP) .................. 2015-206068
Oct. 20, 2015 (JP) .................. 2015-206171
(Continued)

(51) Int. Cl.
G02B 15/14 (2006.01)
G02B 15/173 (2006.01)
(Continued)

(52) U.S. Cl.
CPC ......... G02B 15/173 (2013.01); G02B 15/161 (2013.01); G02B 15/17 (2013.01);
(Continued)

(58) Field of Classification Search
CPC ...... G02B 27/646; G02B 9/60; G02B 15/173; G02B 15/20; G02B 15/177; G02B 15/14;
(Continued)

(56) References Cited

U.S. PATENT DOCUMENTS 8,488,253 B2 * 7/2013 Wakazono ........... G02B 15/173 359/683
8,570,662 B2 * 10/2013 Eguchi ................. G02B 15/173 359/683
(Continued)

FOREIGN PATENT DOCUMENTS

JP  H06-242378 A  9/1994
JP  2005345714 A  12/2005
(Continued)

OTHER PUBLICATIONS

Partial European search report issued in corresponding application No. 16002240.6 dated Feb. 21, 2017.
(Continued)

*Primary Examiner* — Evelyn A Lester
(74) *Attorney, Agent, or Firm* — Carter, DeLuca & Farrell LLP

(57) ABSTRACT

A zoom lens, includes, in order from object side: a front unit including a unit including a first unit arranged closest to the object side and not moving for zooming; an Nf unit including three or more lenses and having a negative refractive power; a stop; a first rear unit moving during zooming; a second rear unit moving during zooming; and a third rear unit not moving for zooming, in which: the front unit includes four or more lenses and includes one or more units having a positive refractive power; and a difference between positions of the first rear unit at a wide angle end and a telephoto end, a difference between positions of the second rear unit at the wide angle end and the telephoto end, a focal length of the second rear unit, and a focal length of the zoom at the wide angle end are appropriately set.

32 Claims, 48 Drawing Sheets

(30) Foreign Application Priority Data

| Oct. 20, 2015 | (JP) | 2015-206172 |
|---|---|---|
| Oct. 20, 2015 | (JP) | 2015-206173 |
| Oct. 20, 2015 | (JP) | 2015-206174 |

(51) Int. Cl.

| G02B 15/177 | (2006.01) |
|---|---|
| G02B 15/20 | (2006.01) |
| G02B 15/16 | (2006.01) |
| G02B 15/17 | (2006.01) |
| G02B 15/24 | (2006.01) |
| G02B 9/60 | (2006.01) |
| G02B 9/62 | (2006.01) |
| G02B 5/00 | (2006.01) |
| G02B 27/64 | (2006.01) |
| G02B 7/04 | (2006.01) |

(52) U.S. Cl.
CPC ........... *G02B 15/177* (2013.01); *G02B 15/20* (2013.01); *G02B 5/005* (2013.01); *G02B 7/04* (2013.01); *G02B 9/60* (2013.01); *G02B 9/62* (2013.01); *G02B 15/14* (2013.01); *G02B 15/24* (2013.01); *G02B 27/646* (2013.01)

(58) Field of Classification Search
CPC . G02B 5/005; G02B 7/04; G02B 9/62; G02B 15/24; G02B 15/161; G02B 15/17
USPC ............... 359/557, 683–687, 714, 715, 740, 359/749–753, 762, 770, 781
See application file for complete search history.

(56) References Cited

U.S. PATENT DOCUMENTS

| 8,879,164 B2* | 11/2014 | Hori | G02B 15/173 |
| | | | 359/683 |
| 8,922,906 B2* | 12/2014 | Komatsu | G02B 13/18 |
| | | | 359/683 |
| 8,928,991 B2* | 1/2015 | Nakamura | G02B 15/173 |
| | | | 359/683 |
| 8,928,992 B2* | 1/2015 | Inomoto | G02B 15/14 |
| | | | 359/683 |
| 9,264,638 B2 | 2/2016 | Nakamura et al. | |
| 9,268,120 B2 | 2/2016 | Shimomura et al. | |
| 9,310,592 B2 | 4/2016 | Wakazono et al. | |
| 9,329,372 B2 | 5/2016 | Shimomura | |
| 9,400,374 B2 | 7/2016 | Yoshimi et al. | |
| 2003/0007256 A1* | 1/2003 | Usui | G02B 15/173 |
| | | | 359/686 |
| 2008/0037136 A1* | 2/2008 | Tsutsumi | G02B 15/173 |
| | | | 359/684 |
| 2009/0091840 A1* | 4/2009 | Ikeda | G02B 15/17 |
| | | | 359/682 |
| 2009/0091842 A1* | 4/2009 | Ikeda | G02B 15/17 |
| | | | 359/684 |
| 2010/0053765 A1 | 3/2010 | Eguchi | |
| 2010/0271601 A1 | 10/2010 | Amano | |
| 2012/0262799 A1 | 10/2012 | Chou | |
| 2013/0120640 A1* | 5/2013 | Taki | G02B 15/14 |
| | | | 359/684 |
| 2013/0250435 A1* | 9/2013 | Hagiwara | G02B 15/173 |
| | | | 359/684 |
| 2013/0301141 A1 | 11/2013 | Ryu | |
| 2013/0342716 A1* | 12/2013 | Yamamoto | G02B 13/18 |
| | | | 359/684 |
| 2014/0002714 A1* | 1/2014 | Eguchi | G02B 15/14 |
| | | | 359/683 |
| 2014/0078598 A1 | 3/2014 | Akiyama et al. | |
| 2014/0118840 A1 | 5/2014 | Enomoto | |
| 2014/0293438 A1 | 10/2014 | Miyazawa | |
| 2014/0320977 A1* | 10/2014 | Yakita | G02B 15/177 |
| | | | 359/686 |
| 2015/0131164 A1* | 5/2015 | Wakazono | G02B 15/173 |
| | | | 359/684 |
| 2015/0131165 A1 | 5/2015 | Nakamura et al. | |
| 2015/0160444 A1* | 6/2015 | Koizumi | G02B 13/18 |
| | | | 359/684 |
| 2015/0301319 A1* | 10/2015 | Komatsu | G02B 15/17 |
| | | | 359/684 |
| 2016/0054579 A1 | 2/2016 | Miyazawa | |
| 2016/0154226 A1 | 6/2016 | Miyazawa | |
| 2016/0161725 A1 | 6/2016 | Shimomura | |

FOREIGN PATENT DOCUMENTS

| JP | 2006011186 A | 1/2006 |
| JP | 2006098686 A | 4/2006 |
| JP | 2006195068 A | 7/2006 |
| JP | 2006279475 A | 10/2006 |
| JP | 2007-193173 A | 8/2007 |
| JP | 2007-219473 A | 8/2007 |
| JP | 2007279077 A | 10/2007 |
| JP | 2007-316288 A | 12/2007 |
| JP | 2007316287 A | 12/2007 |
| JP | 2008026864 A | 2/2008 |
| JP | 2008216881 A | 9/2008 |
| JP | 2009-092922 A | 4/2009 |
| JP | 2009-128620 A | 6/2009 |
| JP | 2009122379 A | 6/2009 |
| JP | 2009204942 A | 9/2009 |
| JP | 2009265553 A | 11/2009 |
| JP | 2010039188 A | 2/2010 |
| JP | 2010191413 A | 9/2010 |
| JP | 2011-081062 A | 4/2011 |
| JP | 2011237832 A | 11/2011 |
| JP | 2012008344 A | 1/2012 |
| JP | 2012058607 A | 3/2012 |
| JP | 2012083726 A | 4/2012 |
| JP | 2012093716 A | 5/2012 |
| JP | 2014-063026 A | 4/2014 |
| JP | 2014153401 A | 8/2014 |
| JP | 2015-022146 A | 2/2015 |
| JP | 2016161878 | 9/2016 |
| WO | 2014115230 A1 | 7/2014 |

OTHER PUBLICATIONS

Extended European search report issued in corresponding EP application No. 16002240.6 dated Jun. 8, 2017.
Japanese office action issued in corresponding application No. 2016067561 dated Oct. 23, 2018 with English translation, 7 pages.
Japanese office action issued in corresponding application No. 2015206172 dated Oct. 25, 2018 with English translation, 21 pages.
Japanese office action issued in corresponding application No. 2015206171 dated Oct. 23, 2018 with English translation, 10 pages.
Japanese office action issued in corresponding application No. 2015206174 dated Nov. 6, 2018 with English translation, 14 pages.

\* cited by examiner

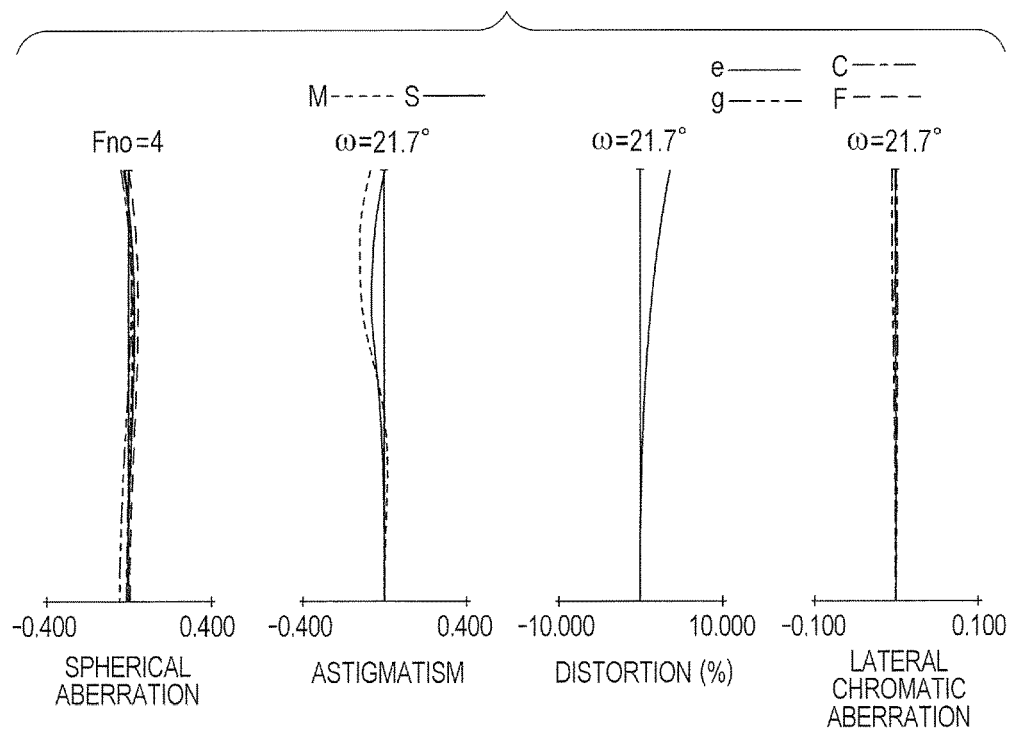
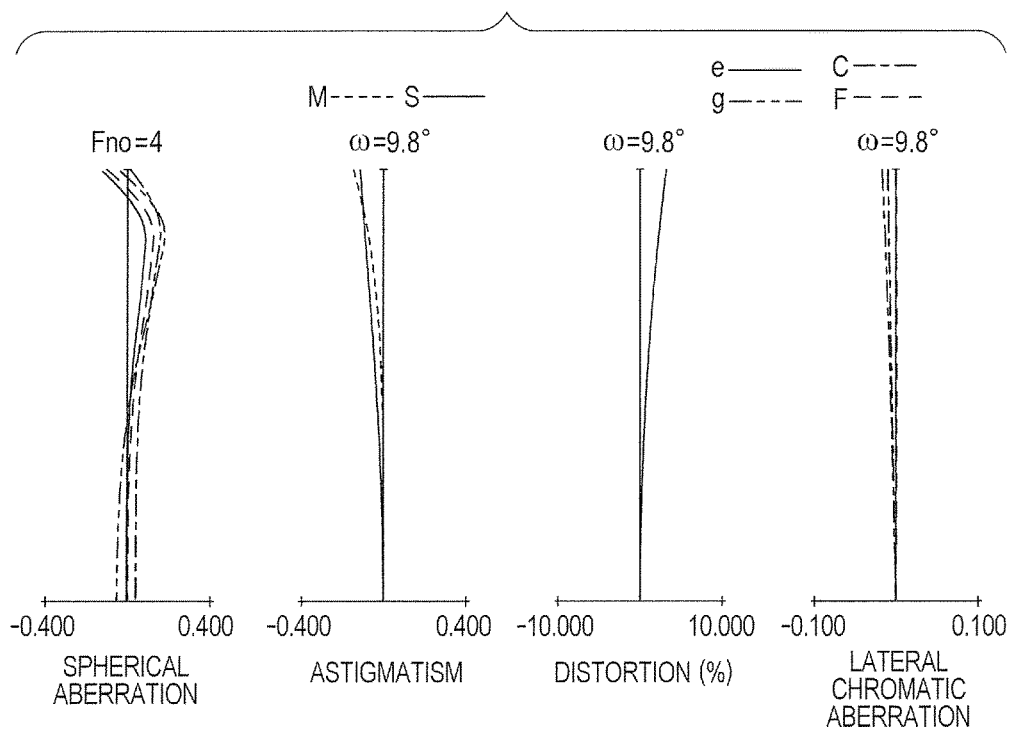

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for, for example, a broadcasting television camera, a cinema camera, a video camera, a digital still camera, a monitoring camera, and a silver-halide film camera.

Description of the Related Art

In recent years, a large-sized solid state image pickup element has become widespread in order to obtain an image having high image quality and a shallow depth of field, but a zoom lens is required to become much smaller in order to avoid an increase in size of an entire camera system. In particular, a zoom lens having a wide angle of view at a wide angle end tends to have a larger front lens diameter, which greatly affects a weight of the zoom lens, and hence a wide-angle zoom lens having a small front lens diameter is desired.

Hitherto, as a small-sized zoom lens capable of efficiently securing a magnification-varying ratio, there is known a zoom lens including lens units having positive, negative, and positive refractive powers, which are arranged in order from an object side. For example, in Japanese Patent Application Laid-Open No. 2015-22146, there is disclosed a zoom lens including lens units having positive, negative, and negative refractive powers, a stop, and a lens unit having a positive refractive power, which are arranged in order from the object side. The zoom lens has a half angle of view of about 40 degrees at a wide angle end, and includes a first lens unit and a fourth lens unit, which are fixed, and a second lens unit divided into lens units having negative and positive refractive powers. In Japanese Patent Application Laid-Open No. 2009-128620, there is disclosed a zoom lens having a half angle of view of about 40 degrees at a wide angle end, and including lens units having positive and negative refractive powers, a stop, and lens units having positive, negative, and positive refractive powers, which are arranged in order from the object side, the first lens unit and the fifth lens units being fixed.

As a zoom lens having a wide angle of view and a high zoom ratio, there is known a so-called positive lead type zoom lens including a first lens unit having a positive refractive power, which is configured not to move during zooming, a second lens unit having a negative refractive power, which is mainly responsible for zooming, and lens units on an image side of the second lens unit, at least one of which is configured to move during zooming. Further, as a positive lead type zoom lens having a wide angle of view and a small size, there is known a zoom lens of a so-called three-unit inner focus type in which the first lens unit includes a 1a lens unit having a negative refractive power, a 1b lens unit having a positive refractive power, which is configured to move in order to achieve in-focus, and a 1c lens unit having a positive refractive power.

In Japanese Patent Application Laid-Open No. H06-242378, there is described a zoom lens having a zoom ratio of about 8× and a photographing angle of view of about 87 degrees at a wide angle end, and including, on the image side of a second lens unit, a third lens unit for correcting an image plane variation accompanying zooming, and a stop configured not to move during zooming. In Japanese Patent Application Laid-Open No. 2014-63026, there is described a zoom lens having a zoom ratio of about 11× and a photographing angle of view of about 76 degrees at a wide angle end, and including, between a second lens unit and subsequent lens units, a stop configured to move during zooming.

An image pickup device, e.g., a charge coupled device (CCD) or a complementary metal oxide semiconductor (CMOS), which is used in an image pickup apparatus, e.g., a television or cinema camera serving as a professional moving image pickup system, has a substantially uniform high resolution over an entire image pickup range. Therefore, a zoom lens used in the moving image pickup system is required to, for example, have a substantially uniform resolution with a high resolution over an entire image plane from an image plane center to an image plane periphery.

As a zoom lens that satisfies those requirements, a positive lead type zoom lens in which a lens unit having a positive refractive power is arranged closest to an object side has been known (Japanese Patent Application Laid-Open No. H06-242378, Japanese Patent Application Laid-Open No. 2007-316288).

In Japanese Patent Application Laid-Open No. H06-242378, there is described a zoom lens including, in order from an object side to an image side, a first lens unit having a positive refractive power, a second lens unit having a negative refractive power, a third lens unit having a positive or negative refractive power, and a fourth lens unit having a positive refractive power. The second lens unit and the third lens unit are configured to move during zooming. The first lens unit includes, in order from the object side to the image side, an 11 lens sub unit having a negative refractive power, a 12 lens sub unit having a positive refractive power, and a 13 lens sub unit having a positive refractive power, and the 12 lens sub unit is configured to move during focusing.

In Japanese Patent Application Laid-Open No. 2007-316288, there is described a zoom lens including, in order from an object side to an image side, a first lens unit having a positive refractive power, a second lens unit having a negative refractive power, a third lens unit having a positive refractive power, a fourth lens unit having a positive refractive power, and a fifth lens unit having a positive refractive power. The second lens unit and the fourth lens unit are configured to move during zooming. The fourth lens unit is configured to move during focusing.

In addition, in Japanese Patent Application Laid-Open No. 2007-316288, there is described a zoom lens including, in order from an object side to an image side, a first lens unit having a positive refractive power, a second lens unit having a negative refractive power, a third lens unit having a positive refractive power, and a fourth lens unit having a positive refractive power. The second lens unit and the fourth lens unit are configured to move during zooming. The fourth lens unit is configured to move during focusing.

Hitherto, as a small-sized zoom lens capable of efficiently securing a magnification-varying ratio, there is known a zoom lens including lens units having positive, negative, and positive refractive powers, which are arranged in order from the object side. There is also known a zoom lens having a small front lens diameter when a wide angle is achieved, and including lens units having negative and positive refractive powers, which are arranged in order from an object side.

For example, in Japanese Patent Application Laid-Open No. 2009-92922, there is disclosed a zoom lens having a half angle of view of about 44 degrees at a wide angle end, and including lens units having positive, negative, positive, and positive refractive powers, which are arranged in order from an object side, the first lens unit and the third lens unit being fixed. In Japanese Patent Application Laid-Open No. 2007-

193173, there is disclosed a zoom lens having a half angle of view of about 41 degrees at a wide angle end, and including lens units having negative, positive, negative, positive, negative, and positive refractive powers, which are arranged in order from an object side to an image side, the first lens unit, the third lens unit, and the sixth lens unit being fixed.

In the zoom lens configured to conduct zooming by moving the second lens unit having a negative refractive power toward the image side, in which the first lens unit having a positive refractive power is configured not to move for zooming, an off-axial ray having an intermediate focal length affects determination of an effective diameter within the first lens unit. Therefore, in Japanese Patent Application Laid-Open No. 2015-22146, a combined focal length after the second lens unit is made to be telephoto, and an off-axial ray angle between the first lens unit and the second lens unit is made to be gradual, to thereby suppress an increase in effective diameter of the first lens unit. The lens units after the second lens unit are made to be telephoto, but a principal point of the first lens unit is pushed to the image side, and a wide angle is achieved for a focal length of the entire system of the zoom lens. However, zooming is conducted with only the lens units on the object side of the stop, a distance from the first lens unit to the stop becomes longer, and an entrance pupil becomes longer, and hence the diameters of the first lens unit and the second lens unit tend to become larger. In Japanese Patent Application Laid-Open No. 2009-128620, the second lens unit is configured to move toward the image side, and the third lens unit is configured to move toward the object side. The stop is arranged between the second lens unit and the third lens unit, and is fixed during zooming, but can be pulled away from the third lens unit at the wide angle end and pushed to the object side to shorten the entrance pupil, which facilitates suppression of an increase in diameters of the first lens unit and the second lens unit. However, in order to greatly move the third lens unit and the fourth lens unit toward the object side during zooming, the third lens unit and the fourth lens unit are positioned near the image side at the wide angle end, and are not suitable as exchangeable lenses due to a short back focus.

With the positive lead type zoom lens having the above-mentioned structure, it is relatively easy to realize a wide angle of view, but in order to realize both high optical performance and downsizing, it is important to appropriately set refractive power arrangement of the lenses. In particular, an off axial ray passes through the first lens unit, which is closest to the object side, at a position farthest from the optical axis. Therefore, in order to realize both the optical performance and the downsizing, it is important to appropriately set a refractive power and a configuration of the first lens unit.

In the zoom lens described in Japanese Patent Application Laid-Open No. H06-242378, the stop is arranged on the image side of the second and third lens units, which are responsible for zooming, and hence a stop diameter is fixed during zooming, which facilitates mechanism control. However, the stop is away from the first lens unit, resulting in an increase in lens diameter of the first lens unit or an increase in number of lenses or number of aspherical surfaces. In the zoom lens described in Japanese Patent Application Laid-Open No. 2014-63026, the stop, which is configured to move during zooming, is arranged between the second lens unit and the third lens unit in a manner that is advantageous to downsizing. However, the small refractive power of the first lens unit disadvantageously causes an increase in size in achieving a wider angle of view. Further, only the second lens unit is mainly responsible for zooming, and hence a movement amount of the stop is disadvantageously increased in order to achieve both the downsizing of the first lens unit and the high zoom ratio.

In the positive lead type zoom lens, in order to obtain high optical performance over an entire object distance while securing the downsizing of the entire system of the zoom lens and the higher zoom ratio, it is important to appropriately set respective components that form the zoom lens.

For example, it is important to appropriately set a zoom type (including the number of lens units and signs of the refractive powers of the lens units), a focusing method, and the like. In particular, it is important to reduce an aberration variation accompanying focusing, and in order to obtain high optical performance over the entire object distance, to appropriately set selection of a lens unit (focus lens unit) for focusing, a lens configuration of the focus lens unit, and the like.

When the setting of those is not appropriate, the entire system of the zoom lens is increased in size to achieve the higher zoom ratio, or variations of various aberrations accompanying zooming and focusing become larger, which results in extreme difficulty in obtaining high optical performance over the entire zoom range and the entire object distance.

In the zoom lens configured to conduct zooming by moving the second lens unit having a negative refractive power toward the image side, in which the first lens unit having a positive refractive power is fixed during zooming, the off-axial ray having an intermediate focal length affects the determination of the effective diameter within the first lens unit. Therefore, in Japanese Patent Application Laid-Open No. 2009-92922, the combined focal length after the second lens unit is made to be telephoto, and the off-axial ray angle between the first lens unit and the second lens unit is made to be gradual, to thereby suppress an increase in effective diameter of the first lens unit. The lens units after the second lens unit are made to be telephoto, but the principal point of the first lens unit is pushed to the image side, and a wide angle is achieved for the focal length of the entire system of the zoom lens. However, as many as six to seven component lenses that form the first lens unit are arranged in order to push the principal point of the first lens unit to the image side, with the result that the first lens unit is disadvantageously heavy.

In Japanese Patent Application Laid-Open No. 2007-193173, the lens unit having a negative refractive power is arranged closest to the object side, and hence a wide angle is achieved for the entire system of the zoom lens with a small number of component lenses that form the first lens unit even when the lens units on the image side of the second lens unit are made to be telephoto. However, the fourth lens unit on the image side of the stop is configured to greatly move toward the object side during zooming, and hence an F-number at a telephoto end is as large (dark) as about 4.7 to about 5.1 with respect to a zoom ratio of 3×.

SUMMARY OF THE INVENTION

The present invention has an object to provide a wide angle zoom lens having an entire optical system small in size with a long back focus, a high zoom ratio, and a small F-number (bright), and is capable of easily obtaining high optical performance over an entire zoom range and an entire object distance, and an image pickup apparatus including the zoom lens.

In order to achieve the object described above, according to one embodiment of the present invention, there is provided a zoom lens, including, in order from an object side to an image side: a front lens unit including one or more lens units including a first lens unit, which is arranged closest to the object side and is not moved for zooming; an Nf lens unit including three or more lenses and having a negative refractive power; an aperture stop; a first rear lens unit which is moved during zooming; a second rear lens unit which is moved during zooming; and a third rear lens unit which is not moved for zooming, in which: the front lens unit includes four or more lenses and comprises one or more lens units having a positive refractive power; and the following expressions are satisfied:

$$-0.80 < Mr2/fr2 < 0.45;$$

$$-2.0 < Mr2/fw < 0.3; \text{ and}$$

$$-15.0 < Mr1/Mr2 < 2.0,$$

where Mr1 represents a difference between positions of the first rear lens unit at a wide angle end and a telephoto end in an optical axis direction, Mr2 represents a difference between positions of the second rear lens unit at the wide angle end and the telephoto end in the optical axis direction, fr2 represents a focal length of the second rear lens unit, fw represents a focal length of the zoom lens at the wide angle end, Mr1 has a positive sign when the first rear lens unit is positioned on the image side at the telephoto end with respect to the wide angle end, and Mr2 has a positive sign when the second rear lens unit is positioned on the image side at the telephoto end with respect to the wide angle end.

According to the present invention, there can be provided the wide angle zoom lens having an entire optical system small in size with a long back focus, a high zoom ratio, and a small F-number (bright), and is capable of easily obtaining high optical performance over an entire zoom range and an entire object distance, and the image pickup apparatus including the zoom lens.

Further features of the present invention will become apparent from the following description of exemplary embodiments with reference to the attached drawings.

BRIEF DESCRIPTION OF THE DRAWINGS

FIG. 27 is an aberration diagram in a state in which focus is at infinity at an intermediate focal length according to Numerical Embodiment 7.

FIG. 28 is an aberration diagram in a state in which focus is at infinity at a telephoto end according to Numerical Embodiment 7.

DESCRIPTION OF THE EMBODIMENTS

Figure 1:
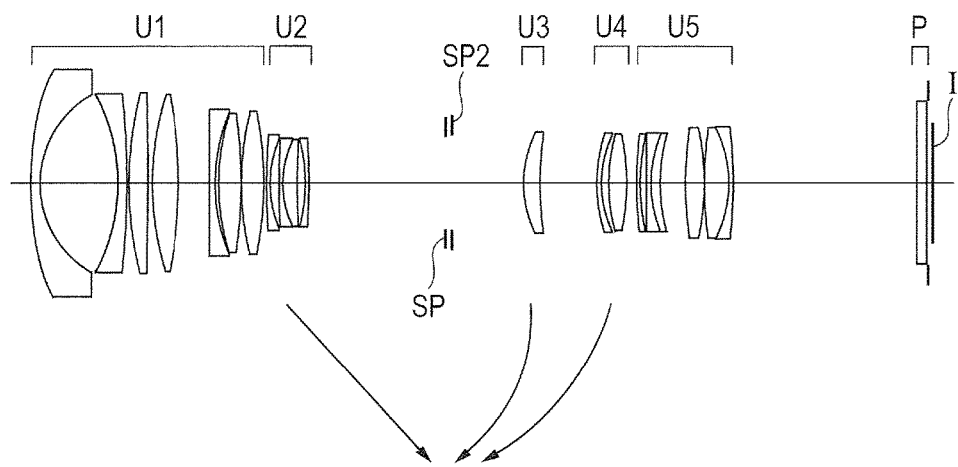
FIG. 1 is a lens cross-sectional view of a zoom lens according to Embodiment 1 (Numerical Embodiment 1) of the present invention at a wide angle end in a state in which focus is at infinity.

Preferred embodiments of the present invention will now be described in detail in accordance with the accompanying drawings.

The zoom lens according to one embodiment of the present invention includes, in order from an object side to an image side: a front lens unit; an Nf lens unit including three or more lenses and having a negative refractive power; an aperture stop; a first rear lens unit configured to move during zooming; a second rear lens unit configured to move during zooming; and a third rear lens unit configured not to move for zooming. The front lens unit has a feature that the front lens unit is formed of one or more lens units including a first lens unit, which is arranged closest to an object side and configured not to move for zooming, and includes one or more lens units including four or more lenses and having a positive refractive power.

The zoom lens according to one embodiment of the present invention includes at least one lens unit having a positive refractive power and at least one lens unit having a negative refractive power on the object side of the aperture stop, and is configured to enable zooming by changing an interval between the lens units having the positive and negative refractive powers.

The first lens unit arranged closest to the object side is heavy, and is therefore configured not to move for zooming, which prevents an increase in driving force required for zooming.

The Nf lens unit arranged adjacent to the object side of the aperture stop is provided as a lens unit having a negative refractive power, to thereby shorten an entrance pupil to suppress an increase in front lens diameter. The Nf lens unit includes at least three lenses, and is configured to enable correction of variations of a field curvature and a lateral chromatic aberration during zooming.

On the object side of the aperture stop, the zoom lens includes at least four lenses except for the Nf lens unit (front lens unit includes at least four lenses), and is configured to enable correction of a distortion at a wide angle end and an axial chromatic aberration at a telephoto end.

On an image side of the aperture stop, the zoom lens includes, in order from the object side to the image side, three lens units of a first rear lens unit, a second rear lens unit, and a third rear lens unit, and the first rear lens unit and the second rear lens unit are configured to move during zooming. The aperture stop provides the lens units on the image side with a zooming effect, to thereby shorten a movement amount of the lens unit on the object side of the aperture stop during zooming. As a result, the aperture stop can be arranged closer to the object side, and the entrance pupil is short, which can suppress an increase in size of the front lens diameter.

The third rear lens unit is configured not to move for zooming. A back focus can be prevented from becoming shorter due to the movement, and when the back focus deviates due to a manufacturing error, the back focus can be adjusted by a fixed amount irrespective of a zooming position by adjusting an entirety or a part of a final lens unit in an optical axis direction.

Further, the following conditional expression is satisfied:

$$-0.80 < Mr2/fr2 < 0.45 \quad (1),$$

where Mr2 represents a difference between positions of the second rear lens unit at the wide angle end and the telephoto end in the optical axis direction, and fr2 represents a focal length of the second rear lens unit, Mr2 having a positive sign when the second rear lens unit is positioned on the image side at the telephoto end with respect to the wide angle end.

The conditional expression (1) is an expression that defines a ratio between the difference between the positions of the second rear lens unit at the wide angle end and the telephoto end in the optical axis direction and the focal length of the second rear lens unit. Both when an upper limit value of the conditional expression (1) is exceeded and when the ratio falls below a lower limit value of the conditional expression (1), the refractive power of the second rear lens unit becomes larger, and the variations of the distortion and the field curvature during zooming disadvantageously increase.

Further, the following conditional expression is satisfied:

$$-2.0 < Mr2/fw < 0.3 \quad (2),$$

where fw represents a focal length at the wide angle end.

The conditional expression (2) is an expression that defines a ratio between the difference between the positions of the second rear lens unit at the wide angle end and the telephoto end in the optical axis direction and the focal length at the wide angle end. When an upper limit value of the conditional expression (2) is exceeded, the interval between the second rear lens unit and the third rear lens unit becomes wider at the wide angle end, and hence a total length becomes longer, which is not preferred. Meanwhile, when the ratio falls below a lower limit value of the conditional expression (2), the second rear lens unit disadvantageously inhibits the third rear lens unit from moving, and it becomes difficult to suppress the variations of the spherical aberration and the field curvature during zooming.

Further, the following conditional expression is satisfied:

$$-15.0 < Mr1/Mr2 < 2.0 \quad (3),$$

where Mr1 represents a difference between positions of the first rear lens unit at the wide angle end and the telephoto end in the optical axis direction, Mr1 having a positive sign when the first rear lens unit is positioned on the image side at the telephoto end with respect to the wide angle end.

The conditional expression (3) is an expression that defines a ratio between the difference between the positions of the first rear lens unit at the wide angle end and the telephoto end in the optical axis direction and the difference between the positions of the second rear lens unit at the wide angle end and the telephoto end in the optical axis direction. Both when an upper limit value of the conditional expression (3) is exceeded and when the ratio falls below a lower limit value of the conditional expression (3), a movement amount of the second rear lens unit is small, and it becomes difficult to suppress the variations of the spherical aberration and the field curvature during zooming.

With the above-mentioned configuration, the object of the present invention is achieved, but it is desired to satisfy the following conditional expressions in one embodiment of the present invention:

$$1.0 < |fr1|/fw < 15.0 \quad (4); \text{ and}$$

$$1.0 < |fr2|/fw < 5.5 \quad (5),$$

where fr1 represents a focal length of the first rear lens unit.

The conditional expression (4) is an expression that defines a ratio between the focal length of the first rear lens unit and the focal length at the wide angle end. When an upper limit value of the conditional expression (4) is exceeded, a limitation is imposed on a movement locus by the second rear lens unit in order to correct an image plane during zooming, and it becomes difficult to suppress the variations of the field curvature and the lateral chromatic aberration during zooming. Meanwhile, when the ratio falls below a lower limit value of the conditional expression (4), it becomes difficult to correct the spherical aberration.

The conditional expression (5) is an expression that defines a ratio between the focal length of the second rear lens unit and the focal length at the wide angle end. When an upper limit value of the conditional expression (5) is exceeded, a limitation is imposed on the movement locus by the first rear lens unit in order to correct the image plane during zooming, and it becomes difficult to suppress the spherical aberration and the field curvature during zooming. Meanwhile, when the ratio falls below a lower limit value of the conditional expression (5), it becomes difficult to correct the lateral chromatic aberration and the field curvature.

Further, in one embodiment of the present invention, it is desired that at least one of the first rear lens unit and the second rear lens unit have a positive refractive power and be positioned on the object side at the telephoto end with respect to the wide angle end.

The zooming can be conducted not only by changing an interval between the lens unit having a positive refractive power on the object side of the aperture stop and the Nf lens unit but also by changing an interval between the Nf lens unit and the lens unit having a positive refractive power on the image side of the aperture stop. Therefore, the zooming can be efficiently conducted within a short total lens length.

Further, in the zoom lens according to one embodiment of the present invention, it is desired that the aperture stop be configured not to move for zooming in the optical axis direction.

In order to configure the aperture stop to move in the optical axis direction, the lens barrel structure and routing of electrical wiring become complicated, which is not preferred.

Further, in one embodiment of the present invention, it is desired to conduct focusing with a part of the lenses within the first lens unit.

The focusing within the fixed first lens unit allows the movement amount of the focus lens unit to be fixed irrespective of the zooming position, and a rotation angle of an operation ring during a manual operation can be fixed even with simple lens barrel structure irrespective of the zooming position. When a manufacturing error occurs, the movement amount of the focus does not change even with an error of a focal length of a lens unit other than the first lens unit, and hence a manufacturing error of the rotation angle of the operation ring from infinity to a desired object distance is also small.

Further, it is desired to satisfy the following conditional expressions in one embodiment of the present invention:

$$0.44 < |fr1/fr2| < 4.91 \quad (6).$$

The conditional expression (6) is an expression that defines a ratio between the focal length of the first rear lens unit and the focal length of the second rear lens unit. When an upper limit value of the conditional expression (6) is exceeded, it becomes difficult to suppress the variations of the field curvature and the lateral chromatic aberration during zooming. Meanwhile, when the ratio falls below a lower limit value of the conditional expression (6), it becomes difficult to correct the spherical aberration.

It is more preferred to specify the numerical range of the conditional expressions (1) to (4) as follows:

$$-0.41 < Mr2/fr2 < 0.43 \quad (1a);$$

$$-1.6 < Mr2/fw < 0.1 \quad (2a);$$

$$-14.2 < Mr1/Mr2 < 1.3 \quad (3a);$$

$$1.4 < |fr1|/fw < 12.5 \quad (4a);$$

$$2.5 < |fr2|/fw < 5.3 \quad (5a); \text{ and}$$

$$0.47 < |fr1/fr2| < 4.69 \quad (6a).$$

A zoom lens according to another embodiment of the present invention includes, in order from the object side to the image side, a first lens unit (front lens unit) U1 having a positive refractive power, which is configured not to move for zooming, a second lens unit U2 having a negative refractive power, which is configured to move during zooming, an aperture stop SP, a third lens unit U3 having a positive refractive power, which is configured to move during zooming, and a rear lens unit having a positive refractive power, which is arranged closest to the image side and configured not to move for zooming. The first lens unit includes, in order from the object side to the image side, an 11 lens sub unit U11 having a negative refractive power, which is configured not to move for focusing, a 12 lens sub unit U12 having a positive refractive power, which is configured to move during focusing, and a 13 lens sub unit U13 having a positive refractive power.

A focal length of the first lens unit is represented by f1, a focal length at the wide angle end is represented by fw, and aperture diameters of the aperture stop at the wide angle end and the telephoto end with respect to an open F-number at the telephoto end are respectively represented by SPw and SPt. At this time, the following conditions are satisfied:

$$0.5 < f1/fw < 4.5 \quad (7); \text{ and}$$

$$1.1 < SPt/SPw < 3.0 \quad (8).$$

The conditional expression (7) defines a ratio between the focal length of the first lens unit and the focal length at the wide angle end. The focal length of the first lens unit is an important factor in achieving both the high optical performance and the downsizing. The conditional expression (7) may be satisfied to define a height of an off-axial light flux passing through the first lens unit at the wide angle end, and to satisfactorily correct various aberrations while suppressing an increase in size of the lens.

When an upper limit of the conditional expression (7) is not satisfied, the refractive power of the first lens unit becomes smaller, and the height of the off-axial light flux passing through the first lens unit becomes larger, with the result that the lens is disadvantageously increased in size. When the lower limit of the conditional expression (7) is not satisfied, the refractive power of the first lens unit becomes larger, and it becomes difficult to correct a chromatic aberration and the various aberrations, in particular, at the telephoto side.

The conditional expression (8) defines a ratio between the aperture diameters of the aperture stop at the wide angle end and the telephoto end with respect to the open F-number at the telephoto end. The ratio between the aperture diameters of the stop is an important factor in suppressing an increase in size of the first lens unit. The conditional expression (8) is satisfied to cause not only the second lens unit but also the third lens unit to be responsible for a share of the zooming. With this configuration, the movement amount of the second lens unit is reduced, and the aperture stop is configured to move closer to the first lens unit, to thereby be able to lower the height of the off-axial light flux passing through the first lens unit.

When an upper limit of the conditional expression (8) is not satisfied, the share of the zooming for the second lens unit becomes too small, and hence the total length is disadvantageously increased. When the lower limit of the conditional expression (8) is not satisfied, the share of the zooming for the third lens unit becomes too small, and hence the aperture stop is disadvantageously away from the first lens unit to increase the lens diameter of the first lens unit.

It is more preferred to set the numerical ranges of the conditional expressions (7) and (8) as follows:

$$1.00 < f1/fw < 4.00 \quad (7a); \text{ and}$$

$$1.10 < SPt/SPw < 2.00 \quad (8a).$$

The above-mentioned conditions are satisfied to obtain a small and lightweight zoom lens in which aberrations are satisfactorily corrected over the entire zoom range.

It is more preferred to satisfy the following condition:

$$-2.5 < f1/f2w < -0.5 \quad (9),$$

where f2w represents the focal length of the second lens unit at the wide angle end.

The conditional expression (9) defines a ratio between the focal lengths at the wide angle end of the first lens unit and the second lens unit.

When an upper limit of the conditional expression (9) is not satisfied, the focal length of the first lens unit becomes relatively shorter, and hence it becomes difficult to correct various aberrations, in particular, to correct the chromatic aberration at the telephoto side. Further, an influence of the manufacturing error on the performance becomes larger, and hence performance greatly deteriorates due to manufacturing variations. When the lower limit of the conditional expression (9) is not satisfied, the focal length of the first lens unit becomes relatively longer, and hence the lens diameter of the first lens unit is increased, with the result that it becomes difficult to achieve the wide angle.

It is more preferred that the third lens unit include, in order from the object side, a 31 lens sub unit having a positive refractive power and a 32 lens sub unit having a positive refractive power. This facilitates the suppression of the various aberrations at an intermediate zoom position, in particular, the correction of the variations of the spherical aberration and the field curvature during zooming.

It is more preferred to inhibit an interval between the rear lens unit and the aperture stop from moving during zooming. This prevents a mechanism of the zoom lens from becoming complicated, and facilitates control of the mechanism.

It is more preferred to satisfy the following condition:

$$0.0<|fw/fr|<0.4 \quad (10),$$

where fr represents a focal length of the rear lens unit.

The conditional expression (10) defines a ratio between the rear lens unit and the focal length at the wide angle end.

When an upper limit of the conditional expression (10) is not satisfied, the focal length of the rear lens unit becomes relatively shorter, and hence it becomes difficult to shorten a focal length of the third lens unit, and the movement amount of the third lens unit is disadvantageously increased.

It is more preferred to satisfy the following conditions:

$$-2.0<f11/f1<-0.3 \quad (11);$$

$$-4.0<f13/f11<-0.5 \quad (12); \text{ and}$$

$$0.2<f31/f32<3.0 \quad (13),$$

where f11 represents a focal length of the 11 lens sub unit, f13 represents a focal length of the 13 lens sub unit, f31 represents a focal length of the 31 lens sub unit, and f32 represents a focal length of the 32 lens sub unit.

The conditional expression (11) defines a ratio between the focal length of the first lens unit and the focal length of the 11 lens sub unit.

When an upper limit of the conditional expression (11) is not satisfied, the focal length of the 11 lens sub unit becomes relatively shorter, and it becomes difficult to suppress the variations of various off-axial aberrations accompanying zooming on a wide angle side, in particular, to suppress the distortion and the field curvature. When the lower limit of the conditional expression (11) is not satisfied, the focal length of the 11 lens sub unit becomes relatively longer, and hence the lens diameter of the first lens unit is increased, with the result that it becomes difficult to achieve the wide angle. It also becomes difficult to suppress a change in field of view during focusing.

The conditional expression (12) defines a ratio between the focal length of the 11 lens sub unit and the focal length of the 13 lens sub unit.

When an upper limit of the conditional expression (12) is not satisfied, the focal length of the 11 lens sub unit becomes relatively longer. Therefore, it becomes difficult to cause a principal point of the first lens unit to move closer to the image side, and hence the lens diameter of the first lens unit is increased, with the result that it becomes difficult to achieve the wide angle. When the lower limit of the conditional expression (12) is not satisfied, the focal length of the 11 lens sub unit becomes relatively shorter. This leads to an increase in number of lenses of the 11 lens sub unit, and hence the lens diameter of the first lens unit is increased, with the result that it becomes difficult to achieve the wide angle.

The conditional expression (13) defines the ratio between a focal length of the 31 lens sub unit and the focal length of the 32 lens sub unit.

When an upper limit of the conditional expression (13) is not satisfied, the focal length of the 31 lens sub unit becomes relatively longer, and hence an axial ray to the subsequent lens units becomes higher, which leads to an increase in lens diameter and number of lenses. When the lower limit of the conditional expression (13) is not satisfied, the focal length of the 32 lens sub unit becomes relatively longer, and hence the movement amount of the 32 lens sub unit is increased, with the result that the total lens length is disadvantageously increased.

It is more preferred that a part of lens units of the rear lens unit be configured to move in a direction substantially perpendicular to the optical axis, to thereby conduct image stabilization. With this configuration, a correcting lens unit is included in the lens units fixed during zooming, to thereby facilitate the control.

It is more preferred to set the numerical ranges of the conditional expressions (9) to (13) as follows:

$$-2.35<f1/f2w<-0.80 \quad (9a);$$

$$0.00<|fw/fr|1<0.16 \quad (10a);$$

$$-1.60<f11/f1<-0.50 \quad (11a);$$

$$-3.00<f13/f11<-0.80 \quad (12a); \text{ and}$$

$$0.40<f31/f32<2.50 \quad (13a).$$

A zoom lens according to another embodiment of the present invention has the following feature.

Figure 93:
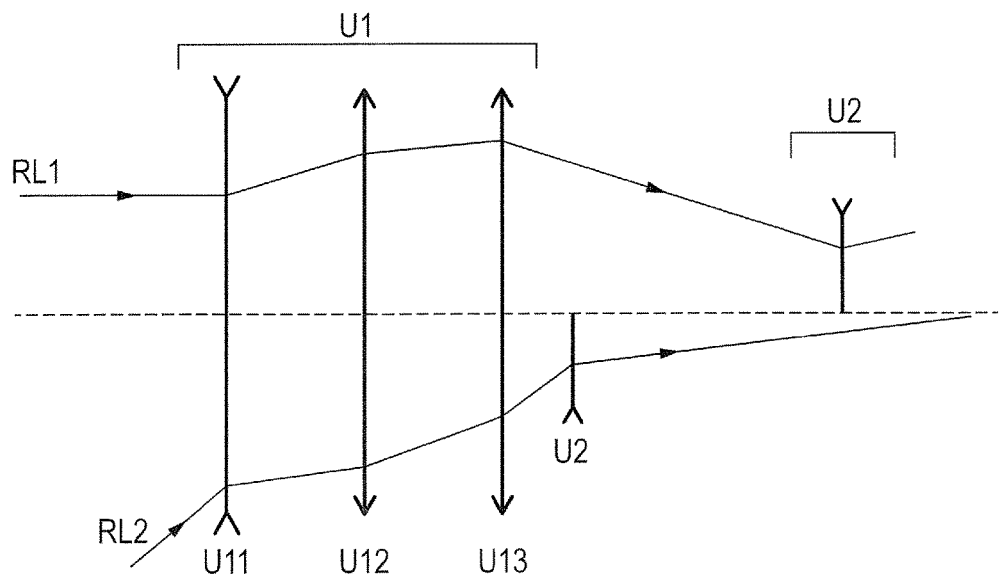
FIG. 93 is an explanatory diagram of a ray passing through a first lens unit according to each of Embodiments.

FIG. 93 is an explanatory diagram of a light flux passing through the first lens unit U1 in the zoom lens according to one embodiment of the present invention. In FIG. 93, the first lens unit U1 includes three lens sub units of an 11 lens sub unit U11 having a negative refractive power, a 12 lens sub unit U12 having a positive refractive power, and a 13 lens sub unit U13 having a positive refractive power. The 12 lens sub unit U12 is configured to move to conduct focusing.

In FIG. 93, a light flux RL1 represents an FNO ray for determining an F-number at the telephoto end. A light flux RL2 represents a principal ray having a maximum angle of view at the wide angle end. In this case, in order to achieve the downsizing of the first lens unit U1, as is apparent from the lower half of FIG. 93, it is necessary to reduce outer diameters of the 11 lens sub unit U11 and the 12 lens sub unit U12 with respect to the principal ray RL2 having the maximum angle of view at the wide angle end. To that end, it is necessary to reduce an inclination of the principal ray RL2 having the maximum angle of view, which travels from the 13 lens sub unit U13 toward the 12 lens sub unit U12.

Alternatively, it is necessary to position a back-side principal point of the first lens unit U1 further backward to increase a retro ratio of the first lens unit U1, and to reduce an interval between the first lens unit U1 and the second lens unit U2 to lower an entrance height of the ray. In this case, the retro ratio represents an amount obtained by dividing the back focus exhibited when a light flux from infinity is caused to enter the lens unit of interest by the focal length. In order to increase the retro ratio, it is necessary to strengthen the positive refractive power of the first lens unit U1. This leads to an increase in number of lenses within the first lens unit U1 for aberration correction, with the result that the first lens unit U1 is disadvantageously increased in size.

Therefore, in the zoom lens according to one embodiment of the present invention, the first lens unit U1 is configured as follows to increase the retro ratio while reducing the number of lenses of the first lens unit U1. The first lens unit U1 includes, in order from the object side to the image side, an 11 lens sub unit U11 having a negative refractive power, which is configured not to move for focusing, a 12 lens sub unit U12 having a positive refractive power, which is configured to move during focusing, and a 13 lens sub unit U13 having a positive refractive power, which is configured not to move for focusing.

The 11 lens sub unit U11 includes, in order from the object side to the image side, a negative 111 lens U111, a negative 112 lens U112, and a positive 113 lens U113. A lens surface of the 112 lens U112 on the object side is set to have a curvature radius of G112R1, and a lens surface of the 112 lens U112 on the image side is set to have a curvature radius of G112R2. A distance on the optical axis from a lens surface arranged closest to the object side at the wide angle end to the aperture stop SP at the wide angle end is represented by Lsp, and a distance on the optical axis from the lens surface arranged closest to the object side at the wide angle end to a lens surface arranged closest to the image side at the wide angle end is represented by L.

At this time, the following conditional expressions are satisfied:

$$-0.5 < (G112R1+G112R2)/(G112R1-G112R2) < 2.0 \quad (14); \text{ and}$$

$$0.1 < Lsp/L < 0.6 \quad (15).$$

Next, the technical meanings of the above-mentioned conditional expressions are described. The conditional expressions (14) and (15) are used to achieve satisfactory optical performance while achieving a wide angle of view, and even to reduce the effective diameter of the first lens unit U1. The conditional expressions (14) and (15) define a condition for reducing a total lens thickness of the first lens unit U1 (distance from the lens surface of the first lens unit U1 which is arranged closest to the object side, to the lens surface of the first lens unit U1 which is arranged closest to the image side). The conditional expression (14) is also a condition for reducing the total lens thickness of the first lens unit U1 while satisfactorily correcting various aberrations.

Figure 94:
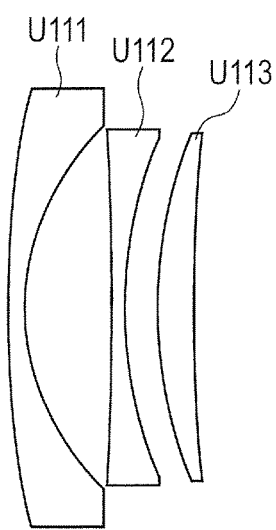
FIG. 94 is an explanatory diagram of an 11 lens sub unit according to each of Embodiments.
Figure 95:
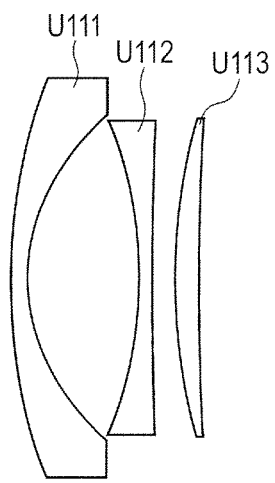
FIG. 95 is an explanatory diagram of the 11 lens sub unit according to each of Embodiments.

The 112 lens U112 is a negative lens, and hence the range of the conditional expression (14) defines that the lens surface on the object side has a surface shape concave on the image side, and means that the refractive power of the lens surface on the image side is negatively large. With this condition, as illustrated in FIG. 94, an air gap between the 111 lens U111 and the 112 lens U112 is made shorter than in FIG. 95, to thereby reduce the total lens thickness of the first lens unit U1.

Further, an interval between principal points of the 111 lens U111 and the 112 lens U112 is increased so as to be able to weaken the negative refractive power of the 111 lens U111. This facilitates the aberration correction, and also facilitates the reduction in size and weight of the first lens unit U1 by thinning a peripheral portion of the 111 lens U111. The conditional expression (14) suppresses a decrease in retro ratio of the first lens unit U1 and an increase in effective diameter of the first lens unit U1 to lower levels when the negative refractive power of the 111 lens U111 becomes weaker.

When an upper limit of the conditional expression (14) is exceeded, the 112 lens U112 has a meniscus shape concave on the image side, in which the refractive power of the lens surface of the 112 lens U112 on the object side is similar to the refractive power of the lens surface of the 112 lens U112 on the image side. At this time, the negative refractive power of the 112 lens U112 becomes too weak, and the negative refractive power of the 111 lens U111 becomes stronger, with the result that it becomes difficult to achieve the downsizing while achieving the aberration correction. Alternatively, the refractive powers of the lens surfaces of the 112 lens U112 become too strong, with the result that it becomes difficult to achieve the downsizing while achieving the aberration correction.

Meanwhile, when the ratio falls below a lower limit of the conditional expression (14), it becomes difficult to increase the principal point interval, and the refractive power of the first lens unit U1 on the image side becomes stronger, with the result that it becomes difficult to achieve the downsizing while achieving the aberration correction.

The conditional expression (15) is a condition for reducing the effective diameter of the first lens unit U1 while satisfactorily correcting various aberrations. The conditional expression (15) defines a position of the aperture stop SP with respect to the total optical length (distance from the lens surface arranged closest to the object side to the lens surface arranged closest to the image side). The entrance pupil is pushed to the object side by positioning the aperture stop SP on the object side, and the entrance height of the off-axial principal ray RL2 to enter the first lens unit U1 in FIG. 93 is lowered, to thereby reduce the effective diameter of the first lens unit U1.

When an upper limit of the conditional expression (15) is exceeded, the aperture stop SP is positioned closer to the object side, and it becomes difficult to secure a large movement amount of a moving lens unit for varying a magnification. Meanwhile, when the ratio falls below a lower limit of the conditional expression (15), the entrance pupil is positioned on the image side, and it becomes difficult to downsize the first lens unit U1. It is more preferred to set the numerical ranges of the conditional expressions (14) and (15) as follows.

$$0.0 (G112R1+G112R2)/(G112R1-G112R2) < 1.2 \quad (14a)$$

$$0.50 < Lsp/L < 0.60 \quad (15a)$$

It suffices that only the upper limit value or the lower limit value of one or more of the conditional expressions (14a) and (15a) is replaced by the corresponding value of the one or more of the conditional expressions (14) and (15).

It is preferred to satisfy one or more of the following conditions. A focal length of the 111 lens U111 is represented by f111, and a focal length of the 112 lens U112 is represented by f112. A focal length of the 11 lens sub unit U11 is represented by f11, a combined focal length of the 111 lens U111 and the 112 lens U112 is represented by f11na, and a focal length of the 113 lens U113 is represented by f113. An average value of an Abbe number of a material of the 111 lens U111 and an Abbe number of a material of the 112 lens U112 is represented by v11na, and an Abbe number of a material of the 113 lens U113 is represented by v113.

A distance on the optical axis from a surface vertex of a lens surface of the first lens unit U1 which is arranged closest to the object side, to a surface vertex of a lens surface of the first lens unit U1 which is arranged closest to the image side, is represented by L1. In this case, it is preferred to satisfy one or more of the following conditional expressions.

$$0.4 < f111/f112 < 1.0 \quad (16)$$

$$-5.0 < f113/f11 < -1.0 \quad (17)$$

$$0.5 < f11na/f11 < 0.8 \quad (18)$$

$$20.0 < v11na - v113 < 35.0 \quad (19)$$

$$0.25 < L1/L < 0.50 \quad (20)$$

Next, the technical meanings of the above-mentioned conditional expressions are described. The conditional expression (16) relates to a ratio between the focal lengths of the 111 lens U111 and the 112 lens U112 of the 11 lens sub unit U11, and mainly defines a condition for achieving the reductions in size and weight of the first lens unit U1 while satisfactorily correcting aberrations.

When the ratio falls below a lower limit of the conditional expression (16), the negative refractive power of the 111 lens U111 becomes too strong (absolute value of the negative refractive power becomes too large), and it is necessary to increase the number of lenses of the first lens unit U1 required for the aberration correction, with the result that it becomes difficult to reduce the total lens thickness of the first lens unit U1. Meanwhile, when an upper limit of the conditional expression (16) is exceeded, the negative refractive power of the 111 lens U111 becomes too weak, and the retro ratio of the first lens unit U1 becomes smaller, with the result that it becomes difficult to reduce the effective diameter.

The conditional expressions (17) and (18) define the focal length of the positive lens included in the 11 lens sub unit U11 and the focal length of the negative lens included in the 11 lens sub unit U11, to thereby define a condition for achieving the reductions in size and weight of the first lens unit U1 while satisfactorily correcting aberrations.

When an upper limit of the conditional expression (17) is exceeded, the curvature radius of each of the lenses within the 11 lens sub unit U11 becomes smaller in order to obtain a sufficient effect of a wide angle of view, and it becomes difficult to correct higher aberrations and reduce the size and the weight. Meanwhile, when the ratio falls below a lower limit of the conditional expression (17), the retro ratio of the 11 lens sub unit U11 becomes smaller, and the effective diameter of the 11 lens sub unit U11 is disadvantageously increased. Alternatively, the distance on the optical axis between the 11 lens sub unit U11 and the 12 lens sub unit U12 becomes longer by an amount corresponding to the reduction in retro ratio, and the total lens thickness of the first lens unit disadvantageously becomes larger.

When an upper limit of the conditional expression (18) is exceeded, the retro ratio of the 11 lens sub unit U11 becomes smaller, and the effective diameter of the 11 lens sub unit U11 is disadvantageously increased. Alternatively, the distance on the optical axis between the 11 lens sub unit U11 and the 12 lens sub unit U12 becomes longer by the amount corresponding to the reduction in retro ratio, and the total lens thickness of the first lens unit U1 disadvantageously becomes larger. Meanwhile, when the ratio falls below a lower limit of the conditional expression (18), the negative refractive power of the negative lens of the 11 lens sub unit U11 becomes relatively too strong, and the higher aberrations become larger due to the reduction in curvature radius of the lens having a negative refractive power, with the result that it becomes difficult to reduce the size and the weight of the first lens unit U1 and to obtain satisfactory optical performance.

The conditional expression (19) defines a range for correcting the chromatic aberration that occurs in the 11 lens sub unit U11. When an upper limit of the conditional expression (19) is exceeded, achromatism becomes excessive, and the refractive power of each of the lenses within the 11 lens sub unit U11 becomes insufficient, with the result that it becomes difficult to provide a sufficient retro ratio and an aberration correction capability. Meanwhile, when the ratio falls below a lower limit of the conditional expression (19), the curvature radius of each of the lenses becomes smaller, and it becomes difficult to reduce the size and weight of the first lens unit U1 and to obtain satisfactory optical performance.

The conditional expression (20) relates to the distance (total lens length) from the surface vertex of the lens surface of the first lens unit U1, which is arranged closest to the object side, to the surface vertex of the lens surface of the first lens unit U1, which is arranged closest to the image side. When an upper limit of the conditional expression (20) is exceeded, the total lens thickness of the first lens unit U1 having a large effective diameter becomes larger, and hence a lens weight becomes larger, with the result that it becomes difficult to reduce the size and the weight of the first lens unit U1. Meanwhile, when the ratio falls below a lower limit of the conditional expression (20), it becomes difficult to increase the retro ratio of the first lens unit U1, and it becomes difficult to widen the angle of view and to downsize the first lens unit U1.

It is more preferred to set the numerical ranges of the conditional expressions (16) to (20) as follows:

$$0.55 < f111/f112 < 0.95 \quad (16a);$$

$$-4.8 < f113/f11 < -1.6 \quad (17a);$$

$$0.55 < f11na/f11 < 0.78 \quad (18a);$$

$$23.0 < v11na - v113 < 31.0 \quad (19a); \text{ and}$$

$$0.27 < L1/L < 0.40 \quad (20a).$$

A zoom lens according to another embodiment of the present invention includes, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power. The lens unit having a negative refractive power is arranged closest to the object side, to thereby suppress the increase in front lens diameter even when a wide angle is achieved. The lens unit having a negative refractive power and the lens unit having a positive refractive power are arranged alternately in the first to sixth lens units, to thereby allow efficient magnification varying by changing each interval between the lens units.

The zoom lens is configured to change an interval between adjacent lens units among the first, second, third, fourth, fifth, and sixth lens units during zooming, but a heavy first lens unit is fixed to prevent an increase in driving force required for zooming. The second lens unit is configured to move in order to conduct zooming by changing the interval between the second lens unit and the first lens unit configured not to move for zooming. The third lens unit positioned on the image side of the second lens unit configured to move may be fixed or may be configured to move. The fourth lens unit is configured to move in order to efficiently conduct zooming even when the third lens unit is fixed. The fifth lens unit is also configured to move in order to correct the spherical aberration and the field curvature during zooming by changing the interval between the fourth lens unit and the fifth lens unit. Lens units arranged on the image side of the fifth lens unit configured to move contribute to magnification varying to a small extent, and therefore may include a fixed lens unit or may be all configured to move.

In addition, the following conditional expression is satisfied:

$$0.50 < M4/M2 < 0.95 \quad (21),$$

where M2 represents a difference between positions of the second lens unit at the wide angle end and the telephoto end in the optical axis direction, and M4 represents a difference between positions of the fourth lens unit at the wide angle end and the telephoto end in the optical axis direction, M2 and M4 having a positive sign when the respective lens units are positioned on the image side at the telephoto end with respect to the wide angle end.

The conditional expression (21) is an expression that defines a ratio between the difference between the positions of the second lens unit at the wide angle end and the telephoto end and the difference between the positions of the fourth lens unit at the wide angle end and the telephoto end. When an upper limit value of the conditional expression (21) is exceeded, variations in field curvature that occur at the wide angle end side due to the movement of the fourth lens unit disadvantageously increase. Meanwhile, when the ratio falls below a lower limit value of the conditional expression (21), the interval between the first lens unit and the second lens unit is increased at the wide angle end, the entrance pupil becomes longer, and the front lens diameter becomes larger, which is not preferred.

With the above-mentioned configuration, the object of the present invention is achieved, but it is desired to satisfy the following conditional expression in one embodiment of the present invention:

$$-1.0 < MD45/M4 < 1.0 \quad (22),$$

where MD45 represents a change in interval between the fourth lens unit and the fifth lens unit during zooming, and is a value obtained by subtracting the interval between the fourth lens unit and the fifth lens unit at the wide angle end from the interval between the fourth lens unit and the fifth lens unit at the telephoto end.

The conditional expression (22) is an expression that defines a ratio between the change in interval between the fourth lens unit and the fifth lens unit during zooming and the difference between the positions of the fourth lens unit at the wide angle end and the telephoto end. When an upper limit value of the conditional expression (22) is exceeded, variations in field curvature that occur from an intermediate focal length to the telephoto end become larger. Meanwhile, when the ratio falls below a lower limit value of the conditional expression (22), the change in interval between the fourth lens unit and the fifth lens unit interferes with the zooming, which is not preferred.

Further, in one embodiment of the present invention, it is desired to conduct focusing with a part of the lenses within the first lens unit.

The focusing within the fixed first lens unit allows the movement amount of the focus lens unit to be fixed irrespective of the zooming position, and the rotation angle of the operation ring during the manual operation can be fixed even with simple lens barrel structure irrespective of the zooming position. When a manufacturing error occurs, the movement amount of the focus does not change even with an error of the focal length of a lens unit other than the first lens unit, and hence the manufacturing error of the rotation angle of the operation ring from the infinity to a desired object distance is also small.

Further, in one embodiment of the present invention, it is desired that the first lens unit include five or less lenses.

The first lens unit has a large diameter, and is therefore heavy with a large number of lenses, which is not preferred.

Further, in one embodiment of the present invention, it is desired that the third lens unit include a plurality of negative lenses.

In one embodiment of the present invention, in particular, a magnification varying action based on the change in interval between the first to fourth lens units is large. It is desired that the number of component lenses that form the first lens unit be suppressed to a small number for the reduction in weight, and in order to suppress the various aberrations that occur in the first lens unit, the negative refractive power is shared with the third lens unit. It is desired that the third lens unit having a negative refractive power include a plurality of negative lenses in order to satisfactorily correct various aberrations.

Further, it is desired to satisfy the following conditional expressions in one embodiment of the present invention:

$$-2.5 < f1/fw < -1.5 \quad (23); \text{ and}$$

$$0.5 < f1/f3 < 2.0 \quad (24),$$

where f1 represents the focal length of the first lens unit, fw represents the focal length of the zoom lens at the wide angle end, and f3 represents the focal length of the third lens unit.

The conditional expression (23) is an expression that defines a ratio between the focal length of the first lens unit and the focal length of the zoom lens at the wide angle end. When an upper limit value of the conditional expression (23) is exceeded, variations in distortion become larger during zooming. Meanwhile, when the ratio falls below a lower limit value of the conditional expression (23), the entrance pupil becomes longer, and hence the front lens diameter becomes larger, which is not preferred.

The conditional expression (24) is an expression that defines a ratio between the focal length of the first lens unit and the focal length of the third lens unit. When an upper limit value of the conditional expression (24) is exceeded, the entrance pupil becomes longer, and hence the front lens diameter becomes larger, which is not preferred. Meanwhile, when the ratio falls below a lower limit of the conditional expression (24), the variations in distortion become larger during zooming. Alternatively, the diameter of the third lens unit becomes larger, which is not preferred.

Further, in one embodiment of the present invention, it is desired that the aperture stop be arranged in proximity to the third lens unit.

When the aperture stop is arranged on the object side of the second lens unit or at a position between the second lens unit and the third lens unit, which is closer to the second lens unit than to the third lens unit, a diameter of the stop becomes larger in order to reduce the F-number to a bright state at the telephoto end, which is not preferred. When the aperture stop is arranged on the image side of the fourth lens unit or at a position between the third lens unit and the fourth lens unit, which is closer to the fourth lens unit than to the third lens unit, the front lens diameter becomes larger in order to allow a ray to pass through a center of the aperture stop so that the zoom lens can be used with a small diameter of the aperture stop, which is not preferred.

It is more preferred to specify the numerical ranges of the conditional expressions (21) to (24) as follows:

$$0.51 < M4/M2 < 0.91 \quad (21a);$$

$$-0.5 < MD45/M4 < 0.5 \quad (22a);$$

$$-2.4 < f1/fw < -1.6 \quad (23a); \text{ and}$$

$$0.6 < f1/f3 < 1.8 \quad (24a).$$

It is more desired to specify the numerical range of the conditional expression (22a) as follows:

$$-0.1 < MD45/M4 < 0.3 \tag{22b}$$

Now, exemplary embodiments of the present invention are described in detail with reference to the attached drawings.

Embodiment 1

A zoom lens according to Embodiment 1 of the present invention includes, in order from the object side to the image side, a first lens unit U1 (front lens unit) having a positive refractive power, which is configured not to move for zooming, a second lens unit U2 (Nf lens unit) having a negative refractive power, which includes three or more lenses, an aperture stop SP, a third lens unit U3 (first rear lens unit) configured to move during zooming, a fourth lens unit U4 (second rear lens unit) configured to move during zooming, and a fifth lens unit U5 (third rear lens unit) configured not to move for zooming.

FIG. 1 is a lens cross-sectional view for illustrating the first lens unit U1, the second lens unit U2, the third lens unit U3, the fourth lens unit U4, the fifth lens unit U5, the aperture stop SP, an auxiliary stop SP2 configured to change the aperture diameter in order to determine an open F-number, a glass block P, e.g., a low-pass filter or a face plate of a CCD, and an image plane I. When used as an image pickup optical system for a broadcasting television camera, a movie camera, a video camera, or a digital still camera, the image plane I corresponds to an image pickup surface of a solid state image pickup element (photoelectric converter) or the like configured to receive light of an image formed by the zoom lens and to convert light to electricity. When used as an image pickup optical system for a film camera, the image plane I corresponds to a film surface on which the image formed by the zoom lens is exposed. The same is true for all Embodiments below.

The zoom lens according to Embodiment 1 includes the following components in order from the object side to the image side. The first lens unit U1 corresponds to the front lens unit and to a first surface to a fourteenth surface, and includes a meniscus negative lens having a surface concave on the image side, a meniscus negative lens having a surface convex on the image side, two biconvex lenses, a meniscus negative lens having a surface concave on the image side, and two biconvex lenses. The second lens unit U2 corresponds to the Nf lens unit and to a fifteenth surface to a twenty-first surface, and includes a meniscus negative lens having a surface concave on the image side, a cemented lens of a meniscus negative lens having a surface concave on the image side and a meniscus positive lens having a surface concave on the image side, and a meniscus negative lens having a surface convex on the image side. The aperture stop SP corresponds to a twenty-second surface, and the auxiliary stop SP2 corresponds to a twenty-third surface. The third lens unit U3 corresponds to the first rear lens unit and to a twenty-fourth surface and a twenty-fifth surface, and includes a meniscus positive lens having a surface concave on the image side. The fourth lens unit U4 corresponds to the second rear lens unit and to a twenty-sixth surface to a twenty-ninth surface, and includes a meniscus negative lens having a surface concave on the image side and a biconvex lens. The fifth lens unit U5 corresponds to the third rear lens unit and to a thirtieth surface to a thirty-ninth surface, and includes a meniscus negative lens having a surface concave on the image side, a cemented lens of a meniscus negative lens having a surface concave on the image side and a meniscus positive lens having a surface concave on the image side, a biconvex lens, and a cemented lens of a biconvex lens and a meniscus negative lens having a surface convex on the image side.

In Embodiment 1, the auxiliary stop is included, but an aperture diameter of the aperture stop may be changed based on the zooming position without use of the auxiliary stop. In this embodiment, the lens units are configured to move as indicated by the arrows of FIG. 1 during magnification varying from the wide angle end to the telephoto end. In Embodiment 1, focusing is conducted by moving the fourth lens from the object side within the first lens unit. Further, adjustment of the back focus can be conducted by moving the rearmost lens unit (fifth lens unit) or a part of the lenses within the rearmost lens unit in the optical axis direction.

Figure 2:
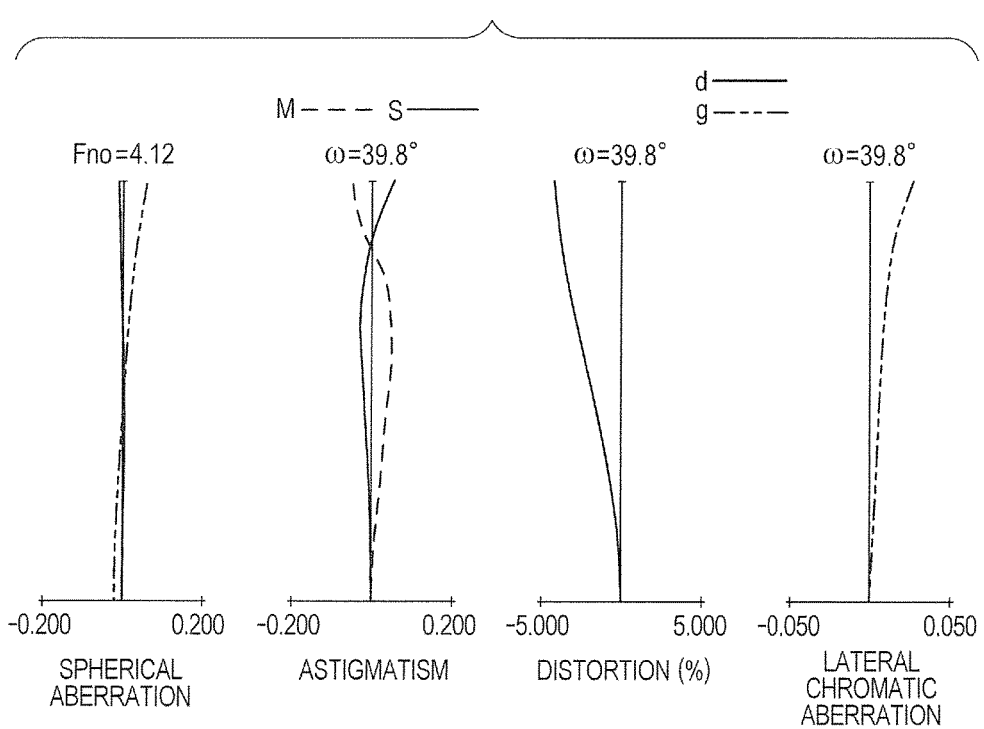
FIG. 2 is an aberration diagram in a state in which focus is at infinity at the wide angle end according to Numerical Embodiment 1.
Figure 3:
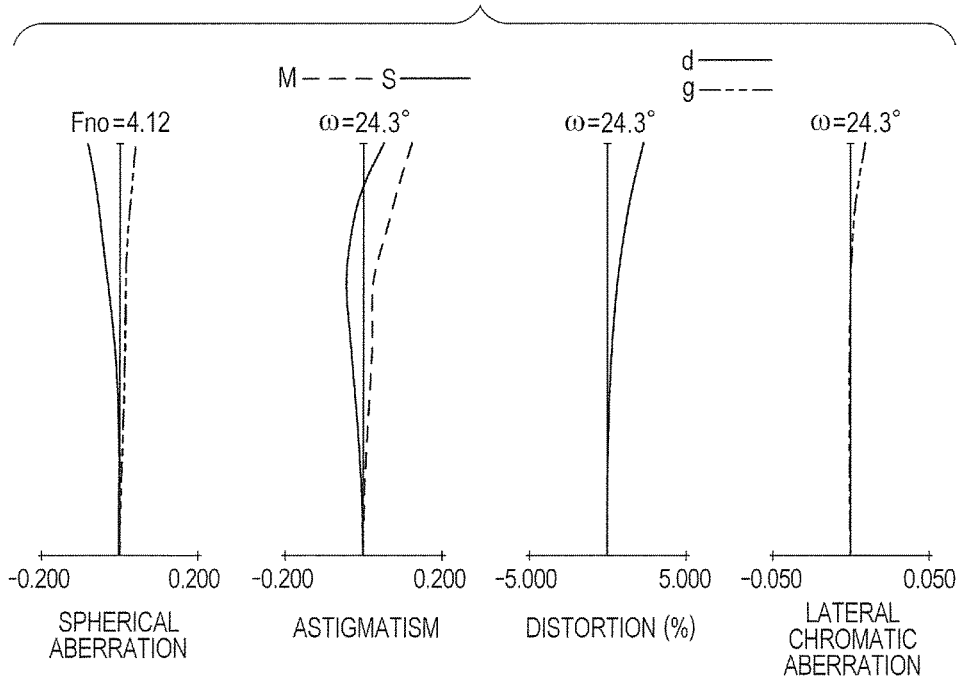
FIG. 3 is an aberration diagram in a state in which focus is at infinity at an intermediate focal length according to Numerical Embodiment 1.
Figure 4:
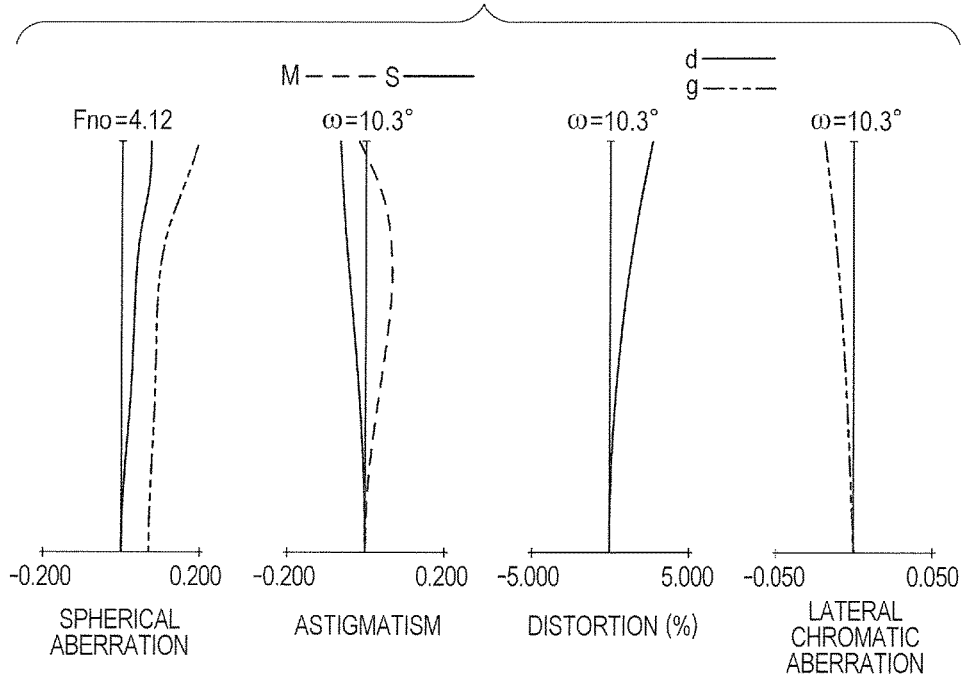
FIG. 4 is an aberration diagram in a state in which focus is at infinity at a telephoto end according to Numerical Embodiment 1.

FIG. 1 is a lens cross-sectional view of the zoom lens according to Embodiment 1 of the present invention at the wide angle end (focal length f=18.54 mm) in a state in which focus is at an object at infinity. FIG. 2, FIG. 3, and FIG. 4 are aberration diagrams of Embodiment 1 at the wide angle end (focal length f=18.54 mm), the intermediate zoom position (focal length f=32.08 mm), and the telephoto end (focal length f=79.52 mm), respectively, in a state in which focus is at the object at infinity. In the aberration diagram, d and g represent d-line and g-line, respectively, and M and S represent a meridional image plane and a sagittal image plane, respectively. A half angle of view is represented by ω, and an F-number is represented by Fno. A spherical aberration is illustrated in the unit of 0.2 mm, an astigmatism is illustrated in the unit of 0.2 mm, a distortion is illustrated in the unit of 5%, and a lateral chromatic aberration is illustrated in the unit of 0.05 mm. The zoom lens according to Embodiment 1 has a zoom ratio of 4.29, an F-number of 4.12, and an image pickup angle of view of 77.20 degrees at the wide angle end.

As described above, refractive power arrangement of each lens unit and movement loci of moving lens units for zooming are defined appropriately. As a result, such a zoom lens is obtained as to achieve high operability and the reductions in size and weight while achieving a high zoom ratio and satisfactory optical performance.

As shown in Table 1 along with arithmetic operation results of numerical value conditions for this Embodiment, the conditional expressions (1) to (14) are satisfied.

Embodiment 2

A zoom lens according to Embodiment 2 of the present invention includes, from the object side to the image side, a front lens unit, an Nf lens unit having a negative refractive power and including three or more lenses, an aperture stop, a first rear lens unit configured to move during zooming, a second rear lens unit configured to move during zooming, and a third rear lens unit configured not to move for zooming. Further, the front lens unit includes one or more lens units including a first lens unit configured not to move for zooming and arranged closest to the object side, and includes four or more lenses and one or more lens units having a positive refractive power.

The zoom lens according to Embodiment 2 includes the following components in order from the object side to the image side. The first lens unit U1 and the second lens unit U2 form the front lens unit. The first lens unit U1 corresponds to the first to sixth surfaces, and includes a meniscus negative lens having a surface concave on the image side, a biconcave lens, and a meniscus positive lens having a surface concave on the image side. The second lens unit U2 includes a cemented lens of a meniscus negative lens having a surface concave on the image side and a biconvex lens and two biconvex lenses. The fourteenth surface corresponds to the auxiliary stop SP2. The third lens unit U3 corresponds to the Nf lens unit and to the fifteenth to twenty-first surfaces, and includes a meniscus negative lens having a surface concave on the image side, a cemented lens of a meniscus negative lens having a surface concave on the image side and a meniscus positive lens having a surface concave on the image side, and a meniscus negative lens having a surface convex on the image side. The aperture stop SP corresponds to the twenty-second surface, and the auxiliary stop SP2 corresponds to the twenty-third surface. The fourth lens unit U4 corresponds to the first rear lens unit and to the twenty-fourth and twenty-fifth surfaces, and includes a meniscus positive lens having a surface concave on the image side. The fifth lens unit U5 corresponds to the second rear lens unit and to the twenty-sixth to twenty-ninth surfaces, and includes a meniscus negative lens having a surface concave on the image side and a biconvex lens. A sixth lens unit U6 corresponds to the third rear lens unit and to the thirtieth to thirty-ninth surfaces, and includes a meniscus negative lens having a surface concave on the image side, a cemented lens of a meniscus negative lens having a surface concave on the image side and a meniscus positive lens having a surface concave on the image side, a biconvex lens, and a cemented lens of a biconvex lens and a meniscus negative lens having a surface convex on the image side. In Embodiment 2, the lens unit having a positive refractive power within the front lens unit corresponds to the second lens unit U2, and the first lens unit U1 has a negative refractive power.

Figure 5:
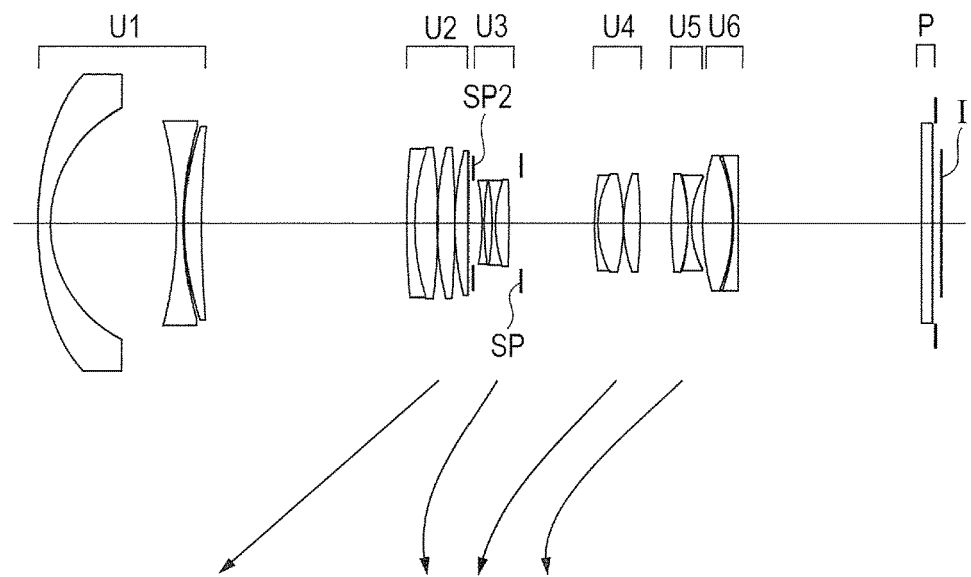
FIG. 5 is a lens cross-sectional view of a zoom lens according to Embodiment 2 (Numerical Embodiment 2) of the present invention at a wide angle end in a state in which focus is at infinity.

In Embodiment 2, the auxiliary stop is included, but an aperture diameter of the aperture stop may be changed based on the zooming position without use of the auxiliary stop. In this embodiment, the lens units are configured to move as indicated by the arrows of FIG. 5 during magnification varying from the wide angle end to the telephoto end. In Embodiment 2, focusing is conducted by integrally moving the second and third lenses from the object side within the first lens unit U1. Further, adjustment of the back focus can be conducted by moving the rearmost lens unit (sixth lens unit) or a part of the lenses within the rearmost lens unit in the optical axis direction.

Figure 6:
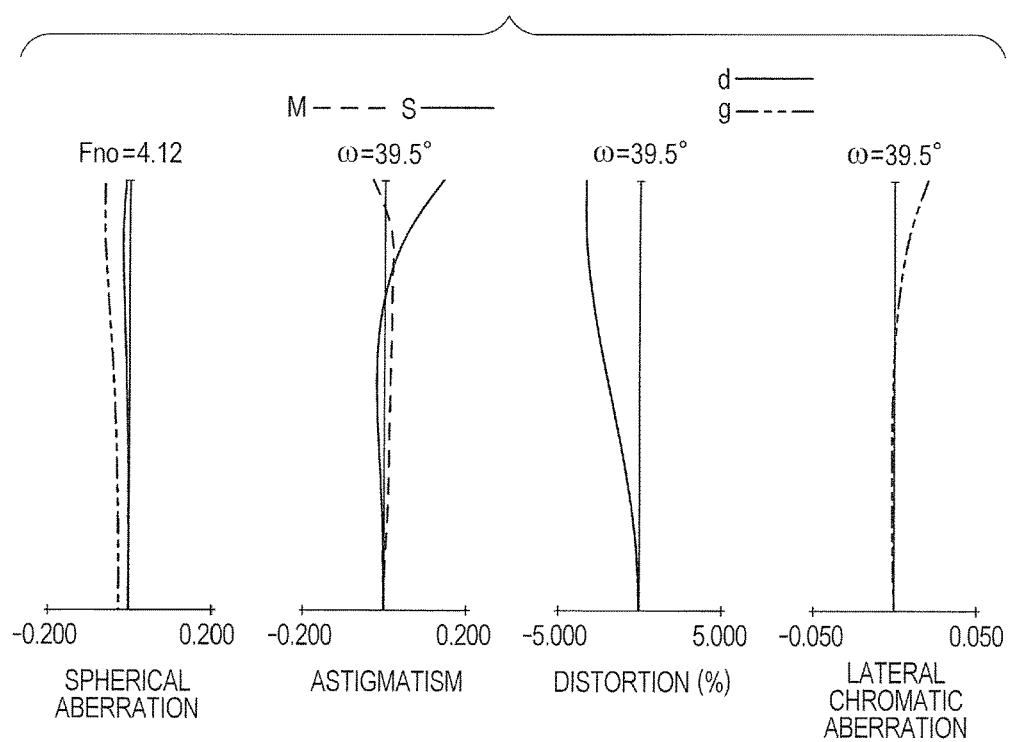
FIG. 6 is an aberration diagram in a state in which focus is at infinity at the wide angle end according to Numerical Embodiment 2.
Figure 7:
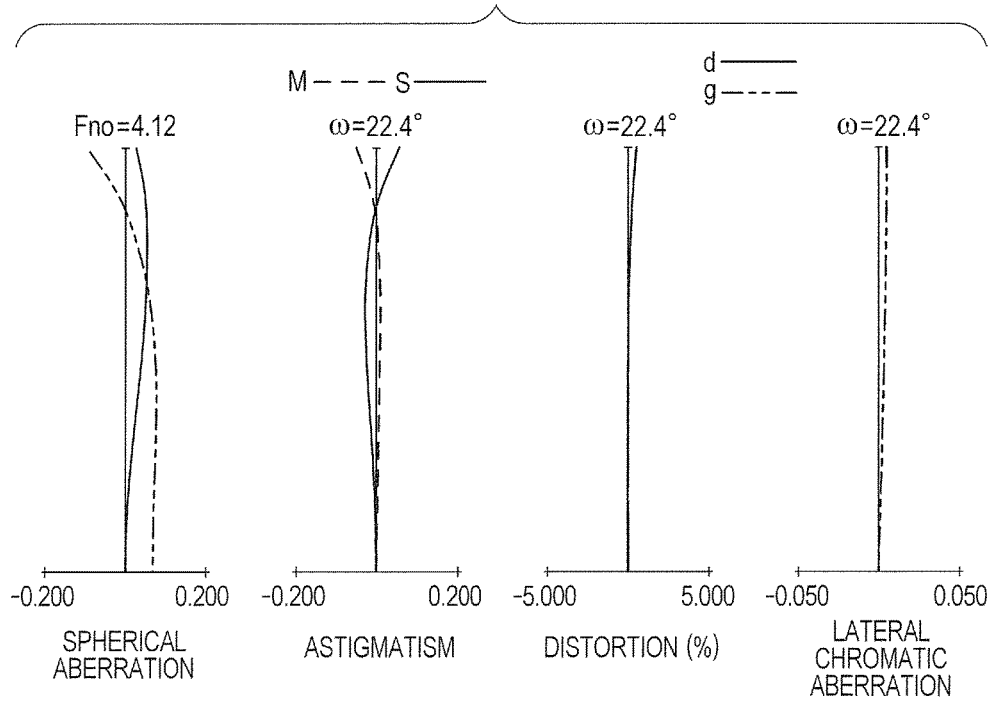
FIG. 7 is an aberration diagram in a state in which focus is at infinity at an intermediate focal length according to Numerical Embodiment 2.
Figure 8:
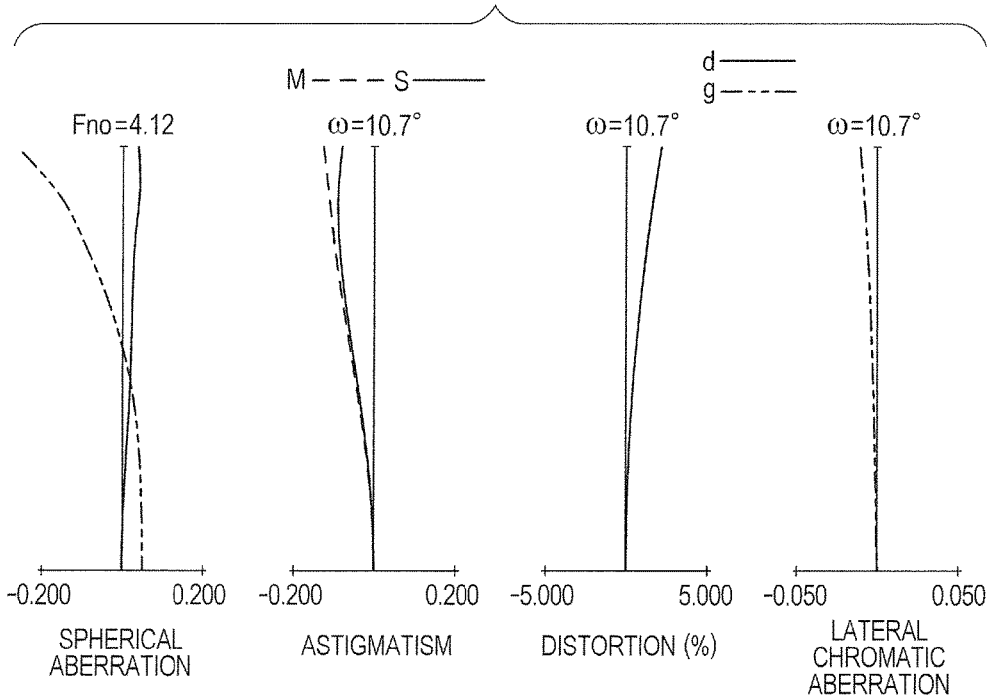
FIG. 8 is an aberration diagram in a state in which focus is at infinity at a telephoto end according to Numerical Embodiment 2.

FIG. 5 is a lens cross-sectional view of the zoom lens according to Embodiment 2 of the present invention at the wide angle end (focal length f=18.54 mm) in a state in which focus is at the object at infinity. FIG. 6, FIG. 7, and FIG. 8 are aberration diagrams of Embodiment 2 at the wide angle end (focal length f=18.54 mm), the intermediate zoom position (focal length f=35.72 mm), and the telephoto end (focal length f=77.00 mm), respectively, in a state in which focus is at the object at infinity. In the aberration diagram, d and g represent d-line and g-line, respectively, and M and S represent a meridional image plane and a sagittal image plane, respectively. A half angle of view is represented by ω, and an F-number is represented by Fno. A spherical aberration is illustrated in the unit of 0.2 mm, an astigmatism is illustrated in the unit of 0.2 mm, a distortion is illustrated in the unit of 5%, and a lateral chromatic aberration is illustrated in the unit of 0.05 mm. The zoom lens according to Embodiment 2 has a zoom ratio of 4.15, an F-number of 4.12, and an image pickup angle of view of 77.20 degrees at the wide angle end.

As described above, refractive power arrangement of each lens unit and movement loci of moving lens units for zooming are defined appropriately. As a result, such a zoom lens is obtained as to achieve high operability and the reductions in size and weight while achieving a high zoom ratio and satisfactory optical performance.

As shown in Table 1 along with arithmetic operation results of numerical value conditions for this Embodiment, the conditional expressions (1) to (6) and (21) to (24) are satisfied.

Embodiment 3

A zoom lens according to Embodiment 3 of the present invention includes, in order from the object side to the image side, a first lens unit U1 (front lens unit) having a positive refractive power, which is configured not to move for zooming, a second lens unit U2 (Nf lens unit) having a negative refractive power, which includes three or more lenses, an aperture stop SP, a third lens unit U3 (first rear lens unit) configured to move during zooming, a fourth lens unit U4 (second rear lens unit) configured to move during zooming, and a fifth lens unit U5 (third rear lens unit) configured not to move for zooming.

The zoom lens according to Embodiment 3 includes the following components in order from the object side to the image side. The first lens unit U1 corresponds to the front lens unit and to the first to thirteenth surfaces, and includes a meniscus negative lens having a surface concave on the image side, a biconcave lens, a meniscus positive lens having a surface concave on the image side, a biconvex lens, a cemented lens of a meniscus negative lens having a surface concave on the image side and a biconvex lens, and a biconvex lens. The second lens unit U2 corresponds to the Nf lens unit and to the fourteenth to eighteenth surfaces, and includes a biconcave lens and a cemented lens of a biconcave lens and a meniscus positive lens having a surface concave on the image side. The nineteenth surface corresponds to the aperture stop SP. The third lens unit U3 corresponds to the first rear lens unit and to the twentieth and twenty-first surfaces, and includes a meniscus negative lens having a surface convex on the image side. The fourth lens unit U4 corresponds to the second rear lens unit and to the twenty-second to twenty-sixth surfaces, and includes a meniscus positive lens having a surface concave on the image side and a cemented lens of a meniscus negative lens having a surface concave on the image side and a biconvex lens. The fifth lens unit U5 corresponds to the third rear lens unit and to the twenty-seventh to thirty-fourth surfaces, and includes a cemented lens of a meniscus positive lens having a surface convex on the image side and a biconcave lens, a biconvex lens, and a cemented lens of a biconvex lens and a biconcave lens.

Figure 9:
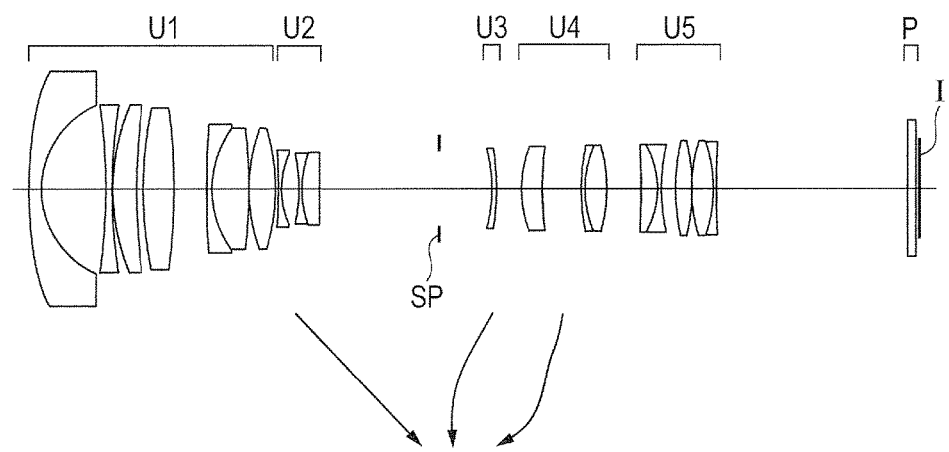
FIG. 9 is a lens cross-sectional view of a zoom lens according to Embodiment 3 (Numerical Embodiment 3) of the present invention at a wide angle end in a state in which focus is at infinity.

In this embodiment, the lens units are configured to move as indicated by the arrows of FIG. 9 during magnification varying from the wide angle end to the telephoto end. In Embodiment 3, focusing is conducted by moving the fourth lens from the object side within the first lens unit U1. Further, the adjustment of the back focus can be conducted by moving the rearmost lens unit (fifth lens unit) or a part of the lenses within the rearmost lens unit.

Figure 10:
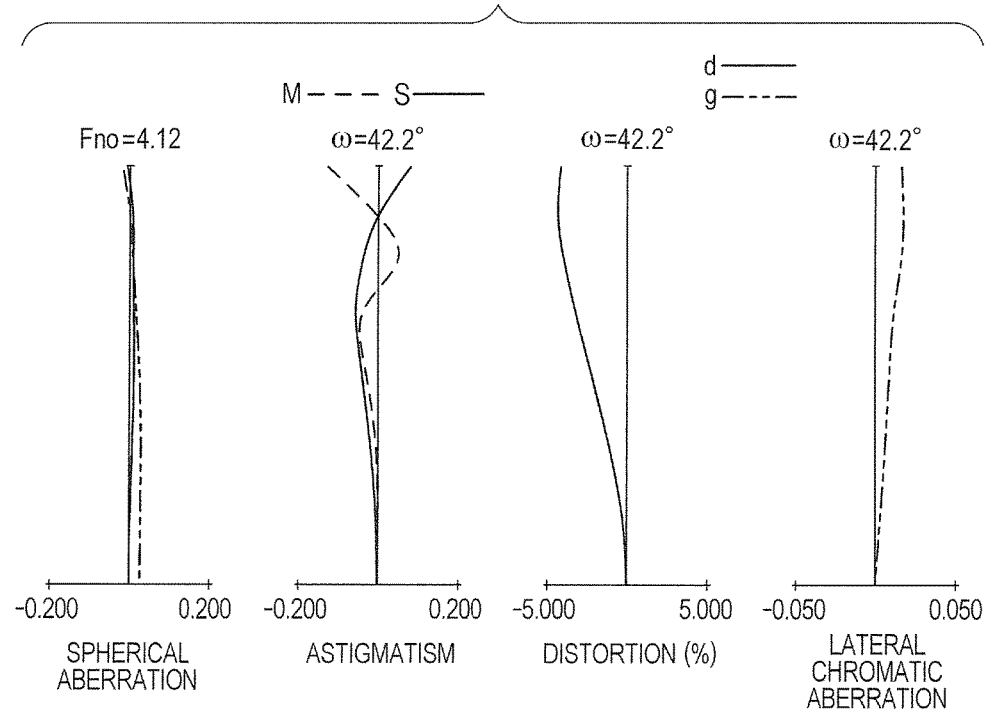
FIG. 10 is an aberration diagram in a state in which focus is at infinity at the wide angle end according to Numerical Embodiment 3.
Figure 11:
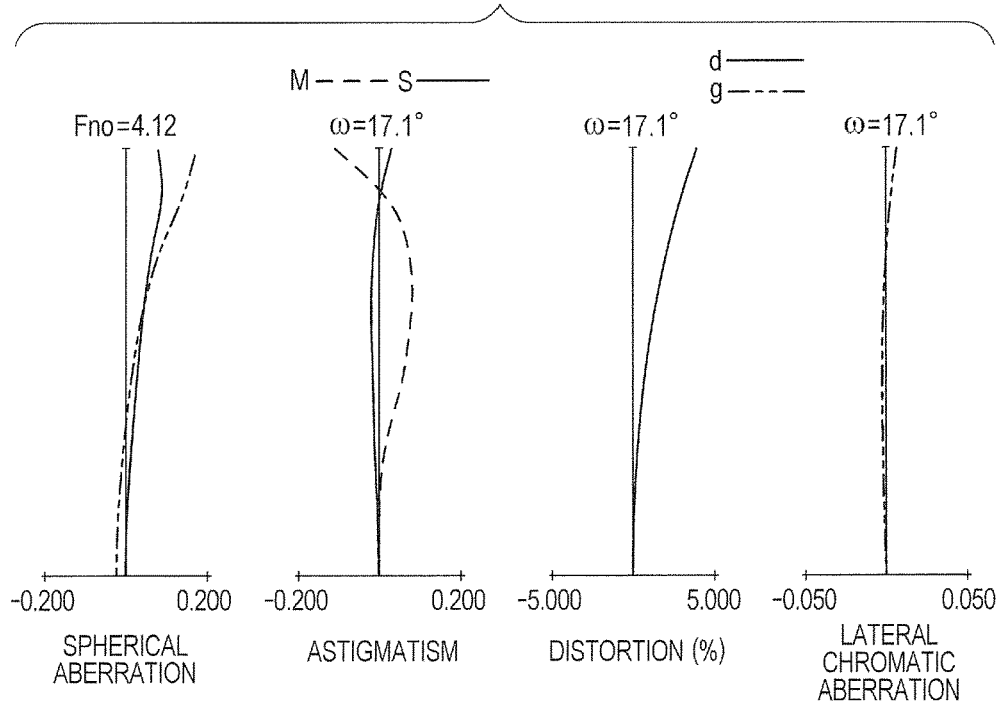
FIG. 11 is an aberration diagram in a state in which focus is at infinity at an intermediate focal length according to Numerical Embodiment 3.
Figure 12:
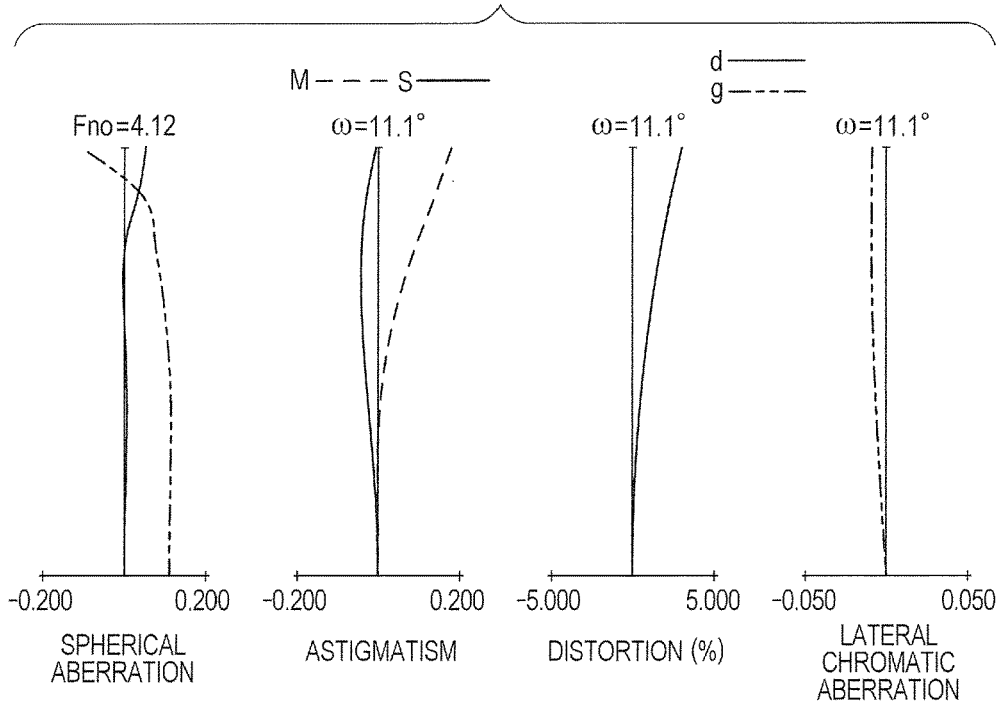
FIG. 12 is an aberration diagram in a state in which focus is at infinity at a telephoto end according to Numerical Embodiment 3.

FIG. 9 is a lens cross-sectional view of the zoom lens according to Embodiment 3 of the present invention at the wide angle end (focal length f=17.03 mm) in a state in which focus is at the object at infinity. FIG. 10, FIG. 11, and FIG. 12 are aberration diagrams of Embodiment 3 at the wide angle end (focal length f=17.03 mm), the intermediate zoom position (focal length f=46.18 mm), and the telephoto end (focal length f=73.36 mm), respectively, in a state in which focus is at the object at infinity. In the aberration diagram, d and g represent d-line and g-line, respectively, and M and S represent a meridional image plane and a sagittal image plane, respectively. A half angle of view is represented by ω, and an F-number is represented by Fno. A spherical aberration is illustrated in the unit of 0.2 mm, an astigmatism is illustrated in the unit of 0.2 mm, a distortion is illustrated in the unit of 5%, and a lateral chromatic aberration is illustrated in the unit of 0.05 mm. The zoom lens according to Embodiment 3 has a zoom ratio of 4.31, an F-number of 4.12, and an image pickup angle of view of 82.00 degrees at the wide angle end.

As described above, refractive power arrangement of each lens unit and movement loci of moving lens units for zooming are defined appropriately. As a result, such a zoom lens is obtained as to achieve high operability and the reductions in size and weight while achieving a high zoom ratio and satisfactory optical performance.

As shown in Table 1 along with arithmetic operation results of numerical value conditions for this Embodiment, the conditional expressions (1) to (12) are satisfied.

Embodiment 4

A zoom lens according to Embodiment 4 of the present invention includes, in order from the object side to the image side, a first lens unit U1 (front lens unit) having a positive refractive power, which is configured not to move for zooming, a second lens unit U2 (Nf lens unit) having a negative refractive power, which includes three or more lenses, an aperture stop SP, a third lens unit U3 (first rear lens unit) configured to move during zooming, a fourth lens unit U4 (second rear lens unit) configured to move during zooming, and a fifth lens unit U5 (third rear lens unit) configured not to move for zooming.

The zoom lens according to Embodiment 4 includes the following components in order from the object side to the image side. The first lens unit U1 corresponds to the front lens unit and to the first to thirteenth surfaces, and includes a meniscus negative lens having a surface concave on the image side, a biconcave lens, a meniscus positive lens having a surface concave on the image side, a biconvex lens, a cemented lens of a meniscus negative lens having a surface concave on the image side and a biconvex lens, and a biconvex lens. The second lens unit U2 corresponds to the Nf lens unit and to the thirteenth to eighteenth surfaces, and includes a biconcave lens and a cemented lens of a biconcave lens and a meniscus negative lens having a surface concave on the image side. The nineteenth surface corresponds to the aperture stop SP. The third lens unit U3 corresponds to the first rear lens unit and to the twentieth to twenty-fourth surfaces, and includes a meniscus positive lens having a surface concave on the image side and a cemented lens of a meniscus positive lens having a surface concave on the image side and a biconvex lens. The fourth lens unit U4 corresponds to the second rear lens unit and to the twenty-fifth and twenty-seventh surfaces, and includes a cemented lens of a meniscus positive lens having a surface convex on the image side and a biconcave lens. The fifth lens unit U5 corresponds to the third rear lens unit and to the twenty-eighth to thirty-second surfaces, and includes a biconvex lens and a cemented lens of a biconvex lens and a meniscus negative lens having a surface convex on the image side.

Figure 13:
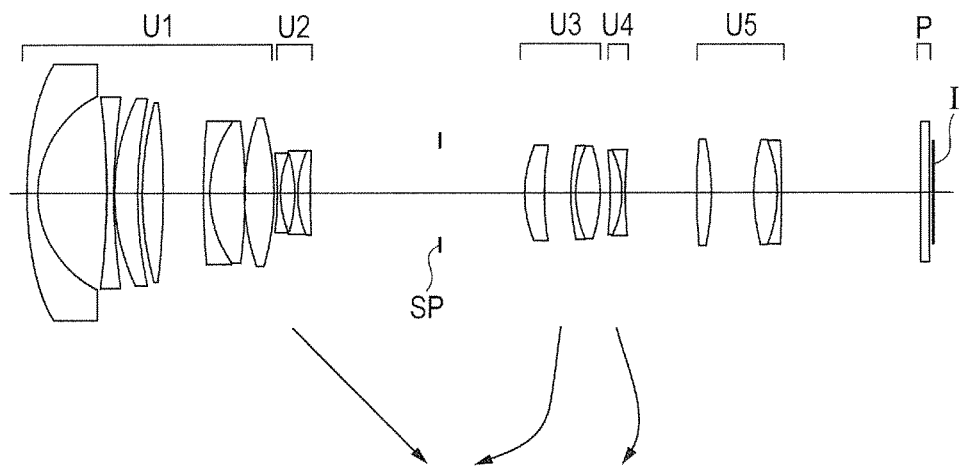
FIG. 13 is a lens cross-sectional view of a zoom lens according to Embodiment 4 (Numerical Embodiment 4) of the present invention at a wide angle end in a state in which focus is at infinity.

In this embodiment, the lens units are configured to move as indicated by the arrows of FIG. 13 during magnification varying from the wide angle end to the telephoto end. In Embodiment 4, focusing is conducted by moving the fourth lens from the object side within the first lens unit U1. Further, adjustment of the back focus can be conducted by moving the rearmost lens unit (fifth lens unit) or a part of the lenses within the rearmost lens unit in the optical axis direction.

Figure 14:
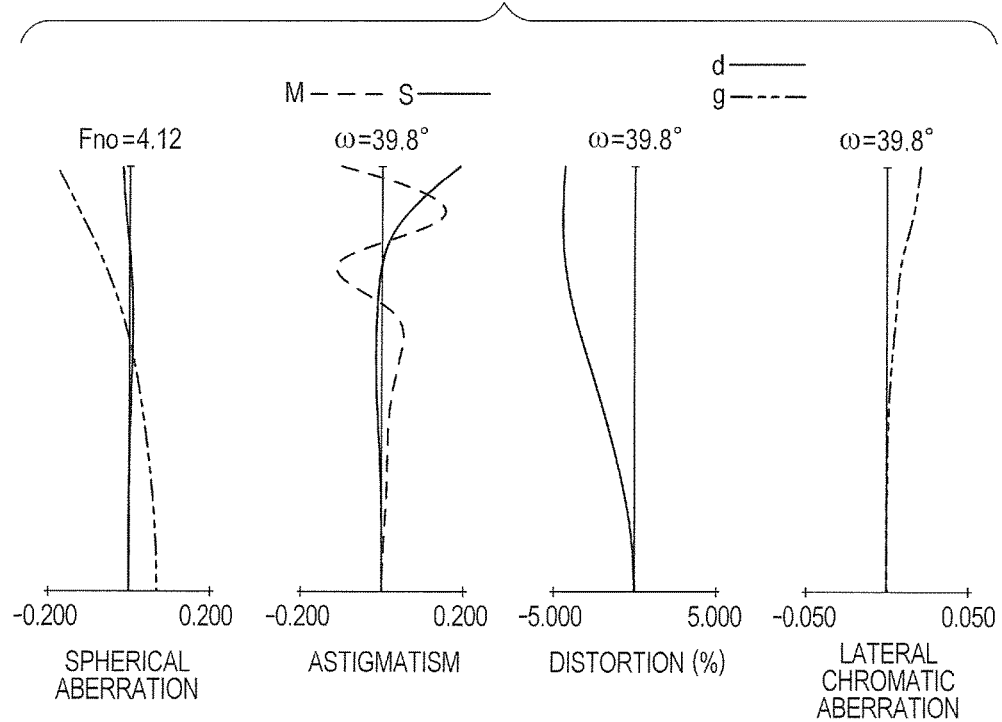
FIG. 14 is an aberration diagram in a state in which focus is at infinity at the wide angle end according to Numerical Embodiment 4.
Figure 15:
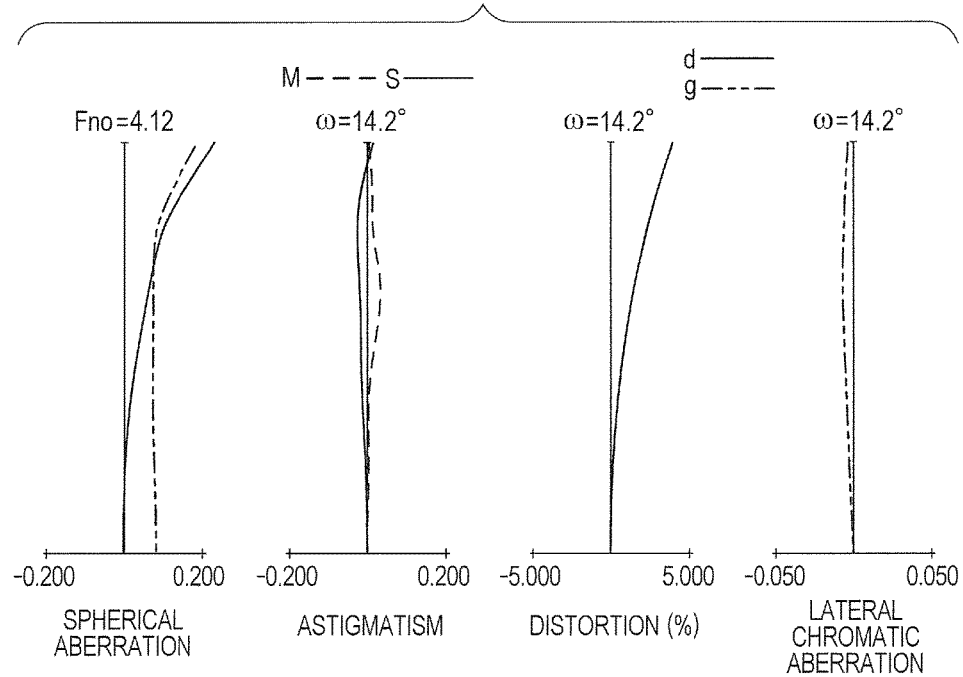
FIG. 15 is an aberration diagram in a state in which focus is at infinity at an intermediate focal length according to Numerical Embodiment 4.
Figure 16:
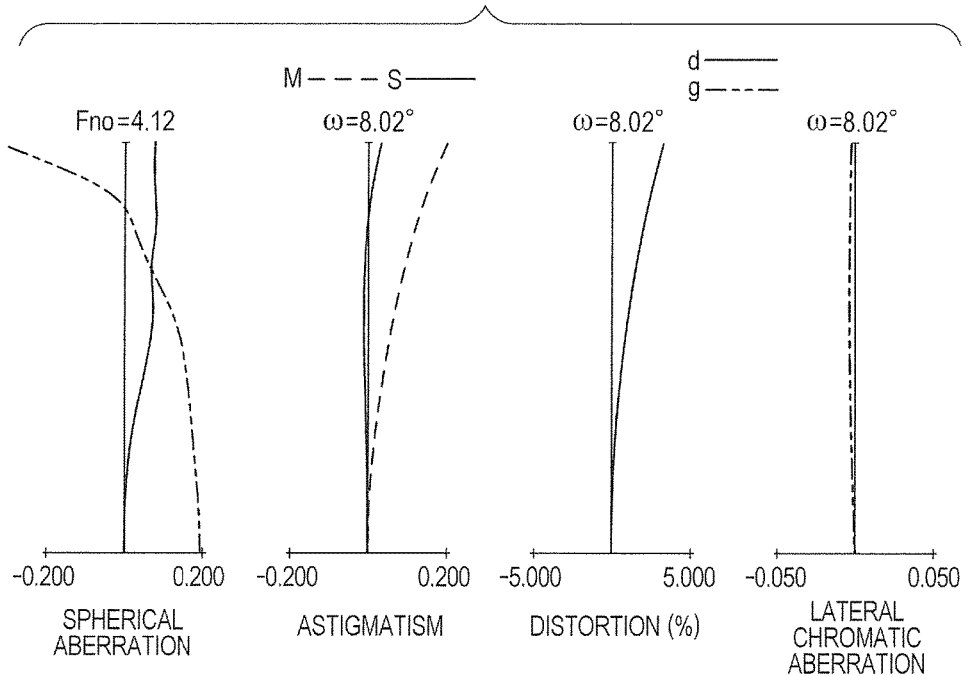
FIG. 16 is an aberration diagram in a state in which focus is at infinity at a telephoto end according to Numerical Embodiment 4.

FIG. 13 is a lens cross-sectional view of the zoom lens according to Embodiment 4 of the present invention at the wide angle end (focal length f=18.54 mm) in a state in which focus is at the object at infinity. FIG. 14, FIG. 15, and FIG. 16 are aberration diagrams of Embodiment 4 at the wide angle end (focal length f=18.54 mm), the intermediate zoom position (focal length f=56.09 mm), and the telephoto end (focal length f=101.76 mm), respectively, in a state in which focus is at the object at infinity. In the aberration diagram, d and g represent d-line and g-line, respectively, and M and S represent a meridional image plane and a sagittal image plane, respectively. A half angle of view is represented by ω, and an F-number is represented by Fno. A spherical aberration is illustrated in the unit of 0.2 mm, an astigmatism is illustrated in the unit of 0.2 mm, a distortion is illustrated in the unit of 5%, and a lateral chromatic aberration is illustrated in the unit of 0.05 mm. The zoom lens according to Embodiment 4 has a zoom ratio of 5.49, an F-number of 4.12, and an image pickup angle of view of 77.20 degrees at the wide angle end.

As described above, refractive power arrangement of each lens unit and movement loci of moving lens units for zooming are defined appropriately. As a result, such a zoom lens is obtained as to achieve high operability and the reductions in size and weight while achieving a high zoom ratio and satisfactory optical performance.

As shown in Table 1 along with arithmetic operation results of numerical value conditions for this Embodiment, the conditional expressions (1) to (12) are satisfied.

Embodiment 5

A zoom lens according to Embodiment 5 of the present invention includes, in order from the object side to the image side, a first lens unit (front lens unit) U1 having a positive refractive power, which is configured not to move for zooming, a second lens unit U2 having a negative refractive power, which is configured to move during zooming, an aperture stop SP, a third lens unit U3 having a positive refractive power, which is configured to move during zooming, and a rear lens unit U4 having a positive refractive power, which is arranged closest to the image side and configured not to move for zooming. The two lens units of the second lens unit U2 and the third lens unit U3 form a zoom system (magnification-varying lens unit). The fourth lens unit U4 is a relay lens unit having an imaging action, which is configured not to move for zooming.

The first lens unit includes, in order from the object side to the image side, an 11 lens sub unit U11 having a negative refractive power, which is configured not to move for focusing, a 12 lens sub unit U12 having a positive refractive power, which is configured to move toward the image side during focusing from the object at infinity to an object at the short distance, and a 13 lens sub unit U13 having a positive refractive power, which is configured to move during focusing.

The second lens unit is constituted only by one or more lens units having negative refractive powers.

The third lens unit includes two lens units U31 and U32 having a positive refractive power, and has a positive refractive power as a whole.

The aperture stop SP is capable of maintaining the F-number by changing the aperture diameter based on zooming, and is configured not to move in the optical axis direction during zooming.

The zoom lens according to Embodiment 5 includes the following components in order from the object side to the image side. The first lens unit U1 corresponds to the first to the fifteenth lens surfaces. The 11 lens sub unit U11 corresponds to the first to sixth surfaces, and includes a meniscus negative lens having a surface concave on the image side, a biconcave lens, and a meniscus positive lens having a surface concave on the image side. The 12 lens sub unit U12 corresponds to the seventh and eighth surfaces, and includes a biconvex lens. The 13 lens sub unit U13 corresponds to the ninth to fifteenth surfaces, and includes, in order from the object side to the image side, a cemented lens of a meniscus negative lens having a surface concave on the image side and a meniscus positive lens having a surface concave on the image side, a biconvex lens, and a meniscus positive lens having a surface concave on the image side. The second lens unit U2 corresponds to the sixteenth to twenty-second lens surfaces, and includes a plano-concave lens having a surface concave on the image side, a cemented lens of a meniscus negative lens having a surface concave on the image side and a meniscus positive lens having a surface concave on the image side, and a biconcave lens. The aperture stop corresponds to the twenty-third surface. The third lens unit U3 includes the 31 lens sub unit U31 and the 32 lens sub unit U32. The 31 lens sub unit U31 corresponds to the twenty-fourth and twenty-fifth lens surfaces, and includes a meniscus positive lens having a surface concave on the image side. The 32 lens sub unit U32 corresponds to the twenty-sixth to thirtieth lens surfaces, and includes a biconvex lens and a cemented lens of a meniscus negative lens having a surface concave on the image side and a biconvex lens. The fourth lens unit U4 (rear lens unit) corresponds to the thirty-first to thirty-fifth lens surfaces, and includes a meniscus negative lens having a surface concave on the image side and a cemented lens of a biconvex lens and a meniscus negative lens having a surface convex on the image side.

During zooming from the wide angle end to the telephoto end, when the second lens unit U2 moves linearly toward the image side, the 31 lens sub unit U31 moves along a substantially S-shaped locus first toward the object side, then toward the image side, and finally toward the object side.

The aperture stop is changed in aperture diameter during zooming, and has the largest aperture diameter at the telephoto end. Moreover, the aperture stop is configured not to move in the optical axis direction during zooming.

During focusing from an infinite end to the telephoto end, when the 12 lens sub unit U12 moves linearly toward the image side, the 13 lens sub unit U13 moves linearly toward the object side.

Figure 17:
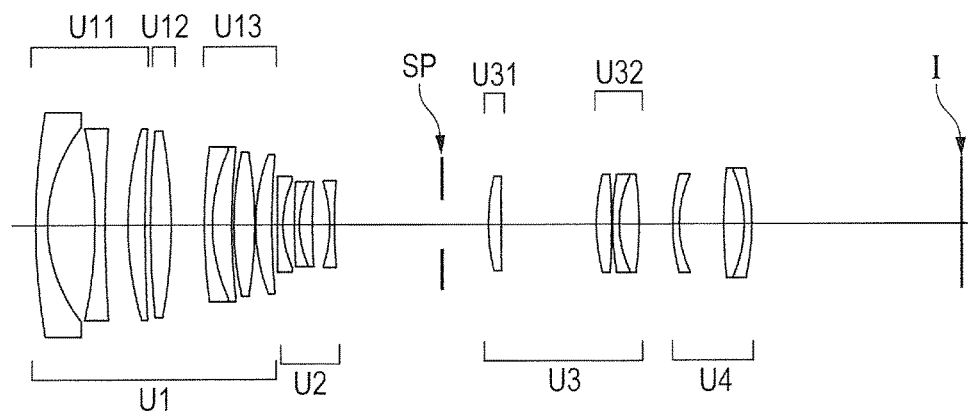
FIG. 17 is a lens cross-sectional view of a zoom lens according to Embodiment 5 (Numerical Embodiment 5) of the present invention at a wide angle end in a state in which focus is at infinity.
Figure 18:
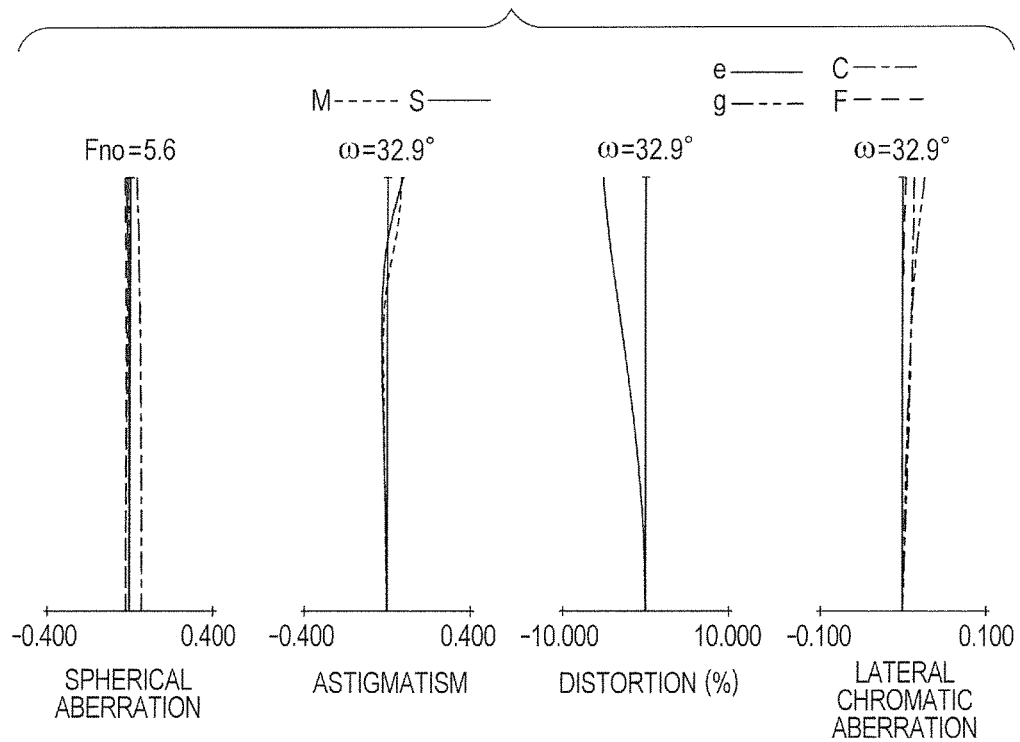
FIG. 18 is an aberration diagram in a state in which focus is at infinity at the wide angle end according to Numerical Embodiment 5.
Figure 19:
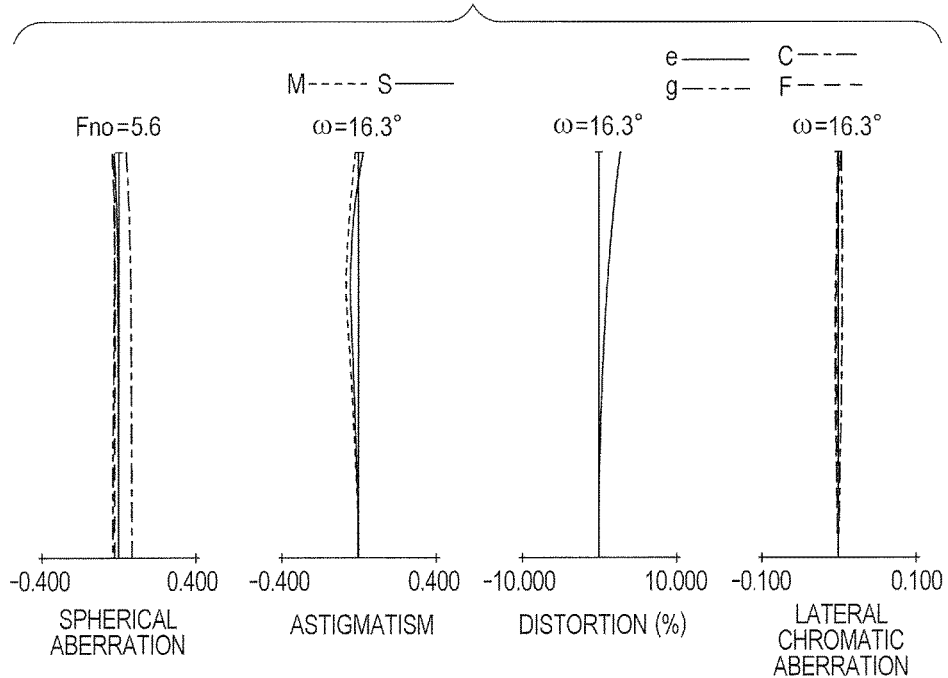
FIG. 19 is an aberration diagram in a state in which focus is at infinity at an intermediate focal length according to Numerical Embodiment 5.
Figure 20:
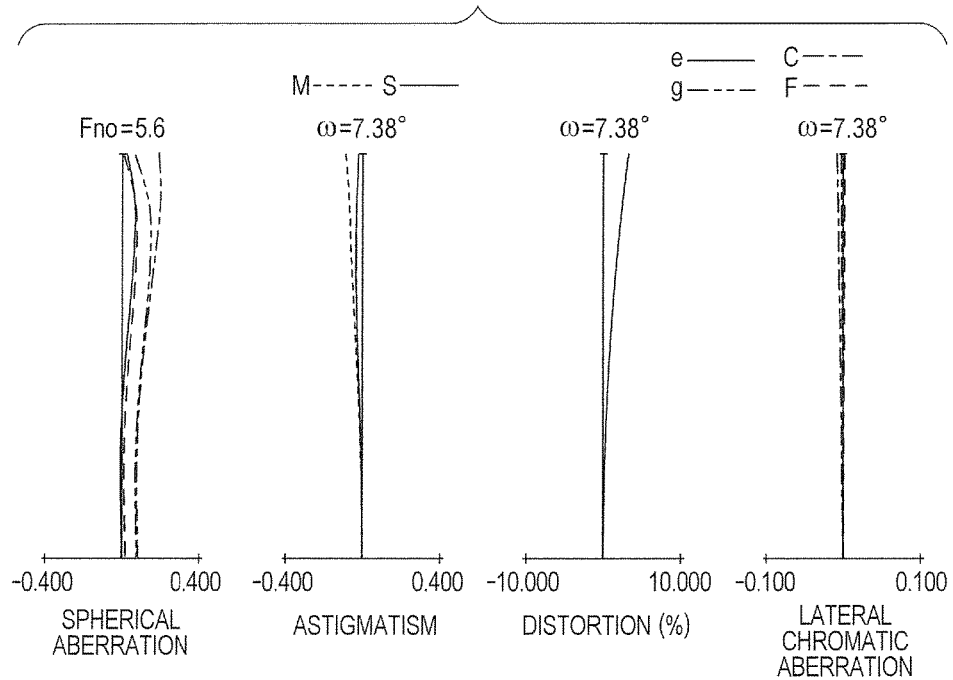
FIG. 20 is an aberration diagram in a state in which focus is at infinity at a telephoto end according to Numerical Embodiment 5.

FIG. 17 is a lens cross-sectional view of the zoom lens according to Embodiment 5 (Numerical Embodiment 5) of the present invention at the wide angle end (focal length f=24.00 mm) in a state in which focus is at the object at infinity. FIG. 18, FIG. 19, and FIG. 20 are aberration diagrams of Numerical Embodiment 5 at the wide angle end (focal length f=24.00 mm), the intermediate zoom position (focal length f=53.14 mm), and the telephoto end (focal length f=120.00 mm), respectively, in a state in which focus is at the object at infinity.

As shown in Table 1, Numerical Embodiment 5 satisfies all of the conditional expressions (1) to (14) so as to have a high zoom ratio of 5.00× and achieve a wide angle of view with a photographing angle of view (angle of view) of 65.88 degrees at the wide angle end. In addition, high optical performance is obtained with various aberrations being satisfactorily corrected over the entire zoom range.

Embodiment 6

A zoom lens according to Embodiment 6 of the present invention includes, in order from the object side to the image side, a first lens unit U1 having a positive refractive power, which is configured not to move for zooming, a second lens unit U2 having a negative refractive power, which is configured to move during zooming, an aperture stop SP, a third lens unit U3 having a positive refractive power, which is configured to move during zooming, and a rear lens unit U4 having a positive refractive power, which is arranged closest to the image side and configured not to move for zooming. The two lens units of the second lens unit U2 and the third lens unit U3 form a zoom system (magnification-varying lens unit). The fourth lens unit U4 is a relay lens unit having an imaging action, which is configured not to move for zooming.

The first lens unit U1 includes, in order from the object side to the image side, an 11 lens sub unit U11 having a negative refractive power, which is configured not to move for focusing, a 12 lens sub unit U12 having a positive refractive power, which is configured to move toward the image side during focusing from the object at infinity to the object at the short distance, and a 13 lens sub unit U13 having a positive refractive power, which is configured not to move for focusing.

The second lens unit U2 is constituted only by one or more lens units having negative refractive powers.

The third lens unit U3 includes two lens units having a positive refractive power, and has a positive refractive power as a whole.

The aperture stop SP is capable of maintaining the F-number by changing the aperture diameter based on zooming, and is configured not to move in the optical axis direction during zooming.

The zoom lens according to Embodiment 6 includes the following components in order from the object side to the image side. The first lens unit U1 corresponds to the first to seventeenth lens surfaces, the 11 lens sub unit U11 corresponds to the first to eighth surfaces, the 12 lens sub unit U12 corresponds to the ninth and tenth surfaces, and the 13 lens sub unit U13 corresponds to the eleventh to seventeenth surfaces. The 11 lens sub unit U11 includes a meniscus negative lens having a surface concave on the image side, a meniscus negative lens having a surface concave on the image side, a biconcave lens, and a biconvex lens. The 12 lens sub unit includes a biconvex lens. The 13 lens sub unit includes a cemented lens of a meniscus negative lens having a surface concave on the image side and a meniscus positive lens having a surface concave on the image side, and two biconvex lenses. The second lens unit U2 corresponds to the eighteenth to twenty-fourth lens surfaces, and includes two biconcave lens and a cemented lens of a biconvex lens and a biconcave lens. The aperture stop corresponds to the twenty-fifth surface. The third lens unit U3 includes a 31 lens sub unit U31 and a 32 lens sub unit U32. The 31 lens sub unit U31 corresponds to the twenty-sixth to thirtieth lens surfaces, and the 32 lens sub unit U32 corresponds to the thirty-first to thirty-fourth lens surfaces. The 31 lens sub unit includes a biconvex lens and a cemented lens of a biconvex lens and a biconcave lens. The 32 lens sub unit includes a meniscus negative lens having a surface concave on the image side and a biconvex lens. The fourth lens unit U4 (rear lens unit) corresponds to a thirty-fifth lens surface to a forty-fourth lens surface, and includes a biconvex lens, a biconcave lens, a cemented lens of a biconvex lens and a meniscus negative lens having a surface convex on the image side, and a cemented lens of a meniscus positive lens having a surface convex on the image side and a meniscus negative lens having a surface convex on the image side.

During zooming from the wide angle end to the telephoto end, when the second lens unit U2 moves linearly toward the image side, the 31 lens sub unit U31 moves first toward the image side, and finally toward the object side.

The aperture stop is changed in aperture diameter during zooming, and has the largest aperture diameter at the telephoto end. Moreover, the aperture stop is configured not to move in the optical axis direction during zooming.

Figure 21:
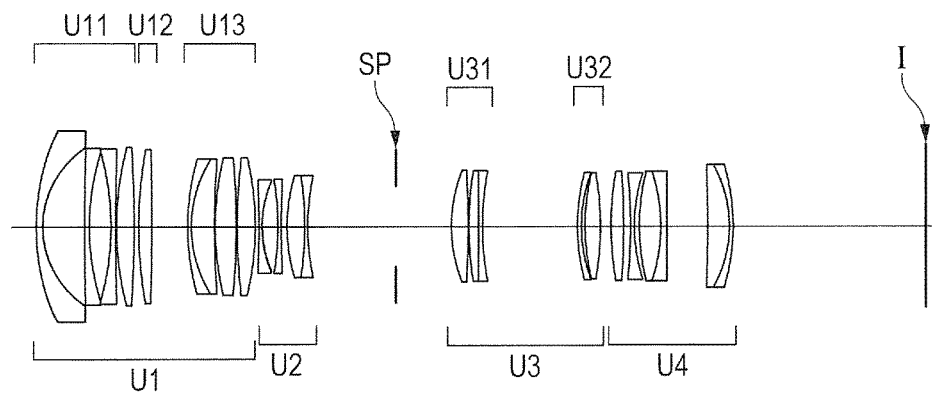
FIG. 21 is a lens cross-sectional view of a zoom lens according to Embodiment 6 (Numerical Embodiment 6) of the present invention at a wide angle end in a state in which focus is at infinity.
Figure 22:
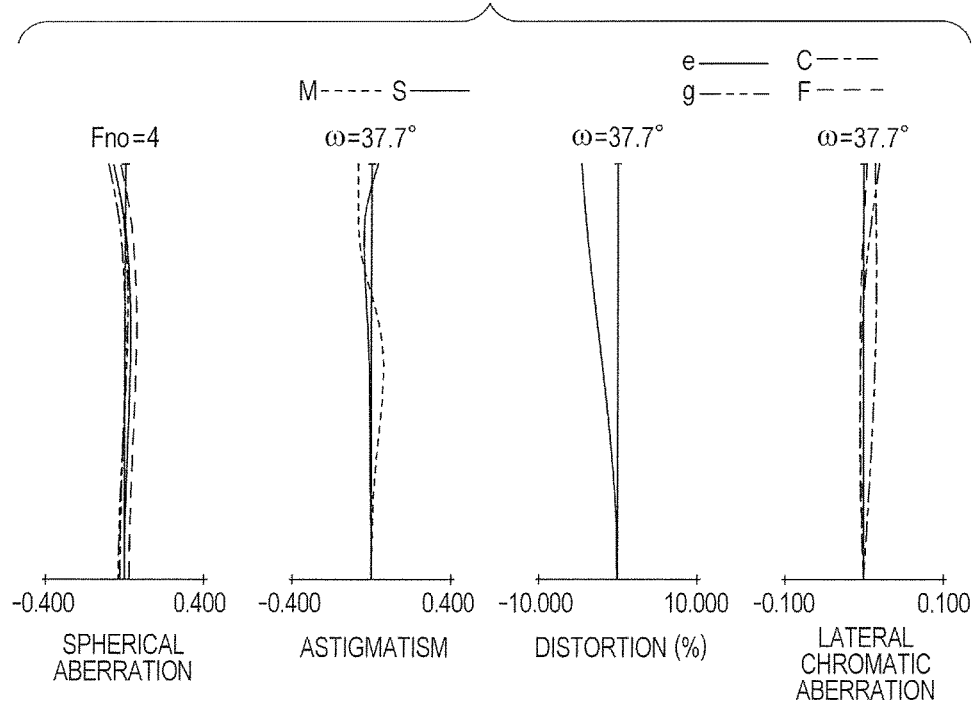
FIG. 22 is an aberration diagram in a state in which focus is at infinity at the wide angle end according to Numerical Embodiment 6.
Figure 23:
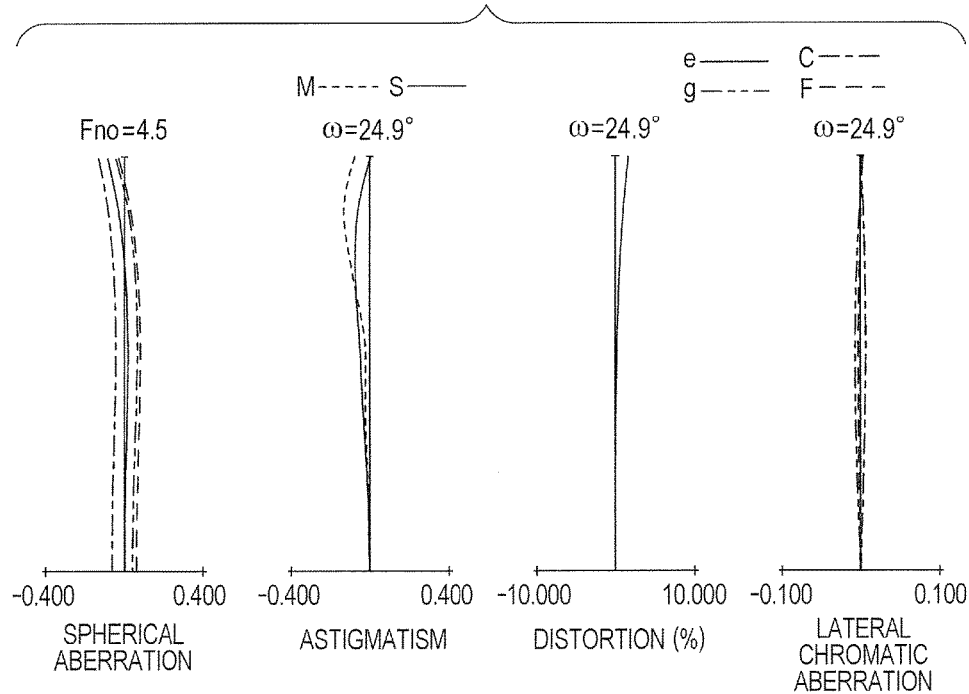
FIG. 23 is an aberration diagram in a state in which focus is at infinity at an intermediate focal length according to Numerical Embodiment 6.
Figure 24:
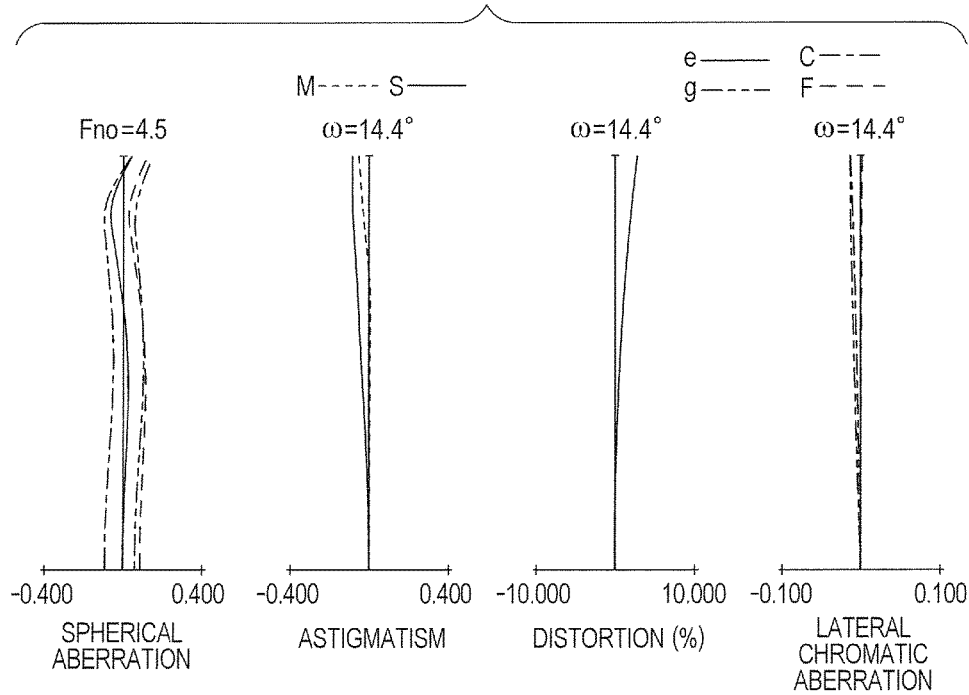
FIG. 24 is an aberration diagram in a state in which focus is at infinity at a telephoto end according to Numerical Embodiment 6.

FIG. 21 is a lens cross-sectional view of the zoom lens according to Embodiment 6 (Numerical Embodiment 6) of the present invention at the wide angle end (focal length f=28 mm) in a state in which focus is at the object at infinity. FIG. 22, FIG. 23, and FIG. 24 are aberration diagrams of Numerical Embodiment 6 at the wide angle end (focal length f=28.00 mm), the intermediate zoom position (focal length f=46.66 mm), and the telephoto end (focal length f=84.00 mm), respectively, in a state in which focus is at the object at infinity.

As shown in Table 1 to be described later, Numerical Embodiment 6 satisfies all of the conditional expressions (1) to (13) so as to have a high zoom ratio of 3.00× and achieve a wide angle of view with a photographing angle of view (angle of view) of 75.38 degrees at the wide angle end. In addition, high optical performance is obtained with various aberrations being satisfactorily corrected over the entire zoom range.

Embodiment 7

A zoom lens according to Embodiment 7 of the present invention includes, in order from the object side to the image side, a first lens unit U1 having a positive refractive power, which is configured not to move for zooming, a second lens unit U2 having a negative refractive power, which is configured to move during zooming, an aperture stop SP, a third lens unit U3 having a positive refractive power, which is configured to move during zooming, and a rear lens unit U4 having a positive refractive power, which is arranged closest to the image side and configured not to move for zooming. The two lens units of the second lens unit U2 and the third lens unit U3 form a zoom system (magnification-varying lens unit). The fourth lens unit U4 is a relay lens unit having an imaging action, which is configured not to move for zooming.

The first lens unit U1 includes, in order from the object side to the image side, an 11 lens sub unit U11 having a negative refractive power, which is configured not to move for focusing, a 12 lens sub unit U12 having a positive refractive power, which is configured to move toward the image side during focusing from the object at infinity to the object at the short distance, and a 13 lens sub unit U13 having a positive refractive power, which is configured not to move for focusing.

The second lens unit U2 is constituted only by one or more lens units having negative refractive powers.

The third lens unit U3 includes two lens units U31 and U32 having a positive refractive power, and has a positive refractive power as a whole.

The aperture stop SP is capable of maintaining the F-number by changing the aperture diameter based on zooming, and is configured to move in the optical axis direction for zooming.

The zoom lens according to Embodiment 7 includes the following components in order from the object side to the image side. The first lens unit U1 corresponds to the first to fifteenth lens surfaces, and includes the 11 lens sub unit U11 having the first to sixth surfaces, the 12 lens sub unit having the seventh to eleventh surfaces, and the 13 lens sub unit having the twelfth to fifteenth surfaces. The 11 lens sub unit U11 includes a meniscus negative lens having a surface concave on the image side, a biconcave lens, and a meniscus positive lens having a surface concave on the image side. The 12 lens sub unit U12 includes a biconvex lens and a cemented lens of a meniscus negative lens having a surface concave on the image side and a meniscus positive lens having a surface concave on the image side. The 13 lens sub unit U13 includes a biconvex lens and a meniscus positive lens having a surface concave on the image side. The second lens unit U2 corresponds to the sixteenth to twenty-second lens surfaces, and includes a meniscus negative lens having a surface concave on the image side, a cemented lens of a biconcave lens and a biconvex lens, and a meniscus negative lens convex on the image side. The aperture stop SP corresponds to the twenty-third surface. The third lens unit U3 includes a 31 lens sub unit U31 and a 32 lens sub unit U32. The 31 lens sub unit U31 corresponds to the twenty-fourth and twenty-fifth lens surfaces, and includes a meniscus positive lens having a surface concave on the image side. The 32 lens sub unit U32 corresponds to the twenty-sixth to thirtieth lens surfaces, and includes a biconvex lens and a cemented lens of a meniscus negative lens having a surface concave on the image side and a biconvex lens. The fourth lens unit U4 (rear lens unit) corresponds to the thirty-first to thirty-eighth lens surfaces, and includes a cemented lens of a meniscus positive lens having a surface concave on the image side and a meniscus negative lens having a surface concave on the image side, a biconvex lens, and a cemented lens of a biconvex lens and a meniscus negative lens having a surface convex on the image side.

The aperture stop is changed in aperture diameter during zooming, and has the largest aperture diameter at the telephoto end. Moreover, the aperture stop is configured to move in the optical axis direction during zooming. During zooming from the wide angle end to the telephoto end, when the second lens unit U2 moves linearly toward the image side, the 31 lens sub unit U31 moves along a substantially S-shaped locus first toward the object side, then toward the image side, and finally toward the object side. The aperture stop SP is configured to move along a substantially reverse S-shaped locus first toward the image side, then toward the object side, and finally toward the image side.

Figure 25:
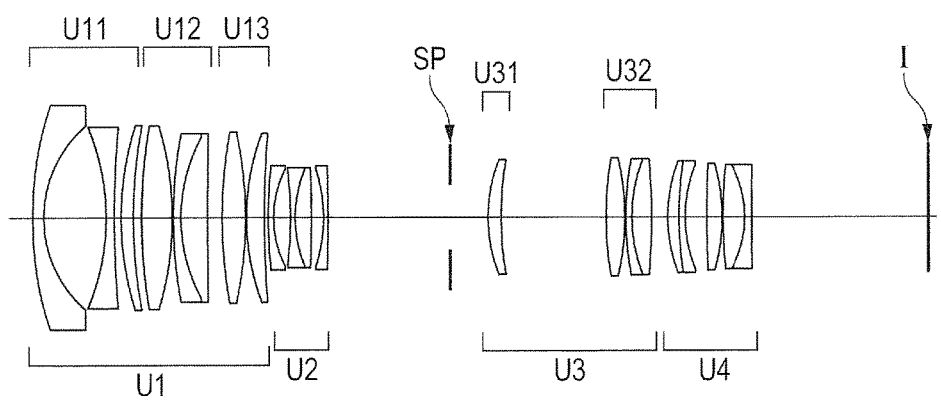
FIG. 25 is a lens cross-sectional view of a zoom lens according to Embodiment 7 (Numerical Embodiment 7) of the present invention at a wide angle end in a state in which focus is at infinity.
Figure 26:
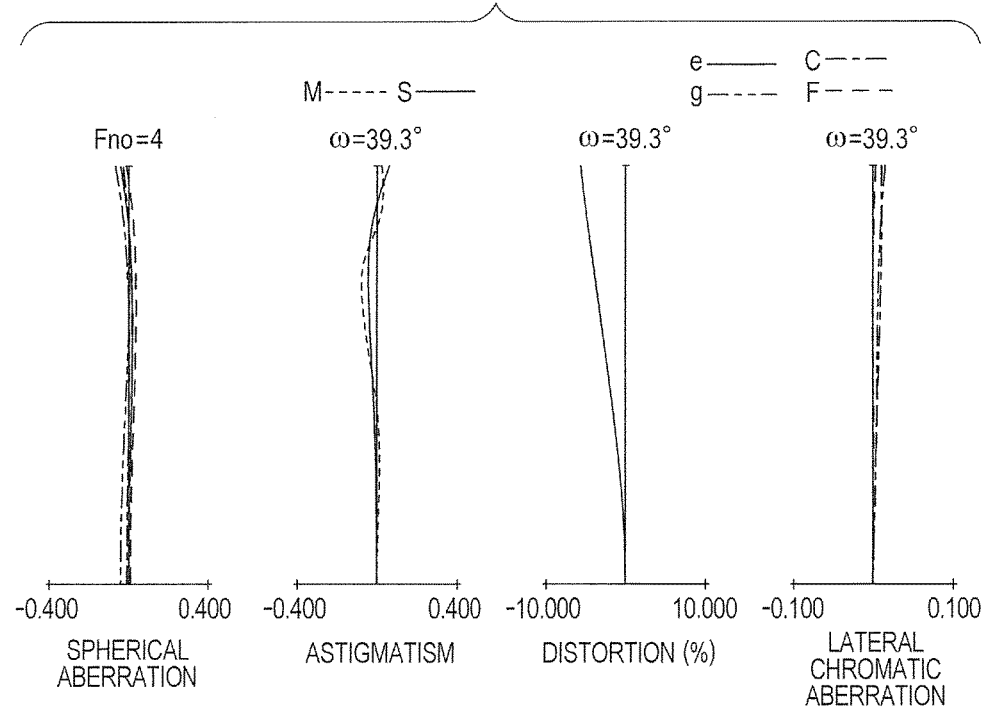
FIG. 26 is an aberration diagram in a state in which focus is at infinity at the wide angle end according to Numerical Embodiment 7.

FIG. 25 is a lens cross-sectional view of the zoom lens according to Embodiment 7 (Numerical Embodiment 7) of the present invention at the wide angle end (focal length f=19 mm) in a state in which focus is at the object at infinity. FIG. 26, FIG. 27, and FIG. 28 are aberration diagrams of Numerical Embodiment 7 at the wide angle end (focal length f=19.00 mm), the intermediate zoom position (focal length f=39.17 mm), and the telephoto end (focal length f=90.00 mm), respectively, in a state in which focus is at the object at infinity.

As shown in Table 1 to be described later, Numerical Embodiment 7 satisfies all of the conditional expressions (1) to (13) so as to have a high zoom ratio of 4.74× and achieve a wide angle of view with a photographing angle of view (angle of view) of 78.60 degrees at the wide angle end. In addition, high optical performance is obtained with various aberrations being satisfactorily corrected over the entire zoom range.

As described above, refractive power arrangement of each lens unit and movement loci of moving lens units for zooming are defined appropriately. As a result, such a zoom lens is obtained as to satisfactorily correct various aberrations while achieving both the high zoom ratio and the wide angle of view.

Embodiment 8

Figure 29:
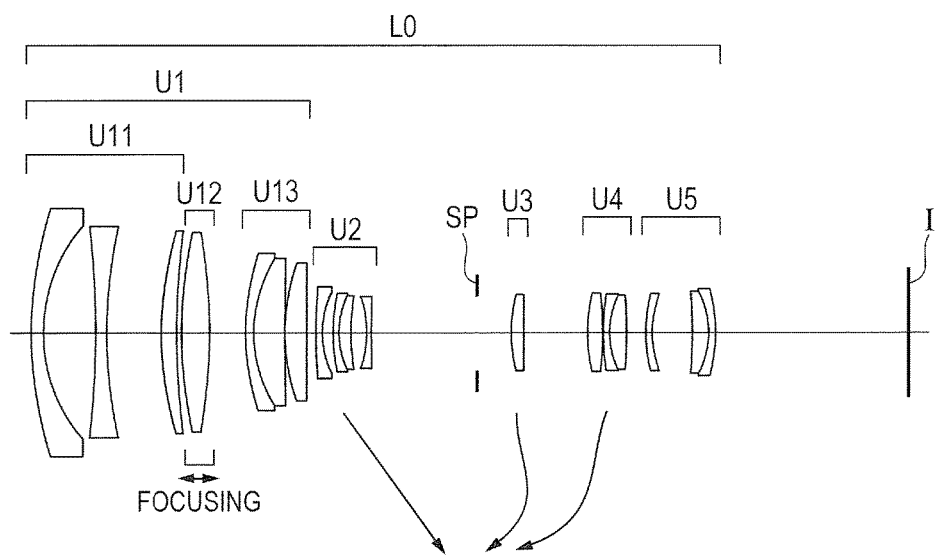
FIG. 29 is a lens cross-sectional view of a zoom lens according to Embodiment 8 (Numerical Embodiment 8) of the present invention at a wide angle end in a state in which focus is at infinity.

A lens configuration of a zoom lens according to Embodiment 8 of the present invention is described specifically with reference to FIG. 29. A first lens unit U1 has a positive refractive power, and is configured not to move for zooming. A second lens unit U2 has a negative refractive power, and is configured to move monotonously toward an image plane side on the optical axis during zooming from the wide angle end to the telephoto end. A third lens unit U3 has a positive refractive power, and is configured to move from the object side to the image side on the optical axis from the wide angle end to the intermediate zoom position and to move from the image side to the object side on the optical axis from the intermediate zoom position to the telephoto end.

A fourth lens unit U4 has a positive refractive power, and is configured to move from the image side to the object side on the optical axis during zooming from the wide angle end to the telephoto end. A fifth lens unit U5 has a negative refractive power, and is configured not to move for zooming.

The lenses that form each of the zoom lens units have the following configuration in order from the object side to the image side. The first lens unit U1 corresponds to the first to thirteenth surfaces. An 11 lens sub unit U11 corresponds to the first to sixth surfaces, and includes a meniscus negative lens having a surface concave on the image side, a biconcave lens, and a meniscus positive lens having a surface concave on the image side. A 12 lens sub unit U12 corresponds to the seventh and eighth surfaces, and includes one biconvex lens. A 13 lens sub unit U13 corresponds to the ninth to thirteenth surfaces, and includes a cemented lens of a meniscus negative lens having a surface concave on the image side and a meniscus positive lens having a surface concave on the image side and a biconvex lens.

The second lens unit U2 corresponds to the fourteenth to twentieth surfaces, and includes a meniscus negative lens having a surface concave on the image side, a cemented lens of a meniscus negative lens having a surface concave on the image side and a meniscus positive lens having a surface concave on the image side, and a biconcave lens. The twenty-first surface corresponds to the aperture stop. The third lens unit U3 corresponds to the twenty-second and twenty-third surfaces, and includes a meniscus positive lens having a surface concave on the image side. The fourth lens unit U4 corresponds to the twenty-fourth to twenty-eighth surfaces, and includes a biconvex lens and a cemented lens of a meniscus concave lens having a surface concave on the image side and a biconvex lens. The fifth lens unit U5 corresponds to the twenty-ninth to thirty-third surfaces, and includes a meniscus negative lens having a surface concave on the image side and a cemented lens of a meniscus positive lens having a surface convex on the image side and a meniscus negative lens having a surface convex on the image side. The fourteenth and twenty-third surfaces each have an aspherical shape, and mainly serve to correct the variations of the distortion and the astigmatism during zooming.

Figure 30:
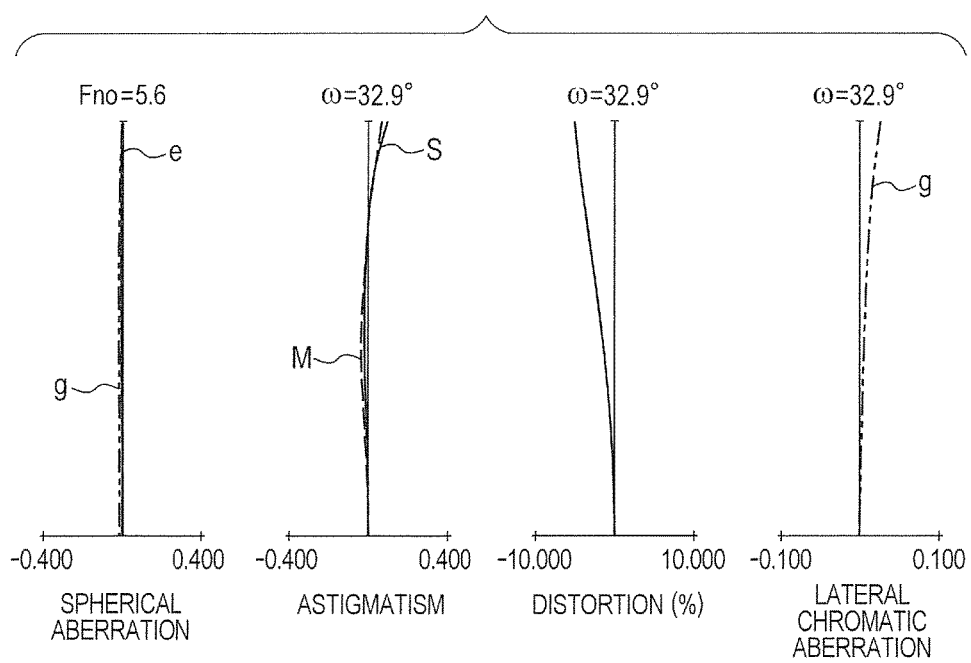
FIG. 30 is an aberration diagram in a state in which focus is at infinity at the wide angle end according to Numerical Embodiment 8.
Figure 31:
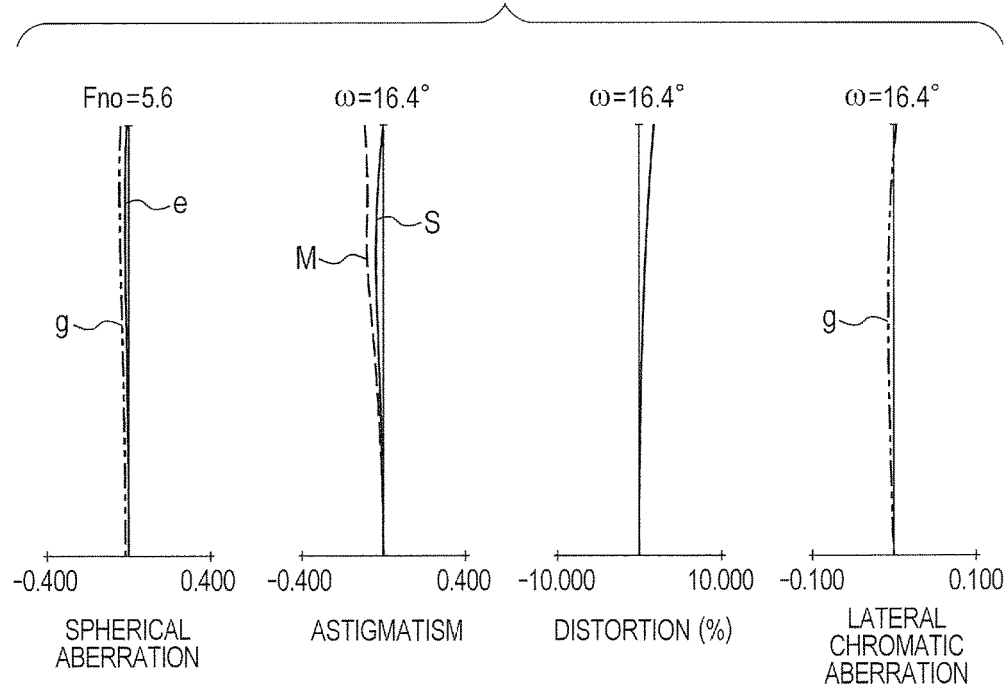
FIG. 31 is an aberration diagram in a state in which focus is at infinity at an intermediate focal length according to Numerical Embodiment 8.
Figure 32:
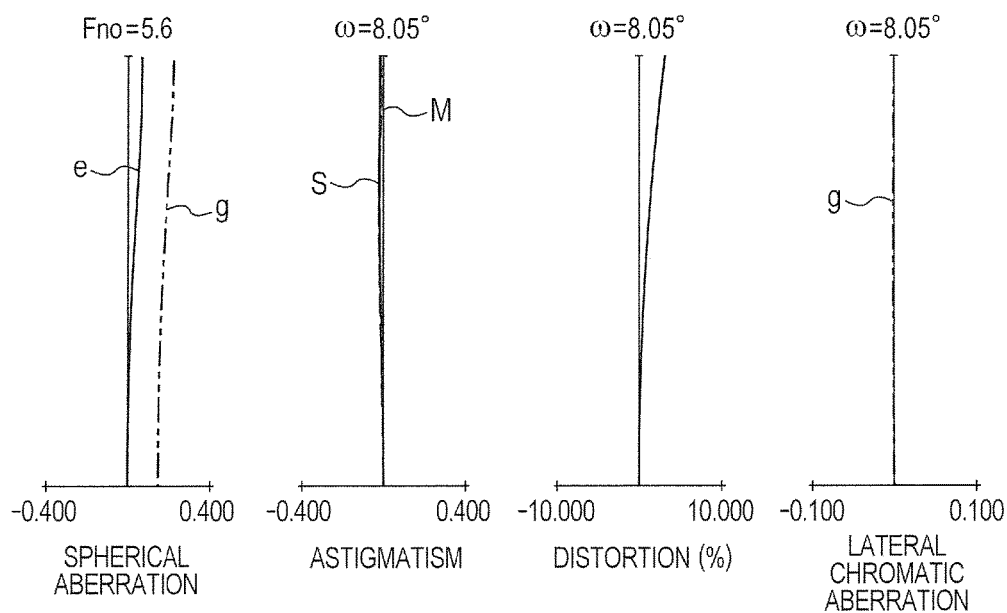
FIG. 32 is an aberration diagram in a state in which focus is at infinity at a telephoto end according to Numerical Embodiment 8.

FIG. 29 is a lens cross-sectional view of the zoom lens according to Embodiment 8 of the present invention at the wide angle end (focal length f=24.00 mm) in a state in which focus is at the object at infinity. FIG. 30, FIG. 31, and FIG. 32 are aberration diagrams of Embodiment 8 at the wide angle end (focal length f=24.00 mm), the intermediate zoom position (focal length f=53.00 mm), and the telephoto end (focal length f=110.00 mm), respectively, in a state in which focus is at the object at infinity. The zoom lens according to Embodiment 8 has a zoom ratio of 4.58, an F-number of 5.60, and an image pickup angle of view of 65.88 degrees at the wide angle end.

As described above, according to each of Embodiments, refractive power arrangement of each lens unit and movement loci of moving lens units for zooming are defined appropriately. As a result, such a zoom lens is obtained as to achieve high operability and the reductions in size and weight while achieving a high zoom ratio and satisfactory optical performance.

As shown in Table 1 along with the arithmetic operation results of the numerical value conditions for this Embodiment, the conditional expressions (1) to (15) are satisfied.

Embodiment 9

A zoom lens according to Embodiment 9 of the present invention includes, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power. The lens unit having a negative refractive power is arranged closest to the object side, to thereby suppress the increase in front lens diameter even when a wide angle is achieved. The lens units having a negative refractive power and the lens units having a positive refractive power are arranged alternately in the first to sixth lens units, to thereby allow efficient magnification varying by changing each interval between the lens units.

The zoom lens is configured to change the interval between adjacent lens units among the first, second, third, fourth, fifth, and sixth lens units during zooming, but the heavy first lens unit is fixed to prevent the increase in driving force required for zooming. The second lens unit is configured to move in order to conduct zooming by changing the interval between the second lens unit and the first lens unit configured not to move for zooming. The third lens unit positioned on the image side of the second lens unit configured to move may be fixed or may be configured to move. The fourth lens unit is configured to move in order to efficiently conduct zooming even when the third lens unit is fixed. The fifth lens unit is also configured to move in order to correct the spherical aberration and the field curvature during zooming by changing the interval between the fourth lens unit and the fifth lens unit. The lens units arranged on the image side of the fifth lens unit configured to move contribute to the magnification varying to a small extent, and therefore may include a fixed lens unit or may be all configured to move.

More specifically, the zoom lens according to this Embodiment includes the following components in order from the object side to the image side. The first lens unit U1 corresponds to the first to sixth surfaces, and includes a meniscus negative lens concave on the image side, a biconcave negative lens, and a meniscus positive lens convex on the object side. The second lens unit U2 corresponds to the seventh to eleventh surfaces, and includes a cemented lens of a meniscus negative lens concave on the image side and a biconvex lens and a biconvex lens. An auxiliary stop SP2 is included as the twelfth surface. The third lens unit U3 corresponds to the thirteenth to seventeenth surfaces, and includes a biconcave lens and a cemented lens of a biconcave lens and a biconvex lens. An aperture stop is included as the eighteenth surface. The fourth lens unit U4 corresponds to the nineteenth to twenty-third surfaces, and includes a cemented lens of a meniscus negative lens concave on the image side and a biconvex lens and a biconvex lens. The fifth lens unit U5 corresponds to the twenty-fourth to twenty-seventh surfaces, and includes a meniscus positive lens convex on the image side and a meniscus negative lens concave on the image side. The sixth lens unit U6 corresponds to the twenty-eighth to thirty-fifth surfaces, and includes a biconvex lens, a meniscus negative lens convex on the image side, a meniscus negative lens concave on the image side, and a biconvex lens.

Figure 33:
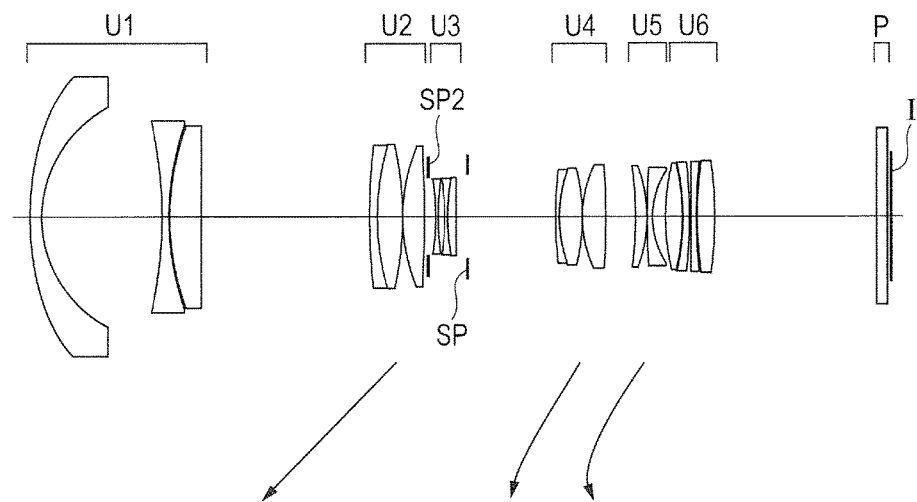
FIG. 33 is a lens cross-sectional view of a zoom lens according to Embodiment 9 (Numerical Embodiment 9) of the present invention at a wide angle end in a state in which focus is at infinity.
Figure 34:
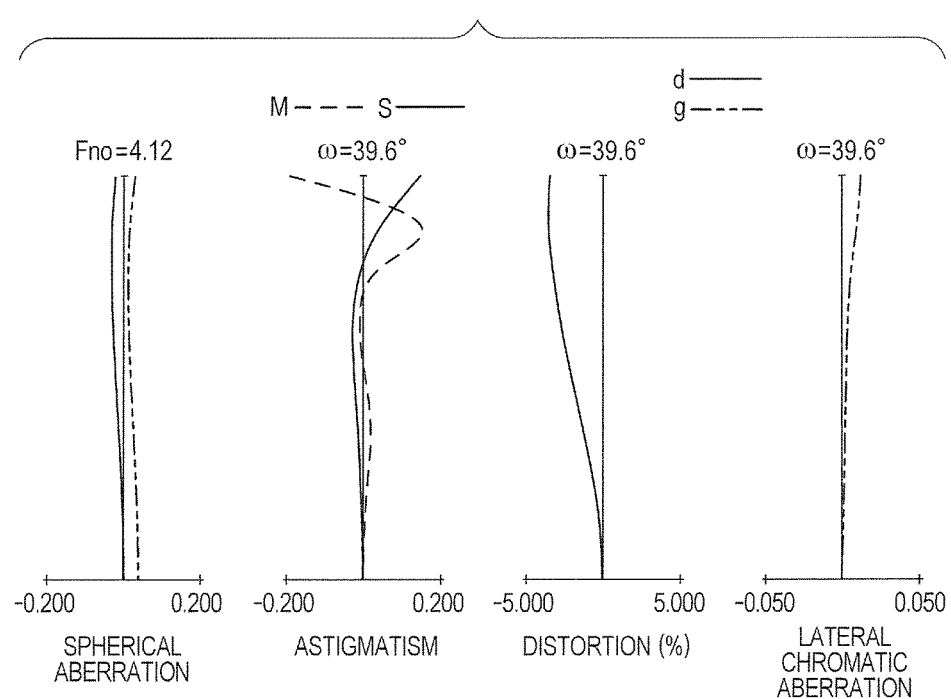
FIG. 34 is an aberration diagram in a state in which focus is at infinity at the wide angle end according to Numerical Embodiment 9.
Figure 35:
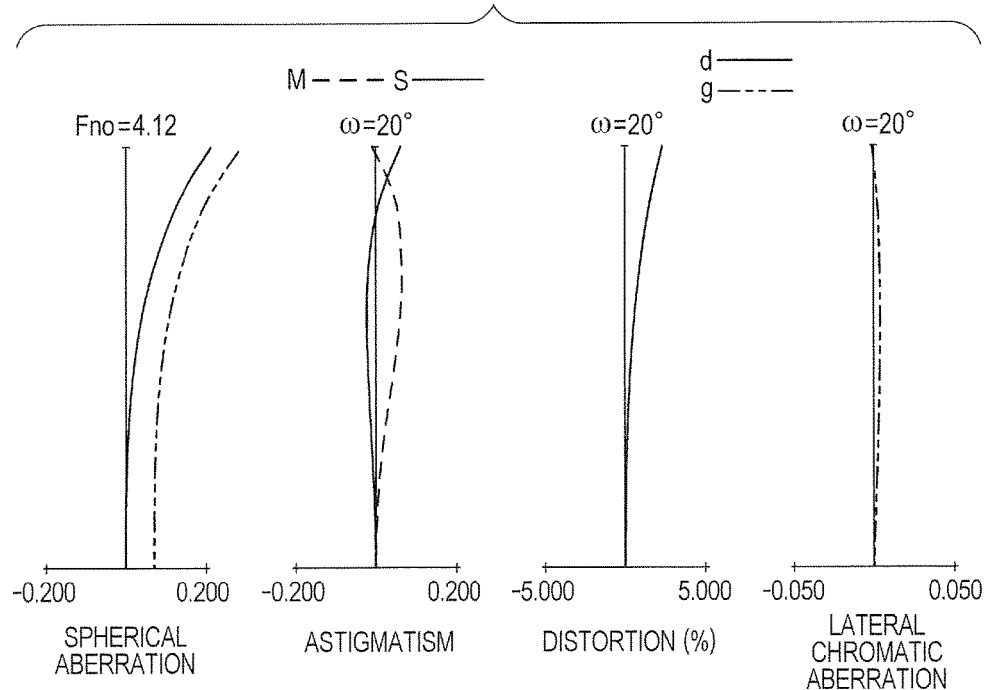
FIG. 35 is an aberration diagram in a state in which focus is at infinity at an intermediate focal length according to Numerical Embodiment 9.
Figure 36:
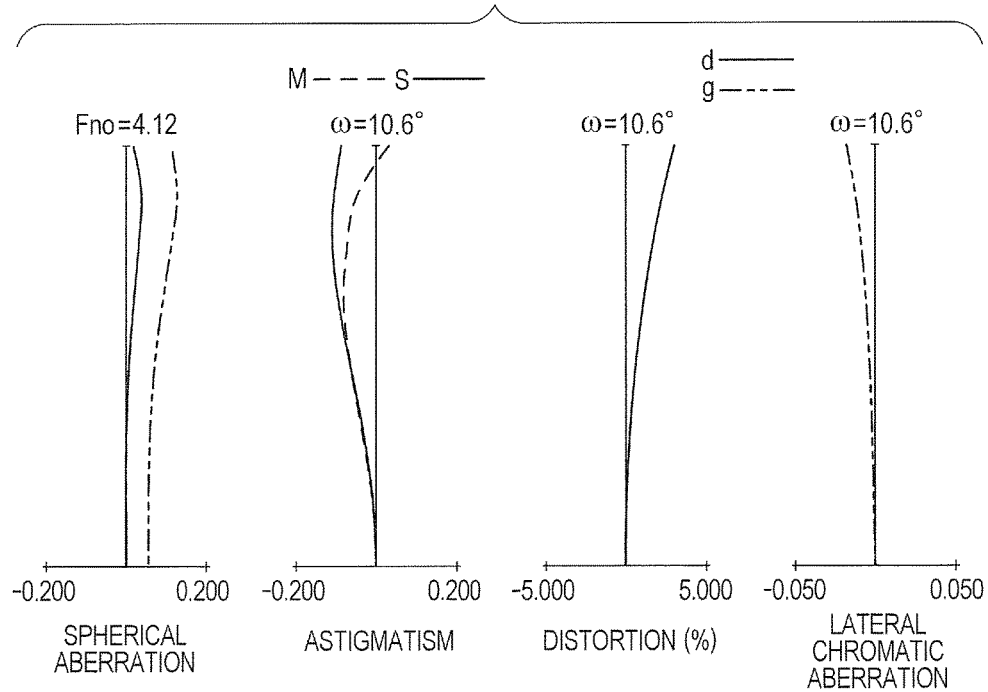
FIG. 36 is an aberration diagram in a state in which focus is at infinity at a telephoto end according to Numerical Embodiment 9.

FIG. 33 is a lens cross-sectional view of the zoom lens according to Embodiment 9 at the wide angle end (focal length f=18.54 mm) in a state in which focus is at the object at infinity. FIG. 34, FIG. 35, and FIG. 36 are aberration diagrams of Embodiment 9 at the wide angle end (focal length f=18.54 mm), the intermediate zoom position (focal length f=39.78 mm), and the telephoto end (focal length f=76.49 mm), respectively, in a state in which focus is at the object at infinity. The zoom lens according to Embodiment 9 has a zoom ratio of 4.13, an F-number of 4.12, and an image pickup angle of view of 77.20 degrees at the wide angle end.

The zoom lens according to this Embodiment includes the auxiliary stop, but the aperture diameter of the aperture stop may be changed based on the zooming position without use of the auxiliary stop. In this embodiment, the respective lens units are configured to move as indicated by the arrows of FIG. 33 during zooming from the wide angle end to the telephoto end. The first lens unit is configured not to move for zooming, and the second, fourth, and fifth lens units are configured to move during zooming. Focusing is conducted with two lenses included in the first lens unit, which are arranged closest to the image side. Further, the adjustment of the back focus can be conducted by moving the rearmost lens unit or a part of the lenses within the rearmost lens unit in the optical axis direction.

As shown in Table 2 along with arithmetic operation results of numerical value conditions for this Embodiment, the conditional expressions (1) to (6) and (21) to (24) are satisfied.

Embodiment 10

Figure 37:
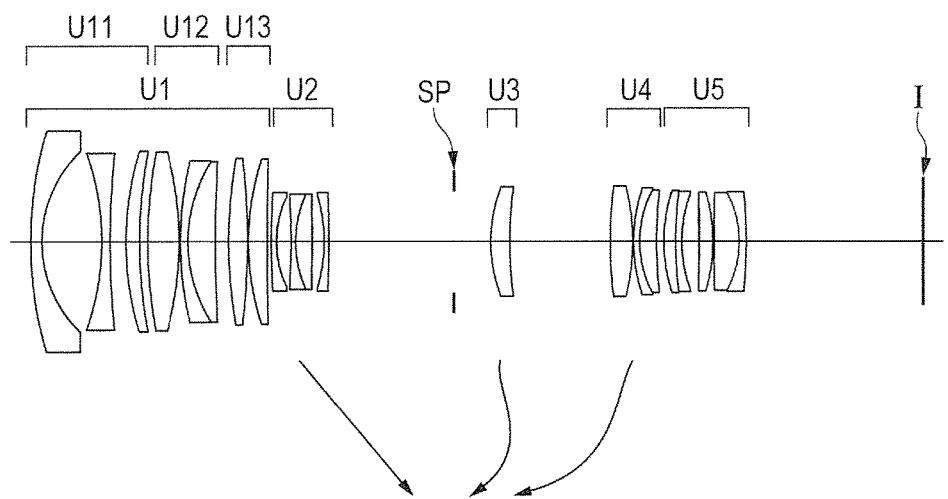
FIG. 37 is a lens cross-sectional view of a zoom lens according to Embodiment 10 (Numerical Embodiment 10) of the present invention at a wide angle end in a state in which focus is at infinity.
Figure 38:
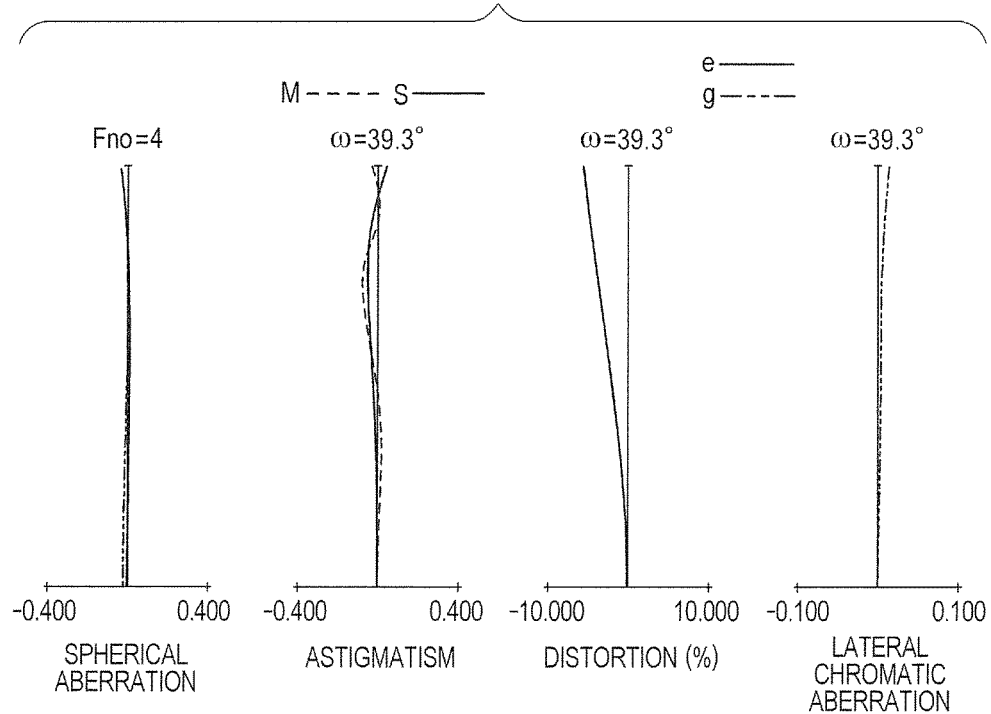
FIG. 38 is an aberration diagram in a state in which focus is at infinity at the wide angle end according to Numerical Embodiment 10.
Figure 39:
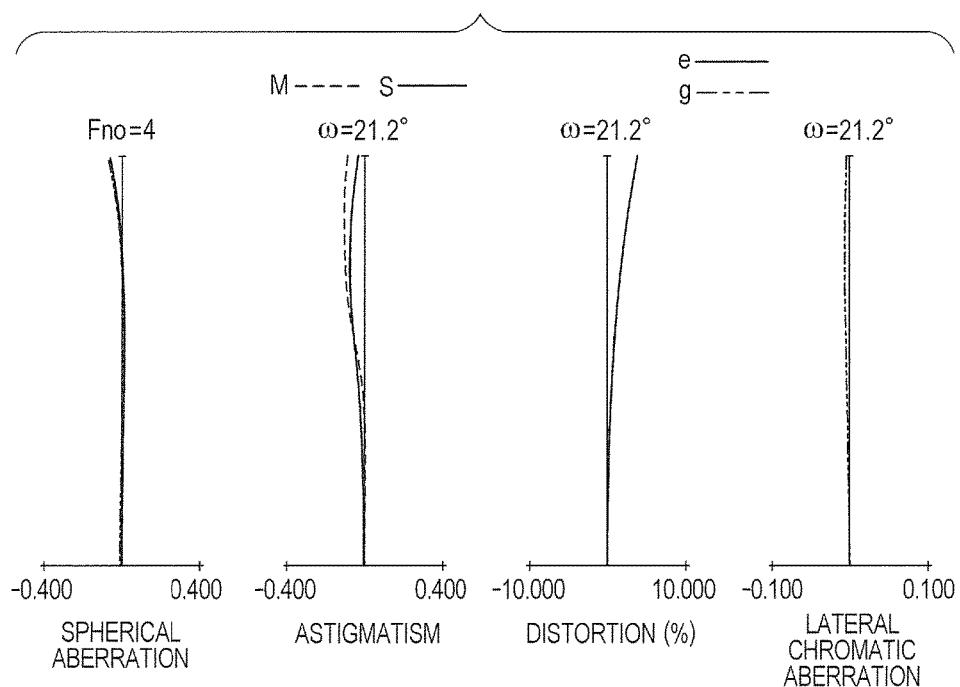
FIG. 39 is an aberration diagram in a state in which focus is at infinity at an intermediate focal length according to Numerical Embodiment 10.
Figure 40:
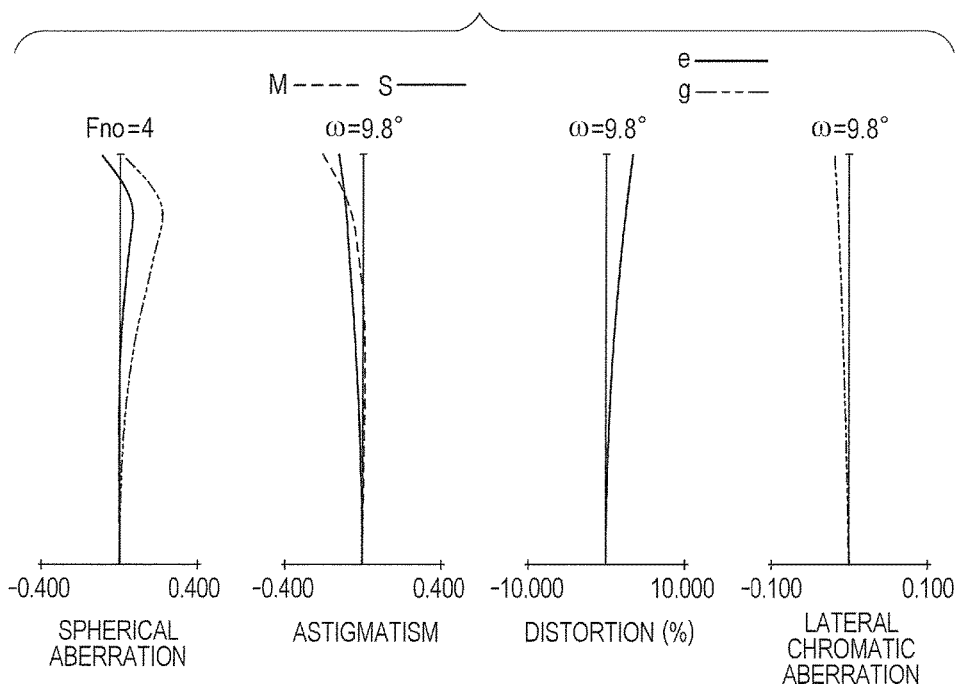
FIG. 40 is an aberration diagram in a state in which focus is at infinity at a telephoto end according to Numerical Embodiment 10.

FIG. 37 is a lens cross-sectional view of a zoom lens according to Embodiment 10 (Numerical Embodiment 10) of the present invention at the wide angle end in a state in which focus is at infinity. FIG. 38, FIG. 39, and FIG. 40 are longitudinal aberration diagrams at the wide angle end (focal length of 19 mm) of Numerical Embodiment 1, at the focal length of 40 mm of Numerical Embodiment 1, and at the telephoto end (focal length of 90 mm) of Numerical Embodiment 1, respectively. Focus is at infinity in all those longitudinal aberration diagrams. Further, a value of the focal length is a value obtained by expressing Numerical Embodiment described later in units of mm. The same is true for all Embodiments below.

In FIG. 37, the zoom lens includes, in order from the object side to the image side, a first lens unit U1 for focusing, which has a positive refractive power. The zoom lens also includes a second lens unit U2 for magnification varying, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an imaging action. In this Embodiment, the rear lens unit corresponds to the fifth lens unit U5.

In this Embodiment, the second lens unit U2, the third lens unit U3, and the fourth lens unit U4 form a magnification varying system. An aperture stop SP is arranged between the second lens unit U2 and the third lens unit U3. The aperture stop is capable of maintaining a predetermined F-number by changing the aperture diameter based on magnification varying. Moreover, the aperture stop is configured not to move in the optical axis direction during zooming. When the zoom lens is used as an image pickup optical system for a broadcasting television camera, a video camera, or a digital still camera, an image plane I corresponds to an image pickup surface of a solid state image pickup element (photoelectric converter) or the like configured to receive light of an image formed by the zoom lens and to convert light to electricity. When the zoom lens is used as an image pickup optical system for a film camera, the image plane I corresponds to a film surface on which the image formed by the zoom lens is exposed.

In the longitudinal aberration diagrams, spherical aberrations are illustrated with respect to e-line and g-line by the solid line and the two-dot chain line, respectively. Further, astigmatisms are illustrated on a meridional image plane by the dotted line and on a sagittal image plane by the solid line. In addition, lateral chromatic aberrations are illustrated with respect to g-line by the two-dot chain line. A half angle of view is represented by ω, and an F-number is represented by Fno. In each of the longitudinal aberration diagrams, a spherical aberration is illustrated in the unit of 0.4 mm, an astigmatism is illustrated in the unit of 0.4 mm, a distortion is illustrated in the unit of 10%, and a lateral chromatic aberration is illustrated in the unit of 0.1 mm.

The zoom lens according to this Embodiment includes the following components in order from the object side to the image side. The first lens unit U1 corresponds to the first to fifteenth surfaces. The first lens unit U1 includes an 11 lens sub unit U11 having a negative refractive power, which is configured not to move in order to achieve in-focus, a 12 lens sub unit U12 having a positive refractive power, which is configured to move toward the image side in order to achieve in-focus from an infinity side to the proximity side, and a 13 lens sub unit U13 having a positive refractive power. The 13 lens sub unit U13 may be configured to move in conjunction with the 12 lens sub unit U12 in order to achieve in-focus. The 11 lens sub unit U11 includes a meniscus negative lens having a surface concave on the image side, a biconcave lens, and a meniscus positive lens having a surface concave on the image side. The 12 lens sub unit U12 includes a biconvex lens and a cemented lens of a meniscus negative lens having a surface concave on the image side and a meniscus positive lens having a surface concave on the image side. The 13 lens sub unit U13 includes a biconvex lens and a meniscus positive lens having a surface concave on the image side. The second lens unit U2 corresponds to the sixteenth to twenty-second surfaces, and includes a meniscus negative lens having a surface concave on the image side, a cemented lens of a biconcave lens and a biconvex lens, and a meniscus negative lens having a surface convex on the image side. The twenty-third surface corresponds to the aperture stop SP. The third lens unit U3 corresponds to the twenty-fourth and twenty-fifth surfaces, and includes a meniscus positive lens having a surface concave on the image side. The fourth lens unit U4 corresponds to the twenty-sixth to thirtieth surfaces, and includes a biconvex lens and a cemented lens of a meniscus negative lens having a surface concave on the image side and a meniscus positive lens having a surface concave on the image side. The fifth lens unit U5 corresponds to the thirty-first to thirty-eighth surfaces, and includes a cemented lens of a meniscus positive lens having a surface concave on the image side and a meniscus negative lens having a surface concave on the image side, a meniscus positive lens having a surface convex on the image side, and a cemented lens of a biconvex lens and a meniscus negative lens having a surface convex on the image side. The first lens unit U1 includes convex lenses and concave lenses, and includes eight lenses in total. The second lens unit U2 includes a convex lens and concave lenses, and includes four lenses in total. The third lens unit U3 includes one convex lens. The fourth lens unit U4 includes convex lenses and a concave lens, and includes three lenses in total. Moreover, the fifth lens unit U5 includes convex lenses and concave lenses, and includes five lenses in total.

In Table 2, values corresponding to the conditional expressions of this Embodiment are shown. This Embodiment satisfies the expressions (1) to (13), and achieves both a photographing angle of view (angle of view) of 78.6 degrees at the wide angle end and a magnification-varying ratio of 4.74, that is, a wide angle of view and high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 11

Figure 41:
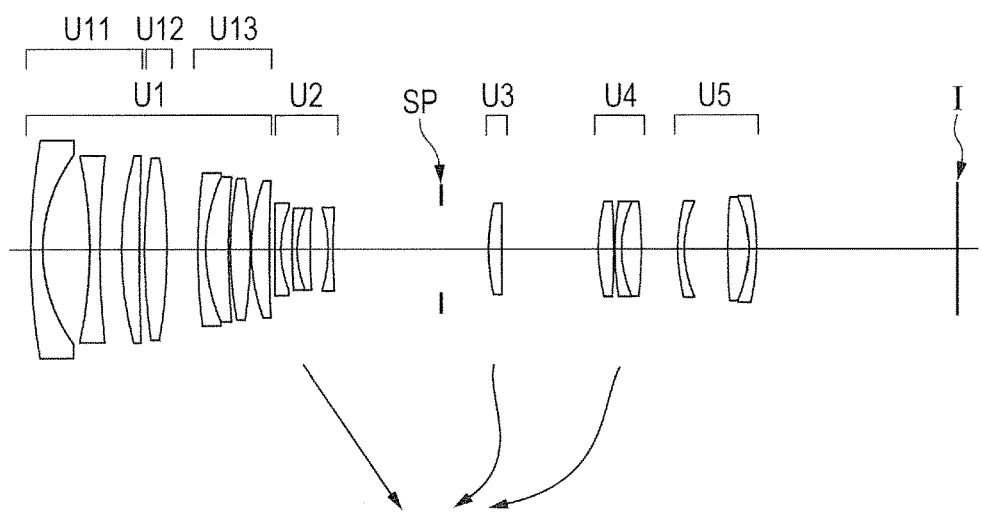
FIG. 41 is a lens cross-sectional view of a zoom lens according to Embodiment 11 (Numerical Embodiment 11) of the present invention at a wide angle end in a state in which focus is at infinity.
Figure 42:
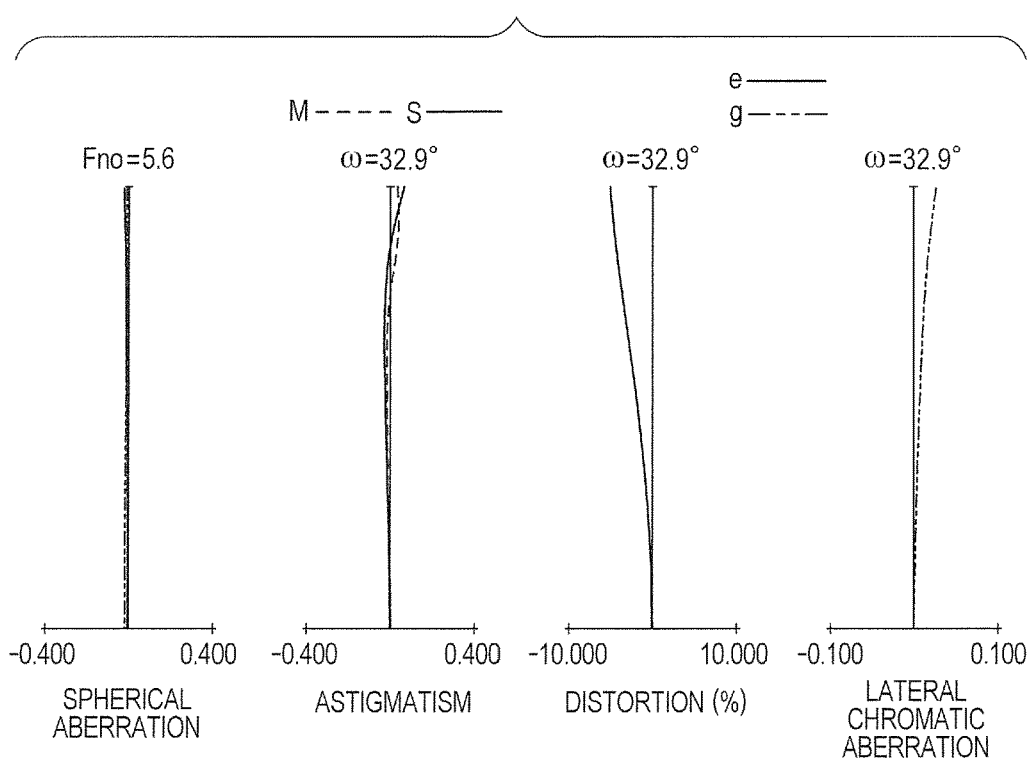
FIG. 42 is an aberration diagram in a state in which focus is at infinity at the wide angle end according to Numerical Embodiment 11.
Figure 43:
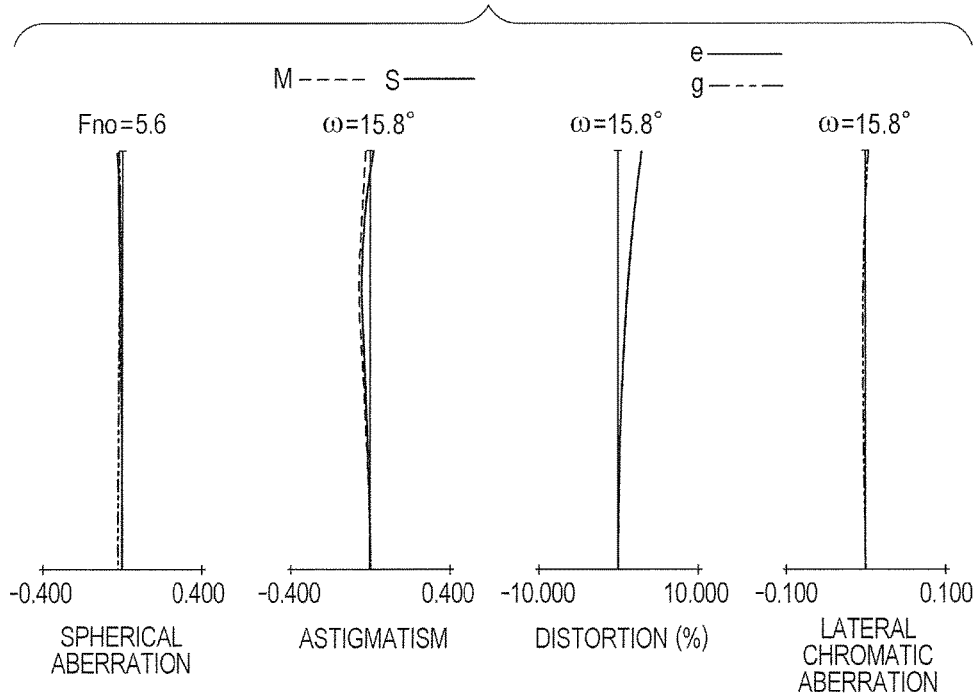
FIG. 43 is an aberration diagram in a state in which focus is at infinity at an intermediate focal length according to Numerical Embodiment 11.
Figure 44:
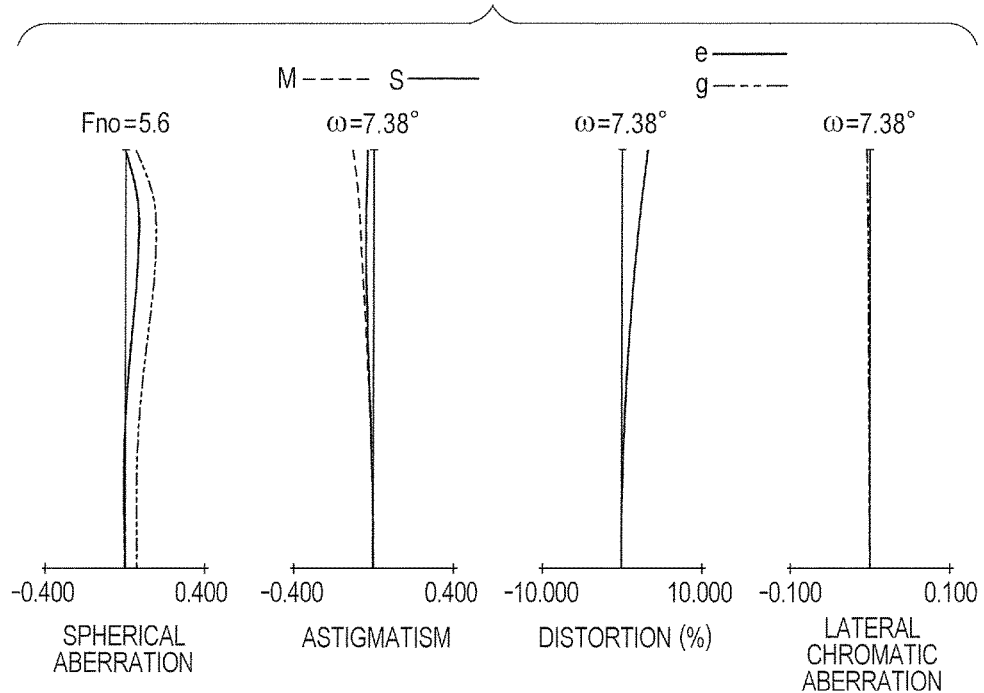
FIG. 44 is an aberration diagram in a state in which focus is at infinity at a telephoto end according to Numerical Embodiment 11.

FIG. 41 is a lens cross-sectional view of a zoom lens according to Embodiment 11 (Numerical Embodiment 11) of the present invention at the wide angle end in a state in which focus is at infinity. FIG. 42, FIG. 43, and FIG. 44 are longitudinal aberration diagrams at the wide angle end (focal length of 24 mm) of Numerical Embodiment 11, at the focal length of 55 mm of Numerical Embodiment 11, and at the telephoto end (focal length of 120 mm) of Numerical Embodiment 11, respectively.

In FIG. 41, the zoom lens includes, in order from the object side to the image side, a first lens unit U1 for focusing, which has a positive refractive power. The zoom lens also includes a second lens unit U2 for magnification varying, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an imaging action. In this Embodiment, the rear lens unit corresponds to the fifth lens unit U5.

In this Embodiment, the second lens unit U2, the third lens unit U3, and the fourth lens unit U4 form a magnification varying system. An aperture stop SP is arranged between the second lens unit U2 and the third lens unit U3. The aperture stop is capable of maintaining a predetermined F-number by changing the aperture diameter based on zooming. Moreover, the aperture stop is configured not to move in the optical axis direction during zooming.

Next, the first lens unit U1 of this Embodiment is described. The first lens unit U1 corresponds to the first to fifteenth surfaces. The first lens unit U1 includes an lens sub unit U11 having a negative refractive power, which is configured not to move for focusing, a 12 lens sub unit U12 having a positive refractive power, which is configured to move toward the image side during focusing from the infinity side to the proximity side, and a 13 lens sub unit U13 having a positive refractive power. The 13 lens sub unit U13 may be configured to move in conjunction with the 12 lens sub unit U12 during focusing. The 11 lens sub unit corresponds to the first to sixth surfaces, and includes a meniscus negative lens having a surface concave on the image side, a biconcave lens, and a meniscus positive lens having a surface concave on the image side. The 12 lens sub unit corresponds to the seventh and eighth surfaces, and includes a biconvex lens. The 13 lens sub unit corresponds to the ninth to fifteenth surfaces, and includes a cemented lens of a meniscus negative lens having a surface concave on the image side and a meniscus positive lens having a surface concave on the image side, a biconvex lens, and a meniscus positive lens having a surface concave on the image side. The second lens unit U2 corresponds to the sixteenth to twenty-second surfaces, and includes a biconcave lens, a cemented lens of a meniscus negative lens having a surface concave on the image side and a meniscus positive lens having a surface concave on the image side, and a biconcave lens. The twenty-third surface corresponds to the aperture stop SP. The third lens unit U3 corresponds to the twenty-fourth and twenty-fifth surfaces, and includes a meniscus positive lens having a surface concave on the image side. The fourth lens unit U4 corresponds to the twenty-sixth to thirtieth surfaces, and includes a biconvex lens and a cemented lens of a meniscus negative lens having a surface concave on the image side and a biconvex lens. The fifth lens unit U5 corresponds to the thirty-first to thirty-fifth surfaces, and includes a meniscus negative lens having a surface concave on the image side and a cemented lens of a biconvex lens and a meniscus concave lens having a surface convex on the image side. The first lens unit U1 includes convex lenses and concave lenses, and includes eight lenses in total. The second lens unit U2 includes a convex lens and concave lenses, and includes four lenses in total. The third lens unit U3 includes one convex lens. The fourth lens unit U4 includes convex lenses and a concave lens, and includes three lenses in total. Moreover, the fifth lens unit U5 includes a convex lens and concave lenses, and includes three lenses in total.

In Table 2, values corresponding to the conditional expressions of this Embodiment are shown. This Embodiment satisfies the expressions (1) to (20), and achieves both a photographing angle of view (angle of view) of 65.88 degrees at the wide angle end and a magnification-varying ratio of 5.00, that is, a wide angle of view and a high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 12

A zoom lens according to Embodiment 12 of the present invention includes, in order from the object side to the image side, a first lens unit U1 having a positive refractive power, which is configured not to move for zooming, a second lens unit U2 having a negative refractive power, which is configured to move during zooming, an aperture stop SP, a third lens unit U3 having a positive refractive power, which is configured to move during zooming, and a rear lens unit U4 having a positive refractive power, which is arranged closest to the image side and configured not to move for zooming. The two lens units of the second lens unit U2 and the third lens unit U3 form a zoom system (magnification-varying lens unit). The fourth lens unit U4 is a relay lens unit having an imaging action, which is configured not to move for zooming.

The first lens unit U1 includes, in order from the object side to the image side, an 11 lens sub unit U11 having a negative refractive power, which is configured not to move for focusing, a 12 lens sub unit U12 having a positive refractive power, which is configured to move during focusing, and a 13 lens sub unit U13 having a positive refractive power. The 13 lens sub unit U13 is configured not to move for focusing.

The second lens unit U2 is constituted only by one or more lens units having negative refractive powers.

The third lens unit U3 includes two lens units U31 and U32 having a positive refractive power, and has a positive refractive power as a whole.

The aperture stop SP is capable of maintaining the F-number by changing the aperture diameter based on zooming, and is configured not to move in the optical axis direction during zooming.

Figure 45:
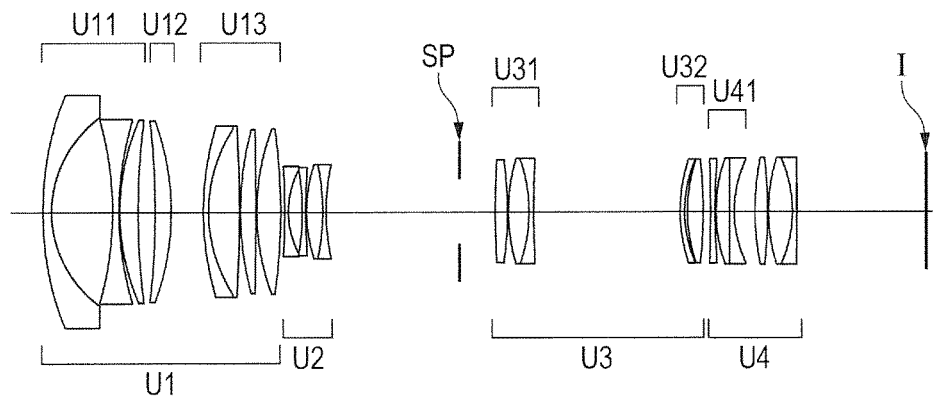
FIG. 45 is a lens cross-sectional view of a zoom lens according to Embodiment 12 (Numerical Embodiment 12) of the present invention at a wide angle end in a state in which focus is at infinity.
Figure 46:
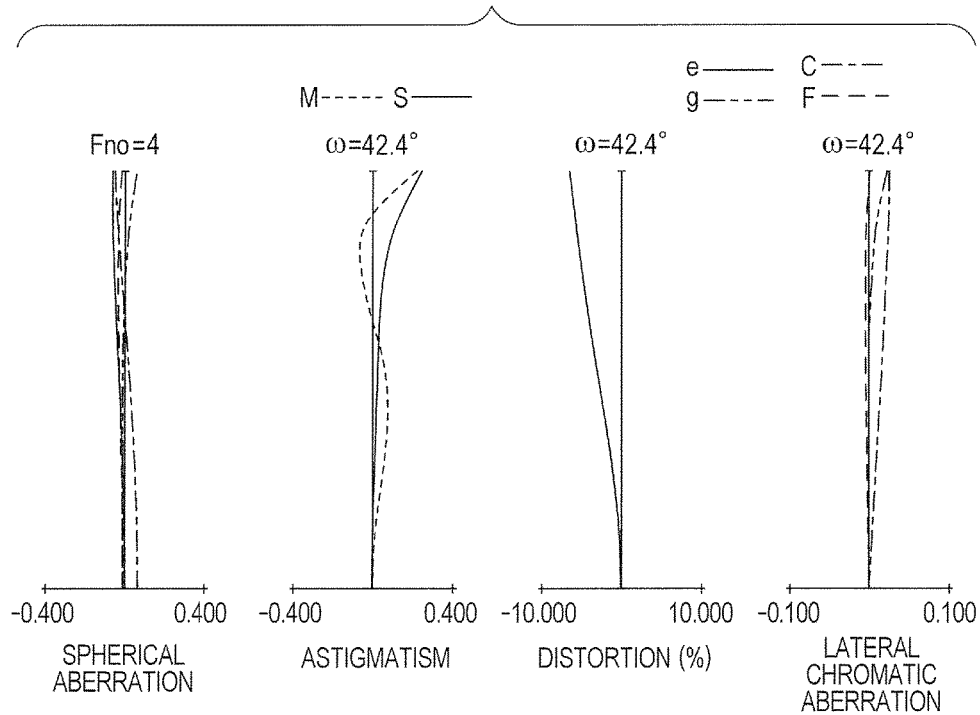
FIG. 46 is an aberration diagram in a state in which focus is at infinity at the wide angle end according to Numerical Embodiment 12.
Figure 47:
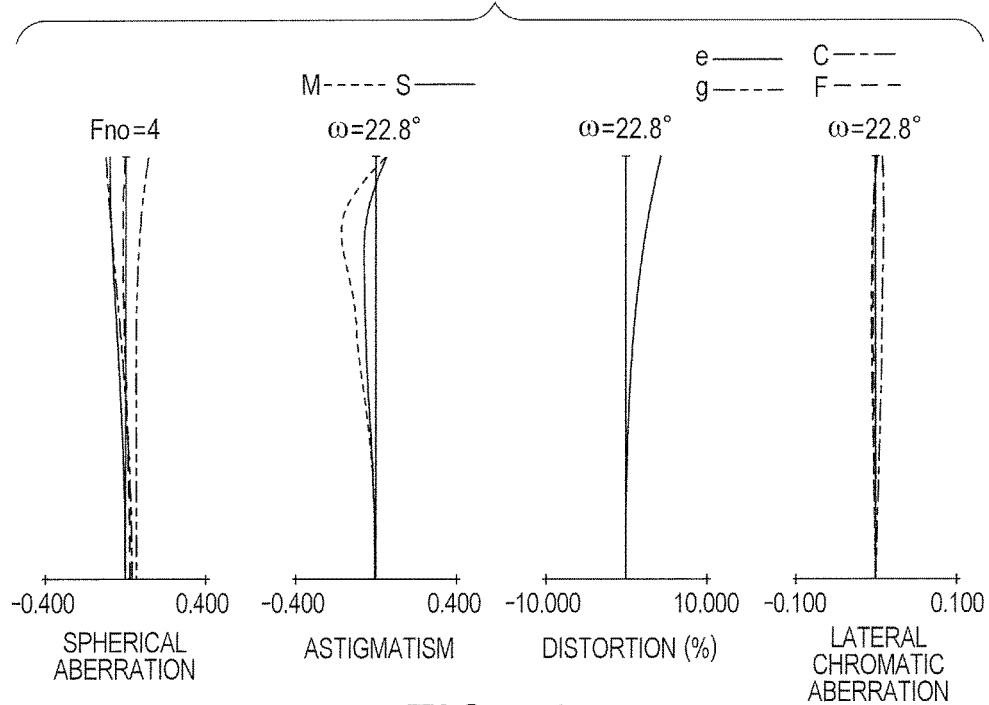
FIG. 47 is an aberration diagram in a state in which focus is at infinity at an intermediate focal length according to Numerical Embodiment 12.
Figure 48:
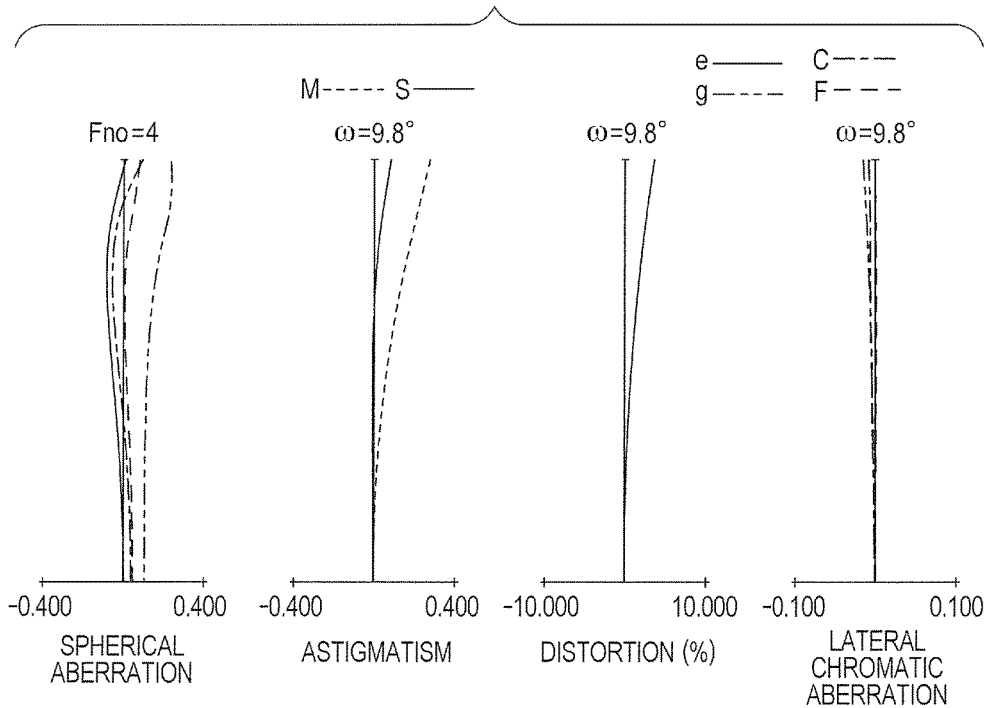
FIG. 48 is an aberration diagram in a state in which focus is at infinity at a telephoto end according to Numerical Embodiment 12.

FIG. 45 is a lens cross-sectional view of the zoom lens according to Embodiment 12 (Numerical Embodiment 12) of the present invention at the wide angle end (focal length f=17.00 mm) in a state in which focus is at the object at infinity. FIG. 46, FIG. 47, and FIG. 48 are aberration diagrams of Numerical Embodiment 12 at the wide angle end (focal length f=17.00 mm), the intermediate zoom position (focal length f=37.03 mm), and the telephoto end (focal length f=90.00 mm), respectively, in a state in which focus is at the object at infinity. The focal length is a value in Numerical Embodiment expressed in units of mm. The same is true for all Embodiments below.

In Embodiment 12, the first lens unit U1 corresponds to the first to fifteenth lens surfaces, and includes an 11 lens sub unit U11 having the first to sixth surfaces, a 12 lens sub unit U12 having the seventh and eighth surfaces, and a 13 lens sub unit U13 having the ninth to fifteenth surfaces. The 11 lens sub unit includes a meniscus negative lens having a surface concave on the image side, a biconcave lens, and a meniscus positive lens having a surface concave on the image side. The 12 lens sub unit includes a meniscus positive lens having a surface convex on the image side. The second lens unit U2 corresponds to the sixteenth to twenty-second lens surfaces, and includes a cemented lens of a meniscus negative lens having a surface concave on the image side and a biconvex lens and two biconvex lenses. The aperture stop corresponds to the twenty-third surface. The third lens unit U3 includes a 31 lens sub unit U31 and a 32 lens sub unit U32. The 31 lens sub unit U31 corresponds to the twenty-fourth to twenty-eighth lens surfaces, and includes a biconvex lens and a cemented lens of a biconvex lens and a biconcave lens. The 32 lens sub unit U32 corresponds to the twenty-ninth to thirty-second lens surfaces, and includes a meniscus negative lens having a surface concave on the image side and a biconvex lens. The fourth lens unit U4 (rear lens unit) corresponds to the thirty-third to forty-second lens surfaces, and a 41 lens sub unit U41 corresponds to the thirty-third to thirty-seventh lens surfaces. The fourth lens unit includes a biconcave lens, a cemented lens of a biconvex lens and a biconcave lens, a biconvex lens, and a cemented lens of a biconvex lens and a meniscus negative lens having a surface convex on the image side.

The 31 lens sub unit U31 is configured to move substantially reciprocally along a convex locus toward the object side when the second lens unit U2 moves linearly toward the image side during zooming from the wide angle end to the telephoto end. The 32 lens sub unit U32 is configured to move toward the object side, and exhibits a larger movement amount on the image side than on the wide angle side.

The aperture stop SP is changed in aperture diameter during zooming, and has the largest diameter at the telephoto end. Moreover, the aperture stop SP is configured not to move in the optical axis direction during zooming.

The 41 lens sub unit U41 is configured to move in a direction substantially perpendicular to the optical axis (direction having a component perpendicular to the optical axis), to thereby conduct image stabilization.

As shown in Table 2 to be described later, Numerical Embodiment 12 satisfies all of the conditional expressions (7) to (15) so as to have a high zoom ratio of 5.29× and achieve a wide angle of view with a photographing angle of view (angle of view) of 84.90 degrees at the wide angle end. In addition, high optical performance is obtained with various aberrations being satisfactorily corrected over the entire zoom range.

Embodiment 13

A zoom lens according to Embodiment 13 of the present invention includes, in order from the object side to the image side, a first lens unit U1 having a positive refractive power, which is configured not to move for zooming, a second lens unit U2 having a negative refractive power, which is configured to move during zooming, an aperture stop SP, a third lens unit U3 having a positive refractive power, which is configured to move during zooming, and a rear lens unit U4 having a positive refractive power, which is arranged closest to the image side and configured not to move for zooming. The two lens units of the second lens unit U2 and the third lens unit U3 form a zoom system (magnification-varying lens unit). The fourth lens unit U4 is a relay lens unit having an imaging action, which is configured not to move for zooming.

The first lens unit U1 includes, in order from the object side to the image side, an 11 lens sub unit U11 having a negative refractive power, which is configured not to move for focusing, a 12 lens sub unit U12 having a positive refractive power, which is configured to move toward the image side during focusing from the object at infinity to the object at the short distance, and a 13 lens sub unit U13 having a positive refractive power. The 13 lens sub unit U13 is configured not to move for focusing.

The second lens unit is constituted only by one or more lens units having negative refractive powers.

The third lens unit U3 includes two lens sub units U31 and U32 having a positive refractive power, and has a positive refractive power as a whole. The lens sub unit U31 arranged on the object side is configured not to move for zooming.

The aperture stop SP is capable of maintaining the F-number by changing the aperture diameter based on zooming, and is configured not to move in the optical axis direction during zooming.

Figure 49:
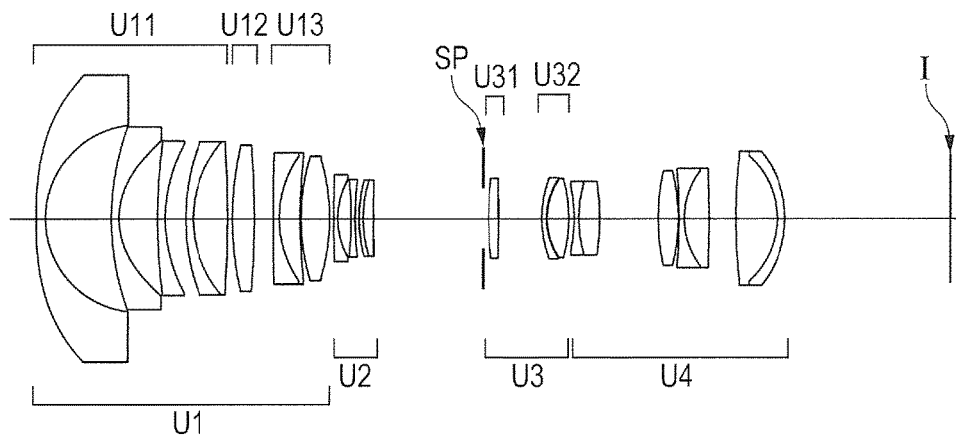
FIG. 49 is a lens cross-sectional view of a zoom lens according to Embodiment 13 (Numerical Embodiment 13) of the present invention at a wide angle end in a state in which focus is at infinity.
Figure 50:
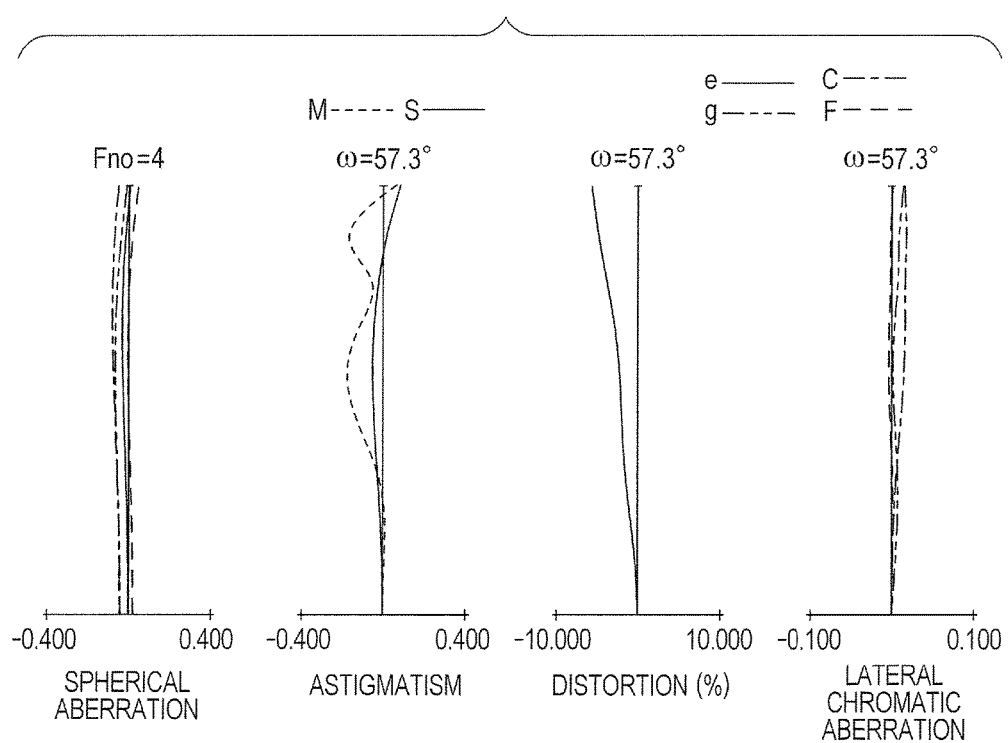
FIG. 50 is an aberration diagram in a state in which focus is at infinity at the wide angle end according to Numerical Embodiment 13.
Figure 51:
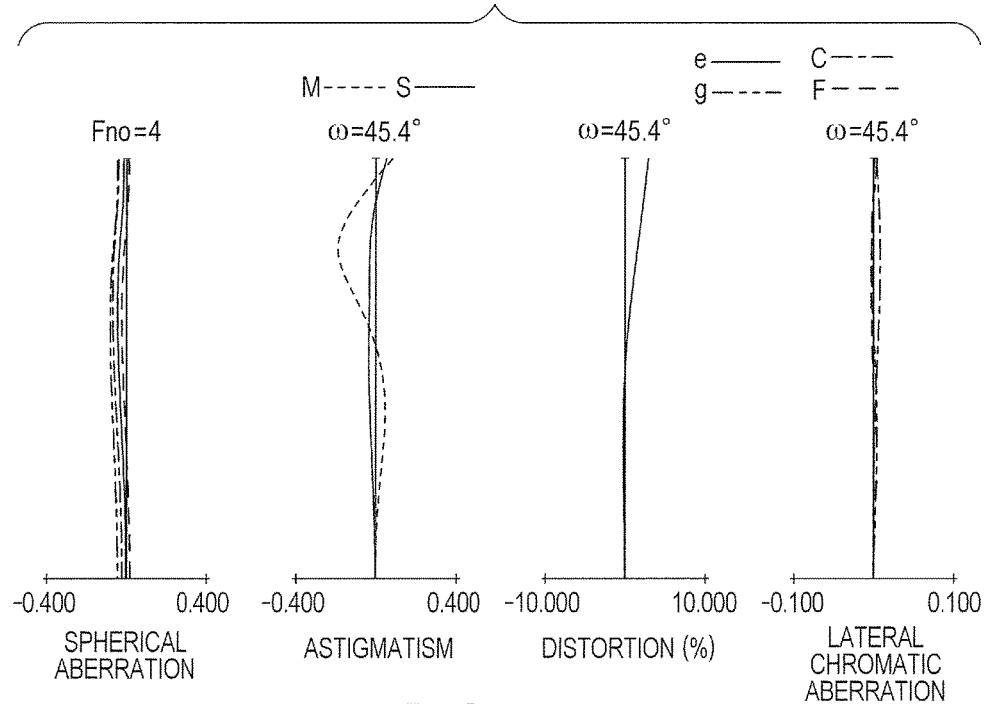
FIG. 51 is an aberration diagram in a state in which focus is at infinity at an intermediate focal length according to Numerical Embodiment 13.
Figure 52:
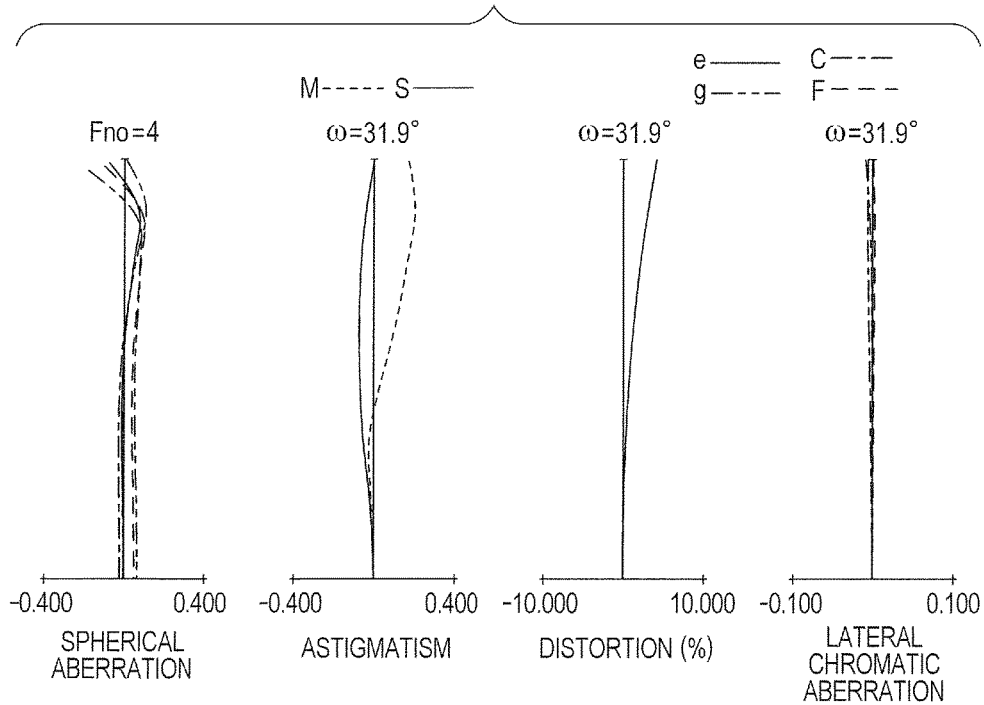
FIG. 52 is an aberration diagram in a state in which focus is at infinity at a telephoto end according to Numerical Embodiment 13.

FIG. 49 is a lens cross-sectional view of the zoom lens according to Embodiment 13 (Numerical Embodiment 13) of the present invention at the wide angle end (focal length f=10.00 mm) in a state in which focus is at the object at infinity. FIG. 50, FIG. 51, and FIG. 52 are aberration diagrams of Numerical Embodiment 13 at the wide angle end (focal length f=10.00 mm), the intermediate zoom position (focal length f=15.33 mm), and the telephoto end (focal length f=25.00 mm), respectively, in a state in which focus is at the object at infinity.

In Embodiment 13, the first lens unit U1 corresponds to the first to sixteenth lens surfaces, and includes the 11 lens sub unit U11 having the first to ninth surfaces, the 12 lens sub unit U12 having the tenth and eleventh surfaces, and the 13 lens sub unit U13 having the twelfth to sixteenth surfaces. The 11 lens sub unit U11 includes a meniscus negative lens having a surface concave on the image side, a meniscus negative lens having a surface concave on the image side, a meniscus negative lens having a surface concave on the image side, and a cemented lens of a meniscus negative lens having a surface concave on the image side and a biconvex lens. The 12 lens sub unit U12 includes a biconvex lens. The 13 lens sub unit U13 includes a cemented lens of a meniscus negative lens having a surface concave on the image side and a meniscus positive lens having a surface concave on the image side. The second lens unit U2 corresponds to the seventeenth to twenty-third lens surfaces, and includes a meniscus negative lens having a surface concave on the image side, a biconcave lens, and a cemented lens of a meniscus negative lens having a surface concave on the image side and a meniscus positive lens having a surface concave on the image side. The aperture stop corresponds to the twenty-fourth surface. The third lens unit U3 includes the 31 lens sub unit U31 and the 32 lens sub unit U32. The 31 lens sub unit U31 corresponds to the twenty-fifth and twenty-sixth lens surfaces, and includes a biconvex lens. The 32 lens sub unit U32 corresponds to the twenty-seventh to thirtieth lens surfaces, and includes a meniscus negative lens having a surface concave on the image side and a biconvex lens. The fourth lens unit U4 (rear lens unit) corresponds to the thirty-first to forty-first lens surfaces, and includes a cemented lens of a biconcave lens and a biconvex lens, a biconvex lens, a cemented lens of a biconcave lens and a biconvex lens, and a cemented lens of a biconvex lens and a meniscus negative lens having a surface convex on the image side.

The 31 lens sub unit U31 is configured not to move when the second lens unit U2 moves linearly toward the image side during zooming from the wide angle end to the telephoto end. The 32 lens sub unit U32 is configured to move toward the object side, and exhibits a larger movement amount on the telephoto side than on the wide angle side.

The aperture stop SP is changed in aperture diameter during zooming, and has the largest diameter at the telephoto end. Moreover, the aperture stop SP is configured not to move in the optical axis direction during zooming.

As shown in Table 2 to be described later, Numerical Embodiment 13 satisfies all of the conditional expressions (7) to (13) so as to have a high zoom ratio of 2.50× and achieve a wide angle of view with a photographing angle of view (angle of view) of 114.52 degrees at the wide angle end. In addition, high optical performance is obtained with various aberrations being satisfactorily corrected over the entire zoom range.

Embodiment 14

A zoom lens according to Embodiment 14 of the present invention includes, in order from the object side to the image side, a first lens unit U1 having a positive refractive power, which is configured not to move for zooming, a second lens unit U2 having a negative refractive power, which is configured to move during zooming, an aperture stop SP, a third lens unit U3 having a positive refractive power, which is configured to move during zooming, and a rear lens unit U4 having a positive refractive power, which is arranged closest to the image side and configured not to move for zooming. The two lens units of the second lens unit U2 and the third lens unit U3 form a zoom system (magnification-varying lens unit). The fourth lens unit U4 is a relay lens unit having an imaging action, which is configured not to move for zooming.

The first lens unit U1 includes, in order from the object side to the image side, an 11 lens sub unit U11 having a negative refractive power, which is configured not to move for focusing, a 12 lens sub unit U12 having a positive refractive power, which is configured to move during focusing, and a 13 lens sub unit U13 having a positive refractive power. The 13 lens sub unit U13 is configured not to move for focusing.

The second lens unit U2 includes two lens units having a negative refractive power and a positive refractive power, and has a negative refractive power as a whole.

The third lens unit U3 includes only a lens unit having a positive refractive power.

The aperture stop SP is capable of maintaining the F-number by changing the aperture diameter based on zooming, and is configured not to move in the optical axis direction during zooming.

Figure 53:
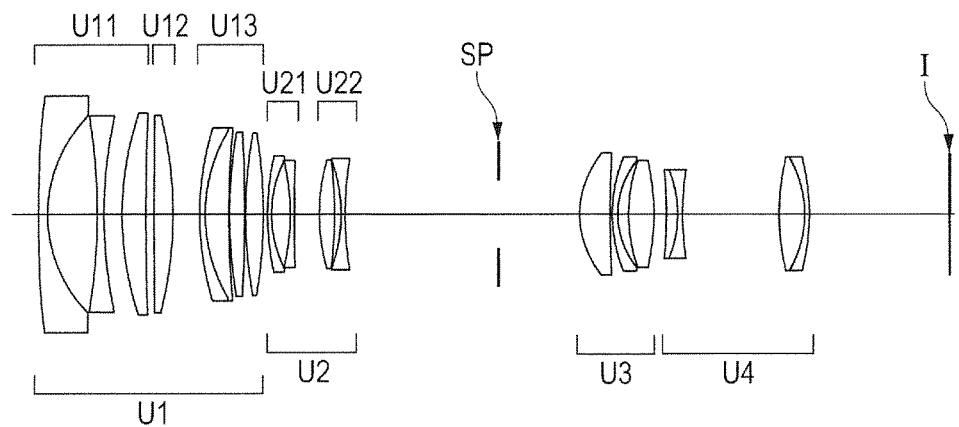
FIG. 53 is a lens cross-sectional view of a zoom lens according to Embodiment 14 (Numerical Embodiment 14) of the present invention at a wide angle end in a state in which focus is at infinity.
Figure 54:
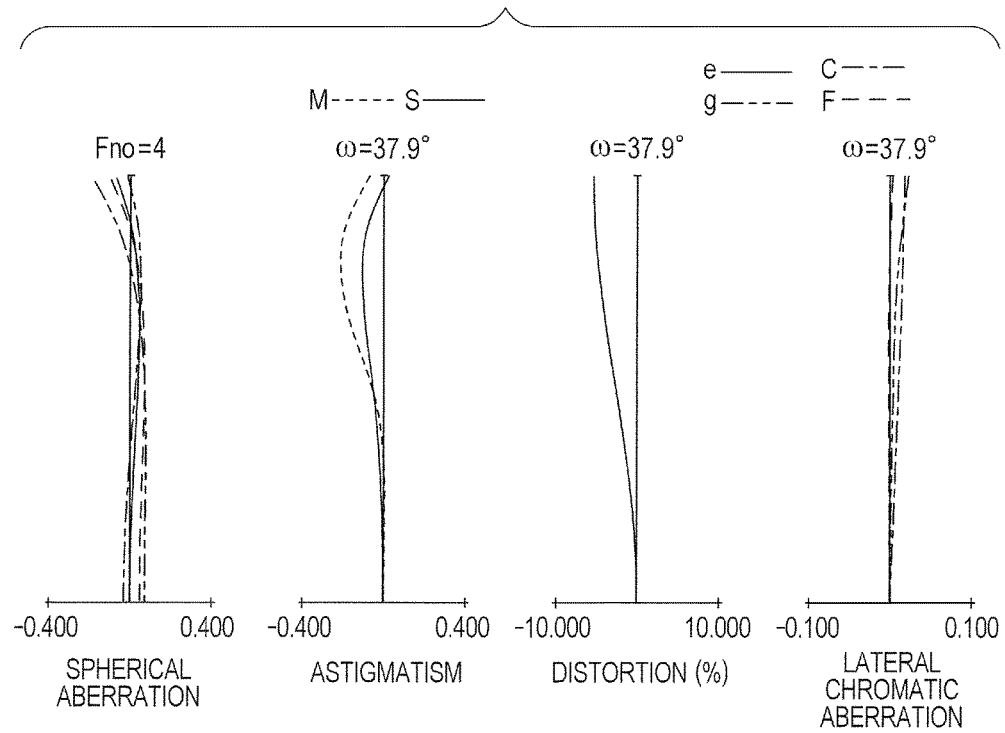
FIG. 54 is an aberration diagram in a state in which focus is at infinity at the wide angle end according to Numerical Embodiment 14.
Figure 55:
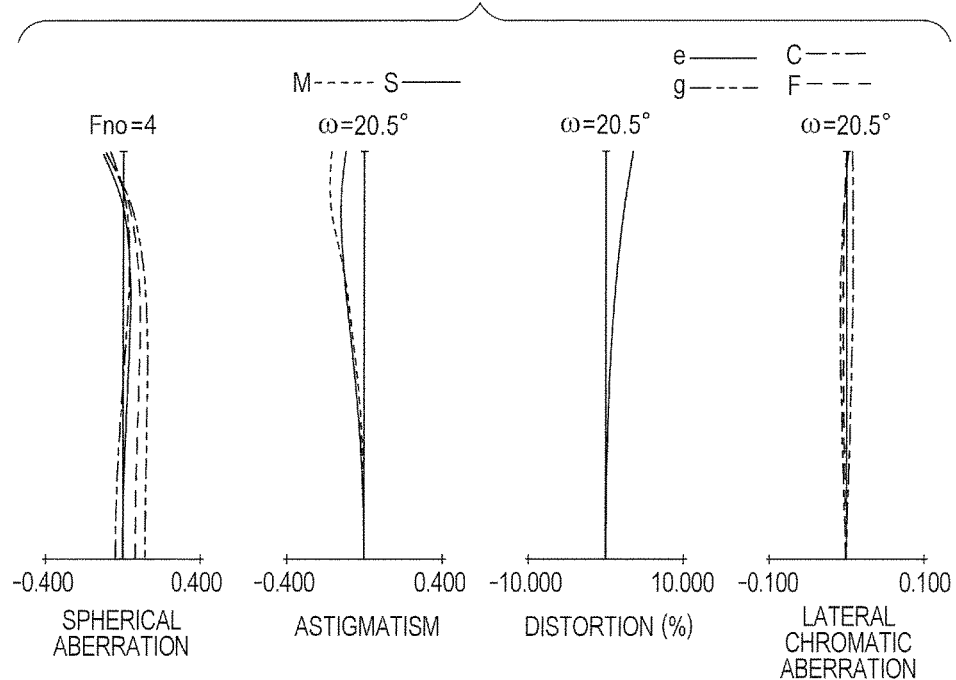
FIG. 55 is an aberration diagram in a state in which focus is at infinity at an intermediate focal length according to Numerical Embodiment 14.
Figure 56:
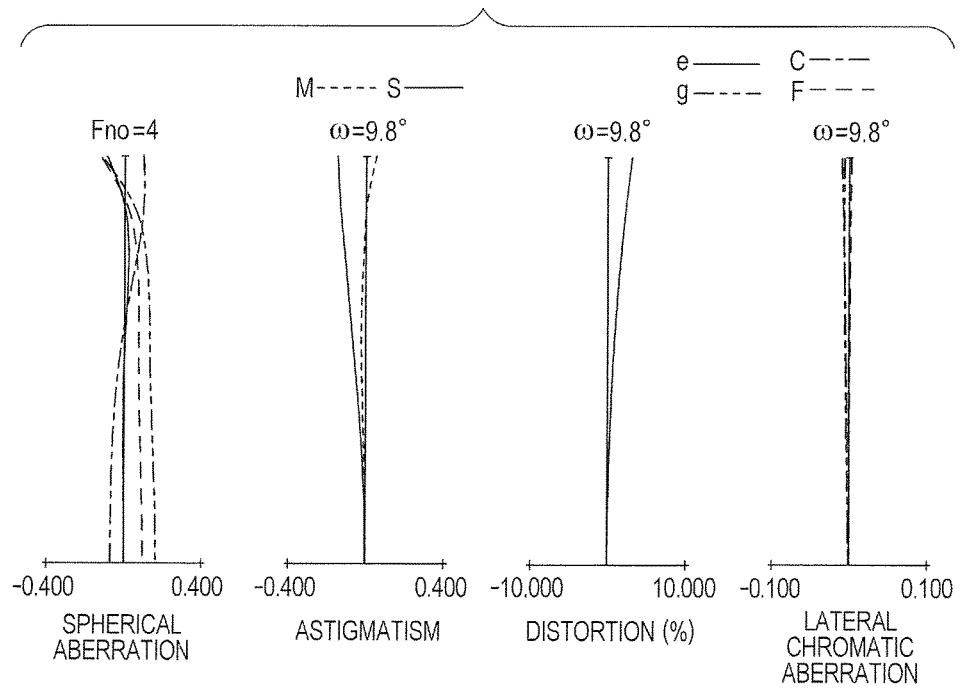
FIG. 56 is an aberration diagram in a state in which focus is at infinity at a telephoto end according to Numerical Embodiment 14.

FIG. 53 is a lens cross-sectional view of the zoom lens according to Embodiment 14 (Numerical Embodiment 14) of the present invention at the wide angle end (focal length f=20.00 mm) in a state in which focus is at the object at infinity. FIG. 54, FIG. 55, and FIG. 56 are aberration diagrams of Numerical Embodiment 14 at the wide angle end (focal length f=20.00 mm), the intermediate zoom position (focal length f=41.48 mm), and the telephoto end (focal length f=90.00 mm), respectively, in a state in which focus is at the object at infinity.

In Embodiment 14, the first lens unit U1 corresponds to the first to fifteenth lens surfaces, and includes the 11 lens sub unit U11 having the first to sixth surfaces, the 12 lens sub unit U12 having the seventh and eighth surfaces, and the 13 lens sub unit U13 having the ninth to fifteenth surfaces. The 11 lens sub unit U11 includes a meniscus negative lens having a surface concave on the image side, a biconcave lens, and a meniscus positive lens having a surface concave on the image side. The 12 lens sub unit U12 includes a biconvex lens. The 13 lens sub unit U13 includes a cemented lens of a meniscus negative lens having a surface concave on the image side and a meniscus positive lens having a surface concave on the image side and two biconvex lenses. The second lens unit U2 includes a 21 lens sub unit U21 corresponding to the sixteenth to nineteenth lens surfaces and a 22 lens sub unit U22 corresponding to the twentieth to twenty-third lens surfaces. The 21 lens sub unit U21 includes a meniscus negative lens having a surface concave on the image side and a biconcave lens. The 22 lens sub unit U22 includes a biconvex lens and a biconcave lens. The aperture stop corresponds to the twenty-fourth surface. The third lens unit U3 corresponds to the twenty-fifth to thirtieth lens surfaces, and includes a meniscus positive lens having a surface concave on the image side, a meniscus negative lens having a surface concave on the image side, and a biconvex lens. The fourth lens unit U4 (rear lens unit) corresponds to the thirty-first to thirty-sixth lens surfaces, and includes a cemented lens of a meniscus positive lens having a surface convex on the image side and a biconcave lens and a cemented lens of a biconvex lens and a meniscus positive lens having a surface convex on the image side.

The 22 lens sub unit U22 is configured to move toward the object side so as to have a smaller movement amount on the image side than on the wide angle side when the 21 lens sub unit U21 moves linearly toward the image side during zooming from the wide angle end to the telephoto end.

The aperture stop SP is changed in aperture diameter during zooming, and has the largest diameter at the telephoto end. Moreover, the aperture stop SP is configured not to move in the optical axis direction during zooming.

As shown in Table 2 to be described later, Numerical Embodiment 14 satisfies all of the conditional expressions (7) to (12) and (14) to (20) so as to have a high zoom ratio of 4.50× and achieve a wide angle of view with a photographing angle of view (angle of view) of 75.74 degrees at the wide angle end. In addition, high optical performance is obtained with various aberrations being satisfactorily corrected over the entire zoom range.

Embodiment 15

Figure 57:
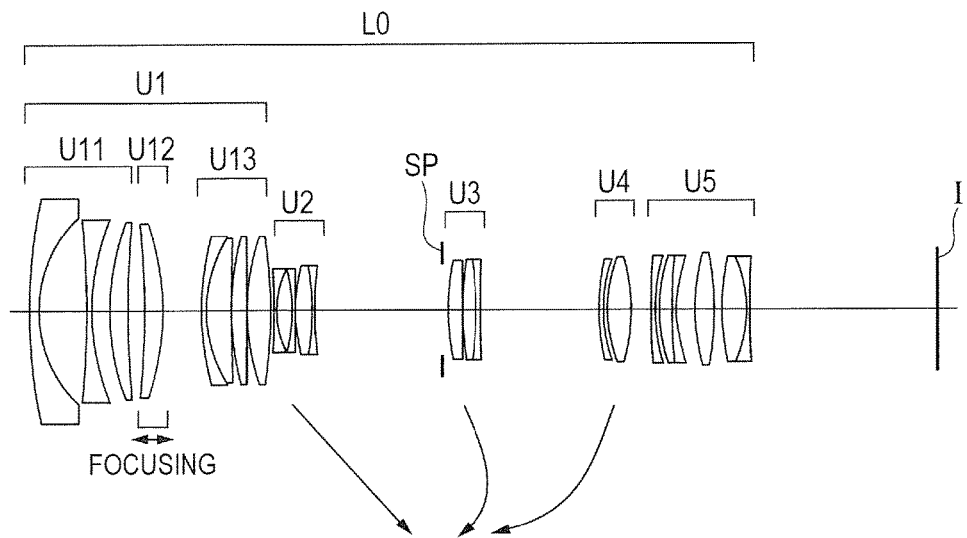
FIG. 57 is a lens cross-sectional view of a zoom lens according to Embodiment 15 (Numerical Embodiment 15) of the present invention at a wide angle end in a state in which focus is at infinity.

A lens configuration of a zoom lens according to Embodiment 15 of the present invention is described specifically with reference to FIG. 57. FIG. 57 is a lens cross-sectional view of the zoom lens according to Embodiment 15 of the present invention at the wide angle end (focal length f=18.00 mm) in a state in which focus is at the object at infinity. Referring to FIG. 57, a first lens unit U1 having a positive refractive power is configured not to move during zooming. A second lens unit U2 having a negative refractive power is configured to move during zooming. The second lens unit U2 is configured to move monotonously toward the image plane side on the optical axis during zooming from the wide angle end to the telephoto end. An aperture stop SP is also illustrated in FIG. 57.

A third lens unit U3 having a positive refractive power is configured to move from the object side to the image side on the optical axis from the wide angle end to the intermediate zoom position, and to move from the image side to the object side on the optical axis from the intermediate zoom position to the telephoto end. In short, the third lens unit U3 is configured to move toward the image side along a convex-shaped locus. A fourth lens unit U4 having a positive refractive power is configured to move from the image side to the object side on the optical axis during zooming from the wide angle end to the telephoto end. A fifth lens unit U5 having a positive refractive power is configured not to move during zooming. An image pickup plane I is also illustrated in FIG. 57.

The first lens unit U1 includes an 11 lens sub unit U11 having a negative refractive power, a 12 lens sub unit U12 having a positive refractive power for focusing, and a 13 lens sub unit U13 having a positive refractive power. The 12 lens sub unit U12 is drawn out from the object side to the image side, to thereby conduct focusing (achieve in-focus) from infinity to a short distance. In the following description, an i-th lens surface obtained by counting the lens surfaces that form the respective lens units in order from the object side to the image side is referred to as "i-th surface".

In numerical value data described later, the first lens unit U1 corresponds to the first to fourteenth surfaces. The 11 lens sub unit U11 corresponds to the first to sixth surfaces, and includes a meniscus negative lens having a surface concave on the image side, a biconcave lens, and a meniscus positive lens having a surface concave on the image side. The 12 lens sub unit U12 corresponds to the seventh and eighth surfaces, and includes a meniscus positive lens having a surface convex on the image side. The 13 lens sub unit U13 corresponds to the ninth to fifteenth surfaces, and includes a cemented lens of a meniscus negative lens having a surface concave on the image side and a meniscus positive lens having a surface concave on the image side and two biconvex lenses.

The second lens unit U2 corresponds to the sixteenth to twenty-second surfaces, and includes a biconcave lens, a meniscus negative lens having a surface convex on the image side, and a cemented lens of a biconvex lens and a biconcave lens. The twenty-third surface corresponds to the aperture stop SP. The third lens unit U3 corresponds to the twenty-fourth to twenty-eighth surfaces, and includes a meniscus positive lens having a surface concave on the image side and a cemented lens of a biconvex lens and a biconcave lens. The fourth lens unit U4 corresponds to the twenty-ninth to thirty-second surfaces, and includes a meniscus negative lens having a surface concave on the image side and a biconvex lens. The fifth lens unit U5 corresponds to the thirty-third to forty-second surfaces, and includes a meniscus negative lens having a surface concave on the image side, a cemented lens of a meniscus positive lens having a surface concave on the image side and a meniscus negative lens having a surface concave on the image side, a biconvex lens, and a cemented lens of a biconvex lens and a biconcave lens. The first and twenty-fourth surfaces each have an aspherical shape, and mainly serve to correct the variations of the distortion and the astigmatism during zooming.

Figure 58:
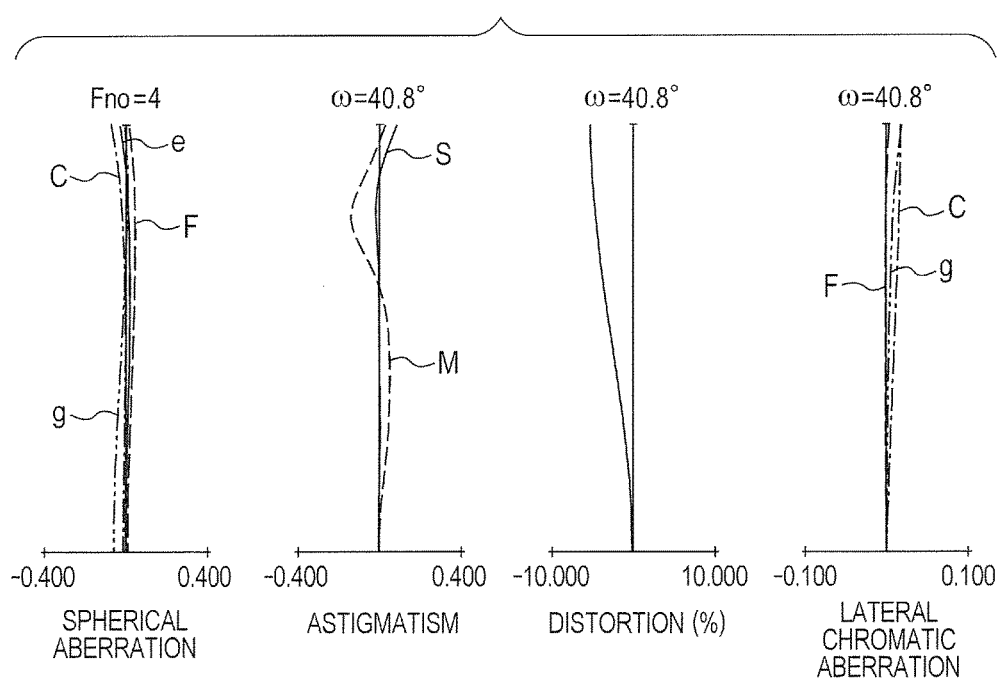
FIG. 58 is an aberration diagram in a state in which focus is at infinity at the wide angle end according to Numerical Embodiment 15.
Figure 59:
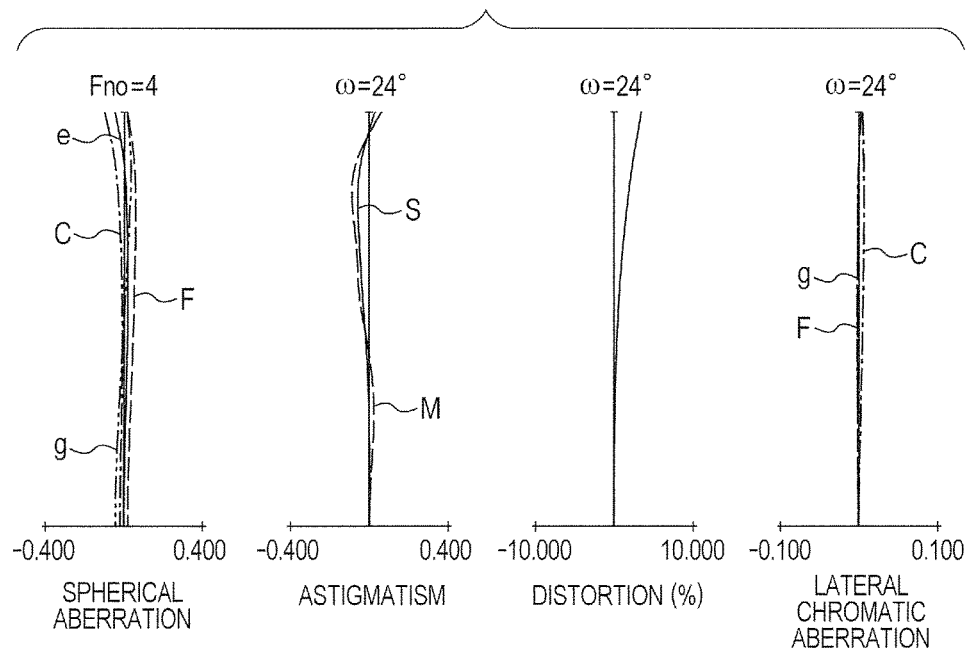
FIG. 59 is an aberration diagram in a state in which focus is at infinity at an intermediate focal length according to Numerical Embodiment 15.
Figure 60:
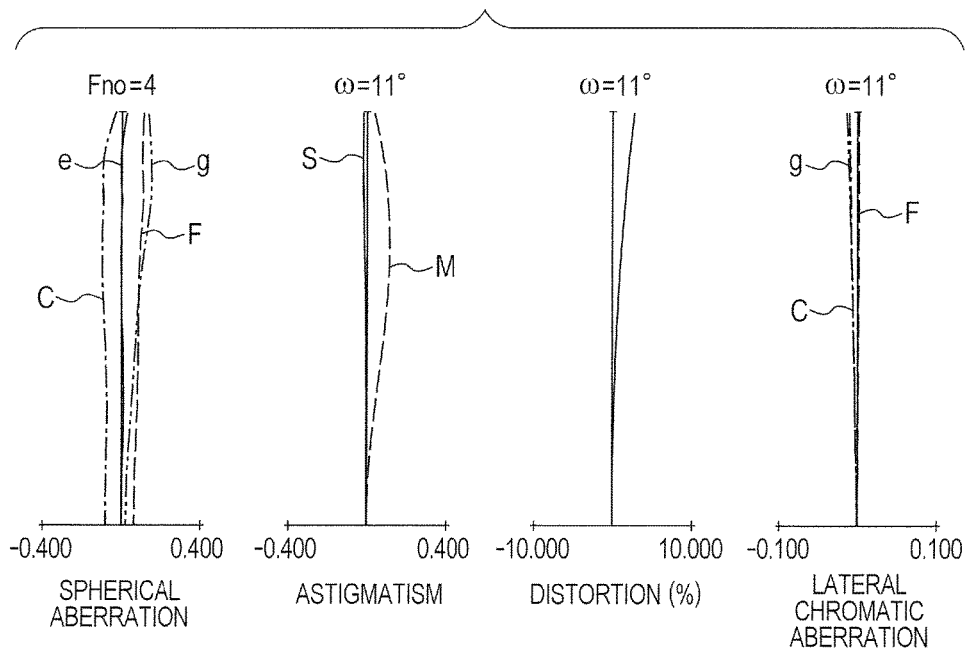
FIG. 60 is an aberration diagram in a state in which focus is at infinity at a telephoto end according to Numerical Embodiment 15.

FIG. 58, FIG. 59, and FIG. 60 are aberration diagrams of Embodiment 15 at the wide angle end (focal length f=18.00 mm), the intermediate zoom position (focal length f=34.90 mm), and the telephoto end (focal length f=80.00 mm), respectively, in a state in which focus is at the object at infinity. The zoom lens according to Embodiment 15 has a zoom ratio of 4.44, an F-number of 4.00, and an image pickup angle of view of 81.64 degrees at the wide angle end.

As shown in Table 2 along with the arithmetic operation results of the numerical value conditions for this Embodiment, the conditional expressions (7) to (20) are satisfied.

Embodiment 16

Figure 61:
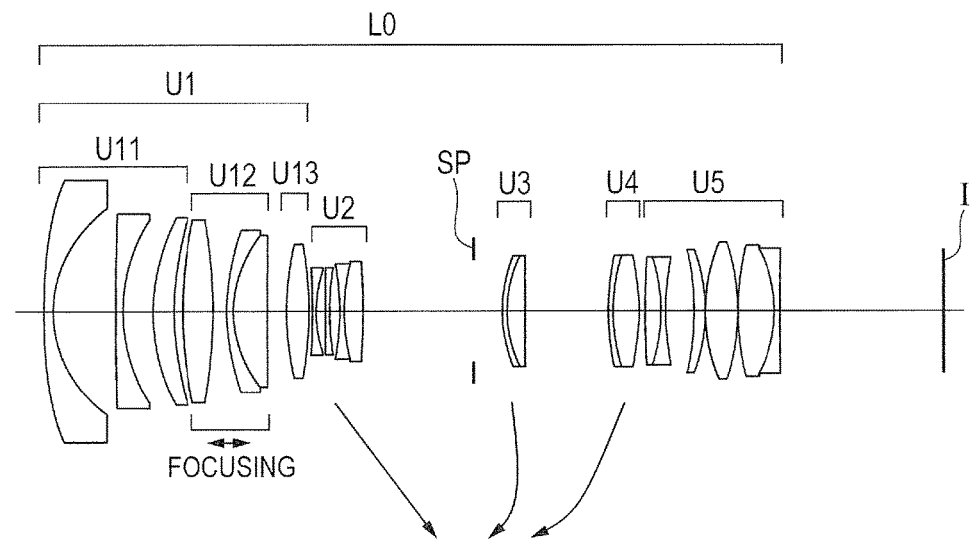
FIG. 61 is a lens cross-sectional view of a zoom lens according to Embodiment 16 (Numerical Embodiment 16) of the present invention at a wide angle end in a state in which focus is at infinity.

A lens configuration of a zoom lens according to Embodiment 16 of the present invention is described specifically with reference to FIG. 61. FIG. 61 is a lens cross-sectional view of the zoom lens according to Embodiment 16 of the present invention at the wide angle end (focal length f=16.00 mm) in a state in which focus is at the object at infinity. In the zoom lens according to Embodiment 16 of the present invention, zoom configurations including the number of lens units, signs of the refractive powers of the lens units, and the movement conditions of the respective lens units during zooming are the same as those of Embodiment 15. In the zoom lens according to Embodiment 16, focus configurations including the number of lens sub units of a first lens unit U1, signs of the refractive powers of the lens sub units, and the movement conditions of the lens sub units during focusing are the same as those of Embodiment 15.

In the numerical value data described later, the first lens unit U1 corresponds to the first to twelfth surfaces. The 11 lens sub unit U11 corresponds to the first to sixth surfaces, and includes a meniscus negative lens having a surface concave on the image side, a meniscus negative lens having a surface concave on the image side, and a meniscus positive lens having a surface concave on the image side. The 12 lens sub unit U12 corresponds to the seventh to eleventh surfaces, and includes a biconvex lens and a cemented lens of a meniscus negative lens having a surface concave on the image side and a meniscus positive lens having a surface concave on the image side. The 13 lens sub unit U13 corresponds to the twelfth and thirteenth surfaces, and includes a biconvex lens.

A second lens unit U2 corresponds to the fourteenth to twentieth surfaces, and includes two biconcave lenses and a cemented lens of a biconcave lens and a biconvex lens. The twenty-first surface corresponds to an aperture stop SP. A third lens unit U3 corresponds to the twenty-second to twenty-fourth surfaces, and includes a cemented lens of a meniscus negative lens having a surface concave on the image side and a meniscus positive lens having a surface concave on the image side. A fourth lens unit U4 corresponds to the twenty-fifth to twenty-seventh surfaces, and includes a cemented lens of a meniscus negative lens having a surface concave on the image side and a biconvex lens. A fifth lens unit U5 corresponds to the twenty-eighth to thirty-seventh surfaces, and includes a cemented lens of a biconvex lens and a biconcave lens, a meniscus positive lens having a surface convex on the image side, a biconvex lens, and a cemented lens of a biconvex lens and a biconcave lens. The first and twenty-fourth surfaces each have an aspherical shape, and mainly serve to correct the variations of the distortion and the astigmatism during zooming.

Figure 62:
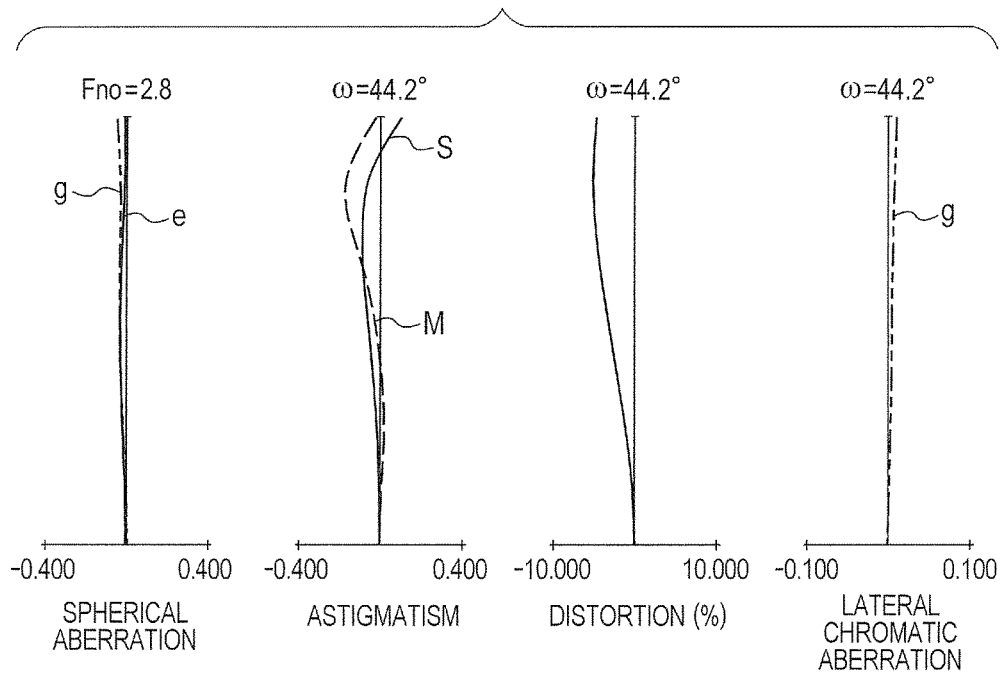
FIG. 62 is an aberration diagram in a state in which focus is at infinity at the wide angle end according to Numerical Embodiment 16.
Figure 63:
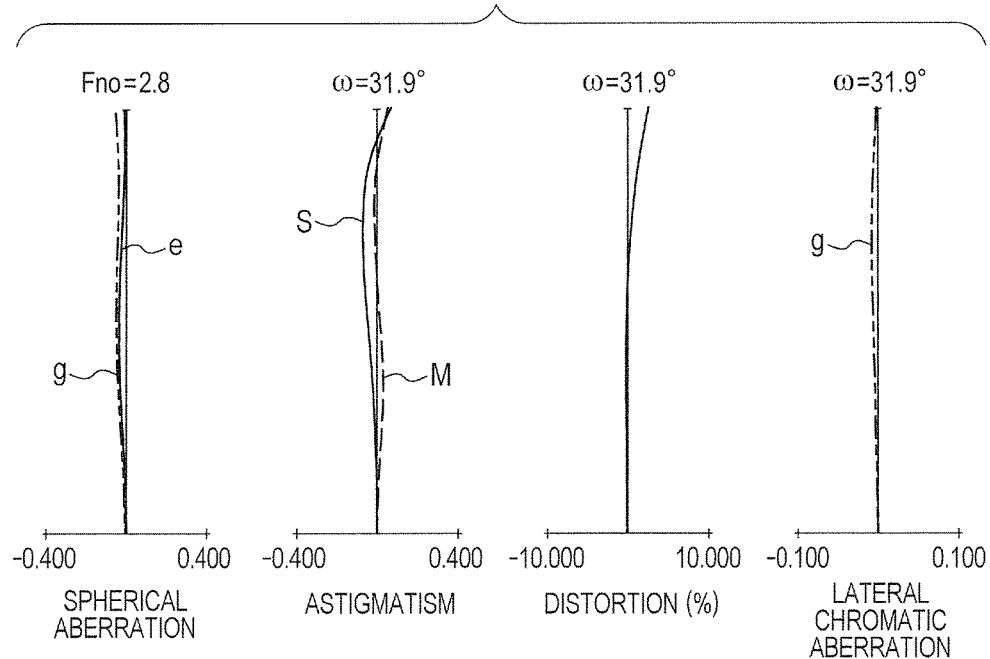
FIG. 63 is an aberration diagram in a state in which focus is at infinity at an intermediate focal length according to Numerical Embodiment 16.
Figure 64:
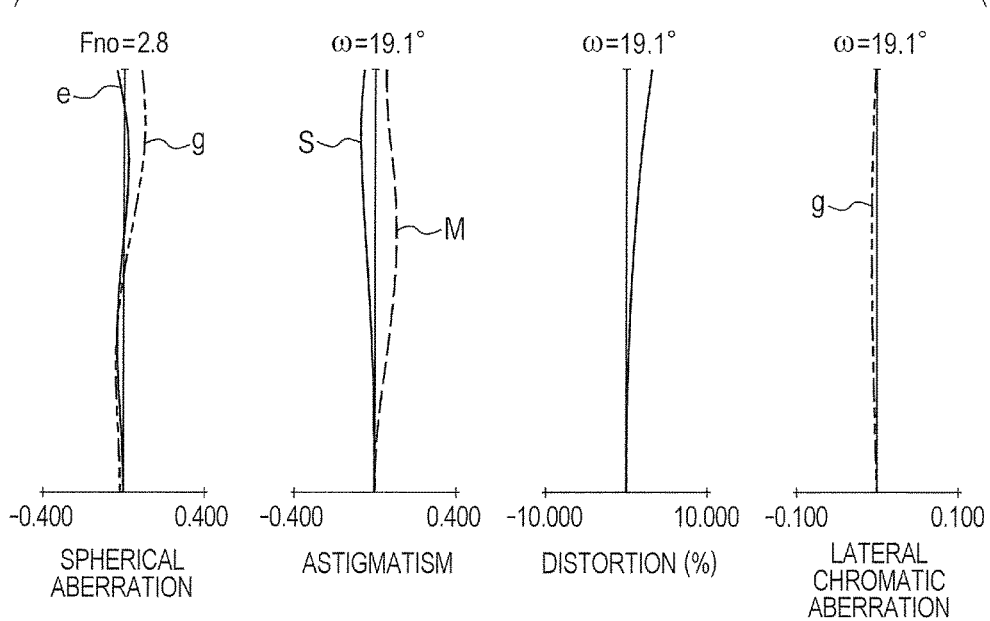
FIG. 64 is an aberration diagram in a state in which focus is at infinity at a telephoto end according to Numerical Embodiment 16.

FIG. 62, FIG. 63, and FIG. 64 are aberration diagrams of Embodiment 16 at the wide angle end (focal length f=16.00 mm), the intermediate zoom position (focal length f=25.00 mm), and the telephoto end (focal length f=45.00 mm), respectively, in a state in which focus is at the object at infinity. The zoom lens according to Embodiment 16 has a zoom ratio of 2.81, an F-number of 2.80, and an image pickup angle of view of 88.36 degrees at the wide angle end.

As shown in Table 2 along with the arithmetic operation results of the numerical value conditions for this Embodiment, the conditional expressions (1) to (4) and (6) to (20) are satisfied.

Embodiment 17

Figure 65:
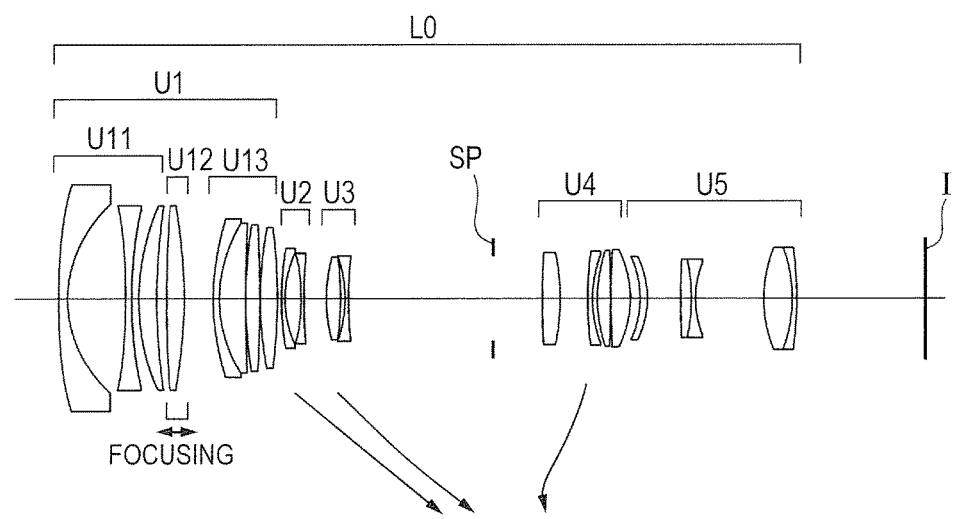
FIG. 65 is a lens cross-sectional view of a zoom lens according to Embodiment 17 (Numerical Embodiment 17) of the present invention at a wide angle end in a state in which focus is at infinity.

A lens configuration of a zoom lens according to Embodiment 17 of the present invention is described specifically with reference to FIG. 65. FIG. 65 is a lens cross-sectional view of the zoom lens according to Embodiment 17 of the present invention at the wide angle end (focal length f=20.00 mm) in a state in which focus is at the object at infinity. Referring to FIG. 65, a first lens unit U1 having a positive refractive power is configured not to move for zooming. A second lens unit U2 for magnification varying has a negative refractive power. The second lens unit U2 is configured to move monotonously toward the image plane side on the optical axis during zooming from the wide angle end to the telephoto end.

A third lens unit U3 having a positive refractive power is configured to move from the object side to the image side on the optical axis during zooming from the wide angle end to the telephoto end. An aperture stop SP is also illustrated in FIG. 65. A fourth lens unit U4 having a positive refractive power is configured to move from the image side to the object side on the optical axis during zooming from the wide angle end to the telephoto end. A fifth lens unit U5 having a negative refractive power is configured not to move for zooming. An image pickup plane I is also illustrated in FIG. 65. The focus configurations including the number of lens sub units of the first lens unit U1, the signs of the refractive powers of the lens sub units, and the movement conditions of the lens sub units during focusing are the same as those of Embodiment 15.

In the numerical value data described later, the first lens unit U1 corresponds to the first to fifteenth surfaces. The 11 lens sub unit U11 corresponds to the first to sixth surfaces, and includes a meniscus negative lens having a surface concave on the image side, a biconcave lens, and a meniscus positive lens having a surface concave on the image side. The 12 lens sub unit U12 corresponds to the seventh and eighth surfaces, and includes a biconvex lens. The 13 lens sub unit U13 corresponds to the ninth to fifteenth surfaces, and includes a cemented lens of a meniscus negative lens having a surface concave on the image side and a meniscus positive lens having a surface concave on the image side and two biconvex lenses.

The second lens unit U2 corresponds to the sixteenth to nineteenth surfaces, and includes a meniscus negative lens having a surface concave on the image side and a biconcave lens. The third lens unit U3 corresponds to the twentieth to twenty-third surfaces, and includes a biconvex lens and a biconcave lens. The twenty-fourth surface corresponds to the aperture stop SP. The fourth lens unit U4 corresponds to the twenty-fifth to thirty-second surfaces, and includes a biconvex lens, a meniscus negative lens having a surface concave on the image side, and two biconvex lenses. The fifth lens unit U5 corresponds to the thirty-third to fortieth surfaces, and includes a meniscus negative lens having a surface convex on the image side, a cemented lens of a biconvex lens and a biconcave lens, and a cemented lens of a biconvex lens and a meniscus negative lens having a surface convex on the image side. The first and twenty-fifth surfaces each have an aspherical shape, and mainly serve to correct the variations of the distortion and the astigmatism during zooming.

Figure 66:
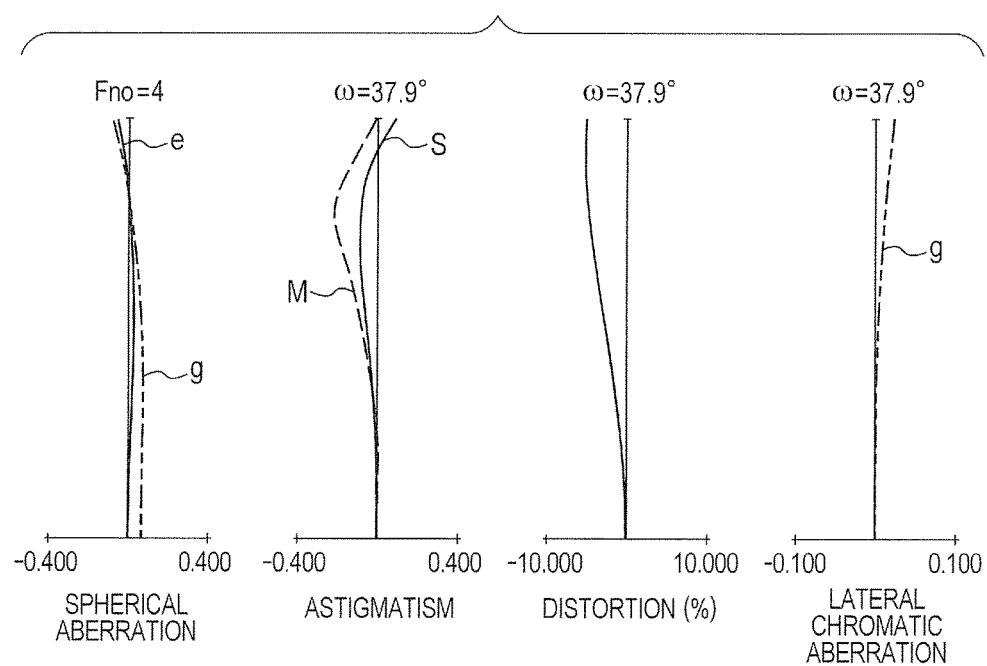
FIG. 66 is an aberration diagram in a state in which focus is at infinity at the wide angle end according to Numerical Embodiment 17.
Figure 67:
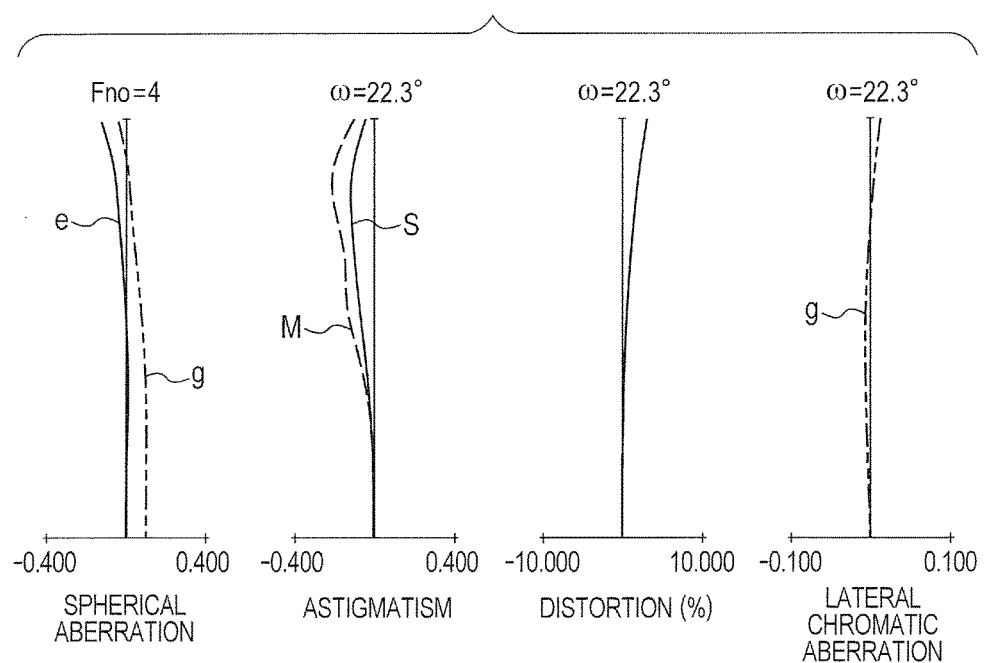
FIG. 67 is an aberration diagram in a state in which focus is at infinity at an intermediate focal length according to Numerical Embodiment 17.
Figure 68:
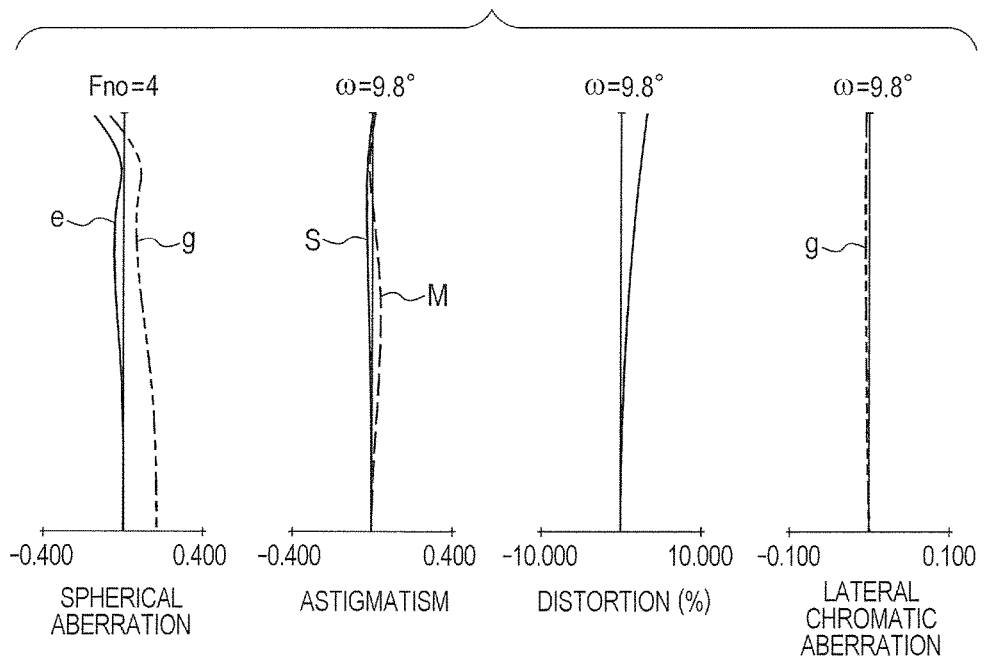
FIG. 68 is an aberration diagram in a state in which focus is at infinity at a telephoto end according to Numerical Embodiment 17.

FIG. 66, FIG. 67, and FIG. 68 are aberration diagrams of Embodiment 17 at the wide angle end (focal length f=20.00 mm), the intermediate zoom position (focal length f=38.00 mm), and the telephoto end (focal length f=90.00 mm), respectively, in a state in which focus is at the object at infinity. The zoom lens according to Embodiment 17 has a zoom ratio of 4.50, an F-number of 4.00, and an image pickup angle of view of 75.74 degrees at the wide angle end.

As shown in Table 3 along with the arithmetic operation results of the numerical value conditions for this Embodiment, the conditional expressions (7), (8), and (10) to (20) are satisfied.

Embodiment 18

Figure 69:
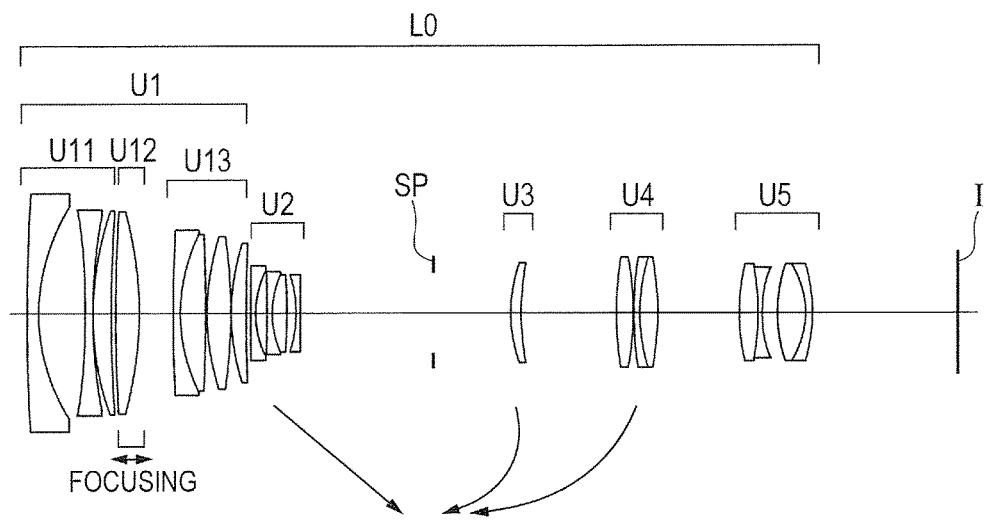
FIG. 69 is a lens cross-sectional view of a zoom lens according to Embodiment 18 (Numerical Embodiment 18) of the present invention at a wide angle end in a state in which focus is at infinity.

A lens configuration of a zoom lens according to Embodiment 18 of the present invention is described specifically with reference to FIG. 69. FIG. 69 is a lens cross-sectional view of the zoom lens according to Embodiment 18 of the present invention at the wide angle end (focal length f=22.00 mm) in a state in which focus is at the object at infinity. Referring to FIG. 69, a first lens unit U1 having a positive refractive power is configured not to move during zooming. A second lens unit U2 having a negative refractive power is configured to move during zooming. The second lens unit U2 is configured to move monotonously toward the image plane side on the optical axis during zooming from the wide angle end to the telephoto end. An aperture stop SP is also illustrated in FIG. 69. A third lens unit U3 having a positive refractive power is configured to move from the object side to the image side on the optical axis from the wide angle end to the intermediate zoom position, and to move from the image side to the object side on the optical axis from the intermediate zoom position to the telephoto end.

A fourth lens unit U4 having a positive refractive power is configured to move from the image side to the object side on the optical axis during zooming from the wide angle end to the telephoto end. A fifth lens unit U5 having a negative refractive power is configured not to move during zooming. An image pickup plane I is also illustrated in FIG. 69. In the zoom lens according to Embodiment 18, the focus configurations including the number of lens sub units of the first lens unit U1, the signs of the refractive powers of the lens sub units, and the movement conditions of the lens sub units during focusing are the same as those of Embodiment 15.

In the numerical value data described later, the first lens unit U1 corresponds to the first to fifteenth surfaces. The 11 lens sub unit U11 corresponds to the first to sixth surfaces, and includes a meniscus negative lens having a surface concave on the image side, a biconcave lens, and a meniscus positive lens having a surface concave on the image side. The 12 lens sub unit U12 corresponds to the seventh and eighth surfaces, and includes a biconvex lens. The 13 lens sub unit U13 corresponds to the ninth to fifteenth surfaces, and includes a cemented lens of a meniscus negative lens having a surface concave on the image side and a biconvex lens, a biconvex lens, and a meniscus positive lens having a surface concave on the image side.

The second lens unit U2 corresponds to the sixteenth to twenty-second surfaces, and includes a biconcave lens, a cemented lens of a biconcave lens and a biconvex lens, and a biconcave lens. The twenty-third surface corresponds to the aperture stop. The third lens unit U3 corresponds to the twenty-fourth and twenty-fifth surfaces, and includes a meniscus positive lens having a surface concave on the image side. The fourth lens unit U4 corresponds to the twenty-sixth to thirtieth surfaces, and includes a biconvex lens, and a cemented lens of a meniscus negative lens having a surface concave on the image side and a biconvex lens. The fifth lens unit U5 corresponds to the thirty-first to thirty-sixth surfaces, and includes a cemented lens of a biconvex lens and a biconvex lens and a cemented lens of a biconvex lens and a meniscus negative lens having a surface convex on the image side. The sixteenth and twenty-fifth surfaces each have an aspherical shape, and mainly serve to correct the variations of the distortion and the astigmatism during zooming.

Figure 70:
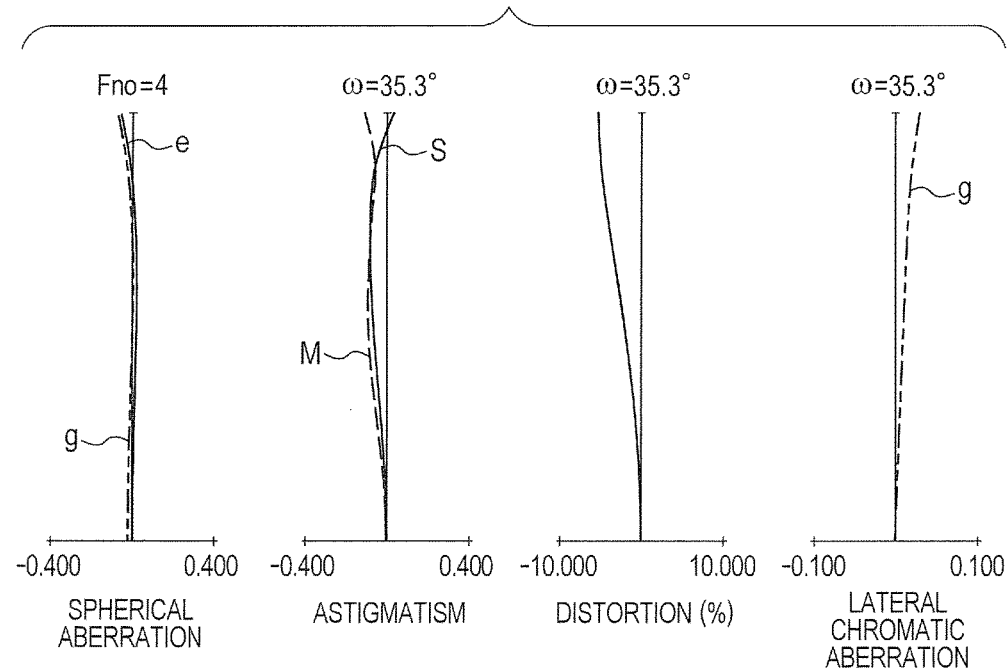
FIG. 70 is an aberration diagram in a state in which focus is at infinity at the wide angle end according to Numerical Embodiment 18.
Figure 71:
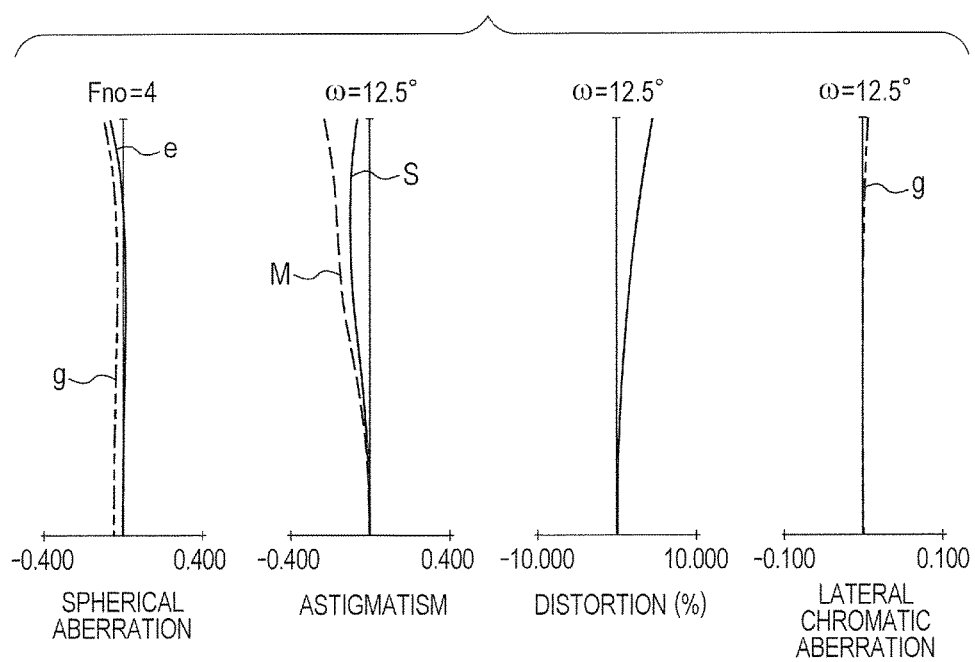
FIG. 71 is an aberration diagram in a state in which focus is at infinity at an intermediate focal length according to Numerical Embodiment 18.
Figure 72:
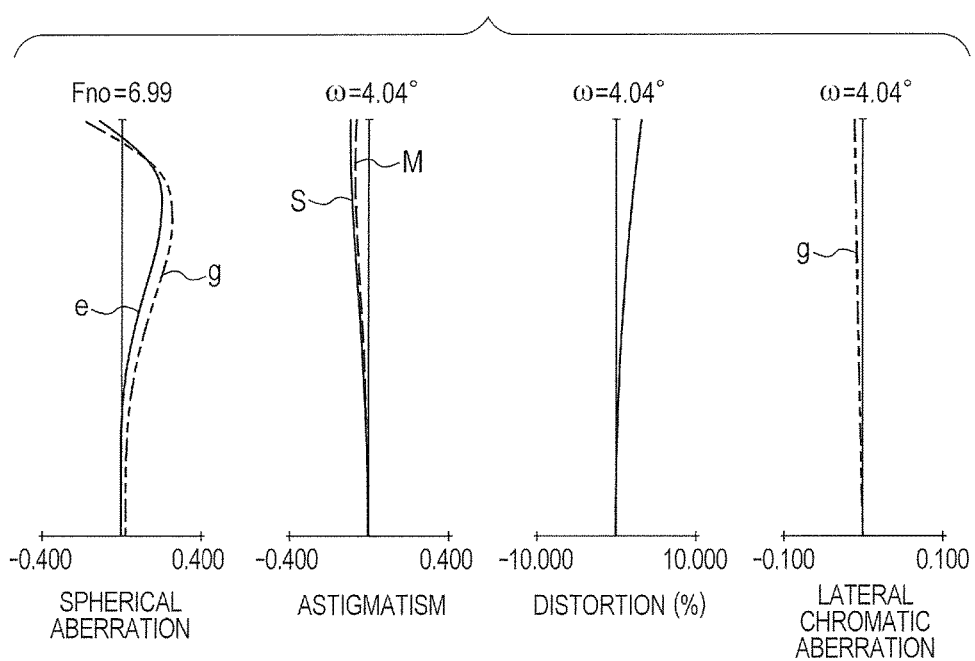
FIG. 72 is an aberration diagram in a state in which focus is at infinity at a telephoto end according to Numerical Embodiment 18.

FIG. 70, FIG. 71, and FIG. 72 are aberration diagrams of Embodiment 18 at the wide angle end (focal length f=22.00 mm), the intermediate zoom position (focal length f=70.00 mm), and the telephoto end (focal length f=220.00 mm), respectively, in a state in which focus is at the object at infinity. The zoom lens according to Embodiment 18 has a zoom ratio of 10.00, an F-number of 4.00 to 6.99, and an image pickup angle of view of 70.5 degrees at the wide angle end.

As shown in Table 3 along with the arithmetic operation results of the numerical value conditions for this Embodiment, the conditional expressions (1), (3) to (8), and (10) to (20) are satisfied.

Embodiment 19

A zoom lens according to Embodiment 19 of the present invention includes, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power. The lens unit having a negative refractive power is arranged closest to the object side, to thereby suppress the increase in front lens diameter even when a wide angle is achieved. The lens units having a negative refractive power and the lens units having a positive refractive power are arranged alternately in the first to sixth lens units, to thereby allow efficient magnification varying by changing each interval between the lens units.

The zoom lens is configured to change the interval between adjacent lens units among the first, second, third, fourth, fifth, and sixth lens units during zooming, but the heavy first lens unit is fixed to prevent the increase in driving force required for zooming. The second lens unit is configured to move in order to conduct zooming by changing the interval between the second lens unit and the first lens unit configured not to move for zooming. The third lens unit positioned on the image side of the second lens unit configured to move may be fixed or may be configured to move. The fourth lens unit is configured to move in order to efficiently conduct zooming even when the third lens unit is fixed. The fifth lens unit is also configured to move in order to correct the spherical aberration and the field curvature during zooming by changing the interval between the fourth lens unit and the fifth lens unit. The lens units arranged on the image side of the fifth lens unit configured to move contribute to the magnification varying to a small extent, and therefore may include a fixed lens unit or may be all configured to move.

Figure 73:
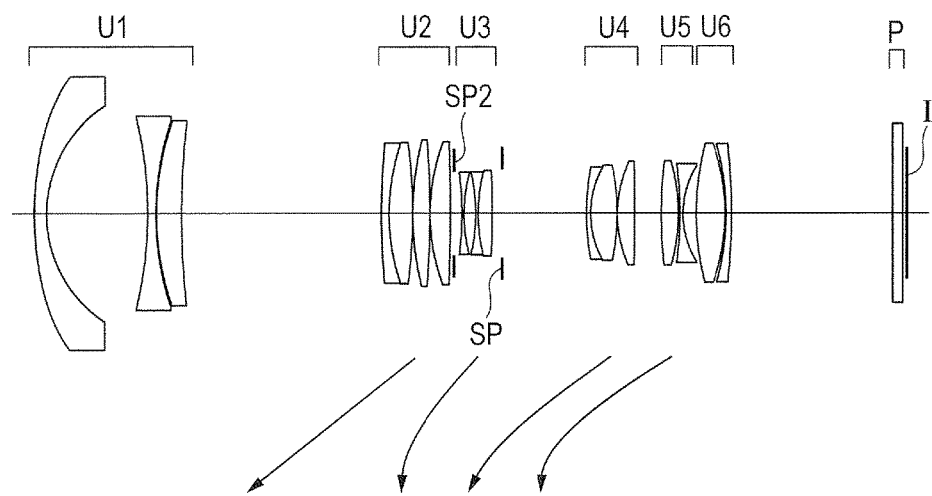
FIG. 73 is a lens cross-sectional view of a zoom lens according to Embodiment 19 (Numerical Embodiment 19) of the present invention at a wide angle end in a state in which focus is at infinity.

FIG. 73 is a lens cross-sectional view for illustrating the first lens unit U1, the second lens unit U2, the third lens unit U3, the fourth lens unit U4, the fifth lens unit U5, the sixth lens unit U6, an aperture stop SP, an auxiliary stop SP2 configured to change the aperture diameter in order to determine the open F-number, a glass block P, e.g., a low-pass filter or a face plate of a CCD, and an image plane I.

More specifically, the zoom lens according to this Embodiment is configured as follows in order from the object side to the image side. The first lens unit U1 corresponds to the first to sixth surfaces, and includes, in order from the object side, a meniscus negative lens concave on the image side, a biconcave negative lens, and a meniscus positive lens concave on the image side. The second lens unit U2 corresponds to the seventh to thirteenth surfaces, and includes a cemented lens of a meniscus negative lens concave on the image side and a biconvex lens and two biconvex lenses. The auxiliary stop SP2 is included as the fourteenth surface. The third lens unit U3 corresponds to the fifteenth to nineteenth surfaces, and includes a biconcave lens and a cemented lens of a biconcave lens and a biconvex lens. The aperture stop SP is included as the twentieth surface. The fourth lens unit U4 corresponds to the twenty-first to twenty-fifth surfaces, and includes a cemented lens of a meniscus negative lens concave on the image side and a biconvex lens and a biconvex lens. The fifth lens unit U5 corresponds to the twenty-sixth to twenty-ninth surfaces, and includes a biconvex lens and a biconcave lens. The sixth lens unit U6 corresponds to the thirtieth to thirty-third surfaces, and includes a biconvex lens and a meniscus negative lens convex on the image side.

Figure 74:
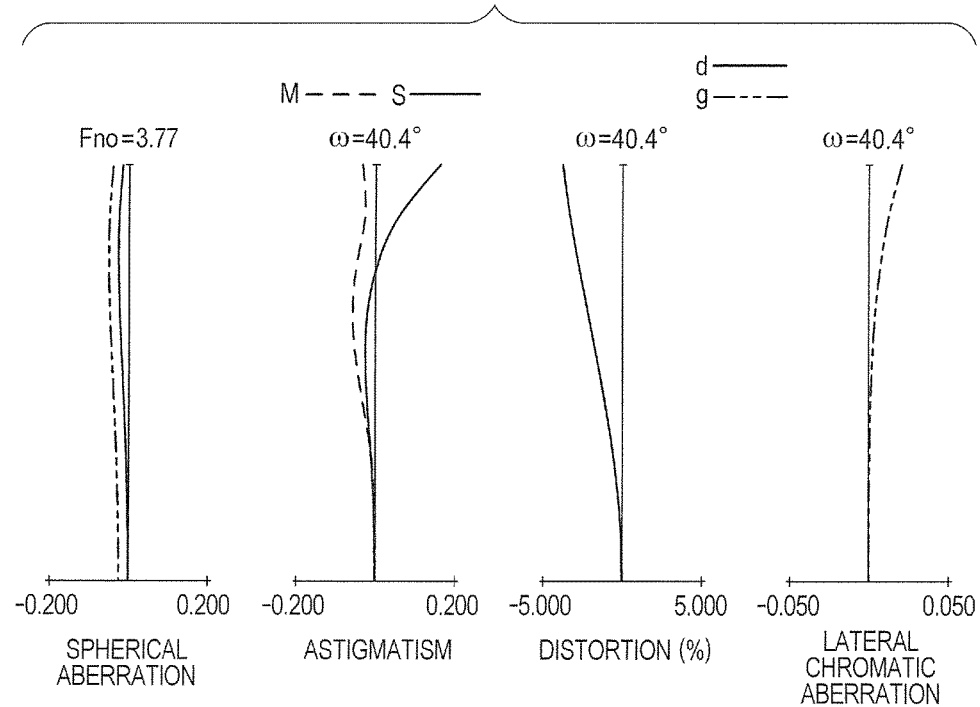
FIG. 74 is an aberration diagram in a state in which focus is at infinity at the wide angle end according to Numerical Embodiment 19.
Figure 75:
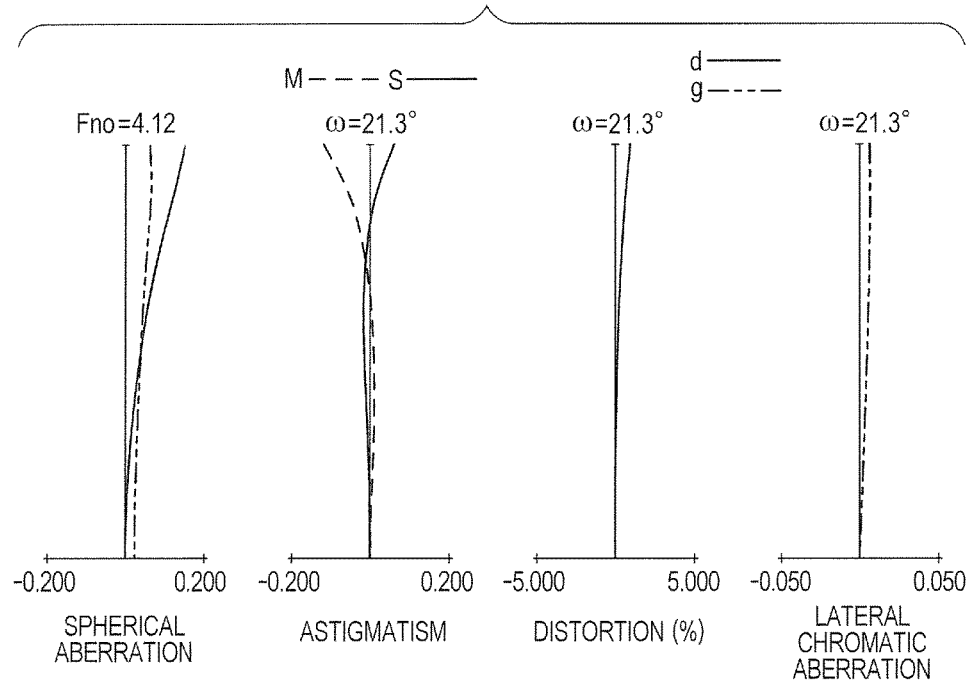
FIG. 75 is an aberration diagram in a state in which focus is at infinity at an intermediate focal length according to Numerical Embodiment 19.
Figure 76:
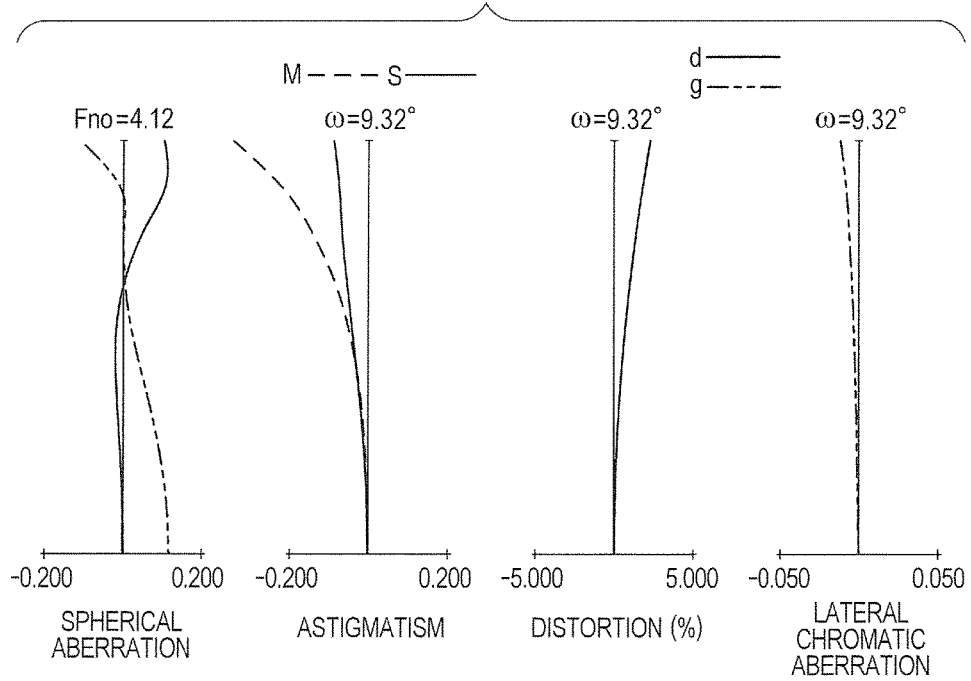
FIG. 76 is an aberration diagram in a state in which focus is at infinity at a telephoto end according to Numerical Embodiment 19.

FIG. 73 is a lens cross-sectional view of the zoom lens according to Embodiment 19 at the wide angle end (focal length f=18.09 mm) in a state in which focus is at the object at infinity. FIG. 74, FIG. 75, and FIG. 76 are aberration diagrams of Embodiment 19 at the wide angle end (focal length f=18.09 mm), the intermediate zoom position (focal length f=37.67 mm), and the telephoto end (focal length f=88.13 mm), respectively, in a state in which focus is at the object at infinity. The zoom lens according to Embodiment 19 has a zoom ratio of 4.87, an F-number of 3.77 (4.12 at telephoto end), and an image pickup angle of view of 78.58 degrees at the wide angle end.

The zoom lens according to this Embodiment includes the auxiliary stop, but the aperture diameter of the aperture stop may be changed based on the zooming position without use of the auxiliary stop. In this embodiment, the respective lens units are configured to move as indicated by the arrows of FIG. 73 during zooming from the wide angle end to the telephoto end. The first lens unit is configured not to move for zooming, and the second, third, fourth, and fifth lens units are configured to move during zooming. Focusing is conducted with two lenses within the first lens unit, which are arranged closest to the image side. Further, the adjustment of the back focus can be conducted by moving the rearmost lens unit or a part of the lenses within the rearmost lens unit in the optical axis direction.

As shown in Table 3 along with arithmetic operation results of numerical value conditions for this Embodiment, the conditional expressions (1) to (7) and (21) to (24) are satisfied.

Embodiment 20

A zoom lens according to Embodiment 20 of the present invention includes, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power. The lens unit having a negative refractive power is arranged closest to the object side, to thereby suppress the increase in front lens diameter even when a wide angle is achieved. The lens units having a negative refractive power and the lens units having a positive refractive power are arranged alternately in the first to sixth lens units, to thereby allow efficient magnification varying by changing each interval between the lens units.

The zoom lens is configured to change the interval between adjacent lens units among the first, second, third, fourth, fifth, and sixth lens units during zooming, but the heavy first lens unit is fixed to prevent the increase in driving force required for zooming. The second lens unit is configured to move in order to conduct zooming by changing the interval between the second lens unit and the first lens unit configured not to move for zooming. The third lens unit positioned on the image side of the second lens unit configured to move may be fixed or may be configured to move. The fourth lens unit is configured to move in order to efficiently conduct zooming even when the third lens unit is fixed. The fifth lens unit is also configured to move in order to correct the spherical aberration and the field curvature during zooming by changing the interval between the fourth lens unit and the fifth lens unit. The lens units arranged on the image side of the fifth lens unit configured to move contribute to the magnification varying to a small extent, and therefore may include a fixed lens unit or may be all configured to move.

Figure 77:
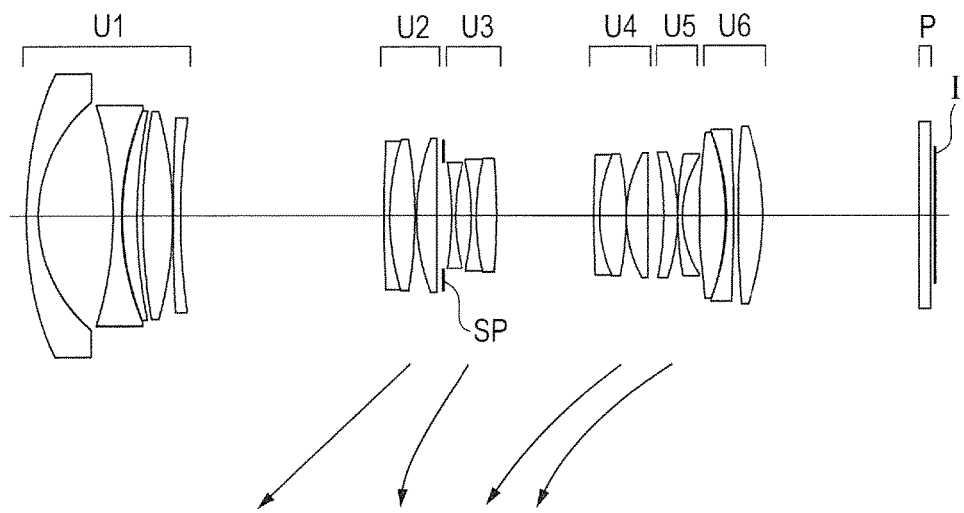
FIG. 77 is a lens cross-sectional view of a zoom lens according to Embodiment 20 (Numerical Embodiment 20) of the present invention at a wide angle end in a state in which focus is at infinity.

FIG. 77 is a lens cross-sectional view for illustrating the first lens unit U1, the second lens unit U2, the third lens unit U3, the fourth lens unit U4, the fifth lens unit U5, the sixth lens unit U6, an aperture stop SP, a glass block P, e.g., a low-pass filter or a face plate of a CCD, and an image plane I.

More specifically, the zoom lens is configured as follows in order from the object side to the image side. The first lens unit U1 corresponds to the first to tenth surfaces, and includes a concave meniscus negative lens, a biconcave negative lens, a meniscus positive lens concave on the image side, a biconvex lens, and a meniscus negative lens concave on the image side. The second lens unit U2 corresponds to the eleventh to fifteenth surfaces, and includes a cemented lens of a meniscus negative lens concave on the image side and a biconvex lens, and a meniscus negative lens concave on the image side. The aperture stop is included as the sixteenth surface. The third lens unit U3 corresponds to the seventeenth to twenty-first surfaces, and includes a biconcave lens and a cemented lens of a biconcave lens and a biconvex lens. The fourth lens unit U4 corresponds to the twenty-second to twenty-sixth surfaces, and includes a cemented lens of a meniscus negative lens concave on the image side and a biconvex lens, and a biconvex lens. The fifth lens unit U5 corresponds to the twenty-seventh to thirtieth surfaces, and includes a meniscus positive lens convex on the image side and a meniscus negative lens concave on the image side. The sixth lens unit U6 corresponds to the thirty-first to thirty-sixth surfaces, and includes a biconvex lens, a meniscus negative lens convex on the image side, and a biconvex lens.

Figure 78:
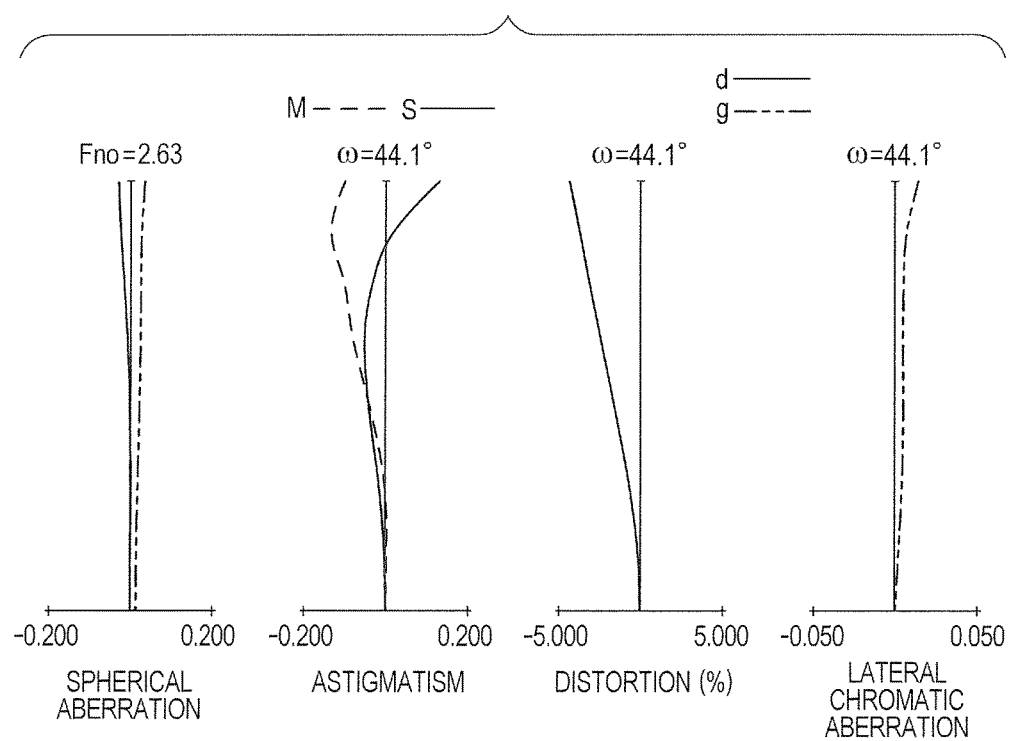
FIG. 78 is an aberration diagram in a state in which focus is at infinity at the wide angle end according to Numerical Embodiment 20.
Figure 79:
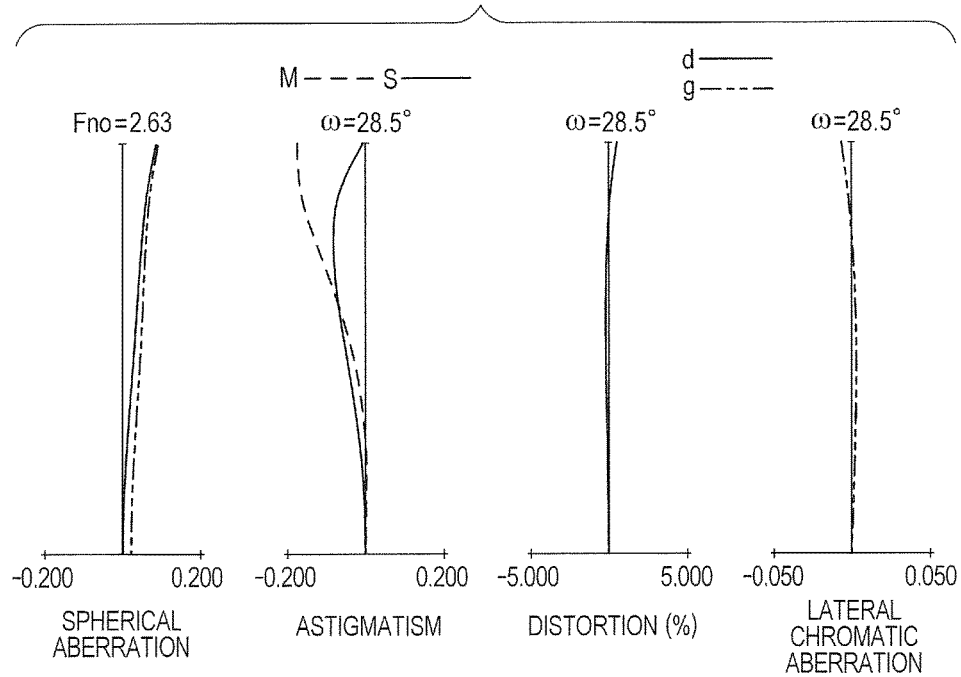
FIG. 79 is an aberration diagram in a state in which focus is at infinity at an intermediate focal length according to Numerical Embodiment 20.
Figure 80:
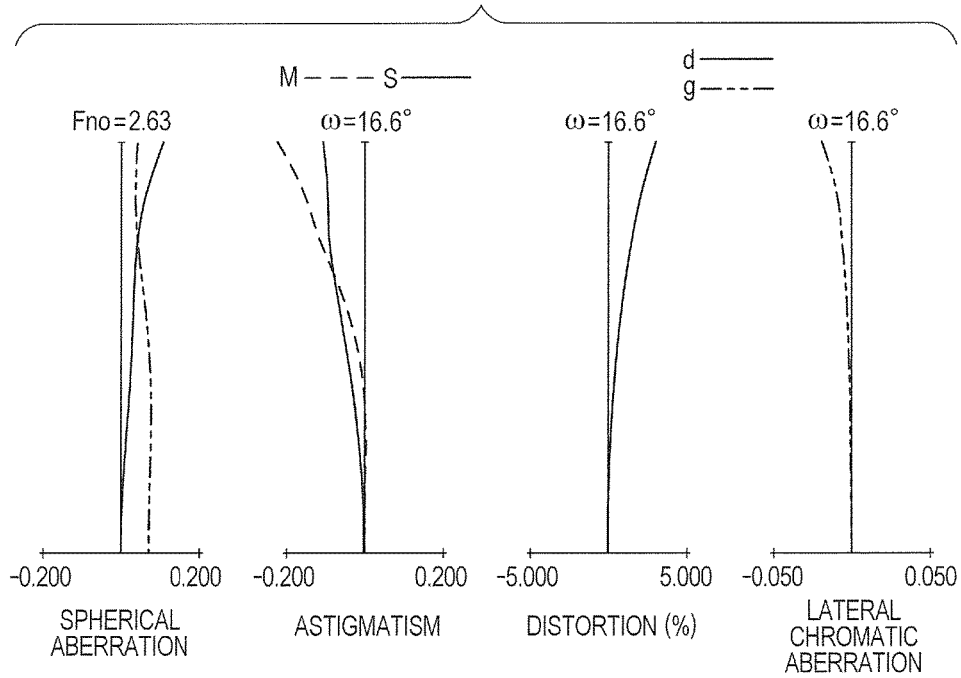
FIG. 80 is an aberration diagram in a state in which focus is at infinity at a telephoto end according to Numerical Embodiment 20.

FIG. 77 is a lens cross-sectional view of the zoom lens according to Embodiment 20 at the wide angle end (focal length f=15.97 mm) in a state in which focus is at the object at infinity. FIG. 78, FIG. 79, and FIG. 80 are aberration diagrams of Embodiment 20 at the wide angle end (focal length f=15.97 mm), the intermediate zoom position (focal length f=27.11 mm), and the telephoto end (focal length f=48.20 mm), respectively, in a state in which focus is at the object at infinity. The zoom lens according to Embodiment 20 has a zoom ratio of 3.02, an F-number of 2.63, and an image pickup angle of view of 85.66 degrees at the wide angle end.

In this embodiment, the respective lens units are configured to move as indicated by the arrows of FIG. 77 during zooming from the wide angle end to the telephoto end. The first lens unit is configured not to move for zooming, and the second, third, fourth, and fifth lens units are configured to move during zooming. Focusing is conducted with two lenses within the first lens unit, which are arranged closest to the image side. Further, the adjustment of the back focus can be conducted by moving the rearmost lens unit or a part of the lenses within the rearmost lens unit in the optical axis direction.

As shown in Table 3 along with arithmetic operation results of numerical value conditions for this Embodiment, the conditional expressions (21) to (24) are satisfied.

Embodiment 21

A zoom lens according to Embodiment 21 of the present invention includes, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power. The lens unit having a negative refractive power is arranged closest to the object side, to thereby suppress the increase in front lens diameter even a wide angle is achieved. The lens units having a negative refractive power and the lens units having a positive refractive power are arranged alternately in the first to sixth lens units, to thereby allow efficient magnification varying by changing each interval between the lens units.

The zoom lens is configured to change the interval between adjacent lens units among the first, second, third, fourth, fifth, and sixth lens units during zooming, but the heavy first lens unit is fixed to prevent the increase in driving force required for zooming. The second lens unit is configured to move in order to conduct zooming by changing the interval between the second lens unit and the first lens unit configured not to move for zooming. The third lens unit positioned on the image side of the second lens unit configured to move may be fixed or may be configured to move. The fourth lens unit is configured to move in order to efficiently conduct zooming even when the third lens unit is fixed. The fifth lens unit is also configured to move in order to correct the spherical aberration and the field curvature during zooming by changing the interval between the fourth lens unit and the fifth lens unit. The lens units arranged on the image side of the fifth lens unit configured to move contribute to the magnification varying to a small extent, and therefore may include a fixed lens unit or may be all configured to move.

Figure 81:
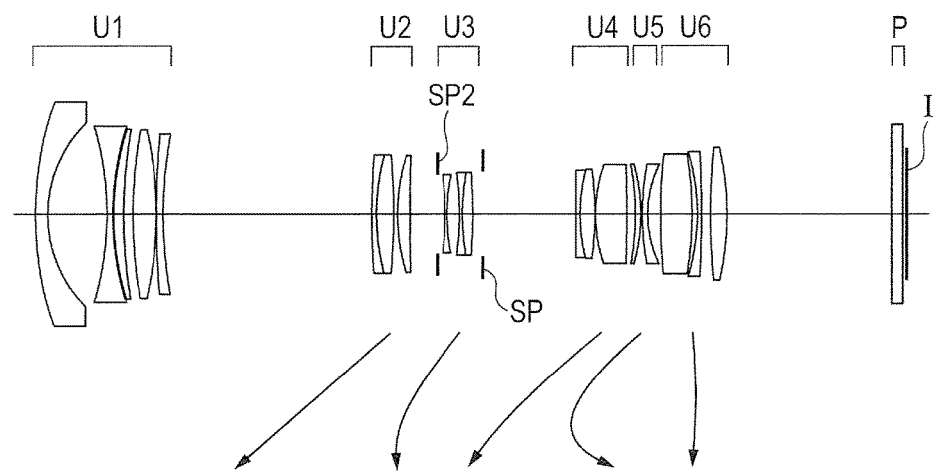
FIG. 81 is a lens cross-sectional view of a zoom lens according to Embodiment 21 (Numerical Embodiment 21) of the present invention at a wide angle end in a state in which focus is at infinity.

FIG. 81 is a lens cross-sectional view for illustrating the first lens unit U1, the second lens unit U2, the third lens unit U3, the fourth lens unit U4, the fifth lens unit U5, the sixth lens unit U6, an aperture stop SP, an auxiliary stop SP2 configured to change the aperture diameter in order to determine the open F-number, a glass block P, e.g., a low-pass filter or a face plate of a CCD, and an image plane I.

More specifically, the first lens unit U1 including the following components in order from the object side to the image side corresponds to the first to tenth surfaces, and includes a meniscus negative lens having a concave surface on the image side, a biconcave negative lens, a meniscus positive lens having a surface concave on the image side, a biconvex lens, and a meniscus negative lens having a surface concave on the image side. The second lens unit U2 corresponds to the eleventh to fifteenth surfaces, and includes a cemented lens of a meniscus negative lens concave on the image side and a biconvex lens and a meniscus positive lens concave on the image side. The auxiliary stop SP2 is included as the sixteenth surface. The third lens unit U3 corresponds to the seventeenth to twenty-first surfaces, and includes a biconcave lens and a cemented lens of a biconcave lens and a biconvex lens. The aperture stop SP is included as the twenty-second surface. The fourth lens unit U4 corresponds to the twenty-third to twenty-seventh surfaces, and includes a cemented lens of a meniscus negative lens concave on the image side and a biconvex lens and a biconvex lens. The fifth lens unit U5 corresponds to the twenty-eighth to thirty-first surfaces, and includes a meniscus positive lens convex on the image side and a meniscus negative lens concave on the image side. The sixth lens unit U6 corresponds to the thirty-second to thirty-seventh surfaces, and includes a biconvex lens, a meniscus negative lens convex on the image side, and a biconvex lens.

Figure 82:
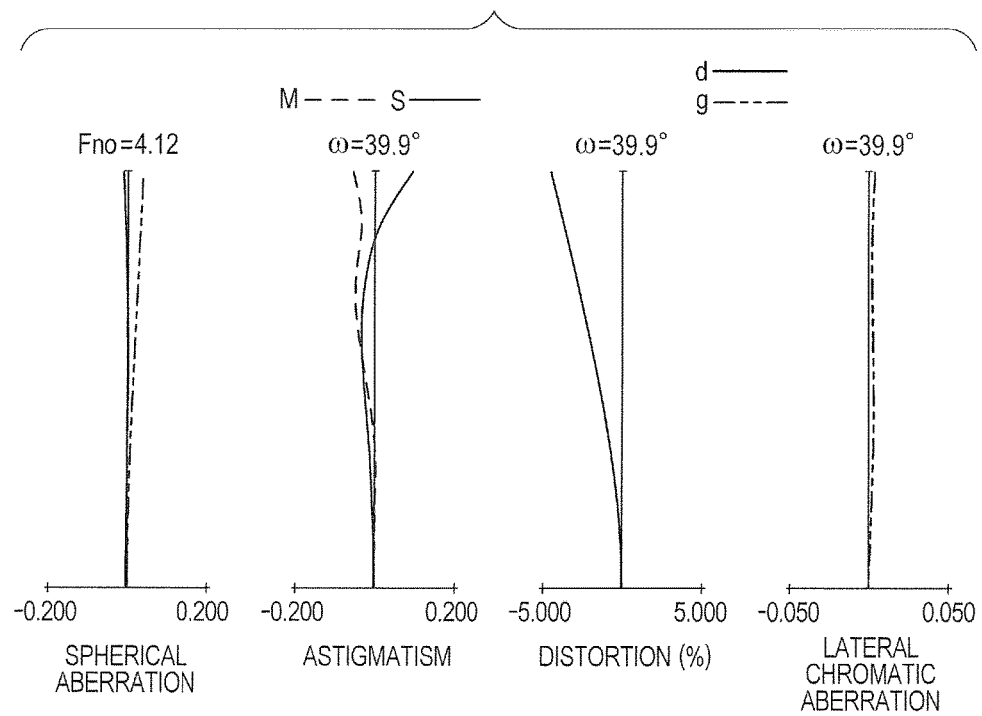
FIG. 82 is an aberration diagram in a state in which focus is at infinity at the wide angle end according to Numerical Embodiment 21.
Figure 83:
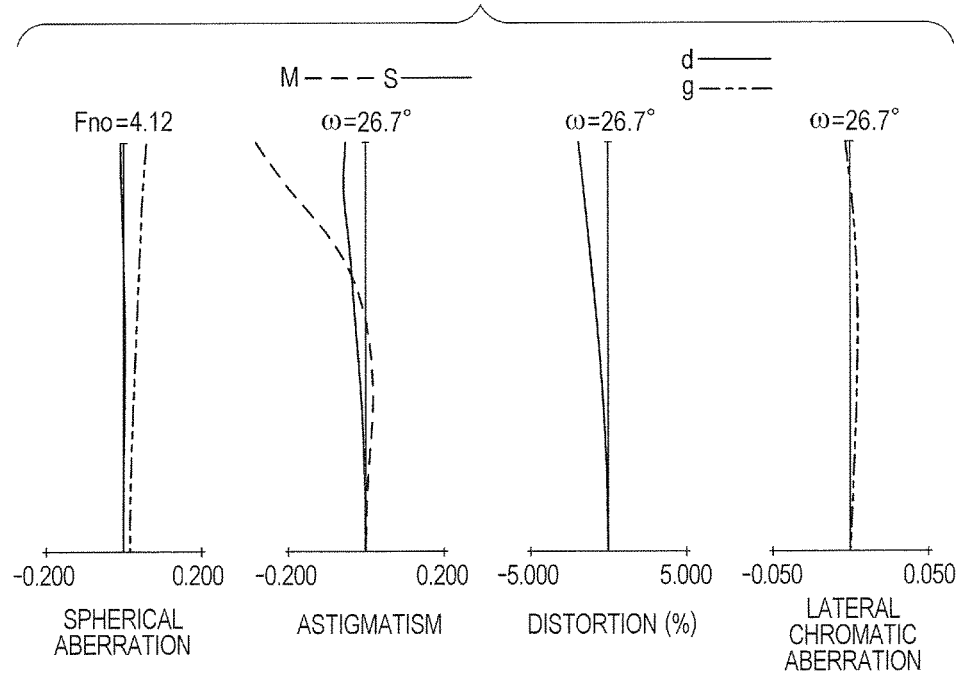
FIG. 83 is an aberration diagram in a state in which focus is at infinity at an intermediate focal length according to Numerical Embodiment 21.
Figure 84:
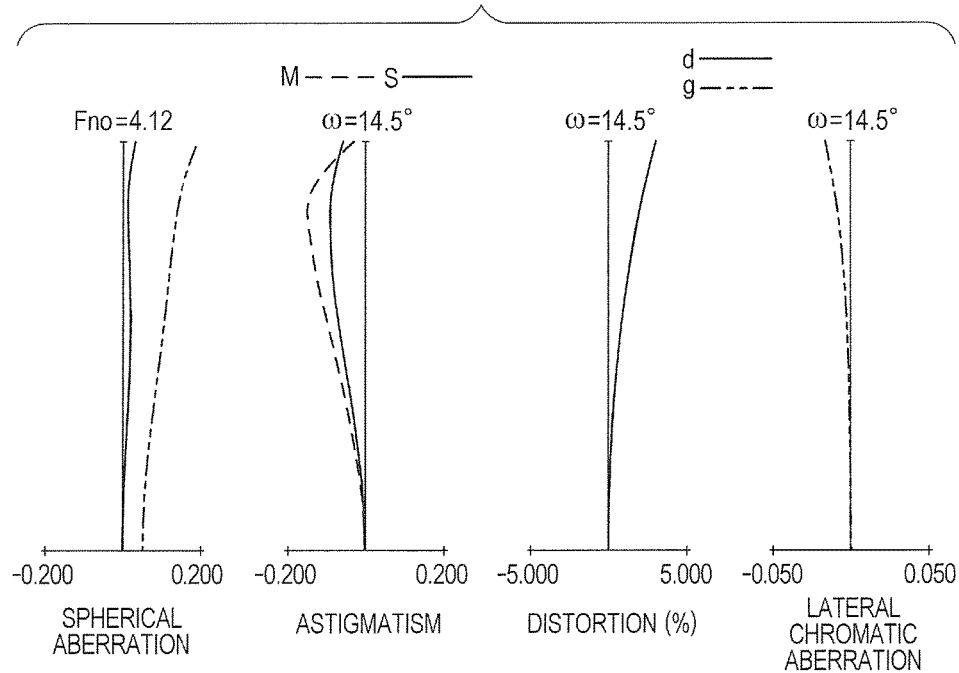
FIG. 84 is an aberration diagram in a state in which focus is at infinity at a telephoto end according to Numerical Embodiment 21.

FIG. 81 is a lens cross-sectional view of the zoom lens according to Embodiment 21 at the wide angle end (focal length f=18.54 mm) in a state in which focus is at the object at infinity. FIG. 82, FIG. 83, and FIG. 84 are aberration diagrams of Embodiment 21 at the wide angle end (focal length f=18.54 mm), the intermediate zoom position (focal length f=30.01 mm), and the telephoto end (focal length f=55.50 mm), respectively, in a state in which focus is at the object at infinity. The zoom lens according to Embodiment 21 has a zoom ratio of 2.99, an F-number of 4.12, and an image pickup angle of view of 77.20 degrees at the wide angle end.

The zoom lens according to this Embodiment includes the auxiliary stop, but the aperture diameter of the aperture stop may be changed based on the zooming position without use of the auxiliary stop. In this embodiment, the respective lens units are configured to move as indicated by the arrows of FIG. 81 during zooming from the wide angle end to the telephoto end. The first lens unit is configured not to move for zooming, and the second, third, fourth, fifth, and sixth lens units are configured to move during zooming. Focusing is conducted with two lenses within the first lens unit, which are arranged closest to the image side. Further, the adjustment of the back focus can be conducted by moving the rearmost lens unit or a part of the lenses within the rearmost lens unit in the optical axis direction. In this Embodiment, the lens unit arranged closest to the image side is configured to move during zooming, but in order to fix an amount of adjustment of the back focus irrespective of the zooming position, it is desired that the lens unit arranged closest to the image side be configured not to move for zooming.

As shown in Table 3 along with arithmetic operation results of numerical value conditions for this Embodiment, the conditional expressions (1) to (6) and (21) to (24) are satisfied.

Embodiment 22

A zoom lens according to Embodiment 22 of the present invention includes, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power. The lens unit having a negative refractive power is arranged closest to the object side, to thereby suppress the increase in front lens diameter even when a wide angle is achieved. The lens units having a negative refractive power and the lens units having a positive refractive power are arranged alternately in the first to sixth lens units, to thereby allow efficient magnification varying by changing each interval between the lens units.

The zoom lens is configured to change the interval between adjacent lens units among the first, second, third, fourth, fifth, and sixth lens units during zooming, but the heavy first lens unit is fixed to prevent the increase in driving force required for zooming. The second lens unit is configured to move in order to conduct zooming by changing the interval between the second lens unit and the first lens unit configured not to move for zooming. The third lens unit positioned on the image side of the second lens unit configured to move may be fixed or may be configured to move. The fourth lens unit is configured to move in order to efficiently conduct zooming even when the third lens unit is fixed. The fifth lens unit is also configured to move in order to correct the spherical aberration and the field curvature during zooming by changing the interval between the fourth lens unit and the fifth lens unit. The lens units arranged on the image side of the fifth lens unit configured to move contribute to the magnification varying to a small extent, and therefore may include a fixed lens unit or may be all configured to move.

Figure 85:
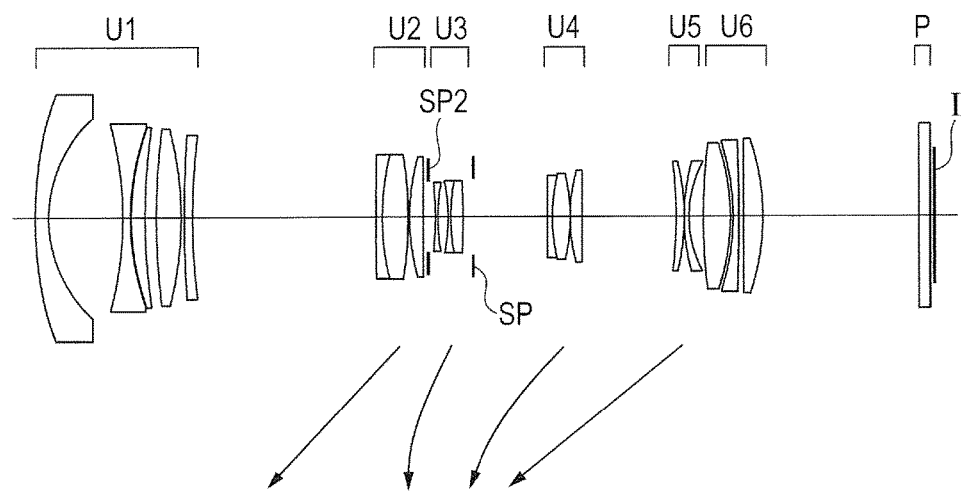
FIG. 85 is a lens cross-sectional view of a zoom lens according to Embodiment 22 (Numerical Embodiment 22) of the present invention at a wide angle end in a state in which focus is at infinity.

FIG. 85 is a lens cross-sectional view for illustrating the first lens unit U1, the second lens unit U2, the third lens unit U3, the fourth lens unit U4, the fifth lens unit U5, the sixth lens unit U6, an aperture stop SP, an auxiliary stop SP2 configured to change the aperture diameter in order to determine the open F-number, a glass block P, e.g., a low-pass filter or a face plate of a CCD, and the image plane I.

More specifically, the zoom lens according to this Embodiment includes the following components in order from the object side to the image side. The first lens unit U1 corresponds to the first to tenth surfaces, and includes, in order from the object side, a meniscus negative lens concave on the image side, a biconcave negative lens, a meniscus positive lens concave on the image side, a biconvex lens, and a meniscus negative lens concave on the image side. The second lens unit U2 corresponds to the eleventh to fifteenth surfaces, and includes a cemented lens of a meniscus negative lens concave on the image side and a biconvex lens and a meniscus convex lens concave on the image side. The auxiliary stop SP2 is included as the sixteenth surface. The third lens unit U3 corresponds to the seventeenth to twenty-first surfaces, and includes a biconcave lens and a cemented lens of a biconcave lens and a biconvex lens. The aperture stop SP is included as the twenty-second surface. The fourth lens unit U4 corresponds to the twenty-third to twenty-seventh surfaces, and includes a cemented lens of a meniscus negative lens concave on the image side and a biconvex lens and a biconvex lens. The fifth lens unit U5 corresponds to the twenty-eighth to thirty-first surfaces, and includes a meniscus positive lens convex on the image side and a meniscus negative lens concave on the image side. The sixth lens unit U6 corresponds to the thirty-second to thirty-seventh surfaces, and includes a biconvex lens, a meniscus negative lens convex on the image side, and a biconvex lens.

Figure 86:
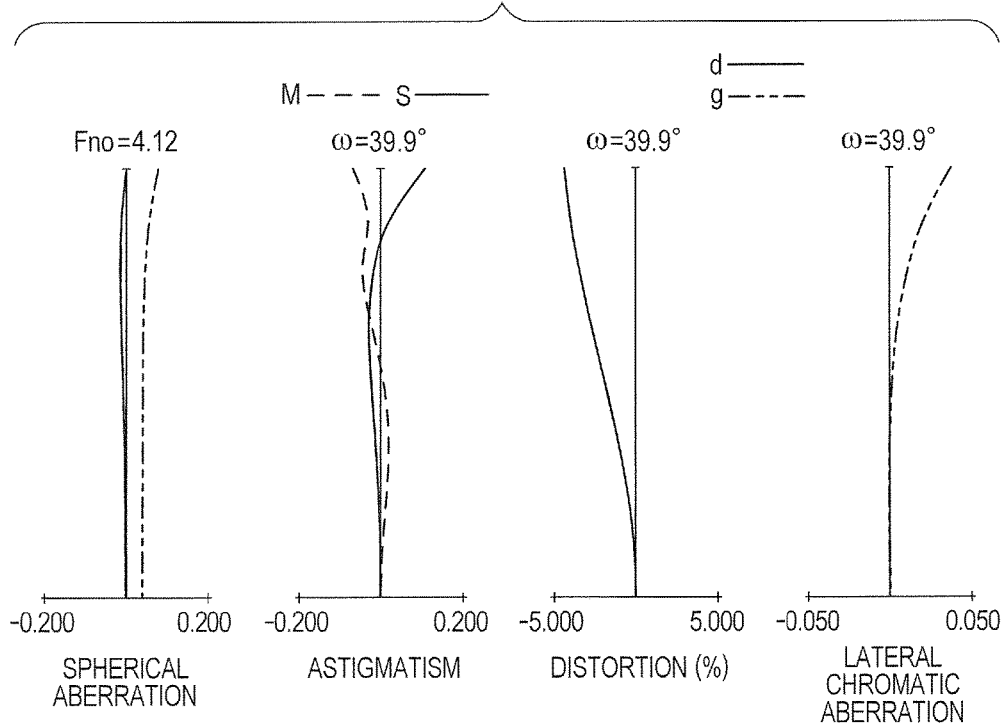
FIG. 86 is an aberration diagram in a state in which focus is at infinity at the wide angle end according to Numerical Embodiment 22.
Figure 87:
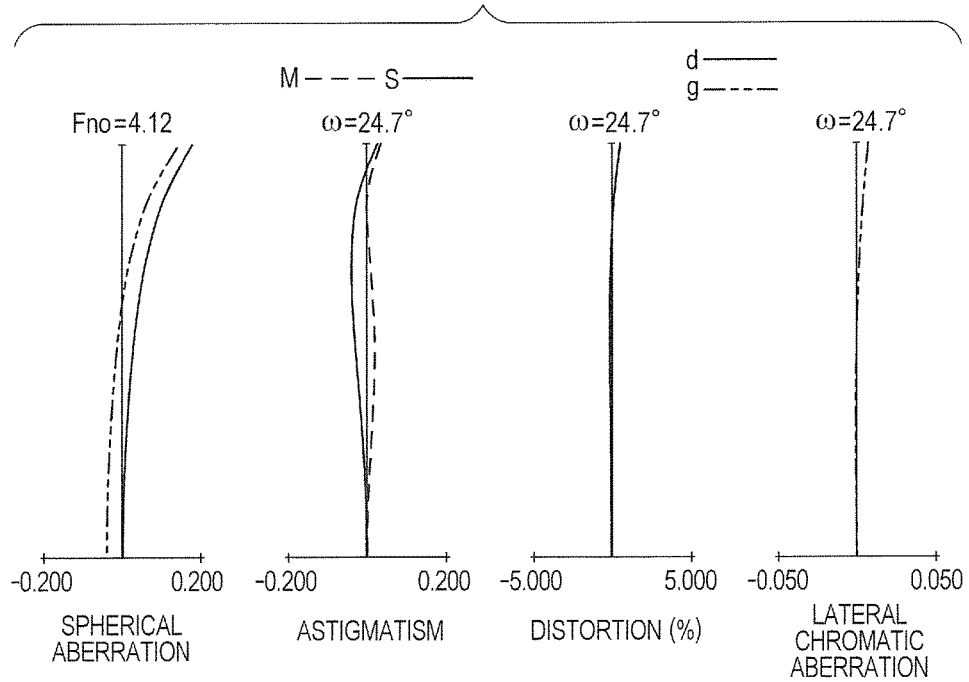
FIG. 87 is an aberration diagram in a state in which focus is at infinity at an intermediate focal length according to Numerical Embodiment 22.
Figure 88:
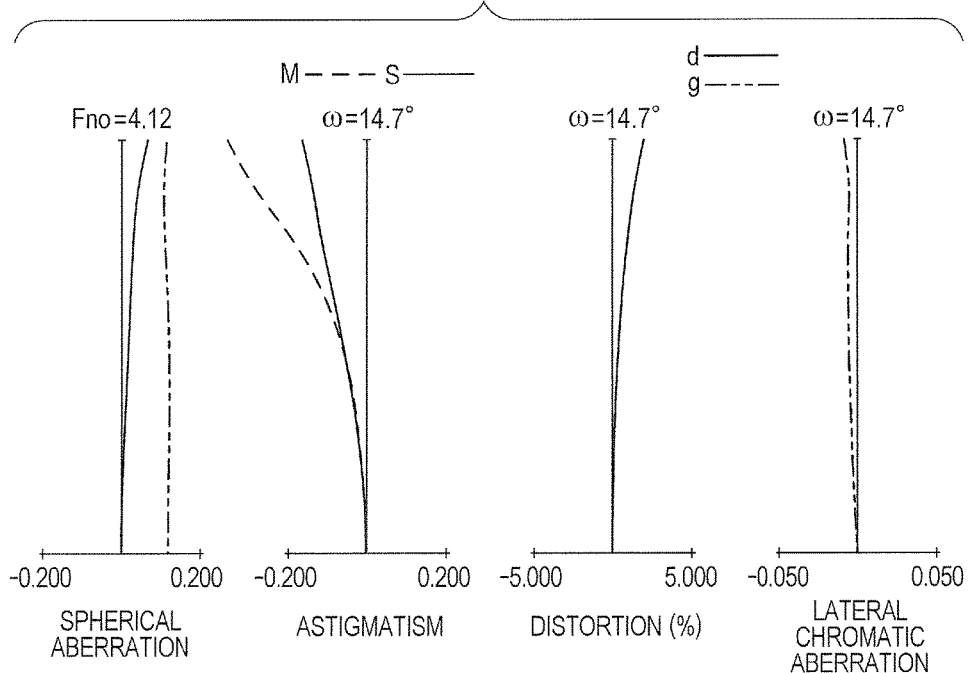
FIG. 88 is an aberration diagram in a state in which focus is at infinity at a telephoto end according to Numerical Embodiment 22.

FIG. 85 is a lens cross-sectional view of the zoom lens according to Embodiment 22 at the wide angle end (focal length f=18.52 mm) in a state in which focus is at the object at infinity. FIG. 86, FIG. 87, and FIG. 88 are aberration diagrams of Embodiment 22 at the wide angle end (focal length f=18.52 mm), the intermediate zoom position (focal length f=32.01 mm), and the telephoto end (focal length f=55.19 mm), respectively, in a state in which focus is at the object at infinity. The zoom lens according to Embodiment 22 has a zoom ratio of 2.98, an F-number of 4.12, and an image pickup angle of view of 77.26 degrees at the wide angle end.

The zoom lens according to this Embodiment includes the auxiliary stop, but the aperture diameter of the aperture stop may be changed based on the zooming position without use of the auxiliary stop. In this embodiment, the respective lens units are configured to move as indicated by the arrows of FIG. 85 during zooming from the wide angle end to the telephoto end. The first lens unit is configured not to move for zooming, and the second, third, fourth, and fifth lens units are configured to move during zooming. Focusing is conducted with two lenses included in the first lens unit, which are arranged closest to the image side. Further, the adjustment of the back focus can be conducted by moving the rearmost lens unit or a part of the lenses within the rearmost lens unit in the optical axis direction.

As shown in Table 3 along with arithmetic operation results of numerical value conditions for this Embodiment, the conditional expressions (1), (3) to (6), and (21) to (24) are satisfied.

Embodiment 23

A zoom lens according to Embodiment 23 of the present invention includes, in order from the object side to the image side, a first lens unit having a negative refractive power, a second lens unit having a positive refractive power, a third lens unit having a negative refractive power, a fourth lens unit having a positive refractive power, a fifth lens unit having a negative refractive power, a sixth lens unit having a positive refractive power, and a seventh lens unit having a positive refractive power. The lens unit having a negative refractive power is arranged closest to the object side, to thereby suppress the increase in front lens diameter even when a wide angle is achieved. The lens units having a negative refractive power and the lens units having a positive refractive power are arranged alternately in the first to sixth lens units, to thereby allow efficient magnification varying by changing each interval between the lens units.

The zoom lens is configured to change the interval between adjacent lens units among the first, second, third, fourth, fifth, sixth, and seventh lens units during zooming, but the heavy first lens unit is fixed to prevent the increase in driving force required for zooming. The second lens unit is configured to move in order to conduct zooming by changing the interval between the second lens unit and the first lens unit configured not to move for zooming. The third lens unit positioned on the image side of the second lens unit configured to move may be fixed or may be configured to move. The fourth lens unit is configured to move in order to efficiently conduct zooming even when the third lens unit is fixed. The fifth lens unit is also configured to move in order to correct the spherical aberration and the field curvature during zooming by changing the interval between the fourth lens unit and the fifth lens unit. The lens units arranged on the image side of the fifth lens unit configured to move contribute to the magnification varying to a small extent, and therefore may include a fixed lens unit or may be all configured to move.

Figure 89:
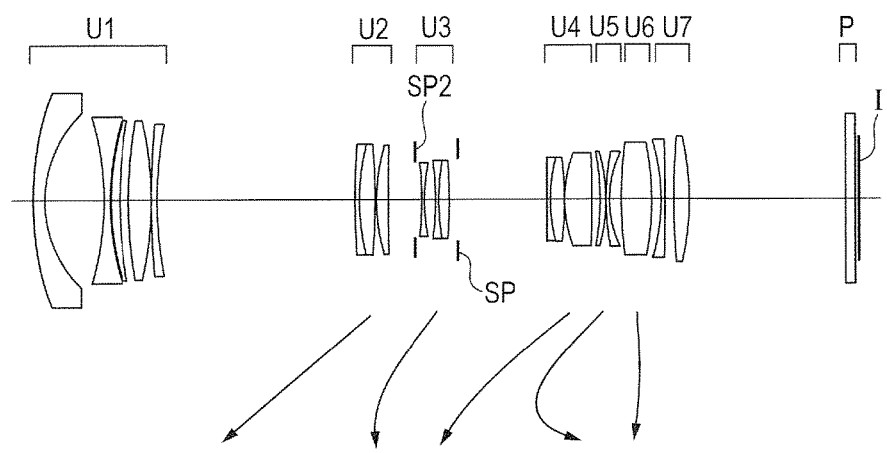
FIG. 89 is a lens cross-sectional view of a zoom lens according to Embodiment 23 (Numerical Embodiment 23) of the present invention at a wide angle end in a state in which focus is at infinity.

FIG. 89 is a lens cross-sectional view for illustrating the first lens unit U1, the second lens unit U2, the third lens unit U3, the fourth lens unit U4, the fifth lens unit U5, the sixth lens unit U6, the seventh lens unit U7, an aperture stop SP, an auxiliary stop SP2 configured to change the aperture diameter in order to determine the open F-number, a glass block P, e.g., a low-pass filter or a face plate of a CCD, and an image plane I.

More specifically, the zoom lens is configured as follows in order from the object side to the image side. The first lens unit U1 corresponds to the first to tenth surfaces, and includes a concave meniscus negative lens, a biconcave lens, a meniscus positive lens concave on the image side, a biconvex lens, and a meniscus negative lens concave on the image side. The second lens unit U2 corresponds to the eleventh to fifteenth surfaces, and includes a cemented lens of a meniscus negative lens concave on the image side and a biconvex lens and a meniscus positive lens concave on the image side. The auxiliary stop SP2 is included as the sixteenth surface. The third lens unit U3 corresponds to the seventeenth to twenty-first surfaces, and includes a biconcave lens and a cemented lens of a biconcave lens and a biconvex lens. The aperture stop SP is included as the twenty-second surface. The fourth lens unit U4 corresponds to the twenty-third to twenty-seventh surfaces, and includes a cemented lens of a meniscus negative lens concave on the image side and a biconvex lens and a biconvex lens. The fifth lens unit U5 corresponds to the twenty-eighth to thirty-first surfaces, and includes a meniscus positive lens convex on the image side and a meniscus negative lens concave on the image side. The sixth lens unit U6 corresponds to the thirty-second and thirty-third surfaces, and includes a biconvex lens. The seventh lens unit U7 corresponds to the thirty-fourth to thirty-seventh surfaces, and includes a meniscus negative lens having a surface convex on the image side and a biconvex lens.

Figure 90:
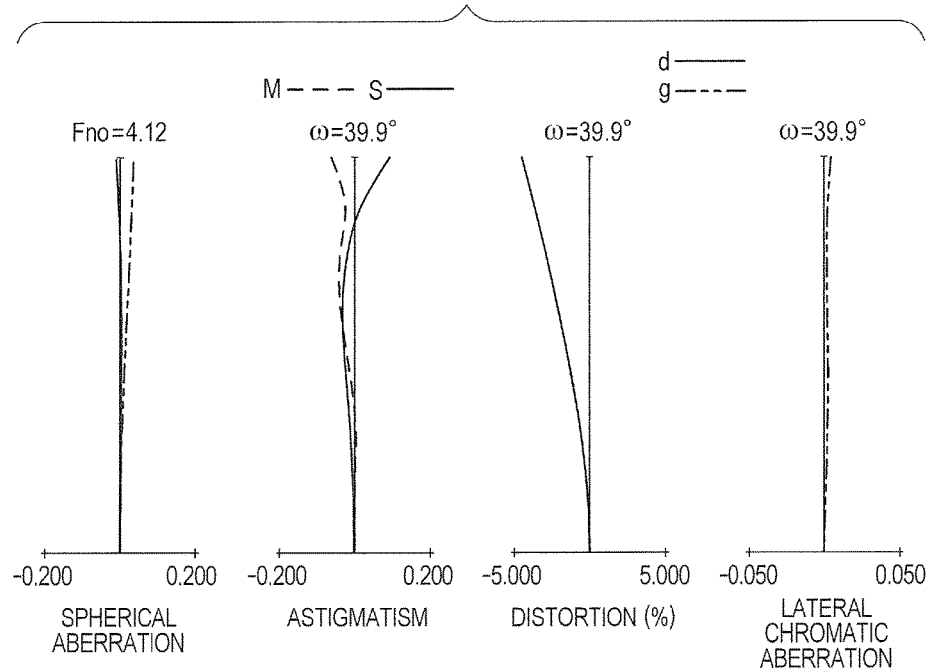
FIG. 90 is an aberration diagram in a state in which focus is at infinity at the wide angle end according to Numerical Embodiment 23.
Figure 91:
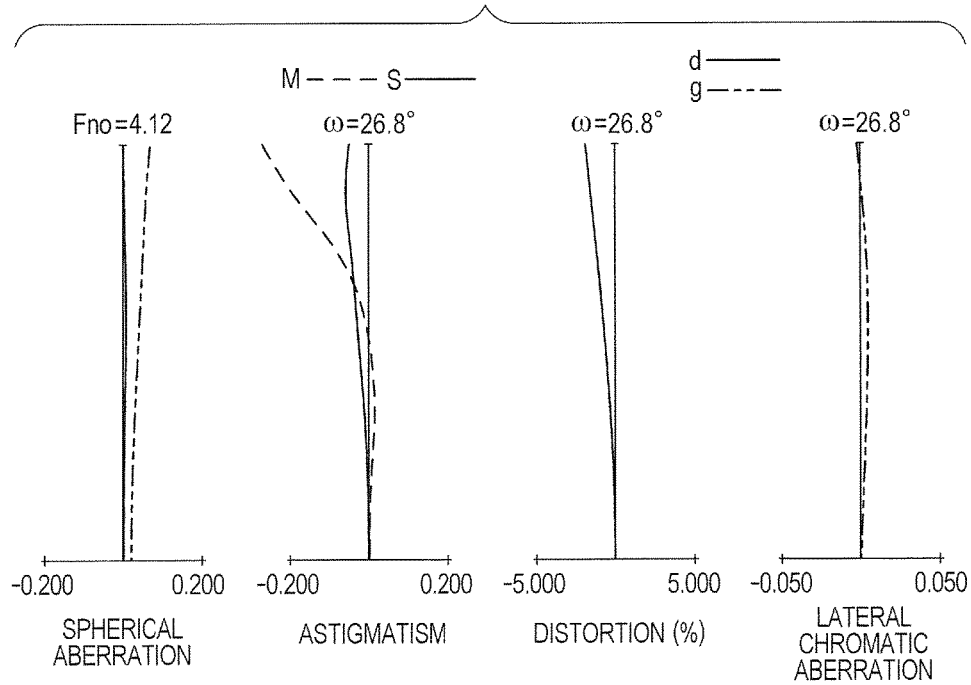
FIG. 91 is an aberration diagram in a state in which focus is at infinity at an intermediate focal length according to Numerical Embodiment 23.
Figure 92:
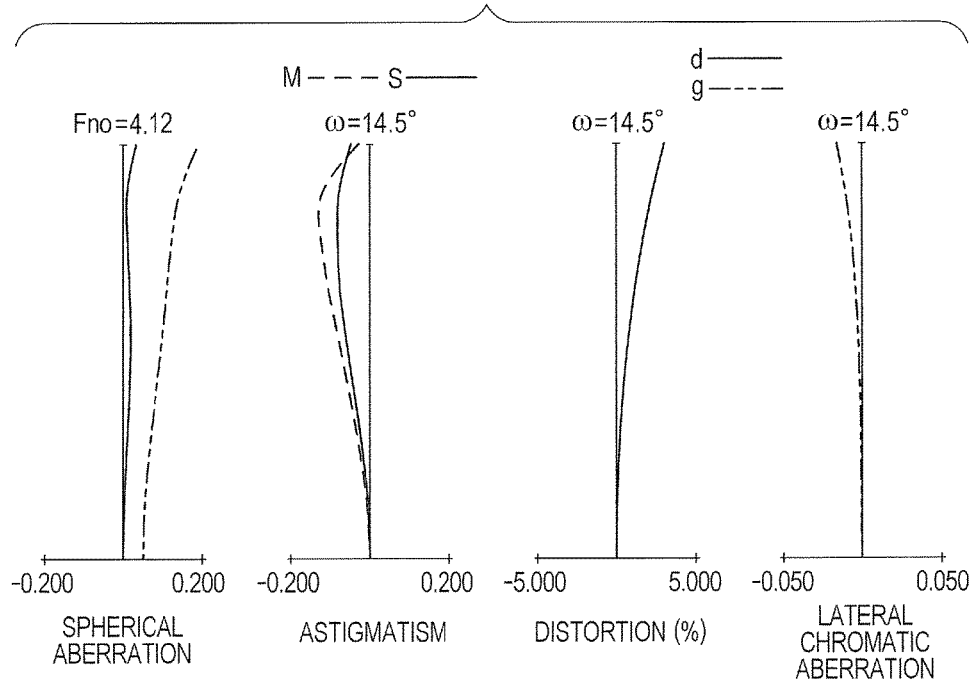
FIG. 92 is an aberration diagram in a state in which focus is at infinity at a telephoto end according to Numerical Embodiment 23.

FIG. 89 is a lens cross-sectional view of the zoom lens according to Embodiment 23 at the wide angle end (focal length f=18.54 mm) in a state in which focus is at the object at infinity. FIG. 90, FIG. 91, and FIG. 92 are aberration diagrams of Embodiment 23 at the wide angle end (focal length f=18.54 mm), the intermediate zoom position (focal length f=29.84 mm), and the telephoto end (focal length f=55.51 mm), respectively, in a state in which focus is at the object at infinity. The zoom lens according to Embodiment 23 has a zoom ratio of 2.99, an F-number of 4.12, and an image pickup angle of view of 77.20 degrees at the wide angle end.

The zoom lens according to this Embodiment includes the auxiliary stop, but the aperture diameter of the aperture stop may be changed based on the zooming position without use of the auxiliary stop. In this embodiment, the respective lens units are configured to move as indicated by the arrows of FIG. 89 during zooming from the wide angle end to the telephoto end. The first lens unit is configured not to move for zooming, and the second, third, fourth, fifth, and sixth lens units are configured to move during zooming. Focusing is conducted with two lenses within the first lens unit, which are arranged closest to the image side. Further, the adjustment of the back focus can be conducted by moving the rearmost lens unit or a part of the lenses within the rearmost lens unit in the optical axis direction.

As shown in Table 3 along with arithmetic operation results of numerical value conditions for this Embodiment, the conditional expressions (21) to (24) are satisfied.

In the following, Numerical Embodiments of the present invention are described.

Now, Numerical Embodiments 1 to 23 for Embodiments 1 to 23 of the present invention are described. In each of Numerical Embodiments, the order of a surface from the object side is represented by i, a curvature radius of the i-th surface from the object side is represented by ri, and an interval between the i-th surface and an (i+1)th surface from the object side is represented by di. A refractive index and an Abbe number of optical members between the i-th surface and the (i+1)th surface are represented by ndi and vdi, respectively. Surface numbers of aspherical surfaces are suffixed by asterisks (*). In Table 1, correspondences between each of Embodiments and the conditional expressions described above are shown.

When an X axis is set in the optical axis direction, an h axis is set in a direction perpendicular to the optical axis, a direction of travel of light is defined as positive, a paraxial curvature radius is represented by R, a conic constant is represented by k, and aspherical coefficients are represented by A4, A6, A8, A10, A12, A14, and A16, aspherical shapes are expressed as the following expression. Further, for example, "e–Z" means "$10^{-Z}$". A back focus is represented by BF.

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16}$$

In Embodiments 5 to 7 and 12 to 14, when a lens unit that is arranged closest to the object side and configured to move during zooming moves along a straight line connecting the wide angle end and the telephoto end, the lens unit configured to move during zooming moves by a movement amount following the mathematical expression provided below. Moreover, a lens unit that is arranged closest to the image side and configured to move during zooming moves for correcting an image plane variation accompanying zooming.

When the number of a lens unit is represented by j, a movement amount in the optical axis direction is represented by fj(y), the direction of travel of light is defined as positive, a movement amount y from the wide angle end to the telephoto end is set to 1, and movement coefficients are represented by Bj1, Bj2, Bj3, Bj4, Bj5, and Bj6, a movement amount is expressed by the following expression.

$$fj(y)=Bj1y+Bj2y^2+Bj3y^3+Bj4y^4+Bj5y^5+Bj6y^6$$

In so-called floating focus, in which two or more lens units are configured to move during focusing, when a lens unit that is arranged closest to the object side and configured to move during focusing moves along a straight line connecting an infinity end and a proximity end, the lens unit moves by a movement amount following the mathematical expression provided below.

When a number of a lens unit is represented by j, a movement amount in the optical axis direction is represented by gj(y), the direction of travel of light is defined as positive, a movement amount of the lens closest to the object side is represented by y, and a movement coefficient is represented by Cj, the movement amount is expressed by the following expression.

$$gj(y)=Cjy$$

Numerical Embodiment 1

| Unit mm | | | | |
| --- | --- | --- | --- | --- |
| Surface data | | | | |
| Surface number i | ri | di | ndi | vdi |
| 1* | 95.971 | 2.25 | 1.77250 | 49.6 |
| 2 | 25.008 | 18.76 | | |
| 3 | −46.148 | 2.24 | 1.59522 | 67.7 |
| 4 | −208.758 | 0.86 | | |
| 5 | 89.944 | 4.49 | 1.85478 | 24.8 |

-continued

Unit mm

| | | | | |
|---|---|---|---|---|
| 6 | −3,391.978 | 1.10 | | |
| 7 | 71.585 | 6.51 | 1.48749 | 70.2 |
| 8* | −112.413 | 7.72 | | |
| 9 | 1,244.744 | 1.48 | 1.85478 | 24.8 |
| 10 | 44.958 | 0.78 | | |
| 11 | 56.753 | 5.34 | 1.49700 | 81.5 |
| 12 | −117.331 | 0.17 | | |
| 13 | 72.173 | 5.31 | 1.72000 | 50.2 |
| 14 | −89.503 | (Variable) | | |
| 15 | 156.184 | 0.98 | 1.91082 | 35.3 |
| 16 | 28.295 | 2.14 | | |
| 17 | 342.322 | 0.90 | 1.58913 | 61.1 |
| 18 | 23.925 | 3.65 | 1.80809 | 22.8 |
| 19 | 195.693 | 1.79 | | |
| 20 | −41.778 | 0.91 | 1.80400 | 46.6 |
| 21 | −170.760 | (Variable) | | |
| 22 (Aperture stop) | ∞ | 1.50 | | |
| 23 (Auxiliary stop) | ∞ | (Variable) | | |
| 24 | 28.270 | 4.15 | 1.55332 | 71.7 |
| 25* | 156.238 | (Variable) | | |
| 26 | 40.158 | 1.23 | 1.85478 | 24.8 |
| 27 | 27.673 | 1.64 | | |
| 28 | 44.510 | 4.34 | 1.49700 | 81.5 |
| 29 | −57.595 | (Variable) | | |
| 30 | 106.538 | 0.99 | 2.00069 | 25.5 |
| 31 | 53.892 | 1.49 | | |
| 32 | 951.384 | 1.00 | 1.53996 | 59.5 |
| 33 | 31.516 | 2.40 | 1.95906 | 17.5 |
| 34 | 44.832 | 6.13 | | |
| 35 | 89.410 | 4.48 | 1.49700 | 81.5 |
| 36 | −65.111 | 0.17 | | |
| 37 | 97.933 | 5.81 | 1.49700 | 81.5 |
| 38 | −30.528 | 1.14 | 1.80610 | 33.3 |
| 39 | −119.681 | (Variable) | | |
| 40 | ∞ | 2.39 | 1.51633 | 64.1 |
| 41 | ∞ | 0.50 | | |
| 42 | ∞ | 1.00 | | |
| Image plane | ∞ | | | |

Aspherical surface data

First surface

K = 6.75370e+000    A4 = 1.49928e−006    A6 = −1.36094e−010
A8 = −2.25783e−012    A10 = 2.94187e−015    A12 = −1.92140e−018

Eighth surface

K = 7.11393e−001    A4 = 9.77054e−007    A6 = −7.78879e−010
A8 = −2.85446e−012    A10 = 5.55537e−015    A12 = −5.06973e−018

Twenty-fifth surface

K = −2.45680e+000    A4 = 7.68788e−006    A6 = −1.82317e−009
A8 = 2.96287e−011    A10 = −1.51304e−013    A12 = 2.06060e−016

Various data
Zoom ratio 4.29

| | | | |
|---|---|---|---|
| Focal length | 18.54 | 32.08 | 79.52 |
| F-number | 4.12 | 4.12 | 4.12 |
| Half angle of view | 38.60 | 24.77 | 10.54 |
| Image height | 14.80 | 14.80 | 14.80 |
| Total lens length | 221.38 | 221.38 | 221.38 |
| BF | 48.70 | 48.70 | 48.70 |
| d14 | 0.93 | 16.87 | 32.81 |
| d21 | 33.64 | 17.70 | 1.76 |
| d23 | 17.93 | 14.57 | 1.46 |
| d25 | 13.79 | 8.58 | 2.07 |
| d29 | 2.55 | 11.13 | 30.74 |
| d39 | 45.62 | 45.62 | 45.62 |

-continued

Unit mm

Zoom lens unit data

| Unit | First surface | Focal length |
|---|---|---|
| 1 | 1 | 51.80 |
| 2 | 15 | −28.12 |
| 3 | 22 | ∞ |
| 4 | 24 | 61.67 |
| 5 | 26 | 94.37 |
| 6 | 30 | 3,422.50 |
| 7 | 40 | ∞ |

Numerical Embodiment 2

Unit mm

Surface data

| Surface number i | ri | di | ndi | vdi |
|---|---|---|---|---|
| 1* | 69.375 | 2.40 | 1.58313 | 59.4 |
| 2 | 25.762 | 24.85 | | |
| 3 | −79.941 | 1.67 | 1.69680 | 55.5 |
| 4 | 71.806 | 0.17 | | |
| 5 | 61.521 | 3.25 | 1.80518 | 25.4 |
| 6 | 215.702 | (Variable) | | |
| 7 | 177.549 | 1.55 | 1.92286 | 18.9 |
| 8 | 49.395 | 4.27 | 1.80400 | 46.6 |
| 9 | −122.318 | 0.17 | | |
| 10 | 63.868 | 3.21 | 1.59522 | 67.7 |
| 11 | −208.494 | 0.17 | | |
| 12 | 59.430 | 2.89 | 1.49700 | 81.5 |
| 13 | −428.708 | (Variable) | | |
| 14 (Auxiliary stop) | ∞ | 1.50 | | |
| 15 | −46.620 | 0.70 | 1.77250 | 49.6 |
| 16 | 59.718 | 1.35 | | |
| 17 | −51.615 | 0.72 | 1.90043 | 37.4 |
| 18 | 27.561 | 2.62 | 1.92286 | 18.9 |
| 19 | −324.069 | 2.56 | | |
| 20 (Aperture stop) | ∞ | (Variable) | | |
| 21 | 62.849 | 0.80 | 1.77250 | 49.6 |
| 22 | 21.365 | 4.87 | 1.53775 | 74.7 |
| 23 | −40.044 | 0.17 | | |
| 24* | 28.094 | 3.18 | 1.49710 | 81.6 |
| 25* | −122.434 | (Variable) | | |
| 26 | 81.102 | 3.09 | 1.69680 | 55.5 |
| 27 | −32.436 | 0.17 | | |
| 28 | −39.287 | 0.80 | 1.63930 | 44.9 |
| 29 | 19.795 | (Variable) | | |
| 30 | 48.924 | 5.79 | 1.49700 | 81.5 |
| 31 | −36.092 | 0.17 | | |
| 32 | −41.516 | 1.11 | 1.62588 | 35.7 |
| 33 | −1,352.163 | (Variable) | | |
| 34 | ∞ | 2.39 | 1.51633 | 64.1 |
| 35 | ∞ | 0.50 | | |
| 36 | ∞ | 1.00 | | |
| Image plane | ∞ | | | |

Aspherical surface data

First surface

K = 2.65155e+000    A4 = 1.43592e−006    A6 = −1.45741e−010
A8 = 1.74224e−013

-continued

Unit mm

Twenty-fourth surface

K = 6.48243e−001  A4 = −4.64544e−006  A6 = 2.87036e−011
A8 = 2.63846e−011

Twenty-fifth surface

K = −8.47515e+001  A4 = −2.24737e−007  A6 = 1.92717e−008
A8 = 3.74377e−011

Various data
Zoom ratio 4.15

| | | | |
|---|---|---|---|
| Focal length | 18.54 | 35.72 | 77.00 |
| F-number | 4.12 | 4.12 | 4.12 |
| Half angle of view | 38.60 | 22.50 | 10.88 |
| Image height | 14.80 | 14.80 | 14.80 |
| Total lens length | 178.77 | 178.77 | 178.77 |
| BF | 39.44 | 39.44 | 39.44 |
| d6 | 41.08 | 21.52 | 1.97 |
| d13 | 0.84 | 10.10 | 27.81 |
| d20 | 14.65 | 8.80 | 2.10 |
| d25 | 6.32 | 4.73 | 7.49 |
| d29 | 2.24 | 19.96 | 25.75 |
| d33 | 36.36 | 36.36 | 36.36 |

Zoom lens unit data

| Unit | First surface | Focal length |
|---|---|---|
| 1 | 1 | −38.29 |
| 2 | 7 | 33.15 |
| 3 | 14 | −22.85 |
| 4 | 21 | 27.88 |
| 5 | 26 | −56.80 |
| 6 | 30 | 106.33 |
| 7 | 34 | ∞ |

Numerical Embodiment 3

Unit mm

Surface data

| Surface number i | ri | di | ndi | vdi |
|---|---|---|---|---|
| 1* | 201.032 | 3.57 | 1.73077 | 40.5 |
| 2 | 27.038 | 18.68 | | |
| 3 | −178.651 | 2.06 | 1.73400 | 51.5 |
| 4 | 155.792 | 0.17 | | |
| 5 | 62.603 | 7.06 | 1.89286 | 20.4 |
| 6 | 203.565 | 1.99 | | |
| 7 | 117.879 | 9.25 | 1.59522 | 67.7 |
| 8* | −148.955 | 9.43 | | |
| 9 | 291.720 | 1.59 | 1.90270 | 31.0 |
| 10 | 30.366 | 10.56 | 1.49700 | 81.5 |
| 11 | −156.526 | 0.35 | | |
| 12 | 52.574 | 7.47 | 1.64850 | 53.0 |
| 13 | −61.857 | (Variable) | | |
| 14 | −160.128 | 0.99 | 1.88300 | 40.8 |
| 15 | 25.707 | 4.99 | | |
| 16 | −49.237 | 1.14 | 1.43875 | 94.9 |
| 17 | 31.343 | 5.06 | 1.85478 | 24.8 |
| 18 | 741.898 | (Variable) | | |
| 19 (Aperture stop) | ∞ | (Variable) | | |
| 20 | −46.003 | 1.27 | 1.53775 | 74.7 |
| 21 | −80.576 | (Variable) | | |
| 22 | 34.999 | 6.09 | 1.59270 | 35.3 |
| 23* | 162.682 | 11.40 | | |
| 24 | 61.362 | 1.17 | 1.95906 | 17.5 |
| 25 | 32.318 | 6.25 | 1.48749 | 70.2 |

-continued

Unit mm

| | | | | |
|---|---|---|---|---|
| 26 | −45.582 | (Variable) | | |
| 27 | −565.123 | 4.67 | 1.95906 | 17.5 |
| 28 | −26.967 | 1.39 | 1.90270 | 31.0 |
| 29 | 57.592 | 4.13 | | |
| 30 | 66.364 | 4.64 | 1.48749 | 70.2 |
| 31 | −58.857 | 0.17 | | |
| 32 | 46.998 | 6.16 | 1.49700 | 81.5 |
| 33 | −42.805 | 1.18 | 2.00069 | 25.5 |
| 34 | 2,793.827 | (Variable) | | |
| 35 | ∞ | 2.39 | 1.51633 | 64.1 |
| 36 | ∞ | 1.00 | | |
| Image plane | ∞ | | | |

Aspherical surface data

First surface

K = 3.00774e+001  A4 = 2.05021e−006  A6 = −7.25063e−010
A8 = −5.54040e−013  A10 = 2.01958e−015  A12 = −3.58602e−018
A14 = 3.05968e−021  A16 = −1.05802e−024

Eighth surface

K = −1.28249e−001  A4 = 9.99030e−007  A6 = −4.91783e−010
A8 = −3.88175e−012  A10 = 1.26529e−014  A12 = −3.32029e−017
A14 = 4.83260e−020  A16 = −2.94324e−023

Twenty-third surface

K = 4.03999e+001  A4 = 5.32482e−006  A6 = −9.26453e−010
A8 = 9.19090e−012  A10 = −3.97424e−014

Various data
Zoom ratio 4.31

| | | | |
|---|---|---|---|
| Focal length | 17.03 | 46.18 | 73.36 |
| F-number | 4.12 | 4.12 | 4.12 |
| Half angle of view | 41.00 | 17.77 | 11.41 |
| Image height | 14.80 | 14.80 | 14.80 |
| Total lens length | 261.21 | 261.21 | 261.21 |
| BF | 58.90 | 58.90 | 58.90 |
| d13 | 1.00 | 27.33 | 33.91 |
| d18 | 35.20 | 8.87 | 2.29 |
| d19 | 15.53 | 5.15 | 5.23 |
| d21 | 7.62 | 9.68 | 1.00 |
| d26 | 10.10 | 18.41 | 27.01 |
| d34 | 56.33 | 56.33 | 56.33 |

Zoom lens unit data

| Unit | First surface | Focal length |
|---|---|---|
| 1 | 1 | 41.25 |
| 2 | 14 | −27.99 |
| 3 | 19 | ∞ |
| 4 | 20 | −201.96 |
| 5 | 22 | 45.25 |
| 6 | 27 | 2,000.00 |
| 7 | 35 | ∞ |

Numerical Embodiment 4

Unit mm

Surface data

| Surface number i | ri | di | ndi | vdi |
|---|---|---|---|---|
| 1* | 142.107 | 2.97 | 1.77250 | 49.6 |
| 2 | 30.833 | 19.23 | | |
| 3 | −214.418 | 2.25 | 1.63854 | 55.4 |
| 4 | 193.318 | 0.17 | | |
| 5 | 61.723 | 6.53 | 1.84666 | 23.8 |
| 6 | 125.558 | 1.26 | | |

-continued

Unit mm

| | | | | |
|---|---|---|---|---|
| 7 | 97.080 | 5.98 | 1.58313 | 59.4 |
| 8* | −189.724 | 11.66 | | |
| 9 | 245.465 | 1.71 | 1.80000 | 29.8 |
| 10 | 35.310 | 9.71 | 1.49700 | 81.5 |
| 11 | −162.533 | 0.17 | | |
| 12 | 65.776 | 8.03 | 1.63854 | 55.4 |
| 13 | −77.715 | (Variable) | | |
| 14 | −91.062 | 0.99 | 1.83481 | 42.7 |
| 15 | 28.912 | 3.84 | | |
| 16 | −42.067 | 1.19 | 1.49700 | 81.5 |
| 17 | 30.945 | 3.61 | 1.85478 | 24.8 |
| 18 | 474.495 | (Variable) | | |
| 19 (Aperture stop) | ∞ | (Variable) | | |
| 20* | 34.929 | 5.84 | 1.58313 | 59.4 |
| 21* | 188.561 | 7.42 | | |
| 22 | 62.689 | 1.29 | 2.00069 | 25.5 |
| 23 | 32.976 | 6.65 | 1.48749 | 70.2 |
| 24 | −41.767 | (Variable) | | |
| 25 | −110.109 | 3.39 | 1.95906 | 17.5 |
| 26 | −27.760 | 1.09 | 1.85478 | 24.8 |
| 27 | 110.961 | (Variable) | | |
| 28 | 155.225 | 3.89 | 1.48749 | 70.2 |
| 29 | −71.770 | 12.40 | | |
| 30 | 56.836 | 6.63 | 1.49700 | 81.5 |
| 31 | −39.229 | 1.25 | 1.91082 | 35.3 |
| 32 | −795.036 | (Variable) | | |
| 33 | ∞ | 2.39 | 1.51633 | 64.1 |
| 34 | ∞ | 1.00 | | |
| Image plane | ∞ | | | |

Aspherical surface data

First surface

K = 9.60256e+000　A4 = 9.02841e−007　A6 = 6.57246e−010
A8 = −2.34864e−012　A10 = 3.36885e−015　A12 = −2.34122e−018
A14 = 6.42583e−022　A16 = −2.10451e−026

Eighth surface

K = −7.19297e+001　A4 = −4.48892e−007　A6 = 1.30222e−009
A8 = −2.14328e−012　A10 = 1.12728e−015　A12 = 6.02779e−019
A14 = −6.86578e−022　A16 = −3.24205e−025

Twentieth surface

K = 3.22915e+000　A4 = −7.43684e−006　A6 = −1.64141e−008
A8 = −4.87770e−011　A10 = −4.23427e−014　A12 = −2.24623e−016
A14 = −3.93621e−018　A16 = 6.48189e−021

Twenty-first surface

K = 1.62572e+002　A4 = 6.39763e−006　A6 = 5.31874e−010
A8 = −4.54040e−011　A10 = 1.44685e−013　A12 = −5.92999e−016
A14 = 5.71689e−019　A16 = −1.89487e−020

Various data
Zoom ratio 5.49

| | | | |
|---|---|---|---|
| Focal length | 18.54 | 56.09 | 101.76 |
| F-number | 4.12 | 4.12 | 4.12 |
| Half angle of view | 38.60 | 14.78 | 8.28 |
| Image height | 14.80 | 14.80 | 14.80 |
| Total lens length | 256.18 | 256.18 | 256.18 |
| BF | 42.19 | 42.19 | 42.19 |
| d13 | 1.00 | 28.34 | 35.17 |
| d18 | 36.53 | 9.19 | 2.36 |
| d19 | 24.21 | 16.90 | 2.97 |
| d24 | 2.79 | 15.03 | 25.59 |
| d27 | 20.31 | 15.37 | 18.74 |
| d32 | 39.61 | 39.61 | 39.61 |

Zoom lens unit data

| Unit | First surface | Focal length |
|---|---|---|
| 1 | 1 | 48.32 |
| 2 | 14 | −24.83 |

-continued

Unit mm

| | | |
|---|---|---|
| 3 | 19 | ∞ |
| 4 | 20 | 43.10 |
| 5 | 25 | −78.50 |
| 6 | 28 | 99.75 |
| 7 | 33 | ∞ |

Numerical Embodiment 5

Unit mm

Surface data

| Surface number i | ri | di | ndi | vdi | Effective diameter |
|---|---|---|---|---|---|
| 1 | 151.182 | 2.85 | 1.77250 | 49.6 | 51.61 |
| 2 | 37.054 | 11.23 | | | 44.62 |
| 3 | −108.262 | 2.38 | 1.77250 | 49.6 | 43.97 |
| 4 | 306.424 | 5.44 | | | 43.69 |
| 5 | 79.631 | 4.06 | 1.85478 | 24.8 | 43.84 |
| 6 | 428.229 | 1.27 | | | 43.46 |
| 7 | 213.865 | 4.94 | 1.59522 | 67.7 | 42.77 |
| 8 | −119.863 | 8.00 | | | 42.14 |
| 9 | 144.587 | 1.90 | 1.85478 | 24.8 | 35.38 |
| 10 | 42.296 | 4.59 | 1.49700 | 81.5 | 33.61 |
| 11 | 170.717 | 0.47 | | | 33.21 |
| 12 | 78.853 | 4.98 | 1.59522 | 67.7 | 32.91 |
| 13 | −101.573 | 0.19 | | | 32.36 |
| 14 | 46.628 | 3.84 | 1.58913 | 61.1 | 31.64 |
| 15 | 174.884 | (Variable) | | | 30.99 |
| 16* | ∞ | 1.33 | 1.88300 | 40.8 | 21.46 |
| 17 | 25.235 | 2.74 | | | 19.23 |
| 18 | 232.123 | 1.14 | 1.53775 | 74.7 | 18.62 |
| 19 | 24.583 | 3.03 | 1.85478 | 24.8 | 18.89 |
| 20 | 131.571 | 4.19 | | | 18.80 |
| 21 | −33.021 | 1.14 | 1.53775 | 74.7 | 18.83 |
| 22 | 172.990 | (Variable) | | | 19.42 |
| 23 (Aperture Stop) | ∞ | (Variable) | | | 20.01 |
| 24 | 48.026 | 3.01 | 1.58313 | 59.4 | 21.00 |
| 25* | 1,306.064 | (Variable) | | | 21.14 |
| 26 | 46.277 | 3.67 | 1.49700 | 81.5 | 21.81 |
| 27 | −154.226 | 0.19 | | | 22.01 |
| 28 | 69.084 | 1.57 | 1.88300 | 40.8 | 22.13 |
| 29 | 26.494 | 4.70 | 1.49700 | 81.5 | 21.80 |
| 30 | −93.642 | (Variable) | | | 21.97 |
| 31 | 44.710 | 1.57 | 1.48749 | 70.2 | 22.24 |
| 32 | 26.789 | 10.58 | | | 21.86 |
| 33 | 133.694 | 4.86 | 1.43875 | 94.9 | 23.78 |
| 34 | −31.673 | 1.78 | 1.88300 | 40.8 | 23.97 |
| 35 | −59.962 | 50.01 | | | 24.72 |
| Image plane | ∞ | | | | |

Aspherical surface data

Sixteenth surface

K = −2.37744e+009　A4 = 2.06174e−006　A6 = −1.42423e−009
A8 = −4.74999e−012

Twenty-fifth surface

K = 0.00000e+000　A4 = 4.59584e−006　A6 = 2.07147e−010
A8 = −1.15848e−012

Zoom movement amount data

B21 = 23.66823
B311 = −4.76378　B312 = 24.32548　B313 = 15.97729
B314 = −99.12101　B315 = 68.59309　B316 = −14.78897

-continued

Unit mm

Focus movement amount data

| | |
|---|---|
| Movement amount of U12 | 5.16022 |
| C13 = −0.77175 | |

Various data
Zoom ratio 5.00

| | Wide angle | Intermediate | Telephoto |
|---|---|---|---|
| Focal length | 24.00 | 53.14 | 120.00 |
| F-number | 5.60 | 5.60 | 5.60 |
| Half angle of view | 32.94 | 16.31 | 7.38 |
| Image height | 15.55 | 15.55 | 15.55 |
| Total lens length | 220.06 | 220.06 | 220.06 |
| BF | 50.01 | 50.01 | 50.01 |
| d15 | 1.33 | 17.90 | 25.00 |
| d22 | 25.43 | 8.86 | 1.76 |
| d23 | 11.12 | 11.17 | 1.34 |
| d25 | 22.55 | 12.90 | 0.98 |
| d30 | 7.97 | 17.56 | 39.31 |
| Entrance pupil position | 39.31 | 55.29 | 63.23 |
| Exit pupil position | −122.49 | −90.25 | −66.14 |
| Front principal point position | 59.97 | 88.30 | 59.26 |
| Rear principal point position | 26.01 | −3.14 | −69.99 |

Zoom lens unit data

| Unit | First surface | Focal length | Lens structure length | Front principal point position | Rear principal point position |
|---|---|---|---|---|---|
| 1 | 1 | 46.00 | 56.15 | 41.35 | 19.58 |
| 2 | 16 | −20.00 | 13.57 | 3.92 | −5.81 |
| 3 | 23 | ∞ | 0.00 | 0.00 | 0.00 |
| 4 | 24 | 85.09 | 3.01 | −0.07 | −1.97 |
| 5 | 26 | 57.85 | 10.13 | 1.53 | −5.21 |
| 6 | 31 | −379.11 | 18.79 | −17.55 | −35.46 |

Single lens data

| Lens | First surface | Focal length |
|---|---|---|
| 1 | 1 | −63.93 |
| 2 | 3 | −102.81 |
| 3 | 5 | 112.75 |
| 4 | 7 | 129.31 |
| 5 | 9 | −69.88 |
| 6 | 10 | 111.47 |
| 7 | 12 | 75.09 |
| 8 | 14 | 106.32 |
| 9 | 16 | −28.41 |
| 10 | 18 | −51.07 |
| 11 | 19 | 34.58 |
| 12 | 21 | −51.30 |
| 13 | 24 | 85.09 |
| 14 | 26 | 71.85 |
| 15 | 28 | −49.24 |
| 16 | 29 | 41.98 |
| 17 | 31 | −140.69 |
| 18 | 33 | 58.74 |
| 19 | 34 | −77.89 |

Numerical Embodiment 6

Unit mm

Surface data

| Surface number i | ri | di | ndi | vdi | Effective diameter |
|---|---|---|---|---|---|
| 1* | 65.303 | 1.70 | 1.80100 | 35.0 | 49.05 |
| 2 | 24.818 | 11.07 | | | 40.26 |
| 3 | 827.587 | 1.20 | 1.80100 | 35.0 | 39.75 |
| 4 | 66.619 | 5.75 | | | 38.61 |
| 5 | −70.568 | 1.20 | 1.61800 | 63.3 | 38.60 |
| 6 | 991.530 | 0.20 | | | 39.35 |
| 7 | 82.201 | 4.68 | 2.00069 | 25.5 | 40.16 |
| 8 | −326.872 | 1.15 | | | 40.02 |
| 9 | 110.763 | 3.48 | 1.59522 | 67.7 | 39.10 |
| 10* | −429.302 | 9.59 | | | 38.69 |
| 11 | 64.145 | 1.00 | 1.85478 | 24.8 | 34.03 |
| 12 | 33.449 | 6.07 | 1.43875 | 94.9 | 33.58 |
| 13 | 251.523 | 0.20 | | | 34.00 |
| 14 | 79.048 | 5.59 | 1.49700 | 81.5 | 34.54 |
| 15 | −177.233 | 0.20 | | | 34.76 |
| 16 | 153.550 | 4.76 | 1.72916 | 54.7 | 34.80 |
| 17 | −78.097 | (Variable) | | | 34.65 |
| 18 | −270.879 | 0.80 | 1.88300 | 40.8 | 23.31 |
| 19 | 30.151 | 4.21 | | | 22.59 |
| 20 | −69.579 | 0.80 | 1.65160 | 58.5 | 22.92 |
| 21 | 268.975 | 1.59 | | | 23.55 |
| 22 | 48.249 | 4.62 | 1.85478 | 24.8 | 25.38 |
| 23 | −89.785 | 0.80 | 1.77250 | 49.6 | 25.47 |
| 24 | 64.341 | (Variable) | | | 25.57 |
| 25 (Aperture stop) | ∞ | (Variable) | | | 26.46 |
| 26* | 37.838 | 4.39 | 1.58313 | 59.4 | 28.00 |
| 27 | −293.530 | 0.20 | | | 27.95 |
| 28 | 92.127 | 2.62 | 1.65160 | 58.5 | 27.77 |
| 29 | −1,462.645 | 1.00 | 1.74950 | 35.3 | 27.49 |
| 30 | 77.003 | (Variable) | | | 27.09 |
| 31 | 54.510 | 1.00 | 2.00069 | 25.5 | 26.90 |
| 32 | 39.212 | 1.00 | | | 26.45 |
| 33 | 58.977 | 4.08 | 1.48749 | 70.2 | 26.49 |
| 34 | −82.461 | (Variable) | | | 26.43 |
| 35 | 80.352 | 3.32 | 1.95906 | 17.5 | 27.34 |
| 36 | −207.144 | 1.83 | | | 27.20 |
| 37 | −138.477 | 1.00 | 1.85478 | 24.8 | 26.73 |
| 38 | 45.409 | 1.30 | | | 26.50 |
| 39 | 58.043 | 5.70 | 1.59522 | 67.7 | 26.89 |
| 40 | −45.171 | 1.60 | 1.72047 | 34.7 | 27.06 |
| 41 | −14,897.747 | 10.72 | | | 27.50 |
| 42 | −634.337 | 5.75 | 1.43875 | 94.9 | 29.68 |
| 43 | −32.789 | 1.00 | 2.00100 | 29.1 | 30.04 |
| 44 | −57.248 | 51.00 | | | 31.03 |
| Image plane | ∞ | | | | |

Aspherical surface data

First surface

K = −2.55264e−001  A4 = 1.52446e−006  A6 = 3.70002e−010
A8 = −1.76324e−013

Tenth surface

K = −3.63095e+001  A4 = 1.61251e−006  A6 = −4.24700e−010
A8 = −9.14016e−013

Twenty-sixth surface

K = 5.35918e−001  A4 = −4.47817e−006  A6 = −1.20201e−009
A8 = −2.26122e−012

Zoom movement amount data

B21 = 19.58464
B311 = 3.72449    B312 = −17.34816    B313 = 15.38325
B314 = −24.42959  B315 = 14.48850     B316 = −6.24911

-continued

Unit mm

Various data
Zoom ratio 3.00

|  | Wide angle | Intermediate | Telephoto |
|---|---|---|---|
| Focal length | 28.00 | 46.66 | 84.00 |
| F-number | 4.00 | 4.50 | 4.50 |
| Half angle of view | 37.69 | 24.87 | 14.44 |
| Image height | 21.63 | 21.63 | 21.63 |
| Total lens length | 235.02 | 235.02 | 235.02 |
| BF | 51.00 | 51.00 | 51.00 |
| d17 | 0.98 | 12.73 | 20.57 |
| d24 | 23.17 | 11.42 | 3.59 |
| d25 | 14.84 | 11.82 | 1.41 |
| d30 | 25.05 | 15.18 | 4.43 |
| d34 | 2.80 | 15.69 | 36.85 |
| Entrance pupil position | 31.32 | 37.27 | 41.66 |
| Exit pupil position | −100.85 | −84.93 | −72.71 |
| Front principal point position | 54.15 | 67.91 | 68.62 |
| Rear principal point position | 23.00 | 4.35 | −33.00 |

Zoom lens unit data

| Unit | First surface | Focal length | Lens structure length | Front principal point position | Rear principal point position |
|---|---|---|---|---|---|
| 1 | 1 | 38.68 | 57.84 | 40.83 | 29.07 |
| 2 | 18 | −25.82 | 12.83 | 1.38 | −7.87 |
| 3 | 25 | ∞ | 0.00 | 0.00 | −0.00 |
| 4 | 26 | 65.55 | 8.21 | −1.53 | −6.44 |
| 5 | 31 | 139.23 | 6.07 | 3.47 | −0.80 |
| 6 | 35 | −4,432.96 | 32.23 | 242.63 | 204.86 |

Single lens data

| Lens | First surface | Focal length |
|---|---|---|
| 1 | 1 | −50.59 |
| 2 | 3 | −89.91 |
| 3 | 5 | −106.16 |
| 4 | 7 | 65.41 |
| 5 | 9 | 147.76 |
| 6 | 11 | −82.25 |
| 7 | 12 | 86.97 |
| 8 | 14 | 110.47 |
| 9 | 16 | 71.31 |
| 10 | 18 | −30.51 |
| 11 | 20 | −84.41 |
| 12 | 22 | 36.94 |
| 13 | 23 | −48.18 |
| 14 | 26 | 57.53 |
| 15 | 28 | 132.56 |
| 16 | 29 | −96.92 |
| 17 | 31 | −143.05 |
| 18 | 33 | 70.97 |
| 19 | 35 | 59.91 |
| 20 | 37 | −39.53 |
| 21 | 39 | 43.42 |
| 22 | 40 | −62.46 |
| 23 | 42 | 78.38 |
| 24 | 43 | −77.65 |

Numerical Embodiment 7

Unit mm

Surface data

| Surface number i | ri | di | ndi | vdi | Effective diameter |
|---|---|---|---|---|---|
| 1* | 97.792 | 2.70 | 1.77250 | 49.6 | 53.27 |
| 2 | 29.474 | 15.34 |  |  | 43.47 |
| 3 | −56.318 | 1.98 | 1.77250 | 49.6 | 42.47 |
| 4 | 256.814 | 1.68 |  |  | 42.77 |
| 5 | 75.034 | 2.96 | 1.89286 | 20.4 | 43.60 |
| 6 | 121.200 | 2.03 |  |  | 43.30 |
| 7 | 134.312 | 7.69 | 1.62041 | 60.3 | 43.27 |
| 8 | −76.682 | 0.20 |  |  | 42.88 |
| 9 | 109.133 | 1.89 | 1.85478 | 24.8 | 39.65 |
| 10 | 40.897 | 6.51 | 1.49700 | 81.5 | 37.59 |
| 11 | 1,047.450 | 3.57 |  |  | 38.11 |
| 12 | 115.553 | 5.76 | 1.59522 | 67.7 | 40.10 |
| 13 | −97.158 | 0.18 |  |  | 40.30 |
| 14 | 57.813 | 4.39 | 1.76385 | 48.5 | 39.78 |
| 15 | 272.396 | (Variable) |  |  | 39.22 |
| 16* | 126.593 | 1.26 | 1.88300 | 40.8 | 24.15 |
| 17 | 25.583 | 4.21 |  |  | 22.23 |
| 18 | −89.927 | 1.08 | 1.59522 | 67.7 | 22.37 |
| 19 | 30.964 | 4.01 | 1.85478 | 24.8 | 23.12 |
| 20 | −241.861 | 2.97 |  |  | 23.18 |
| 21 | −38.064 | 1.08 | 1.76385 | 48.5 | 23.17 |
| 22 | −424.205 | (Variable) |  |  | 23.91 |
| 23 (Aperture stop) | ∞ | (Variable) |  |  | 24.76 |
| 24 | 37.406 | 3.24 | 1.59522 | 67.7 | 26.48 |
| 25* | 97.863 | (Variable) |  |  | 26.43 |
| 26 | 86.583 | 4.63 | 1.49700 | 81.5 | 27.37 |
| 27 | −61.314 | 0.18 |  |  | 27.42 |
| 28 | 74.947 | 1.49 | 2.00100 | 29.1 | 26.85 |
| 29 | 37.523 | 4.89 | 1.49700 | 81.5 | 26.12 |
| 30 | −147.368 | (Variable) |  |  | 25.89 |
| 31 | 37.376 | 2.81 | 1.95906 | 17.5 | 25.89 |
| 32 | 88.563 | 1.49 | 2.00069 | 25.5 | 25.39 |
| 33 | 33.580 | 5.36 |  |  | 24.37 |
| 34 | 459.108 | 3.75 | 1.48749 | 70.2 | 24.55 |
| 35 | −45.965 | 0.18 |  |  | 24.60 |
| 36 | 132.563 | 5.48 | 1.49700 | 81.5 | 24.00 |
| 37 | −25.588 | 1.68 | 1.95375 | 32.3 | 23.54 |
| 38 | 1,781.582 | 43.52 |  |  | 23.90 |
| Image plane | ∞ |  |  |  |  |

Aspherical surface data

First surface

K = 5.58587e+000   A4 = 6.89166e−008   A6 = 1.67536e−010
A8 = −7.81810e−013

Sixteenth surface

K = 0.00000e+000   A4 = 1.99972e−007   A6 = −1.99181e−009
A8 = 6.32825e−013

Twenty-fifth surface

K = 0.00000e+000   A4 = 6.56253e−006   A6 = −6.81552e−011
A8 = 2.40306e−012

Zoom movement amount data

B21 = 28.55285
Bsp1 = 10.44733   Bsp2 = −18.81152   Bsp3 = −7.30782
Bsp4 = 4.06481   Bsp5 = 11.94457   Bsp6 = −9.34884E−006
B311 = −0.95657   B312 = 21.01994   B313 = 17.62048
B314 = −93.71109   B315 = 62.61010   B316 = −14.01060

-continued

Unit mm

Various data
Zoom ratio 4.74

|  | Wide angle | Intermediate | Telephoto |
|---|---|---|---|
| Focal length | 19.00 | 39.17 | 90.00 |
| F-number | 4.00 | 4.00 | 4.00 |
| Half angle of view | 39.30 | 21.65 | 9.80 |
| Image height | 15.55 | 15.55 | 15.55 |
| Total lens length | 220.02 | 220.02 | 220.02 |
| BF | 43.52 | 43.52 | 43.52 |
| d15 | 0.98 | 19.54 | 29.53 |
| d22 | 29.98 | 10.37 | 1.77 |
| d23 | 9.24 | 12.87 | 1.48 |
| d25 | 25.72 | 14.74 | 4.71 |
| d30 | 3.90 | 12.31 | 32.34 |
| Entrance pupil position | 33.55 | 45.40 | 53.68 |
| Exit pupil position | −79.89 | −65.37 | −44.34 |
| Front principal point position | 49.63 | 70.48 | 51.48 |
| Rear principal point position | 24.52 | 4.35 | −46.48 |

Zoom lens unit data

| Unit | First surface | Focal length | Lens structure length | Front principal point position | Rear principal point position |
|---|---|---|---|---|---|
| 1 | 1 | 45.00 | 56.89 | 42.94 | 30.86 |
| 2 | 16 | −22.80 | 14.60 | 4.00 | −6.37 |
| 3 | 23 | ∞ | 0.00 | 0.00 | −0.00 |
| 4 | 24 | 99.38 | 3.24 | −1.23 | −3.22 |
| 5 | 26 | 58.95 | 11.20 | 2.33 | −5.04 |
| 6 | 31 | −245.97 | 20.75 | 40.56 | 21.94 |

Single lens data

| Lens | First surface | Focal length |
|---|---|---|
| 1 | 1 | −55.31 |
| 2 | 3 | −59.34 |
| 3 | 5 | 211.66 |
| 4 | 7 | 79.48 |
| 5 | 9 | −76.79 |
| 6 | 10 | 85.20 |
| 7 | 12 | 89.27 |
| 8 | 14 | 94.77 |
| 9 | 16 | −36.31 |
| 10 | 18 | −38.43 |
| 11 | 19 | 32.03 |
| 12 | 21 | −54.54 |
| 13 | 24 | 99.38 |
| 14 | 26 | 72.77 |
| 15 | 28 | −75.99 |
| 16 | 29 | 60.53 |
| 17 | 31 | 64.79 |
| 18 | 32 | −54.29 |
| 19 | 34 | 85.63 |
| 20 | 36 | 43.53 |
| 21 | 37 | −26.25 |

Numerical Embodiment 8

Unit mm

Surface data

| Surface number i | ri | di | ndi | vdi | Effective diameter |
|---|---|---|---|---|---|
| 1 | 97.408 | 2.85 | 1.77250 | 49.6 | 58.45 |
| 2 | 39.665 | 12.10 |  |  | 50.80 |
| 3 | −218.512 | 2.38 | 1.77250 | 49.6 | 49.94 |
| 4 | 112.120 | 13.06 |  |  | 48.56 |
| 5 | 84.729 | 3.53 | 1.85478 | 24.8 | 48.04 |
| 6 | 177.049 | 1.17 |  |  | 47.56 |
| 7 | 113.091 | 6.49 | 1.59522 | 67.7 | 46.93 |
| 8 | −130.872 | 8.36 |  |  | 46.24 |
| 9 | 60.916 | 1.90 | 1.85478 | 24.8 | 37.30 |
| 10 | 33.124 | 7.23 | 1.49700 | 81.5 | 35.02 |
| 11 | 448.865 | 0.19 |  |  | 33.95 |
| 12 | 49.160 | 5.32 | 1.61800 | 63.3 | 32.37 |
| 13 | −3,575.679 | (Variable) |  |  | 30.73 |
| 14* | 167.293 | 1.33 | 1.88300 | 40.8 | 21.80 |
| 15 | 21.421 | 2.52 |  |  | 19.21 |
| 16 | 48.411 | 1.14 | 1.53775 | 74.7 | 18.49 |
| 17 | 18.886 | 2.96 | 1.85478 | 24.8 | 17.21 |
| 18 | 53.689 | 3.49 |  |  | 16.41 |
| 19 | −26.840 | 1.14 | 1.53775 | 74.7 | 16.34 |
| 20 | 108.060 | (Variable) |  |  | 16.86 |
| 21 (Aperture stop) | ∞ | (Variable) |  |  | 17.35 |
| 22 | 38.688 | 2.84 | 1.58313 | 59.4 | 18.22 |
| 23* | 2,287.345 | (Variable) |  |  | 18.32 |
| 24 | 41.124 | 3.45 | 1.49700 | 81.5 | 18.55 |
| 25 | −87.088 | 0.19 |  |  | 18.41 |
| 26 | 58.990 | 1.57 | 1.88300 | 40.8 | 18.11 |
| 27 | 21.693 | 3.85 | 1.49700 | 81.5 | 17.40 |
| 28 | −93.061 | (Variable) |  |  | 17.23 |
| 29 | 38.273 | 1.57 | 1.48749 | 70.2 | 17.67 |
| 30 | 24.395 | 9.13 |  |  | 17.45 |
| 31 | −91.096 | 3.84 | 1.43875 | 94.9 | 19.02 |
| 32 | −20.195 | 1.78 | 1.88300 | 40.8 | 19.42 |
| 33 | −33.690 | 45.20 |  |  | 20.53 |
| Image plane | ∞ |  |  |  |  |

Aspherical surface data

Fourteenth surface

K = 1.42417e+000  A4 = 2.68815e−006  A6 = −8.50488e−010
A8 = 1.11865e−011

Twenty-third surface

K = 0.00000e+000  A4 = 7.73268e−006  A6 = 1.71066e−009
A8 = 5.90421e−012

Various data
Zoom ratio 4.58

|  | Wide angle | Intermediate | Telephoto |
|---|---|---|---|
| Focal length | 24.00 | 53.00 | 110.00 |
| F-number | 5.60 | 5.60 | 5.60 |
| Half angle of view (degree) | 32.94 | 16.35 | 8.05 |
| Image height | 15.55 | 15.55 | 15.55 |
| Total lens length | 205.07 | 205.07 | 205.07 |
| BF | 45.20 | 45.20 | 45.20 |
| d13 | 2.02 | 18.76 | 25.46 |
| d20 | 25.03 | 8.29 | 1.59 |
| d21 | 7.94 | 9.54 | 1.16 |
| d23 | 15.09 | 6.55 | 0.95 |
| d28 | 4.43 | 11.36 | 25.34 |
| Entrance pupil position | 45.08 | 61.77 | 68.99 |
| Exit pupil position | −63.33 | −54.30 | −44.65 |
| Front principal point position | 63.77 | 86.54 | 44.32 |

-continued

Unit mm

| | | | |
|---|---|---|---|
| Rear principal point position | 21.20 | −7.80 | −64.80 |

Zoom lens unit data

| Unit | First surface | Focal length | Lens structure length | Front principal point position | Rear principal point position |
|---|---|---|---|---|---|
| 1 | 1 | 46.66 | 64.56 | 46.17 | 19.20 |
| 2 | 14 | −18.89 | 12.58 | 4.59 | −4.29 |
| 3 | 21 | ∞ | 0.00 | 0.00 | −0.00 |
| 4 | 22 | 67.19 | 2.84 | −0.03 | −1.82 |
| 5 | 24 | 49.54 | 9.06 | 1.15 | −4.83 |
| 6 | 29 | −149.99 | 16.32 | −2.66 | −17.49 |

Numerical Embodiment 9

Unit mm

Surface data

| Surface number i | ri | di | ndi | vdi |
|---|---|---|---|---|
| 1* | 73.767 | 2.59 | 1.58313 | 59.4 |
| 2 | 28.168 | 27.10 | | |
| 3 | −95.905 | 1.81 | 1.83220 | 40.1 |
| 4 | 64.568 | 0.17 | | |
| 5 | 60.831 | 7.18 | 1.80518 | 25.4 |
| 6 | 49,037.922 | (Variable) | | |
| 7 | 157.597 | 1.72 | 1.92286 | 18.9 |
| 8 | 58.496 | 5.65 | 1.71300 | 53.9 |
| 9 | −74.060 | 0.17 | | |
| 10 | 42.512 | 4.73 | 1.55332 | 71.7 |
| 11 | −563.367 | (Variable) | | |
| 12 (Auxiliary stop) | ∞ | 1.50 | | |
| 13 | −52.447 | 0.76 | 1.81600 | 46.6 |
| 14 | 59.817 | 1.43 | | |
| 15 | −51.314 | 0.78 | 1.81600 | 46.6 |
| 16 | 47.112 | 1.97 | 1.95906 | 17.5 |
| 17 | −490.490 | 2.60 | | |
| 18 (Aperture stop) | ∞ | (Variable) | | |
| 19 | 90.247 | 0.92 | 1.67003 | 47.2 |
| 20 | 32.179 | 4.95 | 1.53775 | 74.7 |
| 21 | −45.065 | 0.17 | | |
| 22* | 26.130 | 5.07 | 1.49710 | 81.6 |
| 23* | −244.813 | (Variable) | | |
| 24 | −85.693 | 2.56 | 1.43875 | 94.9 |
| 25 | −32.297 | 0.21 | | |
| 26 | 199.442 | 1.20 | 1.58144 | 40.8 |
| 27 | 19.430 | (Variable) | | |
| 28* | 55.631 | 3.81 | 1.49700 | 81.5 |
| 29* | −56.164 | 0.36 | | |
| 30 | −42.475 | 1.07 | 1.72000 | 43.7 |
| 31 | −120.913 | 0.49 | | |
| 32 | −864.180 | 1.13 | 1.90270 | 31.0 |
| 33 | 116.836 | 0.20 | | |
| 34 | 87.516 | 3.80 | 1.51633 | 64.1 |
| 35 | −95.552 | (Variable) | | |
| 36 | ∞ | 2.39 | 1.51633 | 64.1 |
| 37 | ∞ | 1.00 | | |
| Image plane | ∞ | | | |

-continued

Unit mm

Aspherical surface data

First surface

K = 2.83165e+000   A4 = 8.24581e−007   A6 = 2.84829e−010
A8 = −2.57868e−013

Twenty-second surface

K = 2.93779e−001   A4 = −1.13092e−006   A6 = 4.39126e−010
A8 = 5.19975e−011

Twenty-third surface

K = 2.37223e+002   A4 = 1.61615e−005   A6 = 1.08580e−008
A8 = 9.30626e−011

Twenty-eighth surface

K = −2.71840e+000   A4 = 1.40833e−006   A6 = −1.63246e−008
A8 = 6.42849e−011

Twenty-ninth surface

K = 3.69542e+000   A4 = −1.34250e−006   A6 = −1.30399e−008
A8 = 5.45234e−011

Various data
Zoom ratio 4.13

| | Wide angle | Intermediate | Telephoto |
|---|---|---|---|
| Focal length | 18.54 | 39.78 | 76.49 |
| F-number | 4.12 | 4.12 | 4.12 |
| Half angle of view | 38.60 | 20.41 | 10.95 |
| Image height | 14.80 | 14.80 | 14.80 |
| Total lens length | 194.06 | 194.06 | 194.06 |
| BF | 39.51 | 39.51 | 39.51 |
| d6 | 37.87 | 20.78 | 3.69 |
| d11 | 0.93 | 18.02 | 35.11 |
| d18 | 19.81 | 9.75 | 2.25 |
| d23 | 6.80 | 6.66 | 11.58 |
| d27 | 3.04 | 13.24 | 15.82 |
| d35 | 36.94 | 36.94 | 36.94 |

Zoom lens unit data

| Unit | First surface | Focal length |
|---|---|---|
| 1 | 1 | −42.55 |
| 2 | 7 | 39.20 |
| 3 | 12 | −24.66 |
| 4 | 19 | 28.14 |
| 5 | 24 | −54.47 |
| 6 | 28 | 107.70 |
| 7 | 36 | ∞ |

Numerical Embodiment 10

Unit mm

Surface data

| Surface number i | ri | di | ndi | vdi | Effective diameter |
|---|---|---|---|---|---|
| 1* | 104.521 | 2.70 | 1.77250 | 49.6 | 53.31 |
| 2 | 30.315 | 14.58 | | | 43.72 |
| 3 | −63.571 | 1.98 | 1.77250 | 49.6 | 42.74 |
| 4 | 199.025 | 3.89 | | | 42.69 |
| 5 | 74.494 | 3.29 | 1.89286 | 20.4 | 43.62 |
| 6 | 115.023 | 2.02 | | | 43.19 |
| 7 | 116.955 | 7.83 | 1.62041 | 60.3 | 43.08 |
| 8 | −78.664 | 0.20 | | | 42.58 |
| 9 | 81.511 | 1.89 | 1.85478 | 24.8 | 39.04 |
| 10 | 36.329 | 6.64 | 1.49700 | 81.5 | 38.45 |
| 11 | 331.011 | 3.24 | | | 38.72 |

-continued

Unit mm

| | | | | | |
|---|---|---|---|---|---|
| 12 | 115.367 | 4.63 | 1.59522 | 67.7 | 40.06 |
| 13 | −164.145 | 0.18 | | | 40.15 |
| 14 | 63.769 | 4.60 | 1.76385 | 48.5 | 39.86 |
| 15 | 875.792 | (Variable) | | | 39.35 |
| 16* | 184.662 | 1.26 | 1.88300 | 40.8 | 23.79 |
| 17 | 25.638 | 3.57 | | | 22.18 |
| 18 | −158.203 | 1.08 | 1.59522 | 67.7 | 22.31 |
| 19 | 28.243 | 3.98 | 1.85478 | 24.8 | 23.01 |
| 20 | −926.470 | 3.00 | | | 23.05 |
| 21 | −40.093 | 1.08 | 1.76385 | 48.5 | 23.07 |
| 22 | −458.726 | (Variable) | | | 23.78 |
| 23 (Aperture stop) | ∞ | (Variable) | | | 24.60 |
| 24 | 37.250 | 4.66 | 1.59522 | 67.7 | 26.43 |
| 25* | 133.331 | (Variable) | | | 26.35 |
| 26 | 118.893 | 5.48 | 1.49700 | 81.5 | 26.64 |
| 27 | −53.600 | 0.18 | | | 26.72 |
| 28 | 40.924 | 1.49 | 2.00100 | 29.1 | 25.84 |
| 29 | 26.603 | 4.13 | 1.49700 | 81.5 | 24.75 |
| 30 | 116.236 | (Variable) | | | 24.57 |
| 31 | 40.142 | 2.87 | 1.95906 | 17.5 | 24.71 |
| 32 | 95.191 | 1.49 | 2.00069 | 25.5 | 24.22 |
| 33 | 33.561 | 4.20 | | | 23.40 |
| 34 | −770.312 | 3.44 | 1.48749 | 70.2 | 23.72 |
| 35 | −41.561 | 0.18 | | | 23.92 |
| 36 | 395.833 | 6.22 | 1.49700 | 81.5 | 23.67 |
| 37 | −24.801 | 1.68 | 1.95375 | 32.3 | 23.36 |
| 38 | −124.306 | 45.29 | | | 24.06 |
| Image plane | ∞ | | | | |

Aspherical surface data

First surface

K = 6.63182e+000  A4 = 8.41422e−008  A6 = 4.05320e−011
A8 = −6.76543e−013

Sixteenth surface

K = 0.00000e+000  A4 = 2.77839e−007  A6 = −1.12528e−009
A8 = −1.24698e−012

Twenty-fifth surface

K = 0.00000e+000  A4 = 6.24439e−006  A6 = 6.92935e−010
A8 = 1.01985e−012

Various data
Zoom ratio 4.74

| | Wide angle | Intermediate | Telephoto |
|---|---|---|---|
| Focal length | 19.00 | 40.00 | 90.00 |
| F-number | 4.00 | 4.00 | 4.00 |
| Half angle of view | 39.30 | 21.24 | 9.80 |
| Image height | 15.55 | 15.55 | 15.55 |
| Total lens length | 219.66 | 219.66 | 219.66 |
| BF | 45.29 | 45.29 | 45.29 |
| d15 | 0.96 | 20.17 | 29.68 |
| d22 | 30.43 | 11.22 | 1.70 |
| d23 | 9.15 | 11.65 | 1.71 |
| d25 | 24.43 | 12.71 | 2.02 |
| d30 | 1.76 | 10.97 | 31.60 |
| Entrance pupil position | 33.55 | 46.26 | 53.53 |
| Exit pupil position | −84.66 | −66.56 | −49.28 |
| Front principal point position | 49.77 | 71.96 | 57.88 |
| Rear principal point position | 26.29 | 5.29 | −44.71 |

Zoom lens unit data

| Unit | First surface | Focal length | Lens structure length | Front principal point position | Rear principal point position |
|---|---|---|---|---|---|
| 1 | 1 | 45.00 | 57.67 | 43.04 | 30.69 |
| 2 | 16 | −22.80 | 13.97 | 3.67 | −6.16 |
| 3 | 23 | ∞ | 0.00 | 0.00 | −0.00 |
| 4 | 24 | 85.00 | 4.66 | −1.11 | −3.98 |
| 5 | 26 | 65.00 | 11.28 | 0.78 | −6.41 |
| 6 | 31 | −502.40 | 20.08 | 43.82 | 27.17 |

Numerical Embodiment 11

Unit mm

Surface data

| Surface number i | ri | di | ndi | vdi | Effective diameter |
|---|---|---|---|---|---|
| 1 | 144.538 | 2.85 | 1.77250 | 49.6 | 51.01 |
| 2 | 37.247 | 11.10 | | | 44.20 |
| 3 | −102.691 | 2.38 | 1.77250 | 49.6 | 43.50 |
| 4 | 194.836 | 5.10 | | | 43.16 |
| 5 | 82.821 | 4.23 | 1.85478 | 24.8 | 43.64 |
| 6 | 652.055 | 1.19 | | | 43.28 |
| 7 | 144.761 | 5.33 | 1.59522 | 67.7 | 42.46 |
| 8 | −126.425 | 7.08 | | | 41.80 |
| 9 | 144.229 | 1.90 | 1.85478 | 24.8 | 35.67 |
| 10 | 42.161 | 5.32 | 1.49700 | 81.5 | 33.82 |
| 11 | 188.338 | 0.47 | | | 33.23 |
| 12 | 92.559 | 4.67 | 1.59522 | 67.7 | 32.96 |
| 13 | −111.501 | 0.19 | | | 32.40 |
| 14 | 47.013 | 4.25 | 1.58913 | 61.1 | 31.86 |
| 15 | 307.335 | (Variable) | | | 31.22 |
| 16* | −60,798.810 | 1.33 | 1.88300 | 40.8 | 21.51 |
| 17 | 25.245 | 2.71 | | | 19.27 |
| 18 | 207.761 | 1.14 | 1.53775 | 74.7 | 18.68 |
| 19 | 24.750 | 3.04 | 1.85478 | 24.8 | 18.96 |
| 20 | 133.621 | 4.28 | | | 18.87 |
| 21 | −33.039 | 1.14 | 1.53775 | 74.7 | 18.89 |
| 22 | 159.777 | (Variable) | | | 19.48 |
| 23 (Aperture stop) | ∞ | (Variable) | | | 20.07 |
| 24 | 47.858 | 3.05 | 1.58313 | 59.4 | 21.11 |
| 25* | 1,474.678 | (Variable) | | | 21.26 |
| 26 | 46.226 | 3.69 | 1.49700 | 81.5 | 21.87 |
| 27 | −156.528 | 0.19 | | | 22.07 |
| 28 | 69.175 | 1.57 | 1.88300 | 40.8 | 22.19 |
| 29 | 26.432 | 4.74 | 1.49700 | 81.5 | 21.85 |
| 30 | −94.711 | (Variable) | | | 22.02 |
| 31 | 44.613 | 1.57 | 1.48749 | 70.2 | 22.33 |
| 32 | 26.917 | 10.18 | | | 21.95 |
| 33 | 140.562 | 4.92 | 1.43875 | 94.9 | 23.77 |
| 34 | −30.637 | 1.78 | 1.88300 | 40.8 | 23.97 |
| 35 | −57.531 | 49.51 | | | 24.75 |
| Image plane | ∞ | | | | |

Aspherical surface data

Sixteenth surface

K = −3.51290e+008  A4 = 2.19875e−006  A6 = −1.30354e−009
A8 = −4.81192e−012

Twenty-fifth surface

K = 0.00000e+000   A4 = 4.55231e−006   A6 = 1.08190e−010
A8 = −8.44991e−013

Various data
Zoom ratio 5.00

|  | Wide angle | Intermediate | Telephoto |
|---|---|---|---|
| Focal length | 24.00 | 55.00 | 120.00 |
| F-number | 5.60 | 5.60 | 5.60 |
| Half angle of view | 32.94 | 15.79 | 7.38 |
| Image height | 15.55 | 15.55 | 15.55 |
| Total lens length | 220.04 | 220.04 | 220.04 |
| BF | 49.51 | 49.51 | 49.51 |
| d15 | 1.40 | 18.41 | 24.99 |
| d22 | 25.37 | 8.36 | 1.78 |
| d23 | 11.03 | 10.77 | 1.42 |
| d25 | 22.81 | 12.68 | 0.50 |
| d30 | 8.52 | 18.91 | 40.45 |
| Entrance pupil position | 39.05 | 55.48 | 62.79 |
| Exit pupil position | −123.27 | −88.95 | −66.57 |
| Front principal point position | 59.72 | 88.64 | 58.73 |
| Rear principal point position | 25.51 | −5.49 | −70.49 |

Zoom lens unit data

| Unit | First surface | Focal length | Lens structure length | Front principal point position | Rear principal point position |
|---|---|---|---|---|---|
| 1 | 1 | 46.00 | 56.05 | 41.14 | 19.75 |
| 2 | 16 | −20.00 | 13.64 | 3.98 | −5.79 |
| 3 | 23 | ∞ | 0.00 | 0.00 | −0.00 |
| 4 | 24 | 84.42 | 3.05 | −0.06 | −1.98 |
| 5 | 26 | 58.32 | 10.20 | 1.52 | −5.26 |
| 6 | 31 | −394.26 | 18.46 | −18.11 | −35.67 |

Numerical Embodiment 12

Unit mm
Surface data

| Surface number i | ri | di | ndi | vdi | Effective diameter |
|---|---|---|---|---|---|
| 1* | 91.439 | 2.29 | 1.77250 | 49.6 | 60.19 |
| 2 | 30.650 | 16.18 | | | 48.43 |
| 3 | −90.113 | 1.70 | 1.77250 | 49.6 | 47.62 |
| 4 | 82.752 | 0.20 | | | 46.59 |
| 5 | 59.860 | 4.88 | 1.85478 | 24.8 | 47.09 |
| 6 | 186.894 | 4.58 | | | 46.76 |
| 7 | −208.155 | 4.27 | 1.59522 | 67.7 | 46.65 |
| 8 | −68.920 | 8.65 | | | 46.76 |
| 9 | 78.112 | 1.40 | 1.85478 | 24.8 | 44.04 |
| 10 | 40.332 | 8.26 | 1.43875 | 94.9 | 42.63 |
| 11 | −332.216 | 0.20 | | | 42.53 |
| 12 | 83.842 | 4.17 | 1.49700 | 81.5 | 42.02 |
| 13 | −746.759 | 0.20 | | | 42.08 |
| 14 | 62.546 | 6.35 | 1.65160 | 58.5 | 42.47 |
| 15 | −157.017 | (Variable) | | | 42.19 |
| 16 | −183.698 | 0.90 | 1.81600 | 46.6 | 22.69 |
| 17 | 23.639 | 3.73 | | | 21.29 |
| 18 | −67.380 | 0.90 | 1.75500 | 52.3 | 21.42 |
| 19 | 165.971 | 0.20 | | | 22.18 |
| 20 | 39.342 | 4.33 | 1.85478 | 24.8 | 23.43 |
| 21 | −61.566 | 0.90 | 1.81600 | 46.6 | 23.54 |
| 22 | 60.666 | (Variable) | | | 23.77 |
| 23 (Aperture stop) | ∞ | (Variable) | | | 24.77 |
| 24 | 201.877 | 3.28 | 1.61800 | 63.3 | 25.53 |
| 25 | −98.250 | 0.20 | | | 26.01 |
| 26 | 49.409 | 5.53 | 1.65160 | 58.5 | 26.65 |
| 27 | −41.463 | 1.20 | 1.74950 | 35.3 | 26.52 |
| 28 | 352.441 | (Variable) | | | 26.35 |
| 29 | 43.099 | 1.20 | 2.00069 | 25.5 | 26.28 |
| 30 | 34.211 | 0.75 | | | 25.96 |
| 31 | 43.005 | 4.16 | 1.48749 | 70.2 | 26.06 |
| 32 | −138.159 | (Variable) | | | 26.19 |
| 33 | −327.586 | 1.20 | 2.00069 | 25.5 | 26.29 |
| 34 | 207.682 | 0.20 | | | 26.40 |
| 35 | 41.219 | 3.69 | 1.92286 | 18.9 | 26.91 |
| 36 | −2,687.752 | 1.20 | 1.78470 | 26.3 | 26.63 |
| 37 | 32.044 | (Variable) | | | 25.75 |
| 38 | 69.333 | 3.40 | 1.53775 | 74.7 | 27.05 |
| 39 | −126.138 | 0.20 | | | 27.12 |
| 40 | 47.255 | 6.41 | 1.43875 | 94.9 | 27.02 |
| 41 | −34.706 | 1.20 | 1.95375 | 32.3 | 26.66 |
| 42 | −1,068.251 | 34.42 | | | 26.94 |
| Image plane | ∞ | | | | |

Aspherical surface data
First surface

K = −1.81302e+000   A4 = 8.42998e−007   A6 = 4.16656e−010
A8 = −2.88945e−013

Zoom movement amount data

B21 = 32.14740
B311 = 7.05092   B312 = −5.98070   B313 = 35.14777
B314 = −39.19330   B315 = 3.90115   B316 = −9.37366

Various data
Zoom ratio 5.29

|  | Wide angle | Intermediate | Telephoto |
|---|---|---|---|
| Focal length | 17.00 | 37.03 | 90.00 |
| F-number | 4.00 | 4.00 | 4.00 |
| Half angle of view | 42.45 | 22.78 | 9.80 |
| Image height | 15.55 | 15.55 | 15.55 |
| Total lens length | 235.17 | 235.17 | 235.17 |
| BF | 34.42 | 34.42 | 34.42 |
| d15 | 1.11 | 23.61 | 33.26 |
| d22 | 35.41 | 12.90 | 3.26 |
| d23 | 9.63 | 13.84 | 1.19 |
| d28 | 38.86 | 18.64 | 1.19 |
| d32 | 2.00 | 18.01 | 48.11 |
| d37 | 5.66 | 5.66 | 5.66 |
| Entrance pupil position | 34.55 | 49.40 | 57.97 |
| Exit pupil position | −121.13 | −97.40 | −68.58 |
| Front principal point position | 49.70 | 76.02 | 69.34 |
| Rear principal point position | 17.42 | −2.61 | −55.58 |

Zoom lens unit data

| Unit | First surface | Focal length | Lens structure length | Front principal point position | Rear principal point position |
|---|---|---|---|---|---|
| 1 | 1 | 42.01 | 63.31 | 45.63 | 31.62 |
| 2 | 16 | −20.89 | 10.96 | 1.61 | −5.75 |
| 3 | 23 | ∞ | 0.00 | 0.00 | 0.00 |
| 4 | 24 | 54.55 | 10.21 | 0.88 | −5.30 |
| 5 | 29 | 110.63 | 6.12 | 1.40 | −2.80 |

-continued

Unit mm

| | | | | | |
|---|---|---|---|---|---|
| 6 | 33 | −111.01 | 6.29 | 7.45 | 3.85 |
| 7 | 38 | 116.30 | 11.21 | −7.25 | −13.76 |

Single lens data

| Lens | First surface | Focal length |
|---|---|---|
| 1 | 1 | −60.39 |
| 2 | 3 | −55.34 |
| 3 | 5 | 100.27 |
| 4 | 7 | 170.54 |
| 5 | 9 | −98.33 |
| 6 | 10 | 82.33 |
| 7 | 12 | 151.48 |
| 8 | 14 | 69.16 |
| 9 | 16 | −25.49 |
| 10 | 18 | −63.08 |
| 11 | 20 | 28.38 |
| 12 | 21 | −37.13 |
| 13 | 24 | 106.98 |
| 14 | 26 | 35.31 |
| 15 | 27 | −49.10 |
| 16 | 29 | −176.20 |
| 17 | 31 | 67.56 |
| 18 | 33 | −125.71 |
| 19 | 35 | 43.48 |
| 20 | 36 | −39.99 |
| 21 | 38 | 83.44 |
| 22 | 40 | 46.60 |
| 23 | 41 | −37.36 |

Numerical Embodiment 13

Unit mm

Surface data

| Surface number i | ri | di | ndi | vdi | Effective diameter |
|---|---|---|---|---|---|
| 1* | 113.875 | 2.35 | 1.77250 | 49.6 | 68.89 |
| 2 | 22.905 | 16.18 | | | 44.85 |
| 3 | 64.613 | 1.90 | 1.58313 | 59.4 | 43.30 |
| 4* | 19.323 | 9.47 | | | 36.67 |
| 5 | 147.352 | 1.90 | 1.69680 | 55.5 | 36.41 |
| 6 | 37.841 | 5.03 | | | 35.06 |
| 7 | 51.441 | 1.90 | 1.59522 | 67.7 | 36.19 |
| 8 | 28.629 | 8.53 | 1.67270 | 32.1 | 35.66 |
| 9 | −250.401 | 1.18 | | | 35.36 |
| 10 | 80.712 | 5.39 | 1.62041 | 60.3 | 34.36 |
| 11 | −199.467 | 4.62 | | | 33.68 |
| 12 | 605.988 | 1.50 | 1.85478 | 24.8 | 30.85 |
| 13 | 26.482 | 5.16 | 1.49700 | 81.5 | 29.19 |
| 14 | 142.077 | 0.20 | | | 29.10 |
| 15 | 51.952 | 7.04 | 1.76385 | 48.5 | 29.13 |
| 16 | −51.034 | (Variable) | | | 28.42 |
| 17 | 410.168 | 1.00 | 1.88300 | 40.8 | 19.90 |
| 18 | 19.460 | 3.25 | | | 17.89 |
| 19 | −103.953 | 1.00 | 1.77250 | 49.6 | 17.64 |
| 20 | 86.083 | 1.00 | | | 17.43 |
| 21 | 37.125 | 1.00 | 1.49700 | 81.5 | 17.34 |
| 22 | 31.520 | 2.48 | 1.85478 | 24.8 | 17.12 |
| 23 | 445.525 | (Variable) | | | 17.04 |
| 24 (Aperture stop) | ∞ | (Variable) | | | 17.56 |
| 25 | 86.927 | 2.50 | 1.69680 | 55.5 | 18.08 |
| 26 | −754.927 | (Variable) | | | 18.23 |
| 27 | 27.820 | 1.15 | 1.95375 | 32.3 | 18.51 |
| 28 | 17.290 | 0.16 | | | 17.92 |
| 29 | 17.185 | 5.31 | 1.48749 | 70.2 | 18.07 |
| 30 | −35.180 | (Variable) | | | 18.05 |
| 31 | −39.396 | 1.15 | 1.88300 | 40.8 | 14.74 |
| 32 | 31.057 | 5.12 | 1.84666 | 23.8 | 15.55 |
| 33 | −58.946 | 14.36 | | | 16.62 |
| 34 | 51.155 | 4.96 | 1.48749 | 70.2 | 21.72 |
| 35 | −47.333 | 0.20 | | | 21.88 |
| 36 | −149.890 | 1.30 | 1.95375 | 32.3 | 21.72 |
| 37 | 19.099 | 6.12 | 1.49700 | 81.5 | 21.73 |
| 38 | −276.992 | 6.54 | | | 22.92 |
| 39 | 130.257 | 10.23 | 1.49700 | 81.5 | 28.16 |
| 40 | −20.271 | 2.00 | 2.00100 | 29.1 | 29.33 |
| 41* | −25.872 | 40.83 | | | 31.47 |
| Image plane | ∞ | | | | |

Aspherical surface data

First surface

K = −5.20252e+000  A4 = 6.93162e−006  A6 = −3.48364e−009
A8 = 1.15224e−012

Fourth surface

K = −8.92189e−001  A4 = 9.47333e−006  A6 = 1.43616e−008
A8 = −6.89888e−011

Forty-first surface

K = 2.65127e−001  A4 = 2.18668e−006  A6 = −9.56049e−010
A8 = 4.40037e−012

Zoom movement amount data

B21 = 25.00761

Various data
Zoom ratio 2.50

| | Wide angle | Intermediate | Telephoto |
|---|---|---|---|
| Focal length | 10.00 | 15.33 | 25.00 |
| F-number | 4.00 | 4.00 | 4.00 |
| Half angle of view | 57.26 | 45.41 | 31.88 |
| Image height | 15.55 | 15.55 | 15.55 |
| Total lens length | 225.41 | 225.41 | 225.41 |
| BF | 40.83 | 40.83 | 40.83 |
| d16 | 1.00 | 13.50 | 26.01 |
| d23 | 26.97 | 14.47 | 1.96 |
| d24 | 1.41 | 1.41 | 1.41 |
| d26 | 10.70 | 6.04 | 0.96 |
| d30 | 1.30 | 5.96 | 11.04 |
| Entrance pupil position | 22.76 | 24.31 | 25.90 |
| Exit pupil position | −568.68 | −402.70 | −338.24 |
| Front principal point position | 32.59 | 39.11 | 49.26 |
| Rear principal point position | 30.83 | 25.50 | 15.83 |

Zoom lens unit data

| Unit | First surface | Focal length | Lens structure length | Front principal point position | Rear principal point position |
|---|---|---|---|---|---|
| 1 | 1 | 28.14 | 72.36 | 40.18 | 61.81 |
| 2 | 17 | −29.53 | 9.74 | −1.15 | −8.99 |
| 3 | 24 | ∞ | 0.00 | 0.00 | 0.00 |
| 4 | 25 | 111.53 | 2.50 | 0.15 | −1.32 |
| 5 | 27 | 46.87 | 6.62 | 2.31 | −2.15 |
| 6 | 31 | 107.20 | 51.97 | 63.92 | 54.79 |

Single lens data

| Lens | First surface | Focal length |
|---|---|---|
| 1 | 1 | −37.36 |
| 2 | 3 | −47.83 |
| 3 | 5 | −73.28 |
| 4 | 7 | −111.56 |

-continued

Unit mm

| | | |
|---|---|---|
| 5 | 8 | 38.39 |
| 6 | 10 | 92.94 |
| 7 | 12 | −32.13 |
| 8 | 13 | 64.34 |
| 9 | 15 | 34.57 |
| 10 | 17 | −23.03 |
| 11 | 19 | −60.53 |
| 12 | 21 | −445.24 |
| 13 | 22 | 39.20 |
| 14 | 25 | 111.53 |
| 15 | 27 | −50.23 |
| 16 | 29 | 24.42 |
| 17 | 31 | −19.40 |
| 18 | 32 | 24.43 |
| 19 | 34 | 51.11 |
| 20 | 36 | −17.57 |
| 21 | 37 | 36.09 |
| 22 | 39 | 36.01 |
| 23 | 40 | −113.06 |

Numerical Embodiment 14

Unit mm

Surface data

| Surface number i | ri | di | ndi | vdi | Effective diameter |
|---|---|---|---|---|---|
| 1* | 544.299 | 2.29 | 1.77250 | 49.6 | 59.30 |
| 2 | 35.949 | 12.82 | | | 49.34 |
| 3 | −152.379 | 1.70 | 1.77250 | 49.6 | 48.98 |
| 4 | 120.185 | 4.67 | | | 48.70 |
| 5 | 80.809 | 6.08 | 1.85478 | 24.8 | 50.20 |
| 6 | 633.791 | 2.13 | | | 49.76 |
| 7 | 1,958.254 | 4.91 | 1.59522 | 67.7 | 49.30 |
| 8 | −103.745 | 6.99 | | | 48.99 |
| 9 | 74.959 | 1.40 | 1.85478 | 24.8 | 43.01 |
| 10 | 41.796 | 6.07 | 1.43875 | 94.9 | 41.35 |
| 11 | 236.976 | 0.20 | | | 40.97 |
| 12 | 125.483 | 3.90 | 1.49700 | 81.5 | 40.68 |
| 13 | −394.106 | 0.20 | | | 40.15 |
| 14 | 114.712 | 4.60 | 1.61800 | 63.3 | 40.38 |
| 15 | −127.327 | (Variable) | | | 40.28 |
| 16 | 70.879 | 1.00 | 2.00100 | 29.1 | 28.57 |
| 17 | 30.534 | 4.85 | | | 26.38 |
| 18 | −57.309 | 1.00 | 1.77250 | 49.6 | 26.12 |
| 19 | 607.121 | (Variable) | | | 25.63 |
| 20 | 49.995 | 3.93 | 1.84666 | 23.8 | 26.61 |
| 21 | −121.295 | 1.71 | | | 26.63 |
| 22 | −40.499 | 1.00 | 1.53775 | 74.7 | 26.59 |
| 23 | 87.213 | (Variable) | | | 27.16 |
| 24 (Aperture stop) | ∞ | (Variable) | | | 27.55 |
| 25* | 22.807 | 7.95 | 1.58313 | 59.4 | 30.08 |
| 26 | 515.865 | 0.51 | | | 29.19 |
| 27 | 38.921 | 1.40 | 1.85478 | 24.8 | 27.91 |
| 28 | 21.385 | 2.78 | | | 26.01 |
| 29 | 40.404 | 6.61 | 1.49700 | 81.5 | 26.10 |
| 30* | −55.364 | (Variable) | | | 25.72 |
| 31 | −113.452 | 2.91 | 1.95906 | 17.5 | 21.38 |
| 32 | −29.525 | 1.20 | 1.78470 | 26.3 | 21.46 |
| 33 | 71.198 | 25.03 | | | 21.40 |
| 34 | 61.019 | 6.63 | 1.43875 | 94.9 | 27.00 |
| 35 | −28.400 | 1.20 | 1.95375 | 32.3 | 27.02 |
| 36 | −57.452 | 36.18 | | | 27.85 |
| Image plane | ∞ | | | | |

-continued

Unit mm

Aspherical surface data

First surface $K = 2.26655e+002$  $A4 = 6.51448e-007$  $A6 = 2.01585e-010$
$A8 = -2.85328e-013$ Twenty-fifth surface $K = -5.16576e-001$  $A4 = -1.73067e-006$  $A6 = 6.40073e-010$
$A8 = -1.96130e-012$ Thirtieth surface $K = -7.75634e+000$  $A4 = -1.11555e-006$  $A6 = 2.74222e-009$
$A8 = -1.53130e-011$ Zoom movement amount data B211 = 42.02030
B221 = 37.24116   B222 = −2.04049   B223 = −4.01169
B224 = 14.79864   B225 = −5.83867   B226 = −2.58458

Various data
Zoom ratio 4.50

| | Wide angle | Intermediate | Telephoto |
|---|---|---|---|
| Focal length | 20.00 | 41.48 | 90.00 |
| F-number | 4.00 | 4.00 | 4.00 |
| Half angle of view | 37.87 | 20.55 | 9.80 |
| Image height | 15.55 | 15.55 | 15.55 |
| Total lens length | 235.06 | 235.06 | 235.06 |
| BF | 36.18 | 36.18 | 36.18 |
| d15 | 1.11 | 26.32 | 43.13 |
| d19 | 6.42 | 3.30 | 1.97 |
| d23 | 39.64 | 17.55 | 2.08 |
| d24 | 20.85 | 13.58 | 1.41 |
| d30 | 3.19 | 10.47 | 22.64 |
| Entrance pupil position | 34.98 | 48.48 | 58.05 |
| Exit pupil position | −113.13 | −92.35 | −80.89 |
| Front principal point position | 52.30 | 76.58 | 78.85 |
| Rear principal point position | 16.18 | −5.31 | −53.83 |

Zoom lens unit data

| Unit | First surface | Focal length | Lens structure length | Front principal point position | Rear principal point position |
|---|---|---|---|---|---|
| 1 | 1 | 68.70 | 57.96 | 53.47 | 50.29 |
| 2 | 16 | −28.86 | 6.85 | 2.82 | −2.94 |
| 3 | 20 | 168.35 | 6.64 | −10.67 | −14.25 |
| 4 | 24 | ∞ | 0.00 | 0.00 | 0.00 |
| 5 | 25 | 37.59 | 19.25 | 4.01 | −10.98 |
| 6 | 31 | −171.96 | 36.97 | −25.33 | −67.41 |

Single lens data

| Lens | First surface | Focal length |
|---|---|---|
| 1 | 1 | −49.69 |
| 2 | 3 | −86.33 |
| 3 | 5 | 106.79 |
| 4 | 7 | 165.09 |
| 5 | 9 | −111.66 |
| 6 | 10 | 114.28 |
| 7 | 12 | 191.42 |
| 8 | 14 | 97.99 |
| 9 | 16 | −53.83 |
| 10 | 18 | −67.42 |
| 11 | 20 | 41.85 |
| 12 | 22 | −51.13 |
| 13 | 25 | 40.52 |
| 14 | 27 | −57.12 |

-continued

Unit mm

| | | |
|---|---|---|
| 15 | 29 | 47.96 |
| 16 | 31 | 40.38 |
| 17 | 32 | −26.22 |
| 18 | 34 | 45.08 |
| 19 | 35 | −59.67 |

Numerical Embodiment 15

Unit mm

Surface data

| Surface number i | ri | di | ndi | vdi | Effective diameter |
|---|---|---|---|---|---|
| 1* | 158.655 | 2.29 | 1.77250 | 49.6 | 57.67 |
| 2 | 32.044 | 12.47 | | | 46.95 |
| 3 | −224.706 | 1.70 | 1.77250 | 49.6 | 46.32 |
| 4 | 64.264 | 4.21 | | | 44.71 |
| 5 | 61.905 | 4.87 | 1.85478 | 24.8 | 45.42 |
| 6 | 257.039 | 4.00 | | | 44.99 |
| 7 | −208.019 | 4.49 | 1.59522 | 67.7 | 44.32 |
| 8 | −71.105 | 9.84 | | | 44.00 |
| 9 | 67.627 | 1.40 | 1.85478 | 24.8 | 37.96 |
| 10 | 36.154 | 6.33 | 1.43875 | 94.9 | 36.63 |
| 11 | 698.018 | 0.20 | | | 36.96 |
| 12 | 76.023 | 3.77 | 1.49700 | 81.5 | 37.72 |
| 13 | −955.749 | 0.20 | | | 37.77 |
| 14 | 61.772 | 5.51 | 1.59522 | 67.7 | 37.90 |
| 15 | −135.544 | (Variable) | | | 37.65 |
| 16 | −157.652 | 0.90 | 1.81600 | 46.6 | 21.40 |
| 17 | 24.443 | 3.68 | | | 20.25 |
| 18 | −46.063 | 0.90 | 1.72916 | 54.7 | 20.37 |
| 19 | −1,020.053 | 0.20 | | | 21.16 |
| 20 | 43.510 | 3.92 | 1.85478 | 24.8 | 22.35 |
| 21 | −61.198 | 0.90 | 1.81600 | 46.6 | 22.48 |
| 22 | 74.070 | (Variable) | | | 22.72 |
| 23 (Aperture stop) | ∞ | (Variable) | | | 23.69 |
| 24* | 59.229 | 3.48 | 1.58313 | 59.4 | 24.80 |
| 25 | 581.482 | 0.26 | | | 25.09 |
| 26 | 91.871 | 3.26 | 1.65160 | 58.5 | 25.31 |
| 27 | −91.293 | 1.20 | 1.74950 | 35.3 | 25.35 |
| 28 | 231.082 | (Variable) | | | 25.43 |
| 29 | 55.690 | 1.20 | 2.00069 | 25.5 | 25.79 |
| 30 | 37.080 | 1.00 | | | 25.63 |
| 31 | 37.527 | 5.84 | 1.48749 | 70.2 | 26.53 |
| 32 | −49.772 | (Variable) | | | 26.88 |
| 33 | 196.819 | 1.20 | 1.85150 | 40.8 | 27.29 |
| 34 | 56.055 | 0.69 | | | 27.21 |
| 35 | 39.053 | 3.18 | 1.95906 | 17.5 | 27.81 |
| 36 | 124.776 | 1.20 | 1.85478 | 24.8 | 27.54 |
| 37 | 37.093 | 4.86 | | | 26.98 |
| 38 | 49.198 | 5.01 | 1.59522 | 67.7 | 28.45 |
| 39 | −72.271 | 1.84 | | | 28.41 |
| 40 | 55.654 | 6.17 | 1.43875 | 94.9 | 27.00 |
| 41 | −33.801 | 1.20 | 1.95375 | 32.3 | 26.35 |
| 42 | 179.157 | 47.81 | | | 26.26 |
| Image plane | ∞ | | | | |

Aspherical surface data

First surface

K = −4.72061e+001  A4 = 2.52766e−006  A6 = 5.74589e−010
A8 = −6.44759e−012  A10 = 1.70955e−014  A12 = −2.42858e−017
A14 = 1.77814e−020  A16 = −5.25165e−024

Twenty-fourth surface

K = −2.82949e+000  A4 = −2.38192e−006  A6 = 2.30170e−009
A8 = −3.19640e−011  A10 = 2.15366e−013  A12 = −5.00417e−016

Unit mm

Various data
Zoom ratio 4.44

| | Wide angle | Intermediate | Telephoto |
|---|---|---|---|
| Focal length | 18.00 | 34.90 | 80.00 |
| F-number | 4.00 | 4.00 | 4.00 |
| Half angle of view (degree) | 40.82 | 24.02 | 11.00 |
| Image height | 15.55 | 15.55 | 15.55 |
| Total lens length | 231.59 | 231.59 | 231.59 |
| BF | 47.81 | 47.81 | 47.81 |
| d15 | 0.99 | 19.02 | 30.29 |
| d22 | 32.46 | 14.43 | 3.16 |
| d23 | 1.41 | 7.79 | 1.41 |
| d28 | 30.30 | 15.30 | 1.30 |
| d32 | 5.26 | 13.88 | 34.27 |
| Entrance pupil position | 32.04 | 42.58 | 51.09 |
| Exit pupil position | −102.00 | −79.95 | −57.48 |
| Front principal point position | 47.87 | 67.94 | 70.31 |
| Rear principal point position | 29.81 | 12.91 | −32.19 |

Zoom lens unit data

| Unit | First surface | Focal length | Lens structure length | Front principal point position | Rear principal point position |
|---|---|---|---|---|---|
| 1 | 1 | 40.04 | 61.28 | 42.98 | 31.25 |
| 2 | 16 | −21.80 | 10.49 | 1.30 | −5.90 |
| 3 | 23 | ∞ | 0.00 | 0.00 | −0.00 |
| 4 | 24 | 85.03 | 8.20 | −0.52 | −5.56 |
| 5 | 29 | 72.22 | 8.03 | 4.25 | −1.34 |
| 6 | 33 | 3,014.01 | 25.36 | −303.07 | −290.95 |

Numerical Embodiment 16

Unit mm

Surface data

| Surface number i | ri | di | ndi | vdi | Effective diameter |
|---|---|---|---|---|---|
| 1* | 177.482 | 2.35 | 1.77250 | 49.6 | 64.94 |
| 2 | 31.214 | 15.22 | | | 50.44 |
| 3 | 1,290.308 | 1.90 | 1.69680 | 55.5 | 48.47 |
| 4 | 44.223 | 7.23 | | | 45.02 |
| 5 | 51.011 | 5.12 | 1.85478 | 24.8 | 46.04 |
| 6 | 79.663 | 2.11 | | | 45.23 |
| 7 | 116.264 | 7.14 | 1.61800 | 63.3 | 45.26 |
| 8 | −130.728 | 3.95 | | | 44.96 |
| 9 | 62.046 | 1.50 | 1.85478 | 24.8 | 41.79 |
| 10 | 30.739 | 8.18 | 1.49700 | 81.5 | 39.28 |
| 11 | 1,128.212 | 4.72 | | | 38.97 |
| 12 | 69.613 | 5.28 | 1.69680 | 55.5 | 36.40 |
| 13 | −95.177 | (Variable) | | | 35.89 |
| 14 | −95.926 | 1.00 | 1.83481 | 42.7 | 21.97 |
| 15 | 39.516 | 2.33 | | | 21.59 |
| 16 | −325.594 | 1.00 | 1.58913 | 61.1 | 21.77 |
| 17 | 76.034 | 2.41 | | | 22.18 |
| 18 | −56.822 | 1.00 | 1.43875 | 94.9 | 22.43 |
| 19 | 53.910 | 4.31 | 1.85478 | 24.8 | 24.11 |
| 20 | −254.444 | (Variable) | | | 24.79 |
| 21 (Aperture stop) | ∞ | (Variable) | | | 26.18 |
| 22 | 41.524 | 1.00 | 1.61772 | 49.8 | 27.69 |
| 23 | 31.250 | 4.42 | 1.58313 | 59.4 | 27.62 |

-continued

Unit mm

| | | | | | |
|---|---|---|---|---|---|
| 24* | 1,120.230 | (Variable) | | | 27.59 |
| 25 | 67.773 | 1.15 | 2.00069 | 25.5 | 27.80 |
| 26 | 45.347 | 6.15 | 1.48749 | 70.2 | 27.46 |
| 27 | −62.911 | (Variable) | | | 27.37 |
| 28 | 3,258.057 | 3.64 | 1.95906 | 17.5 | 26.58 |
| 29 | −43.144 | 1.15 | 2.00100 | 29.1 | 26.69 |
| 30 | 60.877 | 6.73 | | | 27.09 |
| 31 | −77.691 | 2.76 | 1.48749 | 70.2 | 29.69 |
| 32 | −46.344 | 0.20 | | | 30.62 |
| 33 | 43.527 | 7.84 | 1.59522 | 67.7 | 33.95 |
| 34 | −60.882 | 0.20 | | | 33.93 |
| 35 | 67.526 | 8.99 | 1.49700 | 81.5 | 32.19 |
| 36 | −34.755 | 1.30 | 2.00069 | 25.5 | 30.74 |
| 37 | 331.094 | 39.99 | | | 30.53 |
| Image plane | ∞ | | | | |

Aspherical surface data

First surface

K = 3.76090e+000   A4 = 2.06896e−006   A6 = 2.75133e−010
A8 = −1.74958e−012   A10 = 2.46546e−015   A12 = −1.61429e−018
A14 = 4.30176e−022   A16 = −5.15263e−027

Twenty-fourth surface

K = −1.64665e+004   A4 = 5.84957e−006   A6 = −2.47419e−009
A8 = 4.37099e−012

Various data
Zoom ratio 2.81

| | Wide angle | Intermediate | Telephoto |
|---|---|---|---|
| Focal length | 16.00 | 25.00 | 45.00 |
| F-number | 2.80 | 2.80 | 2.80 |
| Half angle of view (degree) | 44.18 | 31.88 | 19.06 |
| Image height | 15.55 | 15.55 | 15.55 |
| Total lens length | 220.02 | 220.02 | 220.02 |
| BF | 39.99 | 39.99 | 39.99 |
| d13 | 1.01 | 14.60 | 25.23 |
| d20 | 27.45 | 13.86 | 3.23 |
| d21 | 7.05 | 8.09 | 1.45 |
| d24 | 20.36 | 11.81 | 3.67 |
| d27 | 1.87 | 9.39 | 24.17 |
| Entrance pupil position | 31.03 | 36.30 | 40.82 |
| Exit pupil position | −145.46 | −116.54 | −88.84 |
| Front principal point position | 45.65 | 57.31 | 70.10 |
| Rear principal point position | 23.99 | 14.99 | −5.01 |

Zoom lens unit data

| Unit | First surface | Focal length | Lens structure length | Front principal point position | Rear principal point position |
|---|---|---|---|---|---|
| 1 | 1 | 42.24 | 64.69 | 45.63 | 39.33 |
| 2 | 14 | −28.02 | 12.05 | 0.18 | −8.98 |
| 3 | 21 | ∞ | 0.00 | 0.00 | −0.00 |
| 4 | 22 | 75.00 | 5.42 | −0.19 | −3.59 |
| 5 | 25 | 90.00 | 7.30 | 2.72 | −2.07 |
| 6 | 28 | 168.15 | 32.81 | 18.41 | −1.40 |

Numerical Embodiment 17

Unit mm

Surface data

| Surface number i | ri | di | ndi | vdi | Effective diameter |
|---|---|---|---|---|---|
| 1* | 176.890 | 2.29 | 1.77250 | 49.6 | 62.57 |
| 2 | 34.297 | 15.70 | | | 51.35 |
| 3 | −154.893 | 1.70 | 1.75500 | 52.3 | 50.62 |
| 4 | 145.540 | 1.94 | | | 50.30 |
| 5 | 66.217 | 5.19 | 1.80809 | 22.8 | 51.27 |
| 6 | 216.955 | 2.54 | | | 50.92 |
| 7 | 429.636 | 4.59 | 1.59522 | 67.7 | 50.56 |
| 8 | −134.830 | 8.19 | | | 50.33 |
| 9 | 75.696 | 1.40 | 1.85478 | 24.8 | 44.71 |
| 10 | 40.148 | 7.10 | 1.43875 | 94.9 | 42.78 |
| 11 | 927.117 | 0.20 | | | 42.50 |
| 12 | 121.317 | 3.72 | 1.49700 | 81.5 | 41.95 |
| 13 | −260.102 | 0.20 | | | 41.62 |
| 14 | 105.642 | 4.35 | 1.61800 | 63.3 | 39.97 |
| 15 | −135.913 | (Variable) | | | 39.49 |
| 16 | 80.065 | 1.00 | 2.00100 | 29.1 | 27.20 |
| 17 | 28.542 | 4.50 | | | 24.84 |
| 18 | −58.030 | 1.00 | 1.77250 | 49.6 | 24.56 |
| 19 | 177.126 | (Variable) | | | 23.97 |
| 20 | 48.868 | 3.36 | 1.84666 | 23.8 | 22.41 |
| 21 | −96.960 | 1.30 | | | 22.45 |
| 22 | −36.621 | 1.00 | 1.53775 | 74.7 | 22.41 |
| 23 | 87.183 | (Variable) | | | 22.85 |
| 24 (Aperture stop) | ∞ | (Variable) | | | 23.59 |
| 25* | 124.261 | 4.68 | 1.59522 | 67.7 | 24.1 |
| 26 | −61.364 | 7.89 | | | 24.82 |
| 27 | 111.142 | 1.20 | 1.95375 | 32.3 | 25.77 |
| 28 | 41.377 | 1.00 | | | 25.60 |
| 29 | 41.279 | 3.90 | 1.49700 | 81.5 | 26.19 |
| 30 | −363.703 | 0.20 | | | 26.36 |
| 31 | 482.971 | 4.91 | 1.49700 | 81.5 | 26.44 |
| 32 | −28.838 | (Variable) | | | 26.53 |
| 33 | −26.251 | 2.00 | 1.91082 | 35.3 | 22.09 |
| 34 | −27.018 | 8.96 | | | 22.80 |
| 35 | 185.086 | 2.73 | 1.95906 | 17.5 | 21.32 |
| 36 | −56.140 | 1.20 | 1.78470 | 26.3 | 21.15 |
| 37 | 27.385 | 19.00 | | | 20.43 |
| 38 | 35.650 | 7.48 | 1.43875 | 94.9 | 27.14 |
| 39 | −38.143 | 1.20 | 1.95375 | 32.3 | 27.08 |
| 40 | −105.322 | 34.35 | | | 27.58 |
| Image plane | ∞ | | | | |

Aspherical surface data

First surface

K = −4.26498e+000   A4 = 3.69843e−007   A6 = 9.50114e−010
A8 = −2.62388e−012   A10 = 5.15834e−015   A12 = −5.81454e−018
A14 = 3.39437e−021   A16 = −7.97543e−025

Twenty-fifth surface

K = −5.53776e+001   A4 = −7.80282e−006   A6 = −1.04302e−008
A8 = −1.47914e−011

Various data
Zoom ratio 4.50

| | Wide angle | Intermediate | Telephoto |
|---|---|---|---|
| Focal length | 20.00 | 38.00 | 90.00 |
| F-number | 4.00 | 4.00 | 4.00 |
| Half angle of view (degree) | 37.87 | 22.25 | 9.80 |
| Image height | 15.55 | 15.55 | 15.55 |
| Total lens length | 235.02 | 235.02 | 235.02 |
| BF | 34.35 | 34.35 | 34.35 |
| d15 | 1.11 | 20.71 | 42.01 |
| d19 | 6.08 | 3.01 | 2.83 |

-continued

Unit mm

| | | | |
|---|---|---|---|
| d23 | 39.64 | 23.11 | 2.00 |
| d24 | 13.43 | 7.66 | 1.78 |
| d32 | 2.80 | 8.56 | 14.44 |
| Entrance pupil position | 37.79 | 51.27 | 70.55 |
| Exit pupil position | −99.02 | −84.77 | −76.88 |
| Front principal point position | 54.79 | 77.15 | 87.73 |
| Rear principal point position | 14.35 | −3.65 | −55.65 |

Zoom lens unit data

| Unit | First surface | Focal length | Lens structure length | Front principal point position | Rear principal point position |
|---|---|---|---|---|---|
| 1 | 1 | 60.05 | 59.10 | 50.08 | 37.34 |
| 2 | 16 | −23.77 | 6.50 | 2.63 | −2.76 |
| 3 | 20 | 152.93 | 5.66 | −8.09 | −11.25 |
| 4 | 24 | ∞ | 0.00 | 0.00 | −0.00 |
| 5 | 25 | 36.07 | 23.77 | 12.97 | −8.11 |
| 6 | 33 | −105.59 | 42.57 | −4.90 | −46.52 |

Numerical Embodiment 18

Unit mm

Surface data

| Surface number i | ri | di | ndi | vdi | Effective diameter |
|---|---|---|---|---|---|
| 1 | 804.683 | 3.20 | 1.77250 | 49.6 | 74.51 |
| 2 | 63.042 | 13.88 | | | 65.63 |
| 3 | −216.520 | 2.70 | 1.77250 | 49.6 | 64.61 |
| 4 | 188.432 | 0.29 | | | 63.71 |
| 5 | 100.018 | 5.31 | 1.89286 | 20.4 | 63.89 |
| 6 | 465.338 | 1.23 | | | 63.56 |
| 7 | 502.979 | 7.07 | 1.59522 | 67.7 | 63.09 |
| 8 | −118.391 | 10.90 | | | 62.51 |
| 9 | 806.714 | 2.10 | 1.85478 | 24.8 | 51.72 |
| 10 | 58.402 | 7.97 | 1.49700 | 81.5 | 49.64 |
| 11 | −328.574 | 0.20 | | | 49.44 |
| 12 | 78.176 | 7.17 | 1.48749 | 70.2 | 48.06 |
| 13 | −170.706 | 0.20 | | | 47.37 |
| 14 | 72.857 | 4.46 | 1.76385 | 48.5 | 43.33 |
| 15 | 572.192 | (Variable) | | | 42.81 |
| 16* | −1,998.000 | 1.40 | 1.88300 | 40.8 | 29.87 |
| 17 | 29.616 | 4.07 | | | 26.23 |
| 18 | −530.908 | 1.20 | 1.59522 | 67.7 | 25.66 |
| 19 | 28.272 | 4.31 | 1.85478 | 24.8 | 24.07 |
| 20 | −337.191 | 3.03 | | | 23.41 |
| 21 | −39.634 | 1.20 | 1.76385 | 48.5 | 22.92 |
| 22 | 417.246 | (Variable) | | | 23.55 |
| 23 (Aperture stop) | ∞ | (Variable) | | | 25.86 |
| 24 | 48.973 | 3.13 | 1.59522 | 67.7 | 31.58 |
| 25* | 106.865 | (Variable) | | | 31.56 |
| 26 | 116.458 | 4.92 | 1.49700 | 81.5 | 34.16 |
| 27 | −83.088 | 0.20 | | | 34.27 |
| 28 | 110.352 | 1.66 | 2.00069 | 25.5 | 33.85 |
| 29 | 57.654 | 5.34 | 1.49700 | 81.5 | 33.24 |
| 30 | −101.992 | (Variable) | | | 33.10 |
| 31 | 78.224 | 5.04 | 1.95906 | 17.5 | 29.43 |
| 32 | −86.858 | 1.66 | 2.00069 | 25.5 | 28.81 |
| 33 | 38.807 | 4.82 | | | 27.52 |
| 34 | 43.234 | 8.36 | 1.43875 | 94.9 | 28.88 |
| 35 | −27.466 | 1.87 | 1.88300 | 40.8 | 28.84 |
| 36 | −57.347 | 44.92 | | | 29.89 |
| Image plane | ∞ | | | | |

Aspherical surface data

Sixteenth surface

K = −4.15372e+004  A4 = 1.58106e−006  A6 = −4.35523e−010
A8 = −6.81773e−013

Twenty-fifth surface

K = 0.00000e+000  A4 = 3.55895e−006  A6 = −1.14035e−010
A8 = 3.47629e−014

Various data
Zoom ratio 10.00

| | Wide angle | Intermediate | Telephoto |
|---|---|---|---|
| Focal length | 22.00 | 70.00 | 220.00 |
| F-number | 4.00 | 4.00 | 6.99 |
| Half angle of view (degree) | 35.25 | 12.52 | 4.04 |
| Image height | 15.55 | 15.55 | 15.55 |
| Total lens length | 285.13 | 285.13 | 285.13 |
| BF | 44.92 | 44.92 | 44.92 |
| d15 | 1.27 | 28.90 | 40.63 |
| d22 | 40.96 | 13.32 | 1.60 |
| d23 | 23.97 | 20.13 | 1.33 |
| d25 | 29.42 | 15.44 | 1.29 |
| d30 | 25.72 | 43.54 | 76.49 |
| Entrance pupil position | 50.53 | 87.93 | 111.01 |
| Exit pupil position | −274.13 | −130.53 | −86.82 |
| Front principal point position | 71.01 | 130.00 | −36.37 |
| Rear principal point position | 22.92 | −25.08 | −175.08 |

Zoom lens unit data

| Unit | First surface | Focal length | Lens structure length | Front principal point position | Rear principal point position |
|---|---|---|---|---|---|
| 1 | 1 | 60.55 | 66.67 | 50.12 | 20.27 |
| 2 | 16 | −22.51 | 15.21 | 4.16 | −6.28 |
| 3 | 23 | ∞ | 0.00 | 0.00 | −0.00 |
| 4 | 24 | 148.35 | 3.13 | −1.63 | −3.55 |
| 5 | 26 | 65.97 | 12.12 | 3.41 | −4.60 |
| 6 | 31 | −320.34 | 21.75 | −1.82 | −17.59 |

Numerical Embodiment 19

Unit mm

Surface data

| Surface number i | ri | di | ndi | vdi |
|---|---|---|---|---|
| 1* | 81.702 | 2.53 | 1.58313 | 59.4 |
| 2 | 29.022 | 22.73 | | |
| 3 | −89.939 | 1.80 | 1.80100 | 35.0 |
| 4 | 66.192 | 0.17 | | |
| 5 | 62.847 | 5.68 | 1.95906 | 17.5 |
| 6 | 183.160 | (Variable) | | |
| 7 | 166.621 | 1.66 | 1.92286 | 18.9 |
| 8 | 49.790 | 5.06 | 1.80400 | 46.6 |
| 9 | −120.403 | 0.17 | | |
| 10 | 66.654 | 3.93 | 1.59522 | 67.7 |

-continued

Unit mm

| | | | | |
|---|---|---|---|---|
| 11 | −195.409 | 0.17 | | |
| 12 | 45.207 | 4.44 | 1.49700 | 81.5 |
| 13 | −786.170 | (Variable) | | |
| 14 (Auxiliary stop) | ∞ | 1.50 | | |
| 15 | −69.607 | 0.81 | 1.77250 | 49.6 |
| 16 | 36.952 | 2.32 | | |
| 17 | −39.631 | 0.82 | 1.81600 | 46.6 |
| 18 | 36.997 | 2.84 | 1.92286 | 18.9 |
| 19 | −190.184 | 2.40 | | |
| 20 (Aperture stop) | ∞ | (Variable) | | |
| 21 | 56.892 | 0.91 | 1.77377 | 47.2 |
| 22 | 21.416 | 5.84 | 1.53775 | 74.7 |
| 23 | −55.593 | 0.17 | | |
| 24* | 28.671 | 3.91 | 1.49710 | 81.6 |
| 25* | −135.524 | (Variable) | | |
| 26 | 100.833 | 3.59 | 1.67790 | 50.7 |
| 27 | −42.974 | 0.38 | | |
| 28 | −83.876 | 0.97 | 1.65412 | 39.7 |
| 29 | 20.466 | (Variable) | | |
| 30 | 61.493 | 6.38 | 1.49700 | 81.5 |
| 31 | −45.013 | 0.17 | | |
| 32 | −56.595 | 1.30 | 1.80000 | 29.8 |
| 33 | −142.912 | (Variable) | | |
| 34 | ∞ | 2.39 | 1.51633 | 64.1 |
| 35 | ∞ | 1.00 | | |
| Image plane | ∞ | | | |

Aspherical surface data

First surface

K = 3.15206e+000  A4 = 1.33089e−006  A6 = −3.38383e−010
A8 = 1.34709e−013

Twenty-fourth surface

K = 8.65366e−001  A4 = −3.98379e−006  A6 = −1.55066e−008
A8 = 2.49943e−011

Twenty-fifth surface

K = −1.34843e+002  A4 = 1.97851e−006  A6 = 8.22794e−009
A8 = 1.23339e−011

Various data
Zoom ratio 4.87

| | Wide angle | Intermediate | Telephoto |
|---|---|---|---|
| Focal length | 18.09 | 37.67 | 88.13 |
| F-number | 3.77 | 4.12 | 4.12 |
| Half angle of view | 39.29 | 21.45 | 9.53 |
| Image height | 14.80 | 14.80 | 14.80 |
| Total lens length | 194.31 | 194.31 | 194.31 |
| BF | 38.62 | 38.62 | 38.62 |
| d6 | 44.48 | 22.90 | 1.31 |
| d13 | 0.94 | 8.35 | 24.67 |
| d20 | 18.79 | 10.11 | 1.93 |
| d25 | 5.93 | 4.43 | 9.22 |
| d29 | 2.89 | 27.24 | 35.89 |
| d33 | 36.05 | 36.05 | 36.05 |

Zoom lens unit data

| Unit | First surface | Focal length |
|---|---|---|
| 1 | 1 | −36.97 |
| 2 | 7 | 31.04 |
| 3 | 14 | −22.02 |
| 4 | 21 | 30.78 |
| 5 | 26 | −61.34 |
| 6 | 30 | 95.19 |
| 7 | 34 | ∞ |

Numerical Embodiment 20

Unit mm

Surface data

| Surface number i | ri | di | ndi | vdi |
|---|---|---|---|---|
| 1* | 114.036 | 2.49 | 1.67790 | 55.3 |
| 2 | 31.929 | 15.77 | | |
| 3 | −78.982 | 1.97 | 1.78800 | 47.4 |
| 4 | 60.053 | 0.17 | | |
| 5 | 61.019 | 3.04 | 1.92286 | 18.9 |
| 6 | 112.720 | 1.17 | | |
| 7 | 129.329 | 6.38 | 1.48749 | 70.2 |
| 8 | −83.157 | 0.17 | | |
| 9 | 363.415 | 1.75 | 1.95906 | 17.5 |
| 10 | 144.579 | (Variable) | | |
| 11 | 310.282 | 1.35 | 1.92286 | 18.9 |
| 12 | 56.186 | 5.15 | 1.88300 | 40.8 |
| 13 | −98.115 | 0.44 | | |
| 14 | 46.056 | 4.38 | 1.82080 | 42.7 |
| 15 | 50,345.024 | (Variable) | | |
| 16 (Aperture stop) | ∞ | 1.50 | | |
| 17 | −70.852 | 1.11 | 1.91082 | 35.3 |
| 18 | 42.762 | 3.29 | | |
| 19 | −50.084 | 1.29 | 1.53775 | 74.7 |
| 20 | 52.883 | 4.12 | 1.95906 | 17.5 |
| 21 | −149.787 | (Variable) | | |
| 22 | 257.828 | 1.11 | 1.59551 | 39.2 |
| 23 | 32.686 | 5.72 | 1.53775 | 74.7 |
| 24 | −64.949 | 0.17 | | |
| 25* | 27.663 | 4.57 | 1.49710 | 81.6 |
| 26* | −307.240 | (Variable) | | |
| 27 | −68.329 | 2.94 | 1.43700 | 95.1 |
| 28 | −42.165 | 0.17 | | |
| 29 | 74.117 | 1.12 | 1.74000 | 28.3 |
| 30 | 23.825 | (Variable) | | |
| 31* | 95.468 | 5.35 | 1.49700 | 81.5 |
| 32* | −58.796 | 0.17 | | |
| 33 | −49.493 | 1.54 | 1.85478 | 24.8 |
| 34 | −423.360 | 0.99 | | |
| 35 | 271.563 | 5.15 | 1.85150 | 40.8 |
| 36 | −59.108 | (Variable) | | |
| 37 | ∞ | 2.39 | 1.51633 | 64.1 |
| 38 | ∞ | 1.00 | | |
| Image plane | ∞ | | | |

Aspherical surface data

First surface

K = 7.90337e+000  A4 = 1.90544e−006  A6 = −6.74990e−010
A8 = 1.87170e−013

Twenty-fifth surface

K = 9.07882e−002  A4 = −1.59091e−006  A6 = 4.76103e−009
A8 = −5.70617e−012

Twenty-sixth surface

K = 1.31523e+002  A4 = 7.23595e−006  A6 = 7.80231e−009
A8 = −3.13907e−012

Thirty-first surface

K = −2.29855e+000  A4 = −4.08764e−006  A6 = −3.49182e−009
A8 = 6.07345e−012

Thirty-second surface

K = −1.03267e+000  A4 = −3.81370e−006  A6 = −3.94685e−009
A8 = 6.64729e−012

Unit mm

Various data
Zoom ratio 3.02

|  | Wide angle | Intermediate | Telephoto |
|---|---|---|---|
| Focal length | 15.97 | 27.11 | 48.20 |
| F-number | 2.63 | 2.63 | 2.63 |
| Half angle of view | 42.83 | 28.63 | 17.07 |
| Image height | 14.80 | 14.80 | 14.80 |
| Total lens length | 193.18 | 193.18 | 193.18 |
| BF | 36.20 | 36.20 | 36.20 |
| d10 | 43.20 | 25.05 | 6.90 |
| d15 | 1.41 | 8.71 | 21.26 |
| d21 | 20.92 | 12.17 | 4.61 |
| d26 | 3.16 | 1.32 | 3.25 |
| d30 | 3.73 | 25.17 | 36.39 |
| d36 | 33.63 | 33.63 | 33.63 |

Zoom lens unit data

| Unit | First surface | Focal length |
|---|---|---|
| 1 | 1 | −36.10 |
| 2 | 11 | 34.77 |
| 3 | 16 | −34.26 |
| 4 | 22 | 35.52 |
| 5 | 27 | −59.00 |
| 6 | 31 | 63.46 |
| 7 | 37 | ∞ |

Numerical Embodiment 21

Unit mm

Surface data

| Surface number i | ri | di | ndi | vdi |
|---|---|---|---|---|
| 1* | 101.966 | 2.60 | 1.65844 | 50.9 |
| 2 | 28.875 | 13.02 | | |
| 3 | −70.075 | 1.65 | 1.82080 | 42.7 |
| 4 | 65.465 | 0.17 | | |
| 5 | 63.828 | 2.21 | 1.92286 | 18.9 |
| 6 | 112.038 | 2.06 | | |
| 7 | 109.686 | 5.12 | 1.48749 | 70.2 |
| 8 | −83.194 | 0.17 | | |
| 9 | 194.993 | 1.51 | 1.92286 | 18.9 |
| 10 | 95.187 | (Variable) | | |
| 11 | 176.062 | 1.13 | 1.92286 | 18.9 |
| 12 | 53.194 | 3.51 | 1.91650 | 31.6 |
| 13 | −147.006 | 1.05 | | |
| 14 | 45.073 | 2.82 | 1.75700 | 47.8 |
| 15 | 377.147 | (Variable) | | |
| 16 (Auxiliary stop) | ∞ | 1.50 | | |
| 17 | −78.508 | 0.77 | 1.85025 | 30.1 |
| 18 | 44.753 | 2.61 | | |
| 19 | −65.341 | 0.81 | 1.51633 | 64.1 |
| 20 | 55.798 | 2.19 | 1.95906 | 17.5 |
| 21 | −131.416 | 2.32 | | |
| 22 (Aperture stop) | ∞ | (Variable) | | |
| 23 | 749.168 | 0.86 | 1.76182 | 26.5 |
| 24 | 40.283 | 3.20 | 1.53775 | 74.7 |
| 25 | −76.383 | 0.17 | | |
| 26* | 31.815 | 7.12 | 1.49710 | 81.6 |
| 27* | −217.663 | (Variable) | | |
| 28 | −59.592 | 1.34 | 1.43875 | 94.9 |
| 29 | −41.199 | 0.48 | | |
| 30 | 59.123 | 1.21 | 1.68893 | 31.1 |
| 31 | 25.501 | (Variable) | | |
| 32* | 86.512 | 7.35 | 1.49700 | 81.5 |
| 33* | −69.543 | 0.74 | | |
| 34 | −48.004 | 1.19 | 1.91650 | 31.6 |
| 35 | −278.443 | 1.97 | | |
| 36 | 166.130 | 3.59 | 1.83481 | 42.7 |
| 37 | −65.316 | (Variable) | | |
| 38 | ∞ | 2.39 | 1.51633 | 64.1 |
| 39 | ∞ | 1.00 | | |
| Image plane | ∞ | | | |

Aspherical surface data

First surface

K = 8.12321e+000  A4 = 2.11802e−006  A6 = −8.90132e−010
A8 = 4.31892e−014

Twenty-sixth surface

K = 2.94657e−001  A4 = −1.70311e−006  A6 = 6.12641e−009
A8 = 5.47472e−012

Twenty-seventh surface

K = 1.32110e+002  A4 = 5.96444e−006  A6 = 1.09325e−008
A8 = 2.22197e−011

Thirty-second surface

K = 8.13086e+000  A4 = −5.92042e−006  A6 = −4.43610e−009
A8 = −6.39210e−011

Thirty-third surface

K = 2.84396e+000  A4 = −3.92304e−006  A6 = −3.20331e−009
A8 = −5.56953e−011

Various data
Zoom ratio 2.99

|  | Wide angle | Intermediate | Telephoto |
|---|---|---|---|
| Focal length | 18.54 | 30.01 | 55.50 |
| F-number | 4.12 | 4.12 | 4.12 |
| Half angle of view | 38.60 | 26.25 | 14.93 |
| Image height | 14.80 | 14.80 | 14.80 |
| Total lens length | 194.23 | 194.23 | 194.23 |
| BF | 39.73 | 38.78 | 39.96 |
| d10 | 46.61 | 26.73 | 6.85 |
| d15 | 6.10 | 14.06 | 30.32 |
| d22 | 20.91 | 13.48 | 2.69 |
| d27 | 1.71 | 5.14 | 28.69 |
| d31 | 2.77 | 19.63 | 9.32 |
| d37 | 37.15 | 36.20 | 37.38 |

Zoom lens unit data

| Unit | First surface | Focal length |
|---|---|---|
| 1 | 1 | −32.26 |
| 2 | 11 | 38.77 |
| 3 | 16 | −46.68 |
| 4 | 23 | 48.96 |
| 5 | 28 | −84.81 |
| 6 | 32 | 67.92 |
| 7 | 38 | ∞ |

Numerical Embodiment 22

Unit mm

Surface data

| Surface number i | ri | di | ndi | vdi |
|---|---|---|---|---|
| 1* | 98.617 | 2.74 | 1.69350 | 50.8 |
| 2 | 29.635 | 15.88 | | |
| 3 | −78.660 | 1.83 | 1.72916 | 54.7 |
| 4 | 56.707 | 0.19 | | |
| 5 | 57.157 | 3.01 | 1.92286 | 18.9 |
| 6 | 129.576 | 2.40 | | |
| 7 | 149.841 | 5.25 | 1.48749 | 70.2 |
| 8 | −75.492 | 0.87 | | |
| 9 | 272.710 | 1.84 | 1.95906 | 17.5 |
| 10 | 142.283 | (Variable) | | |
| 11 | 475.033 | 1.44 | 1.92286 | 18.9 |
| 12 | 56.331 | 5.36 | 1.88300 | 40.8 |
| 13 | −83.422 | 0.60 | | |
| 14 | 49.207 | 2.94 | 1.81600 | 46.6 |
| 15 | 26,064.287 | (Variable) | | |
| 16 (Auxiliary stop) | ∞ | 1.50 | | |
| 17 | −68.661 | 0.68 | 1.95375 | 32.3 |
| 18 | 44.507 | 2.00 | | |
| 19 | −38.502 | 0.70 | 1.61800 | 63.3 |
| 20 | 44.457 | 2.43 | 1.95906 | 17.5 |
| 21 | −177.324 | 2.48 | | |
| 22 (Aperture stop) | ∞ | (Variable) | | |
| 23 | 1,246.198 | 0.98 | 1.73800 | 32.3 |
| 24 | 39.615 | 3.65 | 1.53775 | 74.7 |
| 25 | −39.604 | 0.21 | | |
| 26* | 37.466 | 2.71 | 1.49710 | 81.6 |
| 27* | −236.973 | (Variable) | | |
| 28 | −102.027 | 1.66 | 1.49700 | 81.5 |
| 29 | −49.780 | 0.20 | | |
| 30 | 45.065 | 1.04 | 1.68893 | 31.1 |
| 31 | 25.294 | (Variable) | | |
| 32* | 116.446 | 5.77 | 1.49700 | 81.5 |
| 33* | −55.728 | 0.43 | | |
| 34 | −51.820 | 1.38 | 1.85026 | 32.3 |
| 35 | −577.866 | 0.98 | | |
| 36 | 5,250.656 | 3.99 | 1.74400 | 44.8 |
| 37 | −52.324 | (Variable) | | |
| 38 | ∞ | 2.39 | 1.51633 | 64.1 |
| 39 | ∞ | 1.00 | | |
| Image plane | ∞ | | | |

Aspherical surface data

First surface

K = 5.94773e+000  A4 = 9.29791e−007  A6 = −9.89952e−011
A8 = −3.09014e−013

Twenty-sixth surface

K = 4.02304e−001  A4 = −3.38502e−008  A6 = 6.13470e−009
A8 = −2.34864e−011

Twenty-seventh surface

K = 1.97934e+002  A4 = 5.37087e−006  A6 = 8.53651e−009
A8 = 1.32731e−013

Thirty-second surface

K = −3.03687e+000  A4 = −3.73263e−006  A6 = −7.82156e−009
A8 = 3.12125e−012

Thirty-third surface

K = 1.04896e+000  A4 = −2.30491e−006  A6 = −7.06007e−009
A8 = 2.55100e−012

Unit mm

Various data
Zoom ratio 2.98

| | Wide angle | Intermediate | Telephoto |
|---|---|---|---|
| Focal length | 18.52 | 32.01 | 55.19 |
| F-number | 4.12 | 4.12 | 4.12 |
| Half angle of view | 38.63 | 24.81 | 15.01 |
| Image height | 14.80 | 14.80 | 14.80 |
| Total lens length | 194.25 | 194.25 | 194.25 |
| BF | 36.92 | 36.92 | 36.92 |
| d10 | 39.66 | 23.74 | 7.82 |
| d15 | 0.98 | 9.18 | 22.45 |
| d22 | 16.18 | 8.58 | 2.82 |
| d27 | 20.13 | 13.35 | 1.20 |
| d31 | 3.26 | 25.36 | 45.92 |
| d37 | 34.34 | 34.34 | 34.34 |

Zoom lens unit data

| Unit | First surface | Focal length |
|---|---|---|
| 1 | 1 | −42.63 |
| 2 | 11 | 35.56 |
| 3 | 16 | −26.30 |
| 4 | 23 | 40.55 |
| 5 | 28 | −154.04 |
| 6 | 32 | 79.49 |
| 7 | 38 | ∞ |

Numerical Embodiment 23

Unit mm

Surface data

| Surface number i | ri | di | ndi | vdi |
|---|---|---|---|---|
| 1* | 100.485 | 2.63 | 1.65844 | 50.9 |
| 2 | 28.898 | 13.75 | | |
| 3 | −69.325 | 1.65 | 1.82080 | 42.7 |
| 4 | 66.191 | 0.17 | | |
| 5 | 63.786 | 2.19 | 1.92286 | 18.9 |
| 6 | 111.316 | 2.06 | | |
| 7 | 109.452 | 5.15 | 1.48749 | 70.2 |
| 8 | −82.043 | 0.17 | | |
| 9 | 195.536 | 1.51 | 1.92286 | 18.9 |
| 10 | 94.636 | (Variable) | | |
| 11 | 177.186 | 1.12 | 1.92286 | 18.9 |
| 12 | 53.531 | 3.43 | 1.91650 | 31.6 |
| 13 | −148.382 | 0.56 | | |
| 14 | 44.694 | 2.80 | 1.75700 | 47.8 |
| 15 | 373.256 | (Variable) | | |
| 16 (Auxiliary stop) | ∞ | 1.50 | | |
| 17 | −75.512 | 0.77 | 1.85025 | 30.1 |
| 18 | 44.397 | 2.58 | | |
| 19 | −65.450 | 0.81 | 1.51633 | 64.1 |
| 20 | 55.190 | 2.22 | 1.95906 | 17.5 |
| 21 | −127.585 | 2.30 | | |
| 22 (Aperture stop) | ∞ | (Variable) | | |
| 23 | 819.467 | 0.86 | 1.76182 | 26.5 |
| 24 | 40.640 | 3.20 | 1.53775 | 74.7 |
| 25 | −77.279 | 0.17 | | |
| 26* | 31.896 | 6.41 | 1.49710 | 81.6 |
| 27* | −217.262 | (Variable) | | |
| 28 | −60.051 | 1.36 | 1.43875 | 94.9 |
| 29 | −40.842 | 0.17 | | |
| 30 | 59.521 | 1.01 | 1.68893 | 31.1 |

-continued

| Unit mm | | | | |
|---|---|---|---|---|
| 31 | 25.836 | (Variable) | | |
| 32* | 85.927 | 7.17 | 1.49700 | 81.5 |
| 33* | −69.930 | (Variable) | | |
| 34 | −47.910 | 1.18 | 1.91650 | 31.6 |
| 35 | −282.850 | 1.97 | | |
| 36 | 168.871 | 3.54 | 1.83481 | 42.7 |
| 37 | −65.536 | (Variable) | | |
| 38 | ∞ | 2.39 | 1.51633 | 64.1 |
| 39 | ∞ | 1.00 | | |
| Image plane | ∞ | | | |

Aspherical surface data

First surface

K = 7.64638e+000  A4 = 2.12042e−006  A6 = −8.90408e−010
A8 = 8.06173e−014

Twenty-sixth surface

K = 2.91276e−001  A4 = −1.74556e−006  A6 = 6.36141e−009
A8 = 1.16682e−011

Twenty-seventh surface

K = 1.31905e+002  A4 = 5.86371e−006  A6 = 1.09056e−008
A8 = 2.96638e−011

Thirty-second surface

K = 8.11527e+000  A4 = −5.96871e−006  A6 = −4.25357e−009
A8 = −6.80723e−011

Thirty-third surface

K = 2.52144e+000  A4 = −3.98092e−006  A6 = −2.93962e−009
A8 = −5.98170e−011

-continued

| Unit mm | | | |
|---|---|---|---|
| Various data Zoom ratio 2.99 | | | |
| | Wide angle | Intermediate | Telephoto |
| Focal length | 18.54 | 29.84 | 55.51 |
| F-number | 4.12 | 4.12 | 4.12 |
| Half angle of view | 38.60 | 26.38 | 14.93 |
| Image height | 14.80 | 14.80 | 14.80 |
| Total lens length | 194.18 | 194.18 | 194.18 |
| BF | 39.71 | 39.71 | 39.71 |
| d10 | 46.51 | 26.63 | 6.76 |
| d15 | 6.31 | 14.16 | 29.87 |
| d22 | 20.85 | 13.54 | 2.71 |
| d27 | 1.69 | 5.24 | 29.11 |
| d31 | 2.71 | 19.48 | 8.71 |
| d33 | 2.00 | 1.02 | 2.90 |
| d37 | 37.13 | 37.13 | 37.13 |

Zoom lens unit data

| Unit | First surface | Focal length |
|---|---|---|
| 1 | 1 | −32.25 |
| 2 | 11 | 38.58 |
| 3 | 16 | −46.23 |
| 4 | 23 | 49.29 |
| 5 | 28 | −87.45 |
| 6 | 32 | 78.78 |
| 7 | 34 | 350.53 |
| 8 | 38 | ∞ |

Relationships between the above-mentioned respective conditional expressions and various numerical values in Numerical Embodiments are shown in Tables 1, 2, and 3.

TABLE 1

Relationships between the respective conditional expressions and various numerical values in Numerical Embodiments 1 to 8

| Conditional Expression | Upper limit value | Lower limit value | Embodiment | | | | | | | |
|---|---|---|---|---|---|---|---|---|---|---|
| | | | 1 | 2 | 3 | 4 | 5 | 6 | 7 | 8 |
| PN are present before stop? | | | yes | yes | yes | yes | yes | yes | yes | yes |
| N is present immediately before stop? | | | yes | yes | yes | yes | yes | yes | yes | yes |
| There are only three lens units after stop? | | | yes | yes | yes | yes | yes | yes | yes | yes |
| Two lens units after stop are configured to move? | | | yes | yes | yes | yes | yes | yes | yes | yes |
| Prerequisite components | | | yes | yes | yes | yes | yes | yes | yes | yes |
| (1) Mr2/fr2 | 0.45 | −0.80 | −0.299 | 0.414 | −0.374 | −0.020 | −0.542 | −0.245 | −0.482 | −0.422 |
| (2) Mr2/fw | 0.30 | −2.00 | −1.521 | −1.268 | −0.994 | 0.085 | −1.306 | −1.216 | −1.497 | −0.871 |
| (3) Mr1/Mr2 | 2.00 | −15.00 | 0.584 | 1.050 | 0.609 | −13.547 | 0.312 | 0.394 | 0.261 | 0.324 |
| (4) |fr1|/fw | 15.00 | 1.00 | 3.326 | 1.504 | 11.861 | 2.325 | 3.545 | 2.341 | 5.231 | 2.799 |
| (5) |fr2|/fw | 5.50 | 1.00 | 5.090 | 3.063 | 2.658 | 4.235 | 2.410 | 4.973 | 3.102 | 2.064 |
| (6) |fr1|/fr2| | 4.91 | 0.44 | 0.653 | 0.491 | 4.463 | 0.549 | 1.471 | 0.471 | 1.686 | 1.356 |
| PNP~ | | | yes | no | yes | yes | yes | yes | yes | yes |
| Prerequisite components | | | yes | no | yes | yes | yes | yes | yes | yes |
| (7) f1/fw | 4.50 | 0.50 | 2.794 | | 2.422 | 2.607 | 1.917 | 1.382 | 2.368 | 1.944 |
| (8) SPt/SPw | 3.00 | 1.10 | 1.565 | | 1.404 | 1.598 | 1.737 | 1.287 | 1.582 | 1.540 |
| (9) f1/f2w | −0.50 | −2.50 | −1.842 | | −1.474 | −1.947 | −2.300 | −1.498 | −1.974 | −2.470 |
| Third lens unit is PP | | | yes | | yes | yes | yes | yes | yes | yes |
| (10) |fw/fr| | 0.40 | 0.00 | 0.005 | | 0.009 | 0.186 | 0.063 | 0.006 | 0.077 | 0.160 |
| (11) f11/f1 | −0.30 | −2.00 | −0.882 | | −1.118 | −1.118 | −1.428 | −1.073 | −0.665 | −1.369 |
| (12) f13/f11 | −0.50 | −4.00 | −1.592 | | −1.252 | −1.154 | −0.875 | −1.121 | −1.547 | −1.070 |
| (13) f31/f32 | 3.00 | 0.20 | 0.653 | | −4.463 | −0.549 | 1.471 | 0.471 | 1.686 | 1.356 |
| PNPP~ | | | yes | no | no | no | yes | yes | yes | yes |
| IF with third lens unit | | | yes | yes | yes | yes | yes | yes | yes | yes |
| 11 lens sub unit is NNP? | | | yes | yes | yes | yes | yes | no | yes | yes |
| Prerequisite components | | | yes | no | no | no | yes | no | yes | yes |
| (14) S.F. | 2.00 | −0.50 | −1.568 | | | | −0.478 | | −0.640 | 0.322 |
| (15) Lsp/L | 0.60 | 0.10 | | | | | 0.567 | | | 0.652 |
| (16) G1f/G2f | 1.00 | 0.40 | | | | | 0.622 | | | |
| (17) F1-4/F1 | 0.80 | 0.50 | | | | | 0.563 | | | |
| (18) F56/F1 | −1.00 | −5.00 | | | | | −1.717 | | | |

TABLE 1-continued

Relationships between the respective conditional expressions and various numerical values in Numerical Embodiments 1 to 8

| Conditional Expression | Upper limit value | Lower limit value | Embodiment 1 | 2 | 3 | 4 | 5 | 6 | 7 | 8 |
|---|---|---|---|---|---|---|---|---|---|---|
| (19) ν1n − ν1p | 35.00 | 20.00 | | | | | 24.800 | | | |
| (20) L1/L | 0.50 | 0.25 | | | | | 0.329 | | | |
| PNPP(P or N) are present and second to fourth lens units are configured to move? | | | | | | | yes | | | |
| NPNPNP~ | | | no | yes | no | no | no | no | no | no |
| Prerequisite components | | | no | yes | no | no | no | no | no | no |
| (21) M2/M4 | 0.90 | 0.50 | | 0.631 | | | | | | |
| (22) MD45/M4 | 1.00 | −1.00 | | −0.047 | | | | | | |
| (23) f1/fw | −1.50 | −2.50 | | −2.065 | | | | | | |
| (24) f1/f3 | 2.00 | 0.50 | | 1.676 | | | | | | |

"yes" represents yes or available
"no" represents no or N/A

TABLE 2

Relationships between the respective conditional expressions and various numerical values in Numerical Embodiments 9 to 16

| Conditional Expression | Upper limit value | Lower limit value | Embodiment 9 | 10 | 11 | 12 | 13 | 14 | 15 | 16 |
|---|---|---|---|---|---|---|---|---|---|---|
| PN are present before stop? | | | yes | yes | yes | yes | yes | yes | yes | yes |
| N is present immediately before stop? | | | yes | yes | yes | yes | yes | no | yes | yes |
| There are only three lens units after stop? | | | yes | yes | yes | no | yes | no | yes | yes |
| Two lens units after stop are configured to move? | | | yes | yes | yes | yes | no | no | no | yes |
| Prerequisite component | | | yes | yes | yes | no | no | no | no | yes |
| (1) Mr2/fr2 | 0.45 | −0.80 | 0.235 | −0.459 | −0.547 | | | | | −0.248 |
| (2) Mr2/fw | 0.30 | −2.00 | −0.689 | −1.570 | −1.330 | | | | | −1.393 |
| (3) Mr1/Mr2 | 2.00 | −15.00 | 1.374 | 0.249 | 0.301 | | | | | 0.251 |
| (4) |fr1|/fw | 15.00 | 1.00 | 1.518 | 4.474 | 3.517 | | | | | 4.687 |
| (5) |fr2|/fw | 5.50 | 1.00 | 2.938 | 3.421 | 2.430 | | | | | 5.625 |
| (6) |fr1/fr2| | 4.91 | 0.44 | 0.516 | 1.308 | 1.447 | | | | | 0.833 |
| PNP~ | | | no | yes | yes | yes | yes | yes | yes | yes |
| Prerequisite components | | | no | yes | yes | yes | yes | yes | yes | yes |
| (7) f1/fw | 4.50 | 0.50 | | 2.368 | 1.917 | 2.471 | 2.814 | 3.435 | 2.224 | 2.640 |
| (8) SPt/SPw | 3.00 | 1.10 | | 1.561 | 1.724 | 1.436 | 1.197 | 1.594 | 1.378 | 1.295 |
| (9) f1/f2w | −0.50 | −2.50 | | −1.974 | −2.300 | −2.011 | −0.953 | −1.991 | −1.837 | −1.507 |
| Third lens unit is PP | | | | yes | yes | yes | yes | yes | yes | yes |
| (10) |fw/fr| | 0.40 | 0.00 | | 0.038 | 0.061 | 0.146 | 0.093 | 0.116 | 0.006 | 0.095 |
| (11) f11/f1 | −0.30 | −2.00 | | −0.688 | −1.304 | −0.881 | −0.838 | −0.679 | −1.051 | −0.760 |
| (12) f13/f11 | −0.50 | −4.00 | | −1.633 | −0.961 | −1.213 | −2.791 | −1.460 | −1.139 | −1.814 |
| (13) f31/f32 | 3.00 | 0.20 | | 1.308 | 1.447 | 0.493 | 2.380 | 4.478 | 1.177 | 0.833 |
| PNPP~ | | | no | yes | yes | yes | yes | yes | yes | yes |
| IF with third lens unit | | | no | yes | yes | yes | yes | yes | yes | yes |
| 11 lens sub unit is NNP? | | | yes | yes | yes | yes | no | yes | yes | yes |
| Prerequisite components | | | no | yes | yes | yes | no | yes | yes | yes |
| (14) S.F. | 2.00 | −0.50 | | −0.516 | −0.310 | 0.043 | | 0.118 | 0.555 | 1.071 |
| (15) Lsp/L | 0.60 | 0.10 | | | 0.566 | 0.552 | | 0.596 | 0.573 | 0.584 |
| (16) G1f/G2f | 1.00 | 0.40 | | | 0.758 | 1.091 | | 0.576 | 0.812 | 0.750 |
| (17) F1-4/F1 | 0.80 | 0.50 | | | 0.579 | | | 0.616 | 0.616 | 0.767 |
| (18) F56/F1 | −1.00 | −5.00 | | | −1.827 | | | −2.289 | −2.220 | −4.731 |
| (19) ν1n − ν1p | 35.00 | 20.00 | | | 24.800 | | | 24.800 | 24.800 | 27.765 |
| (20) L1/L | 0.50 | 0.25 | | | 0.329 | | | 0.291 | 0.333 | 0.359 |
| PNPP(P or N) are present and second to fourth lens units are configured to move? | | | | | yes | | | yes | yes | yes |
| NPNPNP~ | | | yes | no | no | no | no | no | no | no |
| Prerequisite components | | | yes | no | no | no | no | no | no | no |
| (21) M2/M4 | 0.90 | 0.50 | 0.514 | | | | | | | |
| (22) MD45/M4 | 1.00 | −1.00 | −0.272 | | | | | | | |
| (23) f1/fw | −1.50 | −2.50 | −2.295 | | | | | | | |
| (24) f1/f3 | 2.00 | 0.50 | 1.725 | | | | | | | |

TABLE 3

Relationships between the respective conditional expressions and various numerical values in Numerical Embodiments 17 to 23

| Conditional Expression | Upper limit value | Lower limit value | Embodiment 17 | 18 | 19 | 20 | 21 | 22 | 23 |
|---|---|---|---|---|---|---|---|---|---|
| PN are present before stop? | | | yes | yes | yes | yes | yes | yes | yes |
| N is present immediately before stop? | | | no | yes | yes | no | yes | yes | yes |
| There are only three lens units after stop? | | | no | yes | yes | no | yes | yes | no |
| Two lens units after stop are configured to move? | | | no | yes | yes | yes | yes | yes | yes |
| Prerequisite components | | | no | yes | yes | no | yes | yes | no |
| (1) Mr2/fr2 | 0.45 | −0.80 | | −0.769 | 0.538 | | 0.080 | 0.277 | |
| (2) Mr2/fw | 0.30 | −2.00 | | −2.305 | −1.825 | | −0.365 | −2.304 | |
| (3) Mr1/Mr2 | 2.00 | −15.00 | | 0.446 | 1.100 | | 4.982 | 0.556 | |
| (4) \|fr1\|/fw | 15.00 | 1.00 | | 6.743 | 1.702 | | 2.641 | 2.189 | |
| (5) \|fr2\|/fw | 5.50 | 1.00 | | 2.999 | 3.391 | | 4.574 | 8.317 | |
| (6) \|fr1/fr2\| | 4.91 | 0.44 | | 2.249 | 0.502 | | 0.577 | 0.263 | |
| PNP~ | | | yes | yes | no | no | no | no | no |
| Prerequisite components | | | yes | yes | no | no | no | no | no |
| (7) f1/fw | 4.50 | 0.50 | 3.002 | 2.752 | | | | | |
| (8) SPt/SPw | 3.00 | 1.10 | 1.303 | 2.185 | | | | | |
| (9) f1/f2w | −0.50 | −2.50 | −2.526 | −2.690 | | | | | |
| Third lens unit is PP | | | yes | yes | | | | | |
| (10) \|fw/fr\| | 0.40 | 0.00 | 0.189 | 0.069 | | | | | |
| (11) f11/f1 | −0.30 | −2.00 | −0.848 | −1.379 | | | | | |
| (12) f13/f11 | −0.50 | −4.00 | −1.196 | −0.794 | | | | | |
| (13) f31/f32 | 3.00 | 0.20 | 4.240 | 2.249 | | | | | |
| PNPP~ | | | yes | yes | no | no | no | no | no |
| IF with third lens unit | | | yes | yes | no | no | no | no | no |
| 11 lens sub unit is NNP? | | | yes | yes | yes | yes | yes | yes | yes |
| Prerequisite components | | | yes | yes | no | no | no | no | no |
| (14) S.F. | 2.00 | −0.50 | 0.031 | 0.069 | | | | | |
| (15) Lsp/L | 0.60 | 0.10 | 0.589 | 0.517 | | | | | |
| (16) G1f/G2f | 1.00 | 0.40 | 0.559 | 0.682 | | | | | |
| (17) F1-4/F1 | 0.80 | 0.50 | 0.630 | 0.589 | | | | | |
| (18) F56/F1 | −1.00 | −5.00 | −2.258 | −1.678 | | | | | |
| (19) ν1n − ν1p | 35.00 | 20.00 | 28.200 | 29.240 | | | | | |
| (20) L1/L | 0.50 | 0.25 | 0.295 | 0.278 | | | | | |
| PNPP(P or N) are present and second to fourth lens units are configured to move? | | | yes | yes | | | | | |
| NPNPNP~ | | | no | no | yes | yes | yes | yes | yes |
| Prerequisite components | | | no | no | yes | yes | yes | yes | yes |
| (21) M2/M4 | 0.90 | 0.50 | | | 0.841 | 0.902 | 0.849 | 0.745 | 0.864 |
| (22) MD45/M4 | 1.00 | −1.00 | | | −0.091 | −0.003 | −0.799 | 0.798 | −0.799 |
| (23) f1/fw | −1.50 | −2.50 | | | −2.044 | −2.261 | −1.740 | −2.302 | −1.740 |
| (24) f1/f3 | 2.00 | 0.50 | | | 1.679 | 1.053 | 0.691 | 1.621 | 0.698 |

As described above, according to each of Embodiments, it is possible to achieve a wide angle zoom lens having an entire optical system small in size with a long back focus and a small F-number (bright).

Next, a camera according to an embodiment of the present invention using the zoom lens according to one embodiment of the present invention as a photographing optical system is described with reference to FIG. 96.

Figure 96:
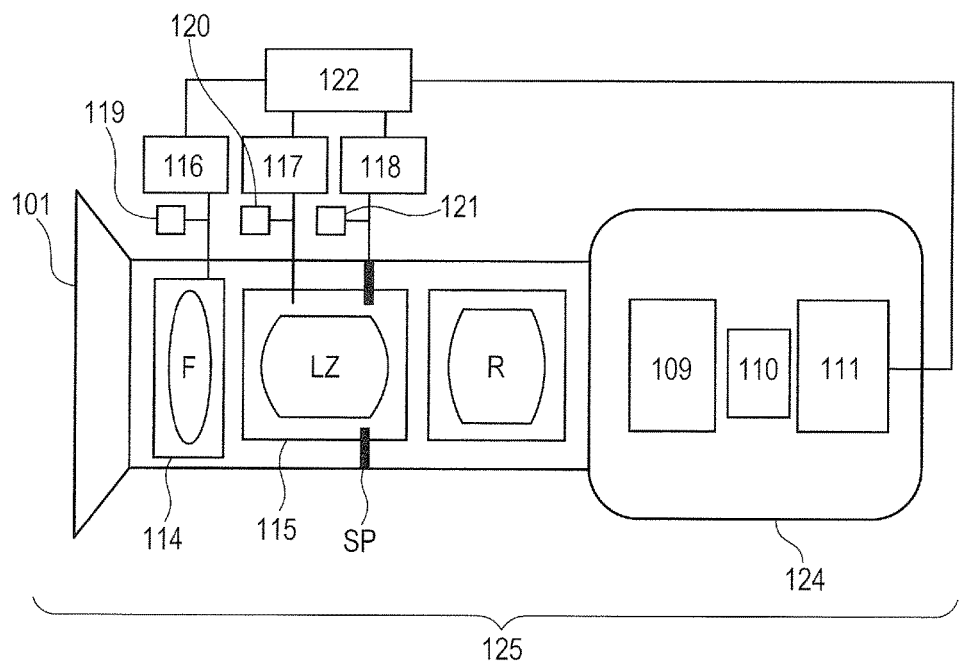
FIG. 96 is a diagram for illustrating an image pickup apparatus according to an embodiment of the present invention.

FIG. 96 is a schematic view of a main part of an image pickup apparatus (television camera system) using the zoom lens according to each of the Embodiments as a photographing optical system. FIG. 96 is an illustration of a zoom lens 101 according to any one of Embodiments 1 to 23, and a camera 124. The zoom lens 101 is configured to be detachably attachable to the camera 124. An image pickup apparatus 125 is formed by attaching the zoom lens 101 to the camera 124. The zoom lens 101 includes a first lens unit F, a zoom portion LZ, and a rear lens unit R for forming an image. The first lens unit F includes a lens unit for achieving in-focus. The zoom portion LZ includes the second lens unit U2 and the third lens unit U3 of Embodiments 1 to 23, which are configured to move on the optical axis for zooming. The rear lens unit R arranged closest to the image side is an imaging lens unit configured not to move for zooming. The aperture stop is denoted by SP. Drive mechanisms 114 and 115, such as helicoids and cams, are configured to drive the first lens unit F and the zoom portion LZ in the optical axis direction, respectively. Motors (drive units) 116 to 118 are configured to electrically drive the drive mechanisms 114 and 115 and the aperture stop SP, respectively. Detectors 119 to 121, such as encoders, potentiometers, or photosensors, are configured to detect positions of the first lens unit F and the zoom portion LZ on the optical axis, and the aperture diameter of the aperture stop SP, respectively. When the zoom lens includes a moving lens unit within the rear lens unit R, the same components as the components 114 to 121 are added to the rear lens unit R. The camera 124 includes a glass block 109, which corresponds to a color separation optical system or an optical filter in the camera 124, and a solid state image pickup element (photoelectric converter) 110, e.g., a CCD sensor or a CMOS sensor, which is configured to receive light of a subject image formed by the zoom lens 101. Moreover, central processing units (CPUs) 111 and 122 are configured to control various kinds of driving of the camera 124 and the zoom lens 101.

When an electronic image pickup element, e.g., a CCD, is used as the image pickup element, an output image can be made to have higher image quality by electronically correcting aberrations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-206174, filed Oct. 20, 2015, Japanese Patent Application No. 2015-206171, filed Oct. 20, 2015, Japanese Patent Application No. 2015-206173, filed Oct. 20, 2015, Japanese Patent Application No. 2015-206068, filed Oct. 20, 2015, and Japanese Patent Application No. 2015-206172, filed Oct. 20, 2015, which are hereby incorporated by reference herein in their entirety.

What is claimed is:

1. A zoom lens comprising in order from an object side to an image side:
a first lens unit configured not to be moved for zooming;
an Nf lens unit including three or more lenses and having a negative refractive power;
an aperture stop;
a first rear lens unit configured to be moved for zooming;
a second rear lens unit configured to be moved for zooming; and
a third rear lens unit configured not to be moved for zooming, wherein
the first lens unit includes four or more lenses and includes one or more sub lens units each having a positive refractive power, and
conditional expressions $-0.80 < Mr2/fr2 < 0.45;$ $-2.0 < Mr2/fw < 0.3;$ and $-15.0 < Mr1/Mr2 < 2.0$ are satisfied where Mr1 represents a difference between positions of the first rear lens unit at a wide angle end and a telephoto end in an optical axis direction, Mr2 represents a difference between positions of the second rear lens unit at the wide angle end and the telephoto end in the optical axis direction, fr2 represents a focal length of the second rear lens unit, fw represents a focal length of the zoom lens at the wide angle end, Mr1 has a positive sign in a case where the first rear lens unit is moved to the image side for zooming from the wide angle end to the telephoto end, and Mr2 has a positive sign in a case where the second rear lens unit is moved to the image side for zooming from the wide angle end to the telephoto end.

2. A zoom lens according to claim 1, wherein conditional expressions $1.0 < |fr1|/fw < 15.0;$ and $1.0 < |fr2|/fw < 5.5$ are satisfied where fr1 represents a focal length of the first rear lens unit.

3. A zoom lens according to claim 1, wherein at least one of the first rear lens unit and the second rear lens unit has a positive refractive power, and is positioned on the object side at the telephoto end with respect to the wide angle end.

4. A zoom lens according to claim 1, wherein the aperture stop is not moved for zooming.

5. A zoom lens according to claim 1, wherein the zoom lens conducts focusing with one of the one or more sub lens unit.

6. A zoom lens according to claim 1, wherein a conditional expression $0.44 < |fr1/fr2| < 4.91,$ is satisfied where fr1 represents a focal length of the first rear lens unit.

7. A zoom lens comprising in order from an object side to an image side:
a first lens unit having a positive refractive power and configured not to be moved for zooming;
a second lens group including one or more lens units, having a negative refractive power as a whole, and configured to be moved for zooming;
an aperture stop;
a third lens group including one or more lens units, having a positive refractive power as a whole, and configured to be moved for zooming; and
a rear lens unit arranged closest to the image side and configured not to be moved for zooming, wherein
the first lens unit includes in order from the object side to the image side:
an 11 sub lens unit having a negative refractive power and configured not to be moved for focusing;
a 12 sub lens unit having a positive refractive power and configured to be moved for focusing; and
a 13 sub lens unit having a positive refractive power, and
conditional expressions $0.5 < f1/fw < 4.5;$ and $1.1 < SPt/SPw < 3.0$ are satisfied where f1 represents a focal length of the first lens unit, fw represents a focal length of the zoom lens at a wide angle end, and SPw and SPt respectively represent aperture diameters of the aperture stop at the wide angle end and a telephoto end with respect to an open F-number.

8. A zoom lens according to claim 7, wherein a conditional expression $-2.5 < f1/f2w < -0.5$ is satisfied where f2w represents a focal length of the second lens group at the wide angle end.

9. A zoom lens according to claim 7, wherein the third lens group includes in order from the object side to the image side:
a 31 sub lens unit having a positive refractive power; and
a 32 sub lens unit having a positive refractive power.

10. A zoom lens according to claim 7, wherein an interval between the rear lens unit and the aperture stop does not change for zooming.

11. A zoom lens according to claim 7, wherein a conditional expression $0.0 < |fw/fr1| < 0.4$ is satisfied where fr represents a focal length of the rear lens unit.

12. A zoom lens according to claim 9, wherein conditional expressions $-2.0 < f11/f1 < -0.3;$ $-4.0 < f13/f11 < -0.5;$ and $0.2 < f31/f32 < 3.0$ are satisfied where f11 represents a focal length of the 11 sub lens unit, f13 represents a focal length of the 13 sub lens unit, f31 represents a focal length of the 31 sub lens unit, and f32 represents a focal length of the 32 sub lens unit.

13. A zoom lens according to claim 7, wherein a part of the rear lens unit is moved in a direction having a component in a direction perpendicular to an optical axis, to conduct an image stabilization.

14. A zoom lens comprising in order from an object side to an image side:
   a first lens unit having a positive refractive power;
   a second lens unit having a negative refractive power;
   a third lens unit having a positive refractive power;
   a fourth lens unit having a positive refractive power; and
   a fifth lens unit, wherein
an interval between each pair of adjacent lens units is changed for zooming,
   the zoom lens further comprises an aperture stop between the second lens unit and the third lens unit or between the third lens unit and the fourth lens unit;
   the first lens unit includes:
      an 11 sub lens unit having a negative refractive power and configured not to be moved for focusing;
      a 12 sub lens unit having a positive refractive power and configured to be moved for focusing; and
      a 13 sub lens unit having a positive refractive power and configured not to be moved for focusing;
   the 11 sub lens unit includes in order from the object side to the image side:
      a 111 lens having a negative refractive power;
      a 112 lens having a negative refractive power; and
      a 113 lens having a positive refractive power,
   conditional expressions $$-0.5 < (G112R1+G112R2)/(G112R1-G112R2) < 2.0,$$
and
$$0.1 < Lsp/L < 0.6$$

are satisfied where G112R1 represents a curvature radius of a lens surface on the object side of the 112 lens, G112R2 represents a curvature radius of a lens surface on the image side of the 112 lens, Lsp represents a distance on an optical axis from a lens surface closest to the object side to the aperture stop at the wide angle end, and L represents a distance on the optical axis from the lens surface closest to the object side to a lens surface closest to the image side at the wide angle end.

15. A zoom lens according to claim 14, wherein a conditional expression $$0.4 < f111/f112 < 1.0$$

is satisfied where f111 represents a focal length of the 111 lens, and f112 represents a focal length of the 112 lens.

16. A zoom lens according to claim 14, wherein conditional expressions $$-5.0 < f113/f11 < -1.0;$$

$$0.5 < f11na/f11 < 0.8; \text{ and}$$

$$20.0 < v11na - v113 < 35.0$$

are satisfied where f11 represents a focal length of the 11 sub lens unit, f11na represents a combined focal length of the 111 lens and the 112 lens, f113 represents a focal length of the 113 lens, v11na represents an average value of an Abbe number of a material of the 111 lens and an Abbe number of a material of the 112 lens, and v113 represents an Abbe number of a material of the 113 lens.

17. A zoom lens according to claim 14, wherein a conditional expression $$0.25 < L1/L < 0.50$$

is satisfied where L1 represents a distance on the optical axis from a vertex, of a lens surface of the first lens unit, closest to the object side, to a vertex, of a lens surface of the first lens unit, closest to the image side.

18. A zoom lens according to claim 14, wherein the second lens unit, the third lens unit, and the fourth lens unit is moved for zooming along respective loci different from one another.

19. A zoom lens according to claim 14, wherein the second lens unit is moved toward the image side, the third lens unit is moved along a locus convex to the image side, and the fourth lens unit is moved toward the object side, for zooming from the wide angle end to a telephoto end.

20. A zoom lens according to claim 14, wherein, during zooming from the wide angle end to a telephoto end, the second lens unit is moved toward the image side, the third lens unit is moved toward the image side, and the fourth lens unit is moved toward the object side.

21. A zoom lens comprising in order from an object side to an image side:
   a first lens unit having a negative refractive power;
   a second lens unit having a positive refractive power;
   a third lens unit having a negative refractive power;
   a fourth lens unit having a positive refractive power;
   a fifth lens unit having a negative refractive power; and
   a sixth lens unit having a positive refractive power,
   wherein
   an interval between each adjacent lens units, among the first lens unit, the second lens unit, the third lens unit, the fourth lens unit, the fifth lens unit, and the sixth lens unit, is changed for zooming,
   the first lens unit is configured not to be moved for zooming,
   the first lens unit includes a negative lens at a position closest to the object side, and
   a conditional expression $$0.5 < M4/M2 < 0.95$$

is satisfied where M2 represents a difference between positions of the second lens unit at a wide angle end and a telephoto end in an optical axis direction, M4 represents a difference between positions of the fourth lens unit at the wide angle end and the telephoto end in the optical axis direction, M2 has a positive sign in a case where the second lens unit is moved to the image side for zooming from the wide angle end to the telephoto end, and M4 has a positive sign in a case where the fourth lens unit is moved to the image side for zooming from the wide angle end to the telephoto end.

22. A zoom lens according to claim 21, wherein a conditional expression $$-1.0 < MD45/M4 < 1.0$$

is satisfied where MD45 represents a value obtained by subtracting an interval between the fourth lens unit and the fifth lens unit at the wide angle end from an interval between the fourth lens unit and the fifth lens unit at the telephoto end.

23. A zoom lens according to claim 21, wherein the zoom lens conducts focusing with a sub lens unit included in the first lens unit.

24. A zoom lens according to claim 21, wherein the first lens unit consists of five or less lenses.

25. A zoom lens according to claim 21, wherein the third lens unit includes a plurality of negative lenses.

26. A zoom lens according to claim 21, wherein conditional expressions $$-2.5<f1/fw<-1.5; \text{ and}$$

$$0.5<f1/f3<2.0$$

are satisfied where f1 represents a focal length of the first lens unit, fw represents a focal length of the zoom lens at the wide angle end, and f3 represents a focal length of the third lens unit.

27. A zoom lens according to claim 21, wherein the zoom lens further comprises an aperture stop nearer to the third lens unit than to another lens unit.

28. A zoom lens according to claim 21, wherein at least the second lens unit, the fourth lens unit, and the fifth lens unit are moved for zooming.

29. An image pickup apparatus comprising a zoom lens, the zoom lens comprising in order from an object side to an image side:
   a first lens unit configured not to be moved for zooming;
   an Nf lens unit including three or more lenses and having a negative refractive power;
   an aperture stop;
   a first rear lens unit configured to be moved for zooming;
   a second rear lens unit configured to be moved for zooming; and
   a third rear lens unit configured not to be moved for zooming, wherein
   the first lens unit includes four or more lenses and includes one or more sub lens units each having a positive refractive power, and
   conditional expressions $$-0.80<Mr2/fr2<0.45;$$

$$-2.0<Mr2/fw<0.3; \text{ and}$$

$$-15.0<Mr1/Mr2<2.0$$

are satisfied where Mr1 represents a difference between positions of the first rear lens unit at a wide angle end and a telephoto end in an optical axis direction, Mr2 represents a difference between positions of the second rear lens unit at the wide angle end and the telephoto end in the optical axis direction, fr2 represents a focal length of the second rear lens unit, fw represents a focal length of the zoom lens at the wide angle end, Mr1 has a positive sign in a case where the first rear lens unit is moved to the image side for zooming from the wide angle end to the telephoto end, and Mr2 has a positive sign in a case where the second rear lens unit is moved to the image side for zooming from the wide angle end to the telephoto end.

30. An image pickup apparatus comprising a zoom lens, the zoom lens comprising in order from an object side to an image side:
   a first lens unit having a positive refractive power and configured not to be moved for zooming;
   a second lens group including one or more lens unit, having a negative refractive power as a whole, and configured to be moved for zooming;
   an aperture stop;
   a third lens group including one or more lens units, having a positive refractive power as a whole, and configured to be moved for zooming; and
   a rear lens unit arranged closest to the image side and configured not to be moved for zooming, wherein
   the first lens unit includes in order from the object side to the image side:
      an 11 sub lens unit having a negative refractive power and configured not to be moved for focusing;
      a 12 sub lens unit having a positive refractive power and configured to be moved for focusing; and
      a 13 sub lens unit having a positive refractive power, and
   conditional expressions $$0.5<f1/fw<4.5; \text{ and}$$

$$1.1<SPt/SPw<3.0$$

are satisfied where f1 represents a focal length of the first lens unit, fw represents a focal length of the zoom lens at a wide angle end, and SPw and SPt respectively represent aperture diameters of the aperture stop at the wide angle end and a telephoto end with respect to an open F-number.

31. An image pickup apparatus comprising a zoom lens, the zoom lens comprising in order from an object side to an image side:
   a first lens unit having a positive refractive power;
   a second lens unit having a negative refractive power;
   a third lens unit having a positive refractive power;
   a fourth lens unit having a positive refractive power; and
   a fifth lens unit, wherein
   an interval between each pair of adjacent lens units is changed for zooming,
   the zoom lens further comprises an aperture stop between the second lens unit and the third lens unit or between the third lens unit and the fourth lens unit;
   the first lens unit includes:
      an 11 sub lens unit having a negative refractive power and configured not to be moved for focusing;
      a 12 sub lens unit having a positive refractive power and configured to be moved for focusing; and
      a 13 sub lens unit having a positive refractive power and configured not to be moved for focusing;
   the 11 sub lens unit includes in order from the object side to the image side:
      a 111 lens having a negative refractive power;
      a 112 lens having a negative refractive power; and
      a 113 lens having a positive refractive power,
   conditional expressions $$-0.5<(G112R1+G112R2)/(G112R1-G112R2)<2.0, \text{ and}$$

$$0.1<Lsp/L<0.6$$

are satisfied where G112R1 represents a curvature radius of a lens surface on the object side of the 112 lens, G112R2 represents a curvature radius of a lens surface on the image side of the 112 lens, Lsp represents a distance on an optical axis from a lens surface closest to the object side to the aperture stop at the wide angle end, and L represents a distance on the optical axis from the lens surface closest to the object side to a lens surface closest to the image side at the wide angle end.

32. An image pickup apparatus comprising a zoom lens, the zoom lens comprising in order from an object side to an image side:
   a first lens unit having a negative refractive power;
   a second lens unit having a positive refractive power;
   a third lens unit having a negative refractive power;
   a fourth lens unit having a positive refractive power;
   a fifth lens unit having a negative refractive power; and
   a sixth lens unit having a positive refractive power, wherein
an interval between each adjacent lens units, among the first lens unit, the second lens unit, the third lens unit, the fourth lens unit, the fifth lens unit, and the sixth lens unit, is changed for zooming,
the first lens unit is configured not to be moved for zooming,
the first lens unit includes a negative lens at a position closest to the object side, and
a conditional expression $$0.5 < M4/M2 < 0.95$$

is satisfied where M2 represents a difference between positions of the second lens unit at a wide angle end and a telephoto end in an optical axis direction, M4 represents a difference between positions of the fourth lens unit at the wide angle end and the telephoto end in the optical axis direction, M2 has a positive sign in a case where the second lens unit is moved to the image side for zooming from the wide angle end to the telephoto end, and M4 has a positive sign in a case where the fourth lens unit is moved to the image side for zooming from the wide angle end to the telephoto end.

* * * * *